(12) United States Patent
Cranfill et al.

(10) Patent No.: US 11,363,137 B2
(45) Date of Patent: Jun. 14, 2022

(54) USER INTERFACES FOR MANAGING CONTACTS ON ANOTHER ELECTRONIC DEVICE

(71) Applicant: Apple Inc., Cupertino, CA (US)

(72) Inventors: Elizabeth Caroline Cranfill, San Francisco, CA (US); Pablo F. Caro, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/888,543

(22) Filed: May 29, 2020

(65) Prior Publication Data
US 2020/0382637 A1 Dec. 3, 2020

Related U.S. Application Data

(60) Provisional application No. 62/855,998, filed on Jun. 1, 2019.

(51) Int. Cl.
*H04M 3/42* (2006.01)
*H04M 3/16* (2006.01)
*H04M 3/436* (2006.01)
*H04M 3/54* (2006.01)

(52) U.S. Cl.
CPC ......... *H04M 3/42059* (2013.01); *H04M 3/16* (2013.01); *H04M 3/436* (2013.01); *H04M 3/541* (2013.01)

(58) Field of Classification Search
None
See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,108,735 | A | 8/2000 | Pawlowski |
| 6,188,391 | B1 | 2/2001 | Seely et al. |
| 6,230,204 | B1 | 5/2001 | Fleming, III |
| 6,310,610 | B1 | 10/2001 | Beaton et al. |

(Continued)

FOREIGN PATENT DOCUMENTS

| | | |
|---|---|---|
| CN | 101339500 A | 1/2009 |
| CN | 103294965 A | 9/2013 |

(Continued)

OTHER PUBLICATIONS

Check your Apple ID device list to see where you're signed in, Apple Support, Available online at: <https://support.apple.com/en-us/HT205064>, Mar. 7, 2018, 4 pages.

(Continued)

*Primary Examiner* — Quoc D Tran
(74) *Attorney, Agent, or Firm* — Kubota & Basol LLP

(57) ABSTRACT

In some embodiments, a supervising electronic device manages communication restrictions of a supervised electronic device. In some embodiments, a supervised electronic device presents user interfaces that enforce one or more communication restrictions configured by a supervising electronic device when communicating with other users.

81 Claims, 85 Drawing Sheets

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 6,678,824 B1 | 1/2004 | Cannon et al. |
| 6,690,387 B2 | 2/2004 | Zimmerman et al. |
| 6,769,127 B1 | 7/2004 | Bonomi et al. |
| 6,785,889 B1 | 8/2004 | Williams |
| 7,015,894 B2 | 3/2006 | Morohoshi |
| 7,184,064 B2 | 2/2007 | Zimmerman et al. |
| 7,218,226 B2 | 5/2007 | Wehrenberg |
| 7,434,713 B2 | 10/2008 | Linden |
| 7,614,008 B2 | 11/2009 | Ording |
| 7,627,652 B1 | 12/2009 | Commons et al. |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,688,306 B2 | 3/2010 | Wehrenberg et al. |
| 7,814,055 B2 | 10/2010 | Hullot et al. |
| 7,822,713 B2 | 10/2010 | Hullot et al. |
| 7,844,914 B2 | 11/2010 | Andre et al. |
| 7,895,661 B2 | 2/2011 | Dowdy et al. |
| 7,899,714 B2 | 3/2011 | Robbin et al. |
| 7,957,762 B2 | 6/2011 | Herz et al. |
| 8,006,002 B2 | 8/2011 | Kalayjian et al. |
| 8,020,105 B1 | 9/2011 | Lemay et al. |
| 8,201,224 B1 | 6/2012 | Spertus |
| 8,239,784 B2 | 8/2012 | Hotelling et al. |
| 8,279,180 B2 | 10/2012 | Hotelling et al. |
| 8,285,810 B2 | 10/2012 | Svendsen et al. |
| 8,352,873 B2 | 1/2013 | Craig et al. |
| 8,381,135 B2 | 2/2013 | Hotelling et al. |
| 8,468,580 B1 | 6/2013 | Casey et al. |
| 8,479,122 B2 | 7/2013 | Hotelling et al. |
| 8,538,458 B2 | 9/2013 | Haney |
| 8,554,861 B2 | 10/2013 | Christie et al. |
| 8,713,535 B2 | 4/2014 | Malhotra et al. |
| 8,812,994 B2 | 8/2014 | Seymour et al. |
| 8,825,036 B2 | 9/2014 | Kemery |
| 9,129,135 B2 | 9/2015 | Hoefel et al. |
| 9,137,389 B2 | 9/2015 | Neal et al. |
| 9,172,705 B1 | 10/2015 | Kong et al. |
| 9,213,845 B1 | 12/2015 | Taraki et al. |
| 9,270,760 B2 | 2/2016 | Heinberg |
| 9,292,882 B2 | 3/2016 | Blinder |
| 9,294,460 B1 | 3/2016 | Thomas |
| 9,348,458 B2 | 5/2016 | Hotelling et al. |
| 9,473,419 B2 | 10/2016 | Brand |
| 9,626,720 B2 | 4/2017 | Robbin et al. |
| 9,755,842 B2 | 9/2017 | Raleigh et al. |
| 9,769,310 B2 * | 9/2017 | Hodge ............... H04M 3/4365 |
| 9,870,238 B2 | 1/2018 | Astete et al. |
| 9,875,346 B2 | 1/2018 | Pitschel et al. |
| 9,933,937 B2 | 4/2018 | Lemay et al. |
| 9,935,956 B1 | 4/2018 | Cha et al. |
| 10,122,723 B1 * | 11/2018 | Chang ............... H04L 63/101 |
| 10,243,824 B2 | 3/2019 | Zalmanovitch et al. |
| 2002/0015024 A1 | 2/2002 | Westerman et al. |
| 2002/0049806 A1 | 4/2002 | Gatz et al. |
| 2002/0065919 A1 | 5/2002 | Taylor et al. |
| 2003/0028622 A1 | 2/2003 | Inoue et al. |
| 2003/0061111 A1 | 3/2003 | Dutta et al. |
| 2003/0112874 A1 | 6/2003 | Rabinowitz et al. |
| 2004/0015985 A1 | 1/2004 | Kweon |
| 2004/0034853 A1 | 2/2004 | Gibbons et al. |
| 2004/0127197 A1 | 7/2004 | Roskind |
| 2004/0133793 A1 | 7/2004 | Ginter et al. |
| 2004/0236650 A1 | 11/2004 | Zapiec et al. |
| 2005/0060412 A1 | 3/2005 | Chebolu et al. |
| 2005/0190059 A1 | 9/2005 | Wehrenberg |
| 2005/0273399 A1 | 12/2005 | Soma et al. |
| 2006/0017692 A1 | 1/2006 | Wehrenberg et al. |
| 2006/0026521 A1 | 2/2006 | Hotelling et al. |
| 2006/0033724 A1 | 2/2006 | Chaudhri et al. |
| 2006/0150240 A1 | 7/2006 | Robinson et al. |
| 2006/0197753 A1 | 9/2006 | Hotelling |
| 2006/0265192 A1 | 11/2006 | Turicchi |
| 2007/0261030 A1 | 11/2007 | Wadhwa |
| 2008/0005319 A1 | 1/2008 | Anderholm et al. |
| 2008/0134295 A1 | 6/2008 | Bailey et al. |
| 2008/0154903 A1 | 6/2008 | Crowley et al. |
| 2009/0064314 A1 | 3/2009 | Lee |
| 2009/0086010 A1 | 4/2009 | Tiphane |
| 2009/0150545 A1 | 6/2009 | Flores et al. |
| 2009/0197569 A1 | 8/2009 | Gaznaghi et al. |
| 2009/0254656 A1 | 10/2009 | Vignisson et al. |
| 2009/0300671 A1 | 12/2009 | Scott et al. |
| 2010/0077036 A1 | 3/2010 | Deluca et al. |
| 2010/0146607 A1 | 6/2010 | Piepenbrink et al. |
| 2010/0188579 A1 | 7/2010 | Friedman |
| 2010/0205656 A1 | 8/2010 | Fein et al. |
| 2010/0302182 A1 | 12/2010 | Wei et al. |
| 2010/0306163 A1 | 12/2010 | Beaty et al. |
| 2010/0312696 A1 | 12/2010 | Sinha et al. |
| 2011/0055735 A1 | 3/2011 | Wood et al. |
| 2011/0065419 A1 | 3/2011 | Book et al. |
| 2011/0078767 A1 | 3/2011 | Cai et al. |
| 2011/0108622 A1 | 5/2011 | Das et al. |
| 2011/0295727 A1 | 12/2011 | Ferris et al. |
| 2011/0302182 A1 | 12/2011 | Crawford |
| 2012/0014516 A1 | 1/2012 | Nies |
| 2012/0036552 A1 | 2/2012 | Dare et al. |
| 2012/0047024 A1 | 2/2012 | Urban et al. |
| 2012/0101952 A1 | 4/2012 | Raleigh et al. |
| 2012/0117478 A1 | 5/2012 | Vadde et al. |
| 2012/0210444 A1 | 8/2012 | Yabe et al. |
| 2012/0265803 A1 | 10/2012 | Ha et al. |
| 2012/0291101 A1 | 11/2012 | Ahlstrom et al. |
| 2012/0317609 A1 | 12/2012 | Carrara et al. |
| 2012/0331568 A1 | 12/2012 | Weinstein et al. |
| 2013/0017806 A1 | 1/2013 | Sprigg et al. |
| 2013/0018960 A1 | 1/2013 | Knysz et al. |
| 2013/0031191 A1 | 1/2013 | Bott |
| 2013/0060616 A1 | 3/2013 | Block et al. |
| 2013/0065555 A1 | 3/2013 | Baker et al. |
| 2013/0073654 A1 | 3/2013 | Cohen et al. |
| 2013/0080522 A1 | 3/2013 | Ren |
| 2013/0083059 A1 | 4/2013 | Hwang et al. |
| 2013/0086169 A1 | 4/2013 | Bruich et al. |
| 2013/0088650 A1 | 4/2013 | Rouady et al. |
| 2013/0169546 A1 | 7/2013 | Thomas et al. |
| 2013/0174100 A1 | 7/2013 | Seymour et al. |
| 2013/0227675 A1 | 8/2013 | Fujioka |
| 2013/0231093 A1 | 9/2013 | Toy et al. |
| 2013/0254288 A1 | 9/2013 | Harrison |
| 2013/0254660 A1 | 9/2013 | Fujioka |
| 2013/0311597 A1 | 11/2013 | Arrouye et al. |
| 2014/0009378 A1 | 1/2014 | Chew |
| 2014/0045472 A1 * | 2/2014 | Sharma ............... H04W 12/50 455/416 |
| 2014/0068755 A1 | 3/2014 | King et al. |
| 2014/0113593 A1 * | 4/2014 | Zhou ............... H04W 12/08 455/411 |
| 2014/0136607 A1 | 5/2014 | Ou et al. |
| 2014/0150068 A1 | 5/2014 | Janzer |
| 2014/0162595 A1 | 6/2014 | Raleigh et al. |
| 2014/0237235 A1 | 8/2014 | Kuno et al. |
| 2014/0248852 A1 | 9/2014 | Raleigh et al. |
| 2014/0289866 A1 | 9/2014 | Beck et al. |
| 2014/0298207 A1 | 10/2014 | Ittah et al. |
| 2014/0320398 A1 | 10/2014 | Papstein |
| 2014/0325407 A1 | 10/2014 | Morris et al. |
| 2014/0330945 A1 | 11/2014 | Dabbiere et al. |
| 2014/0331314 A1 | 11/2014 | Fujioka |
| 2014/0337997 A1 | 11/2014 | Beck et al. |
| 2014/0344951 A1 | 11/2014 | Brewer |
| 2014/0364056 A1 | 12/2014 | Belk et al. |
| 2015/0006723 A1 | 1/2015 | Sheth et al. |
| 2015/0049018 A1 | 2/2015 | Gomez |
| 2015/0106833 A1 | 4/2015 | Kang et al. |
| 2015/0153928 A1 | 6/2015 | Chen et al. |
| 2015/0269547 A1 | 9/2015 | Fan et al. |
| 2015/0323974 A1 | 11/2015 | Shuster et al. |
| 2015/0341484 A1 | 11/2015 | Yablokov et al. |

(56) References Cited

U.S. PATENT DOCUMENTS

| | | | |
|---|---|---|---|
| 2015/0341506 A1 | 11/2015 | Mirza et al. | |
| 2015/0348032 A1 | 12/2015 | Ioveva et al. | |
| 2015/0348185 A1 | 12/2015 | Frost et al. | |
| 2015/0350215 A1 | 12/2015 | Shi et al. | |
| 2016/0050194 A1 | 2/2016 | Rachmiel | |
| 2016/0080510 A1 | 3/2016 | Dawoud et al. | |
| 2016/0094538 A1 | 3/2016 | Dabbiere et al. | |
| 2016/0094881 A1 | 3/2016 | Khatua | |
| 2016/0127210 A1 | 5/2016 | Noureddin et al. | |
| 2016/0139752 A1 | 5/2016 | Shim et al. | |
| 2016/0188821 A1 | 6/2016 | Ozeran | |
| 2016/0198322 A1 | 7/2016 | Pitis | |
| 2016/0232336 A1 | 8/2016 | Pitschel et al. | |
| 2016/0292060 A1 | 10/2016 | Mathew et al. | |
| 2016/0323191 A1 | 11/2016 | Aoki | |
| 2016/0330078 A1 | 11/2016 | Bostick et al. | |
| 2016/0349932 A1 | 12/2016 | Gomy | |
| 2016/0373588 A1 | 12/2016 | Raleigh et al. | |
| 2017/0010794 A1 | 1/2017 | Cho et al. | |
| 2017/0019858 A1 | 1/2017 | Zhao et al. | |
| 2017/0034228 A1 | 2/2017 | Grossman et al. | |
| 2017/0053129 A1 | 2/2017 | Arif et al. | |
| 2017/0055110 A1 | 2/2017 | Tian et al. | |
| 2017/0149795 A1 | 5/2017 | Day, II | |
| 2017/0180494 A1 | 6/2017 | Agrawal et al. | |
| 2017/0201850 A1 | 7/2017 | Raleigh et al. | |
| 2017/0251268 A1 | 8/2017 | Zhao | |
| 2017/0279971 A1 | 9/2017 | Raleigh et al. | |
| 2017/0295258 A1 | 10/2017 | Raleigh et al. | |
| 2018/0018252 A1 | 1/2018 | Farrell et al. | |
| 2018/0046818 A1 | 2/2018 | Amacker et al. | |
| 2018/0060102 A1 | 3/2018 | Zhu et al. | |
| 2018/0224915 A1 | 8/2018 | Shuster et al. | |
| 2018/0276353 A1 | 9/2018 | Pitschel et al. | |
| 2018/0343306 A1 | 11/2018 | Lotter et al. | |
| 2019/0037037 A1 | 1/2019 | Umeya et al. | |
| 2019/0081949 A1 | 3/2019 | Wu et al. | |
| 2019/0082227 A1 | 3/2019 | Zhao | |
| 2019/0124065 A1* | 4/2019 | Hodge | H04L 63/102 |
| 2019/0347180 A1 | 11/2019 | Cranfill et al. | |
| 2019/0347181 A1 | 11/2019 | Cranfill et al. | |
| 2020/0358765 A1* | 11/2020 | Olsen | H04L 63/102 |
| 2020/0410584 A1 | 12/2020 | Frost et al. | |
| 2021/0109836 A1 | 4/2021 | Cranfill et al. | |

FOREIGN PATENT DOCUMENTS

| | | |
|---|---|---|
| CN | 104471521 A | 3/2015 |
| CN | 104487929 A | 4/2015 |
| CN | 104636645 A | 5/2015 |
| CN | 105308634 A | 2/2016 |
| CN | 107533368 A | 1/2018 |
| CN | 107637055 A | 1/2018 |
| EP | 2429183 A1 | 3/2012 |
| EP | 2860608 A1 | 4/2015 |
| JP | 2000-163031 A | 6/2000 |
| JP | 2001-218976 A | 8/2001 |
| JP | 2002-342033 A | 11/2002 |
| JP | 2007-125338 A | 5/2007 |
| JP | 2016-13151 A | 1/2016 |
| JP | 2016-517598 A | 6/2016 |
| WO | 2007/064200 A1 | 6/2007 |
| WO | 2011/163481 A2 | 12/2011 |
| WO | 2013/169849 A2 | 11/2013 |
| WO | 2014/105276 A1 | 7/2014 |
| WO | 2014/144908 A1 | 9/2014 |
| WO | 2015/010111 A1 | 1/2015 |

OTHER PUBLICATIONS

Extended Search Report received for European Patent Application No. 17756993.6, dated Oct. 4, 2019, 7 pages.
Final Office Action received for U.S. Appl. No. 14/502,937, dated Aug. 9, 2019, 11 pages.
Final Office Action received for U.S. Appl. No. 14/502,937, dated May 10, 2018, 23 pages.
Final Office Action received for U.S. Appl. No. 14/502,981, dated Dec. 28, 2018, 29 pages.
Final Office Action received for U.S. Appl. No. 14/502,981, dated Oct. 12, 2017, 22 pages.
Final Office Action received for U.S. Appl. No. 14/683,093, dated Dec. 15, 2016, 11 pages.
Final Office Action received for U.S. Appl. No. 15/274,887, dated Jan. 5, 2018, 17 pages.
Final Office Action received for U.S. Appl. No. 15/875,934, dated Aug. 8, 2019, 11 pages.
Final Office Action received for U.S. Appl. No. 16/179,106, dated Mar. 6, 2020, 12 pages.
Final Office Action received for U.S. Appl. No. 15/875,934, dated Aug. 21, 2020, 11 pages.
International Search Report received for PCT Patent Application No. PCT/US2015/023406, dated Jun. 26, 2015, 3 pages.
International Search Report received for PCT Patent Application No. PCT/US2019/029214, dated Nov. 4, 2019, 6 pages.
My Data Manager Track your Mobile Data Usage and Save Money, AppPicker, Aug. 18, 2015, 4 pages.
Non-Final Office Action received for U.S. Appl. No. 14/502,937, dated Aug. 14, 2017, 19 pages.
Non-Final Office Action received for U.S. Appl. No. 14/502,937, dated Dec. 14, 2018, 24 pages.
Non-Final Office Action received for U.S. Appl. No. 14/502,981, dated Apr. 3, 2020, 42 pages.
Non-Final Office Action received for U.S. Appl. No. 14/502,981, dated Apr. 11, 2018, 20 pages.
Non-Final Office Action received for U.S. Appl. No. 14/502,981, dated Feb. 14, 2017, 17 pages.
Non-Final Office Action received for U.S. Appl. No. 14/683,093, dated Apr. 20, 2017, 11 pages.
Non-Final Office Action received for U.S. Appl. No. 14/683,093, dated May 5, 2016, 12 pages.
Non-Final Office Action received for U.S. Appl. No. 15/274,887, dated Jun. 23, 2017, 16 pages.
Non-Final Office Action received for U.S. Appl. No. 15/875,934, dated Jan. 23, 2020, 11 pages.
Non-Final Office Action received for U.S. Appl. No. 15/875,934, dated Nov. 30, 2018, 12 pages.
Non-Final Office Action received for U.S. Appl. No. 16/147,069, dated Jan. 6, 2020, 29 pages.
Non-Final Office Action received for U.S. Appl. No. 16/147,108, dated Mar. 22, 2019, 17 pages.
Non-Final Office Action received for U.S. Appl. No. 16/179,106, dated Oct. 23, 2019, 10 pages.
Notice of Allowance received for U.S. Appl. No. 14/502,937, dated Jul. 27, 2020, 4 pages.
Notice of Allowance received for U.S. Appl. No. 14/502,937, dated May 14, 2020, 20 pages.
Notice of Allowance received for U.S. Appl. No. 14/683,093, dated Sep. 6, 2017, 12 pages.
Notice of Allowance received for U.S. Appl. No. 15/274,887, dated Jul. 20, 2018, 10 pages.
Notice of Allowance received for U.S. Appl. No. 15/875,934, dated Nov. 25, 2019, 8 pages.
Notice of Allowance received for U.S. Appl. No. 16/147,069, dated Apr. 29, 2020, 8 pages.
Notice of Allowance received for U.S. Appl. No. 16/147,069, dated Aug. 19, 2020, 8 pages.
Notice of Allowance received for U.S. Appl. No. 16/147,108, dated Sep. 26, 2019, 28 pages.
Restriction Requirement received for U.S. Appl. No. 14/502,937, dated Feb. 14, 2017, 6 pages.
Search Report received for Danish Patent Application No. PA201870341, Completed on Sep. 6, 2018, 4 pages.
Search Report received for Danish Patent Application No. PA201870345, Completed on Aug. 28, 2018, 4 pages.
Golightly, Daniel, "Google Is Taking Steps In Search Of "Digital Wellbeing"—I/O 2018", Google Blog, Available Online at: <https://

(56) References Cited

OTHER PUBLICATIONS www.androidheadlines.com/2018/05/google-is-taking-steps-in-search-of-digital-wellbeing-i-o-2018. html>, May 8, 2018, 3 pages.

Koester, Mark, "Moment: Automatic Track and Know Your iPhone Usage", Minding the Borderlands, Available online at: <http://www.markwk.com/2016/11/iphone-tracking-with-moment.html>, Jan. 30, 2018, 6 pages.

Langer, Christina, "How To Disable Gmail Notifications on Android", Available online at: <https://ccm.net/faq/35590-how-to-disable-gmail-notifications-on-android>, Mar. 6, 2018, 2 pages.

Lee et al., "A Multi-Touch Three Dimensional Touch-Sensitive Tablet", CHI'85 Proceedings, Apr. 1985, pp. 21-25.

Nam, Luke, "Live in the Moment (app review)", deTeched, Available online at: <http://www.deteched.com/2017/11/20/live-moment-app-review/amp/>, Dec. 6, 2017, 5 pages.

Rubine, Dean, "Combining Gestures and Direct Manipulation", CHI'92, May 3-7, 1992, pp. 659-660.

Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Final Office Action received for U.S. Appl. No. 14/502,981, dated Oct. 15, 2020, 36 pages.

International Search Report received for PCT Patent Application No. PCT/US2020/035430, dated Oct. 28, 2020, 5 pages.

Invitation to Pay Additional Fees received for PCT Patent Application No. PCT/US2019/029214, dated Aug. 14, 2019, 16 pages.

Invitation to Pay Additional Fees received for PCT Patent Application No. PCT/US2020/035430, dated Sep. 7, 2020, 12 pages.

Extended European Search Report received for European Patent Application No. 20209029.6, dated Jul. 16, 2021, 10 pages.

Non-Final Office Action received for U.S. Appl. No. 15/875,934, dated Feb. 4, 2021, 12 pages.

Notice of Allowance received for U.S. Appl. No. 15/875,934, dated Jul. 30, 2021, 9 pages.

Search Report received for Chinese Patent Application No. 201811616437.2, dated Jan. 28, 2021, 4 pages (2 page of English Translation and 2 pages of Official Copy).

* cited by examiner

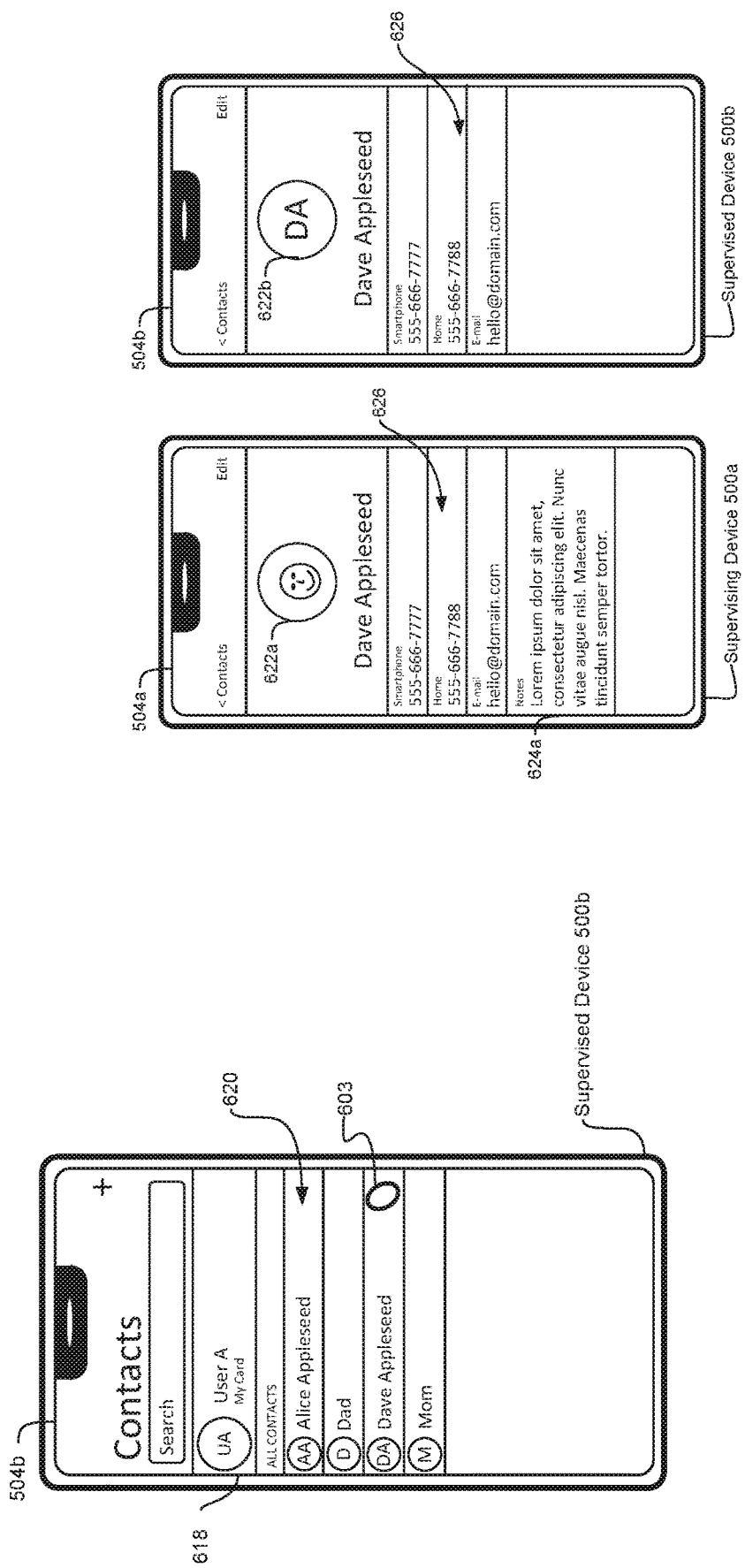

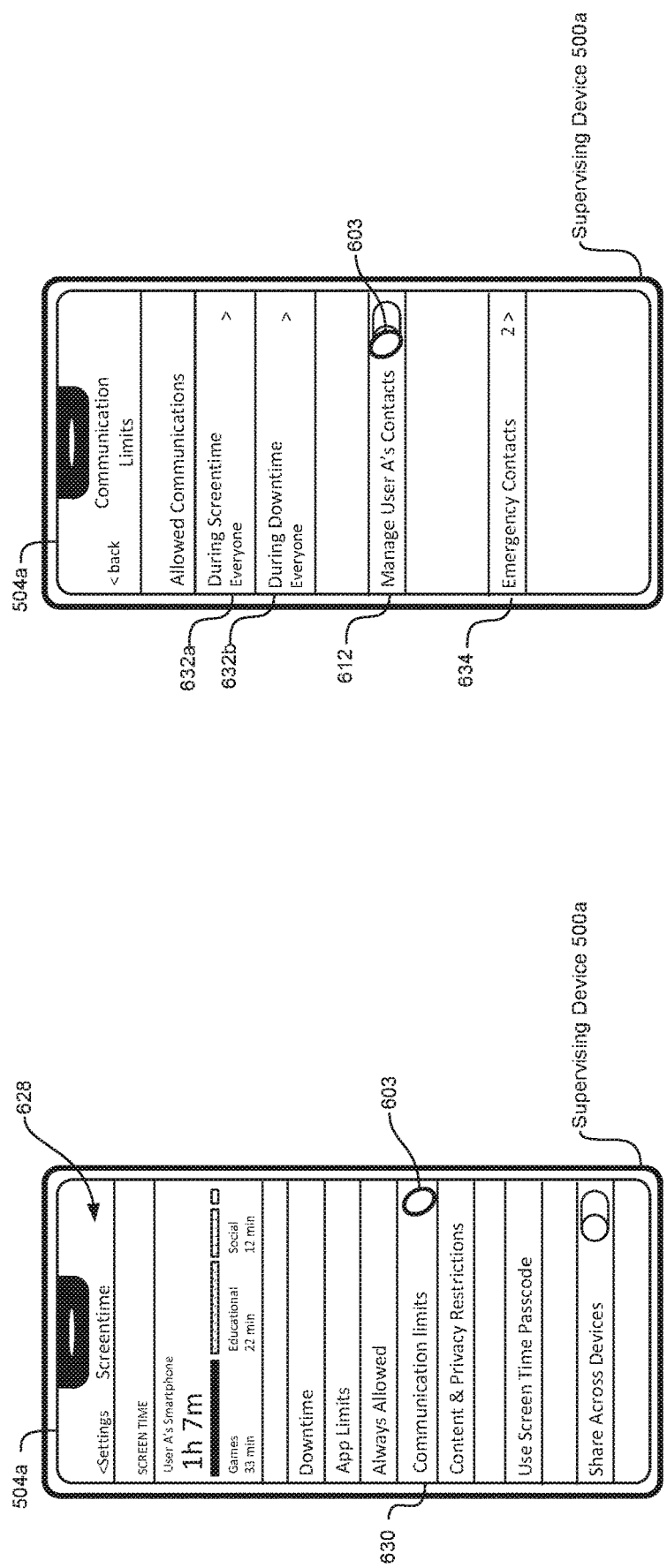

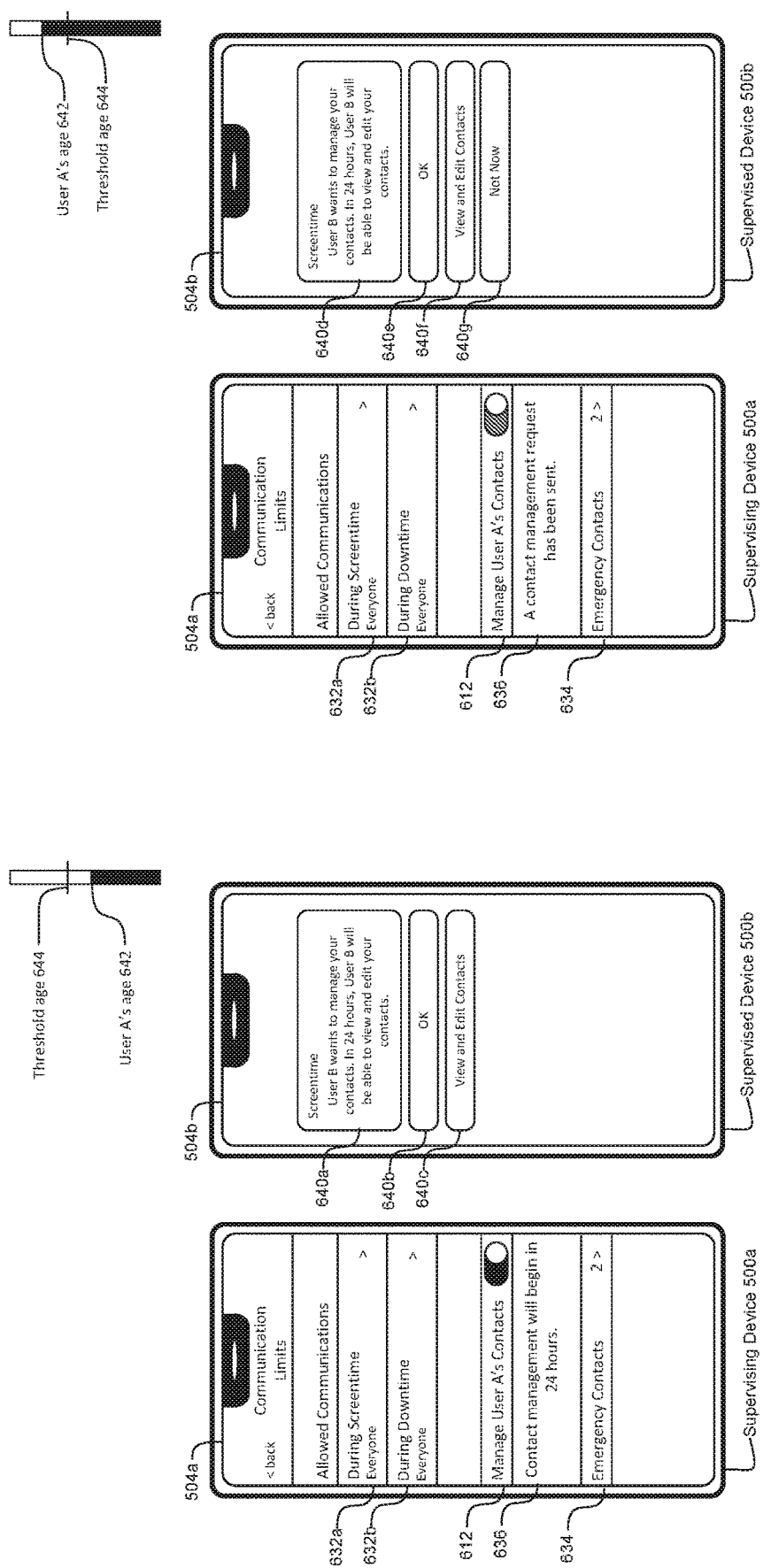

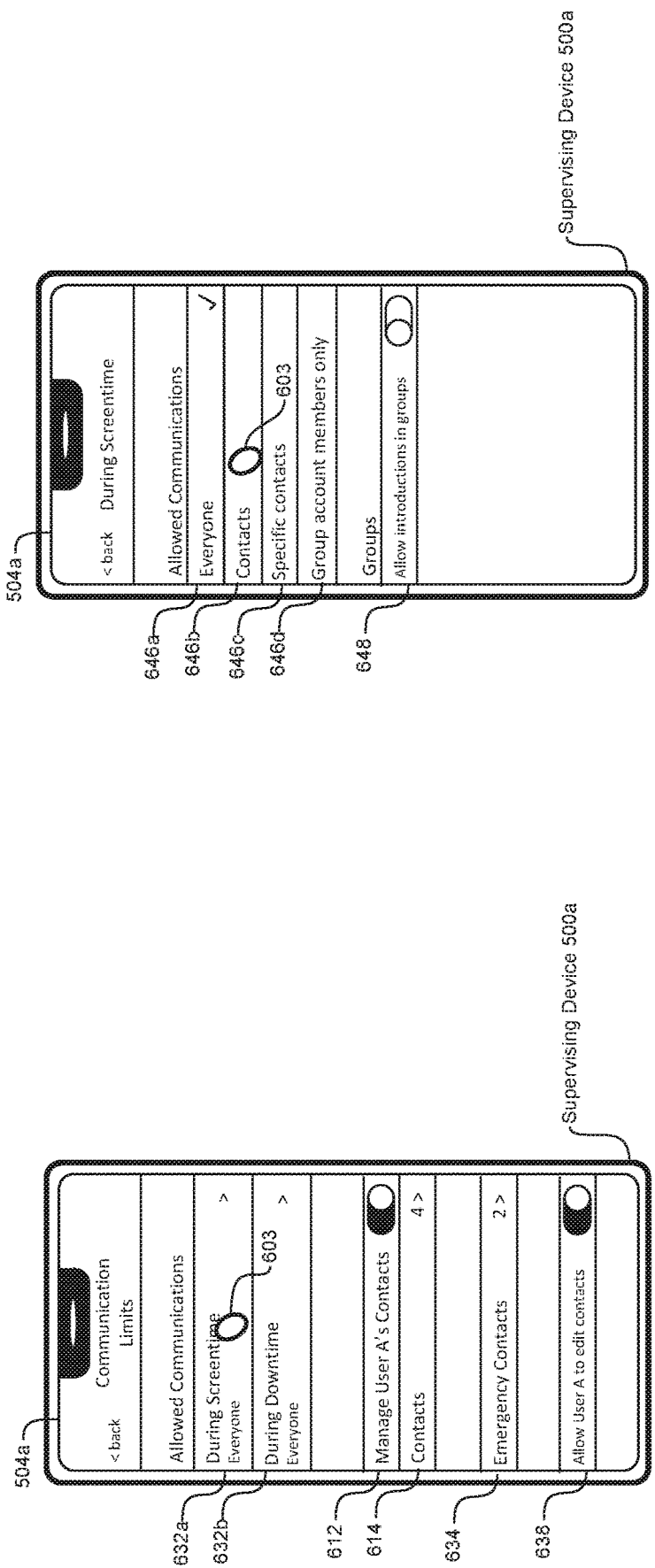

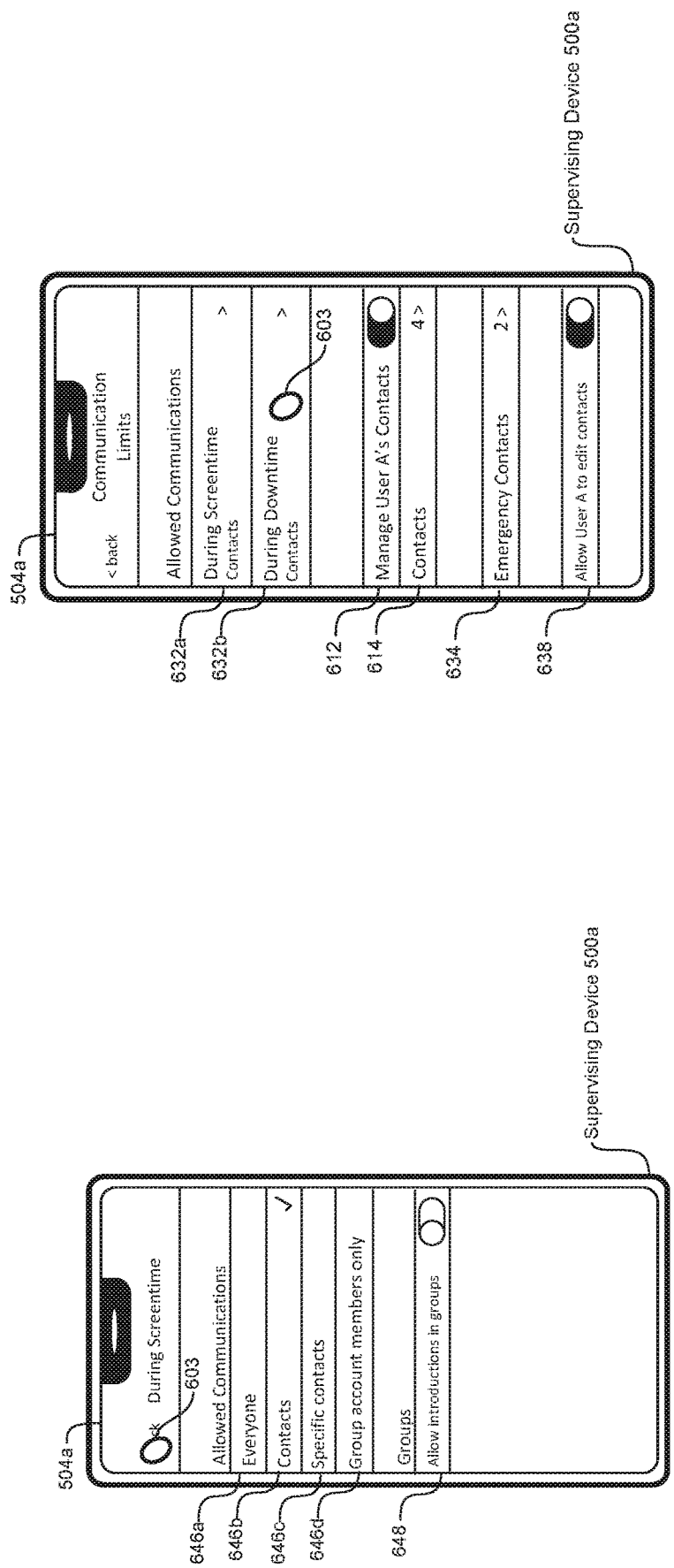

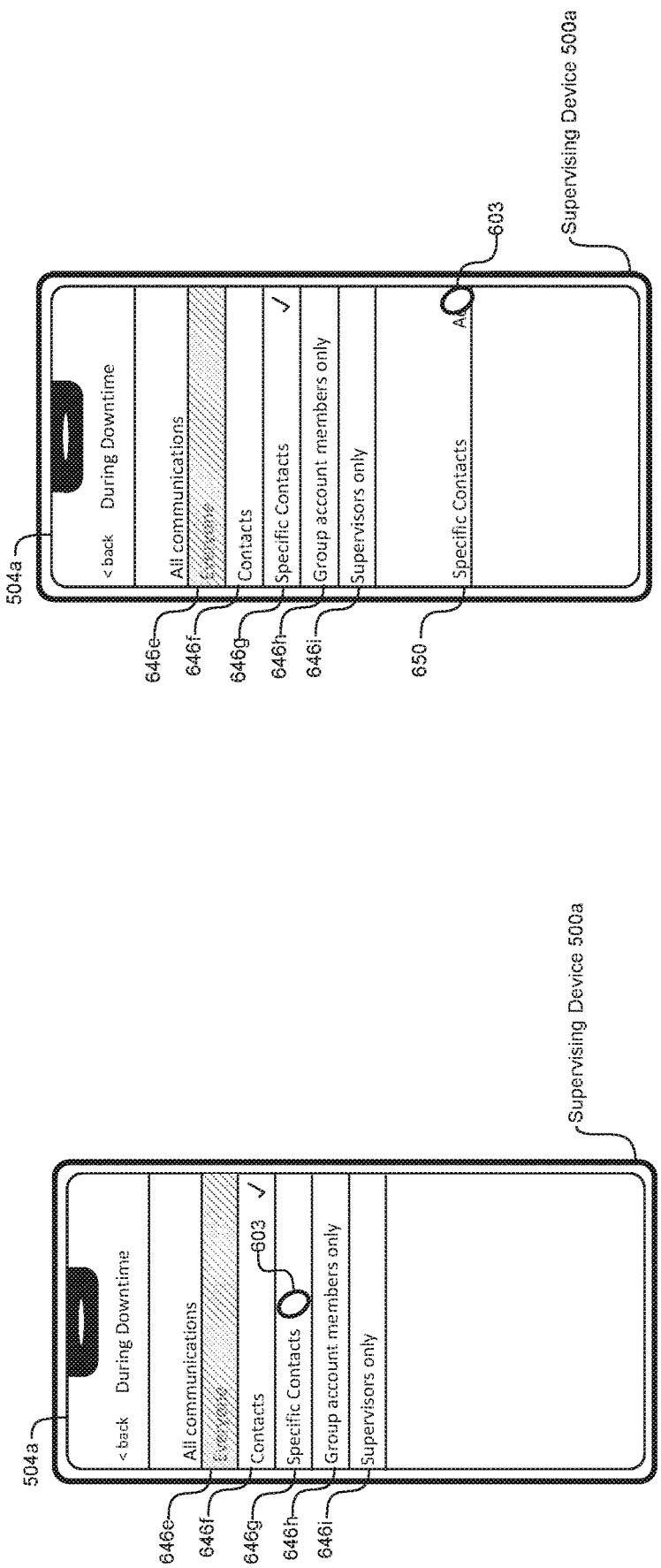

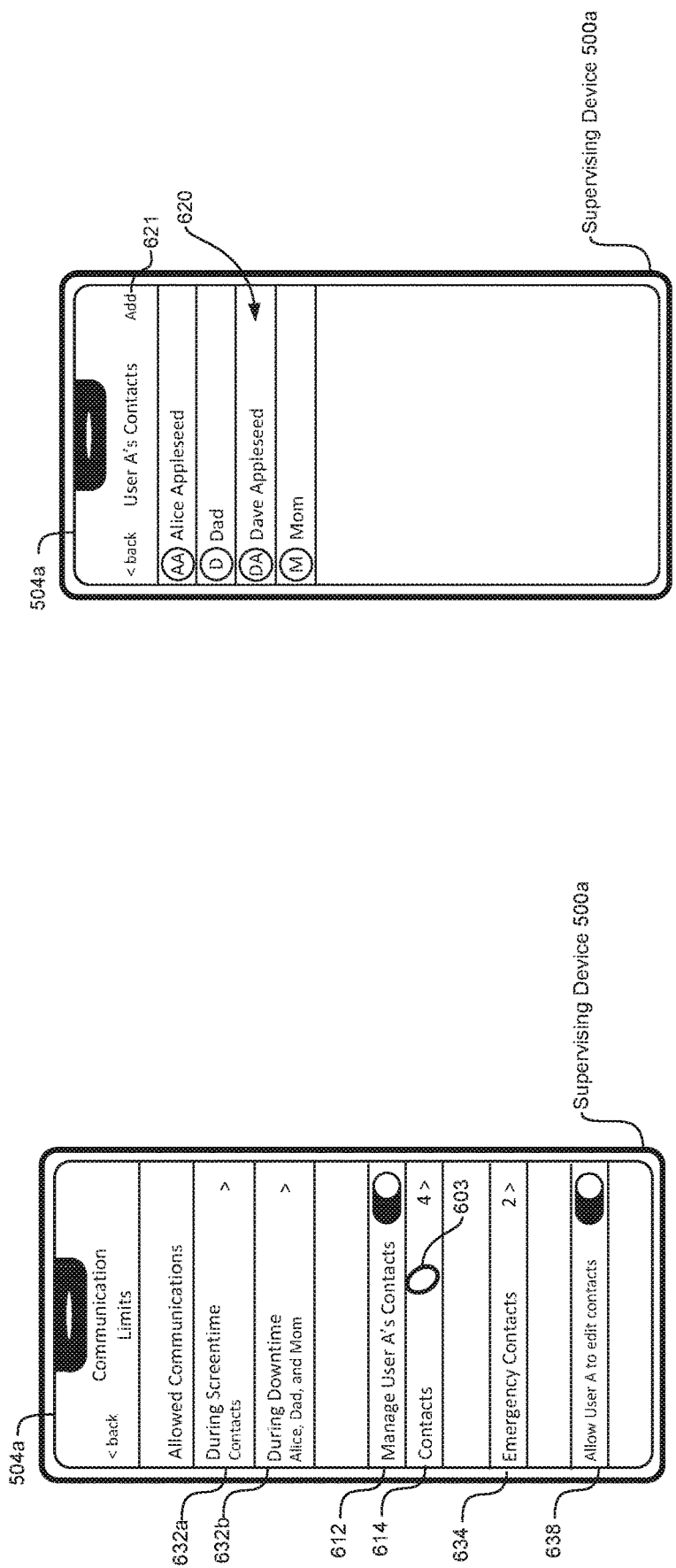

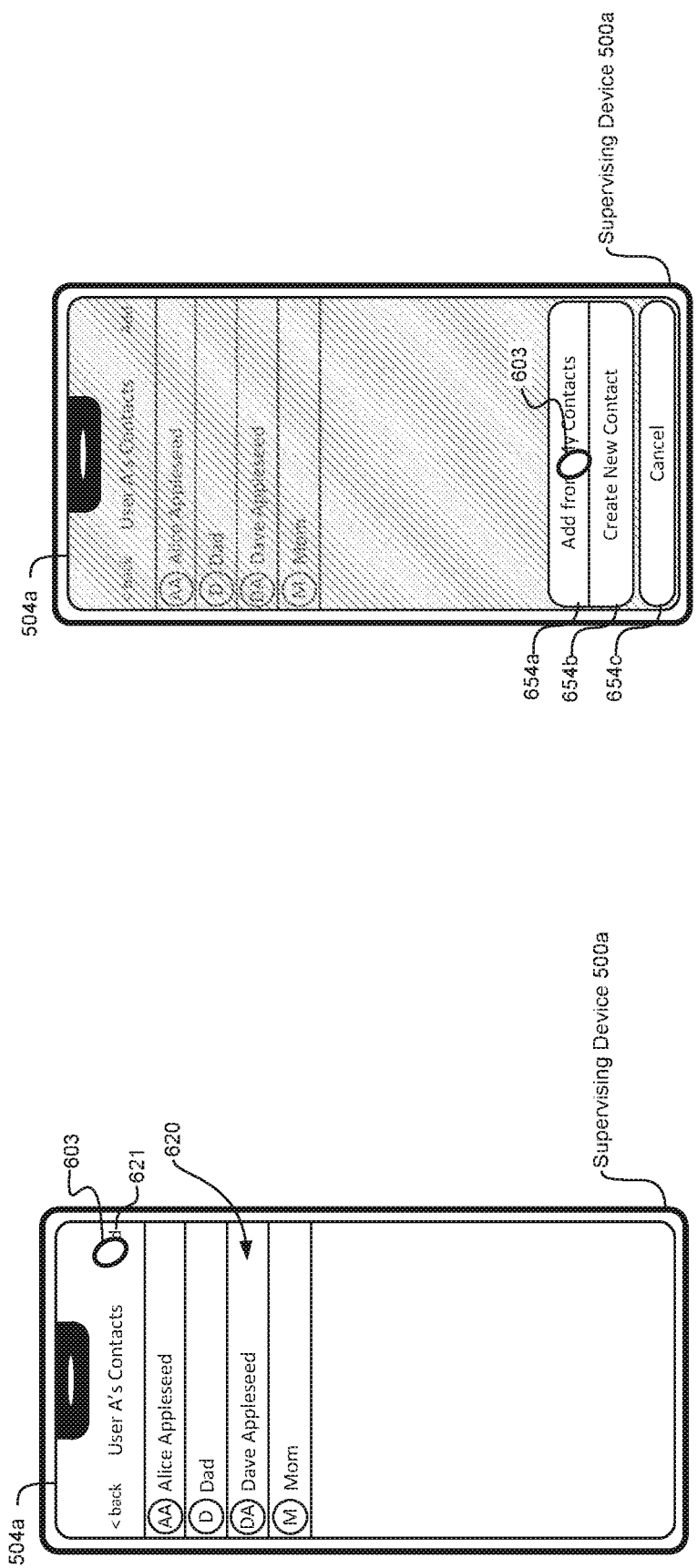

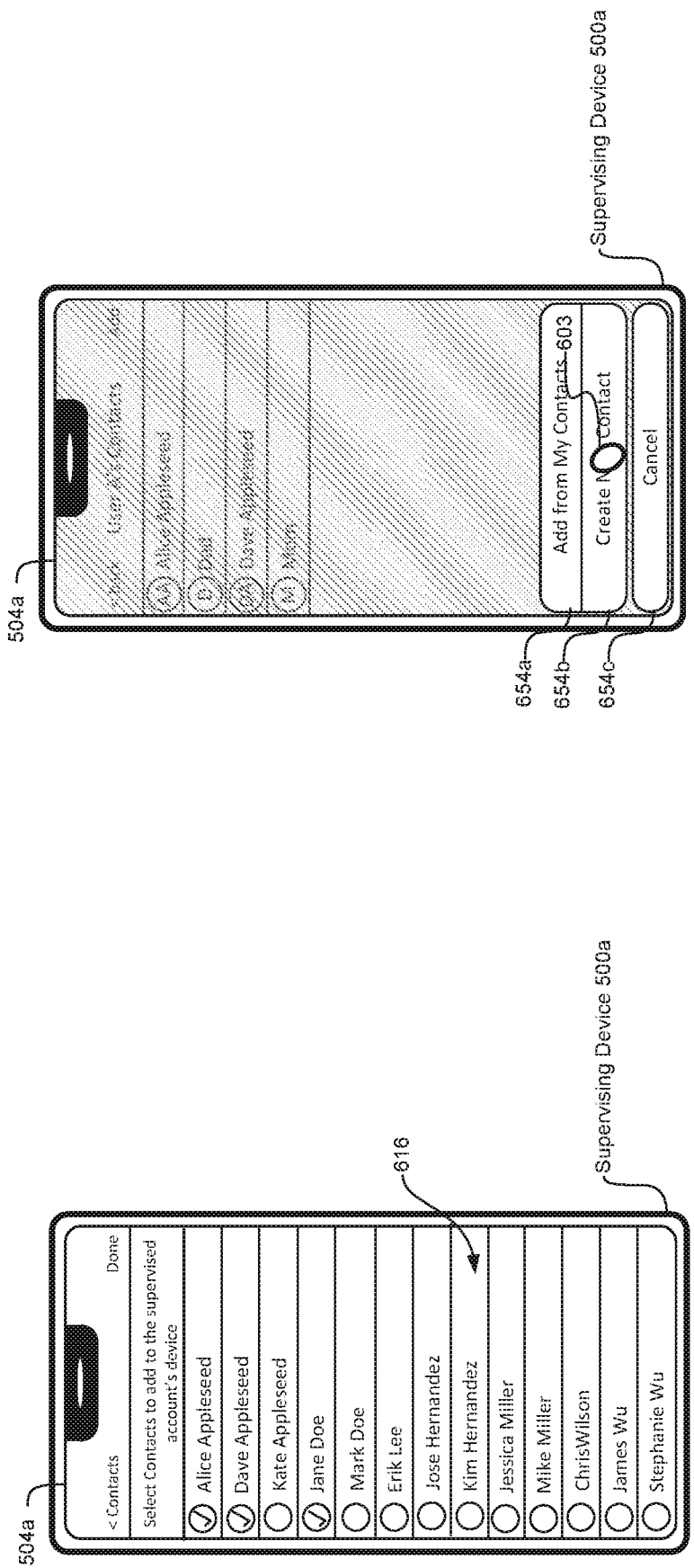

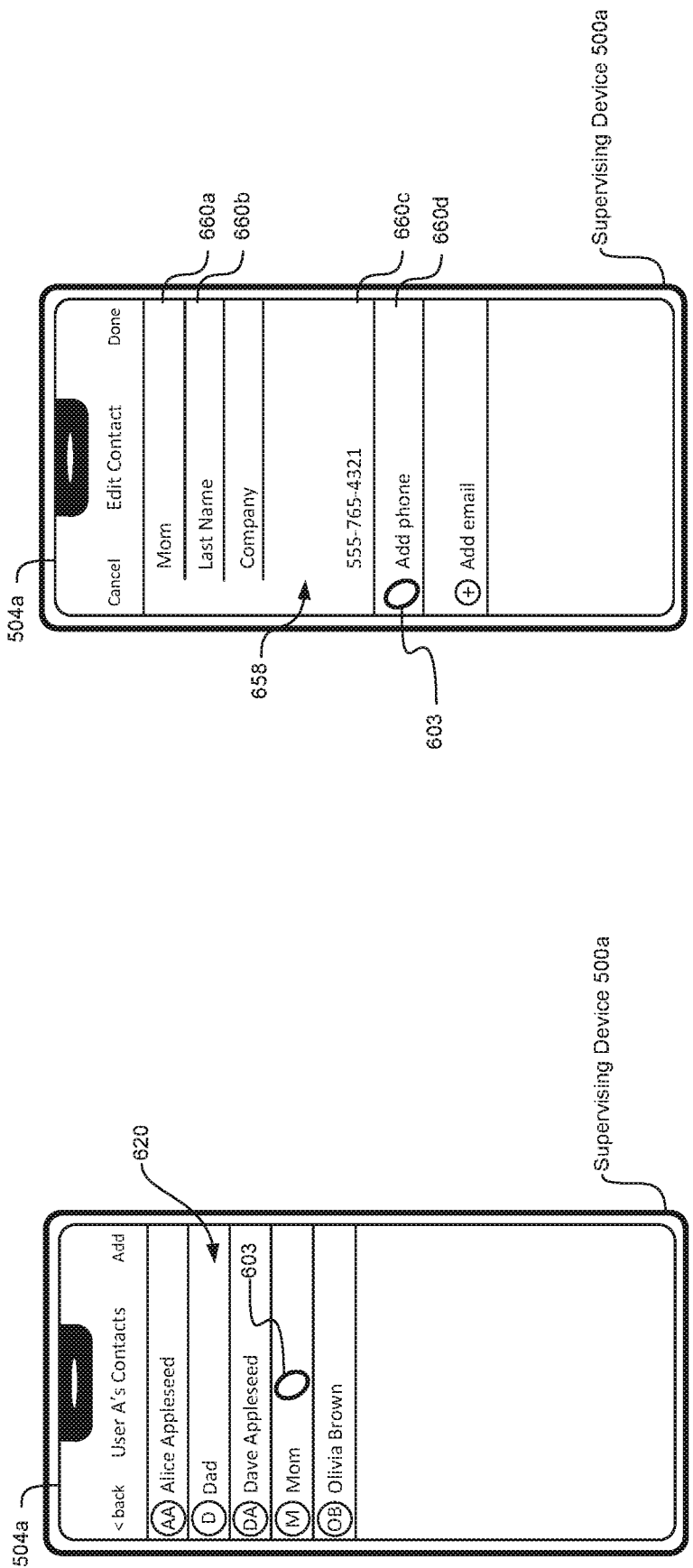

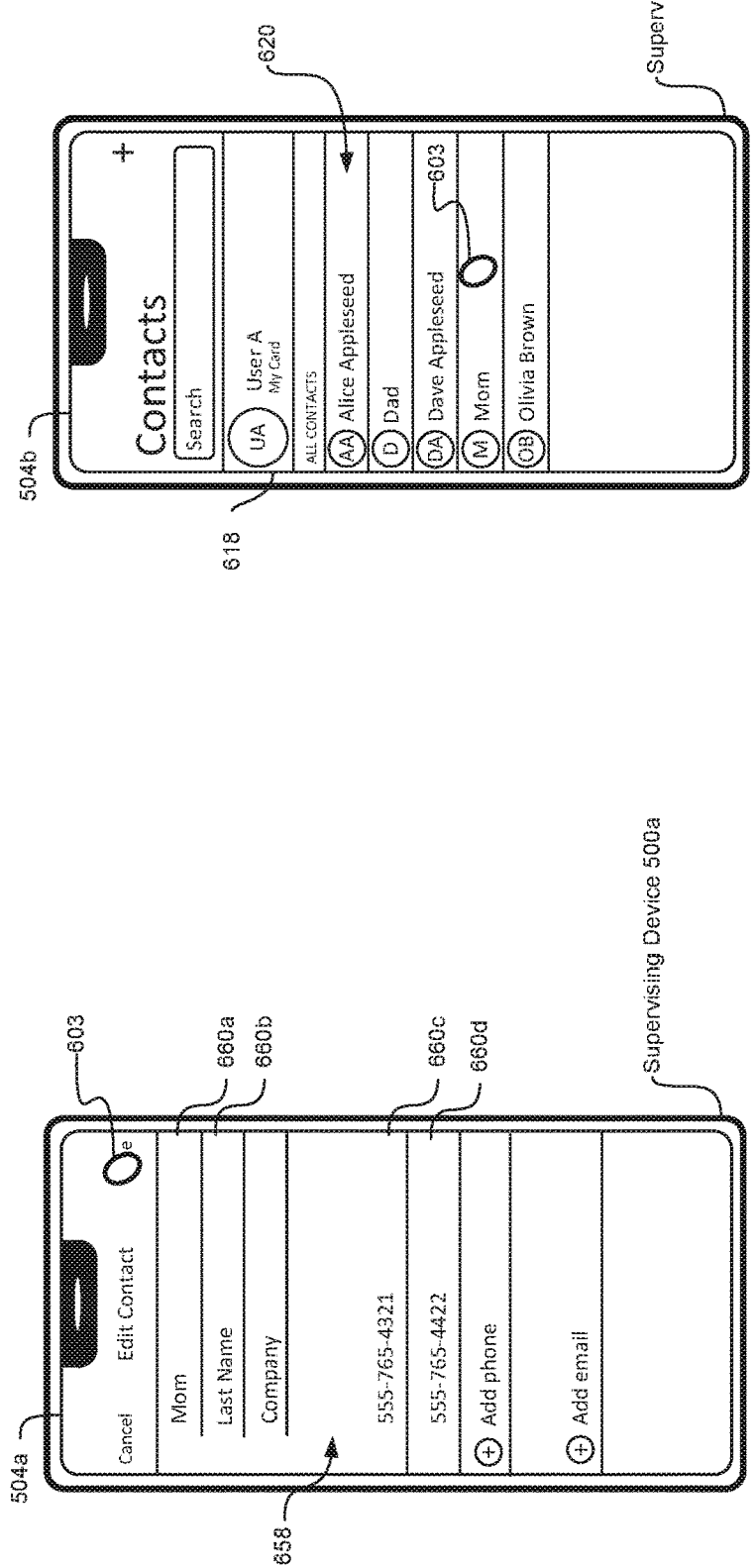

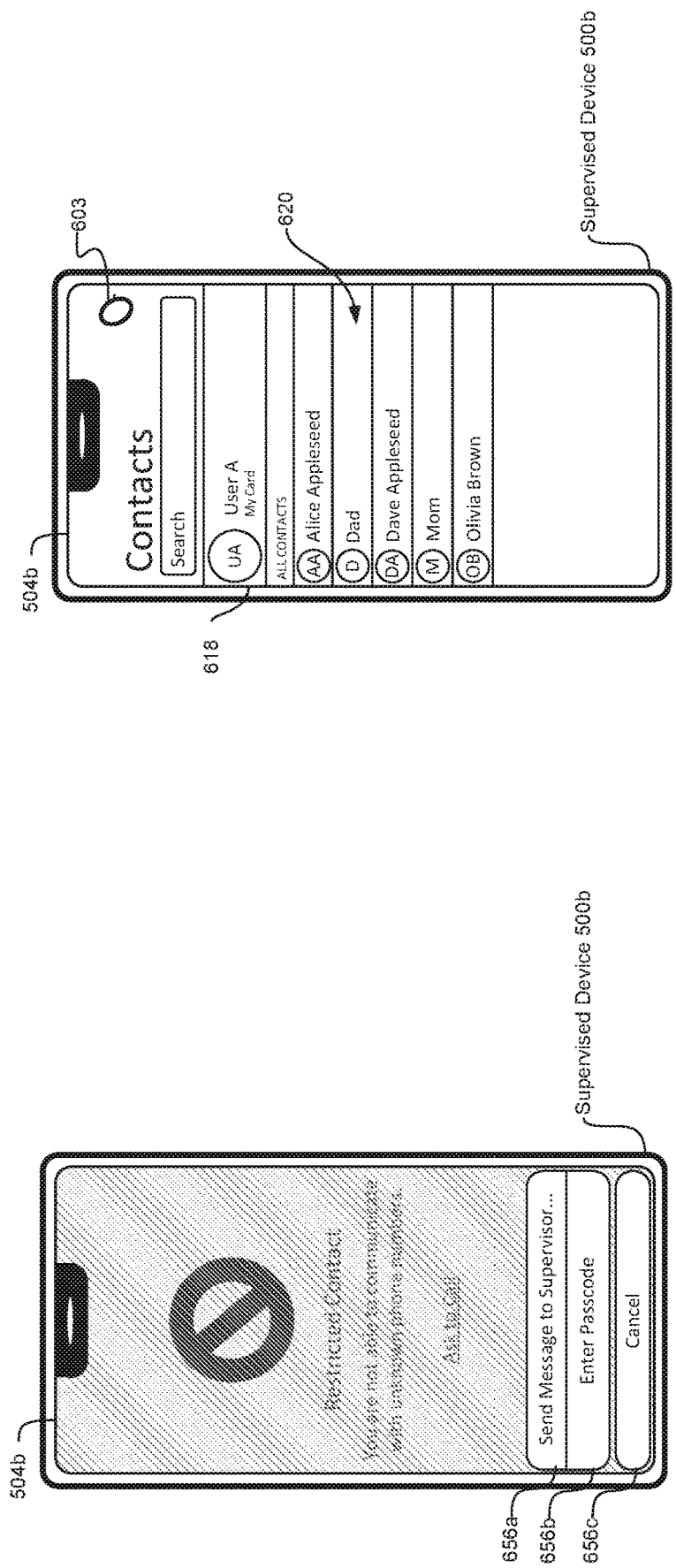

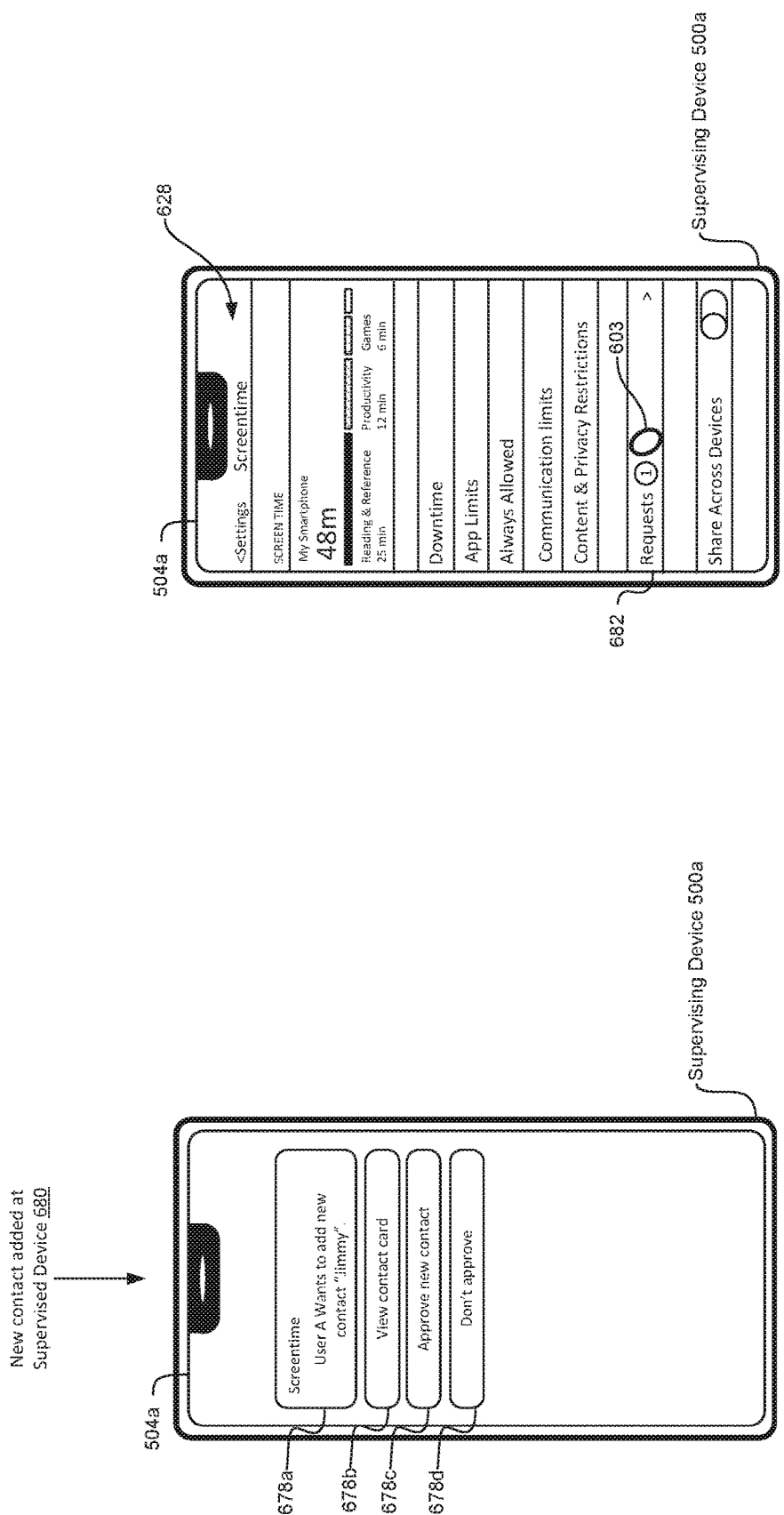

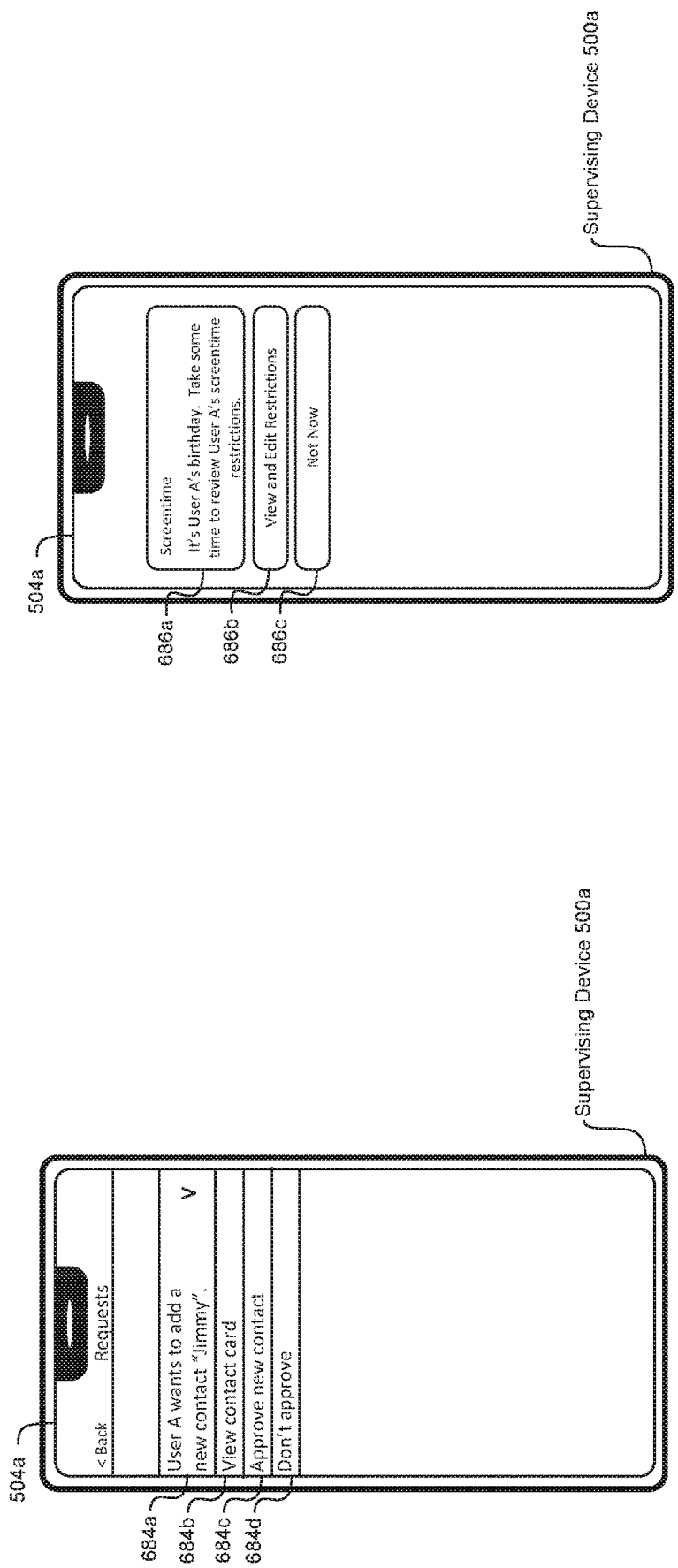

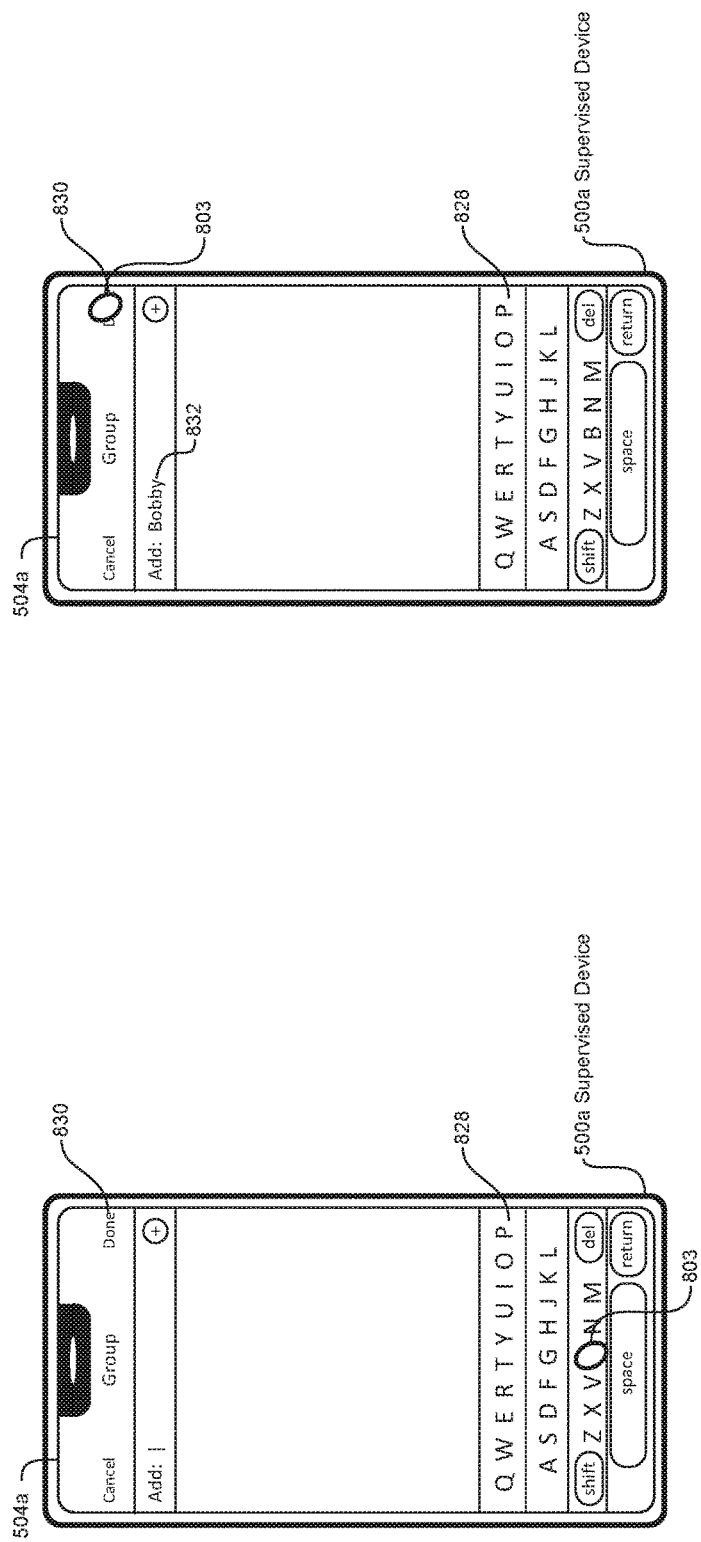

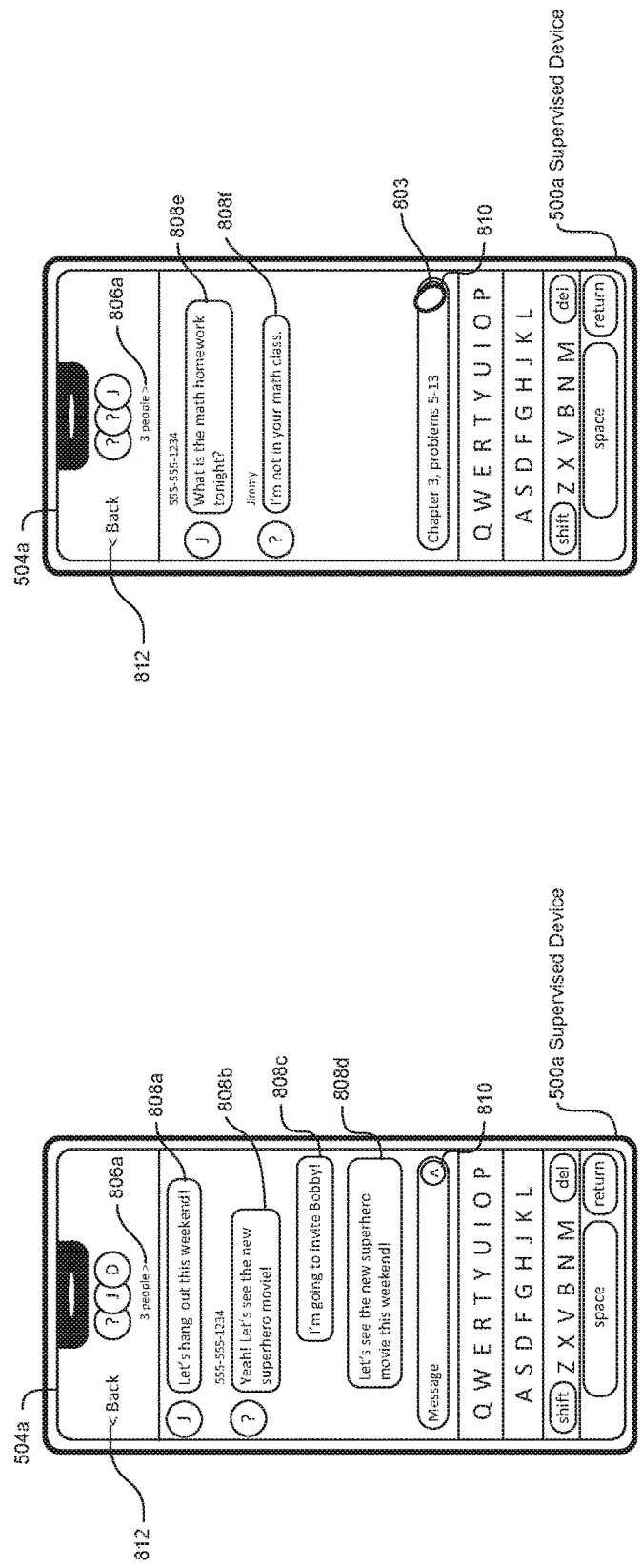

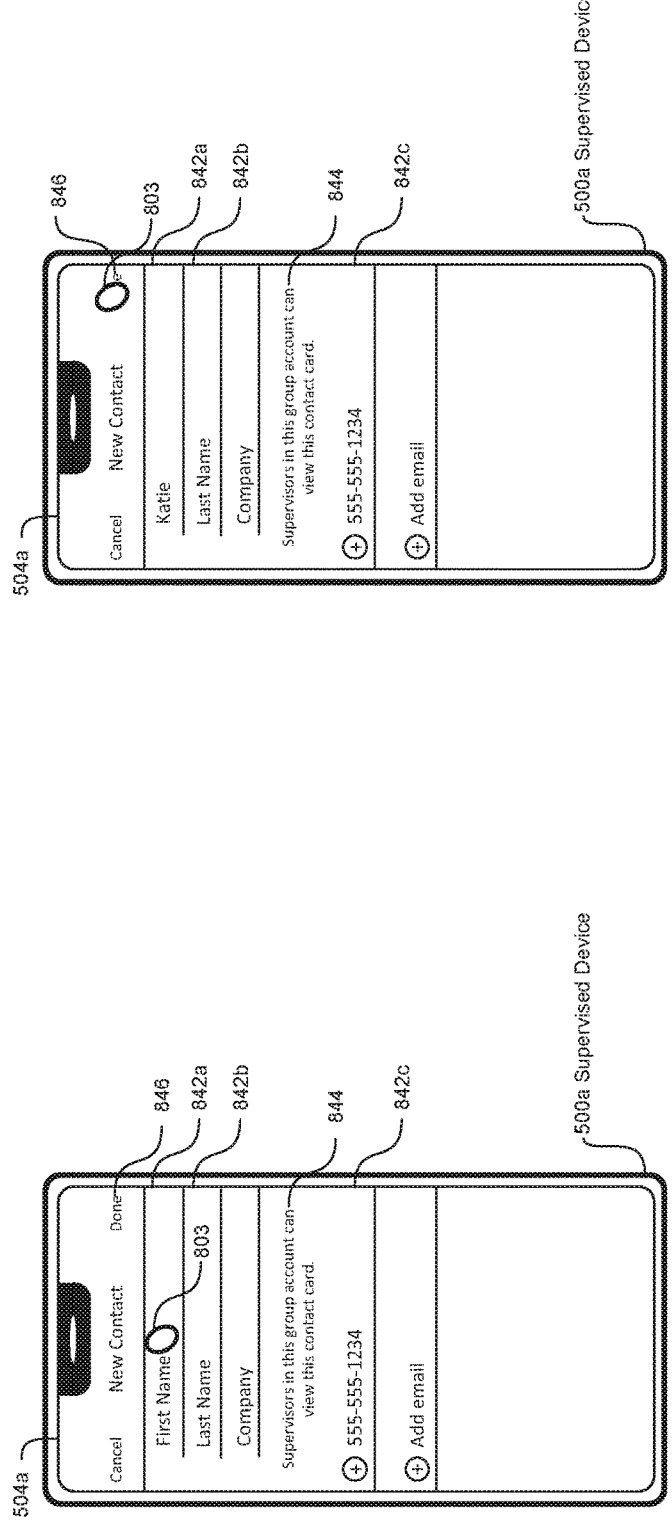

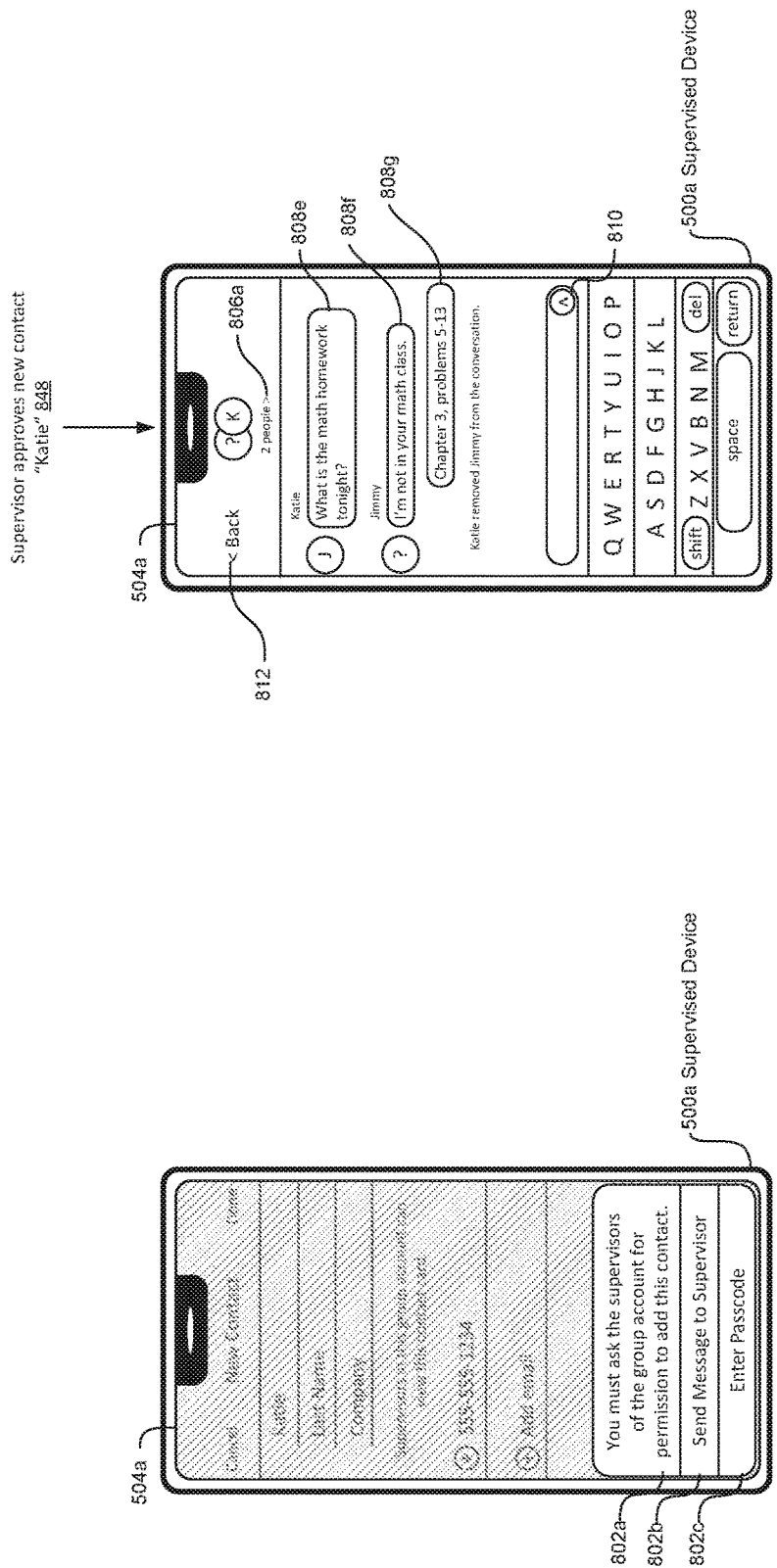

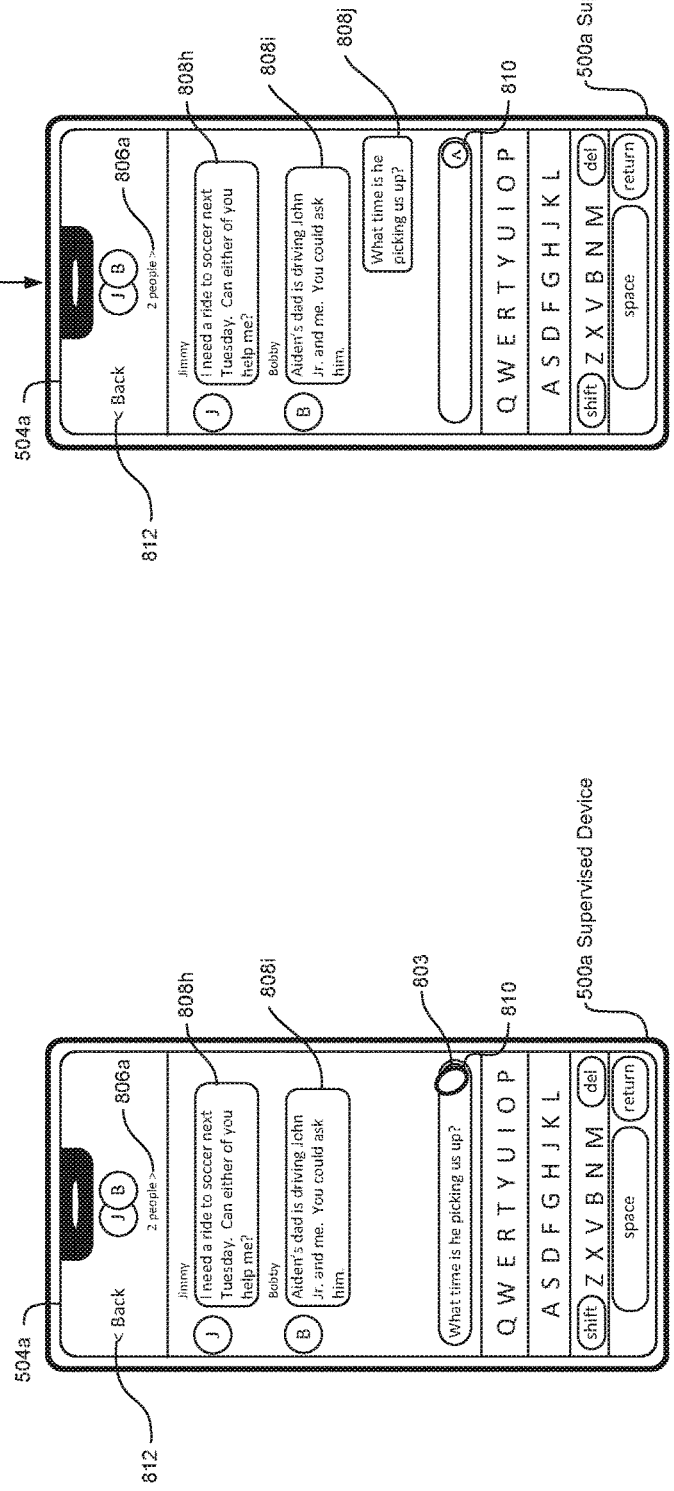

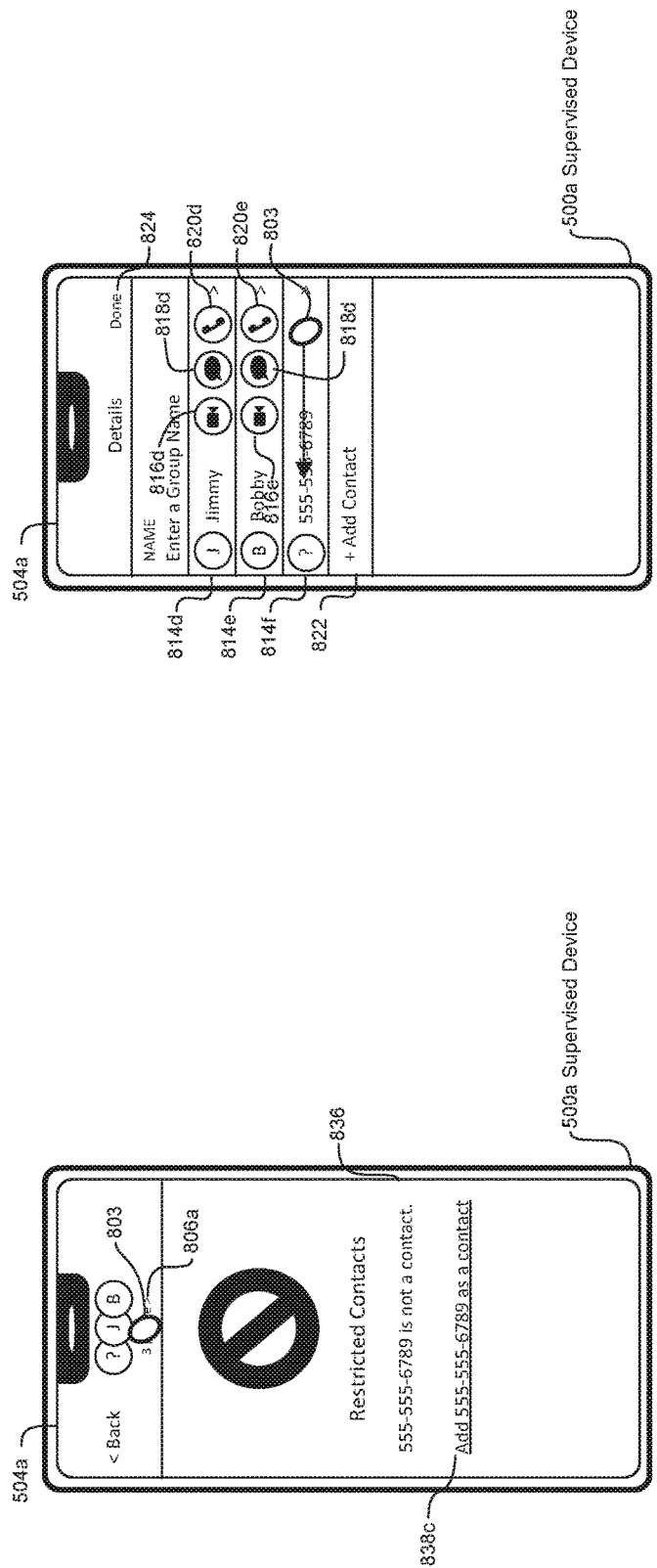

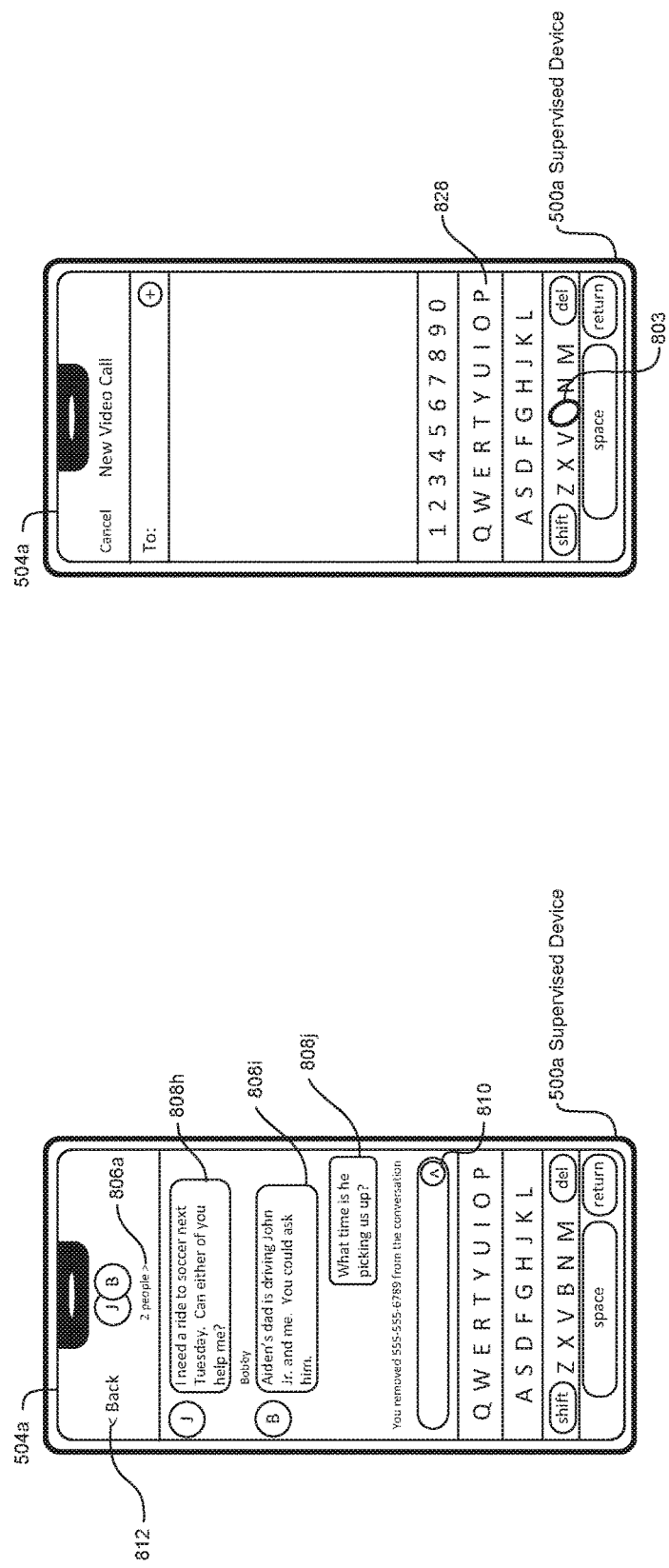

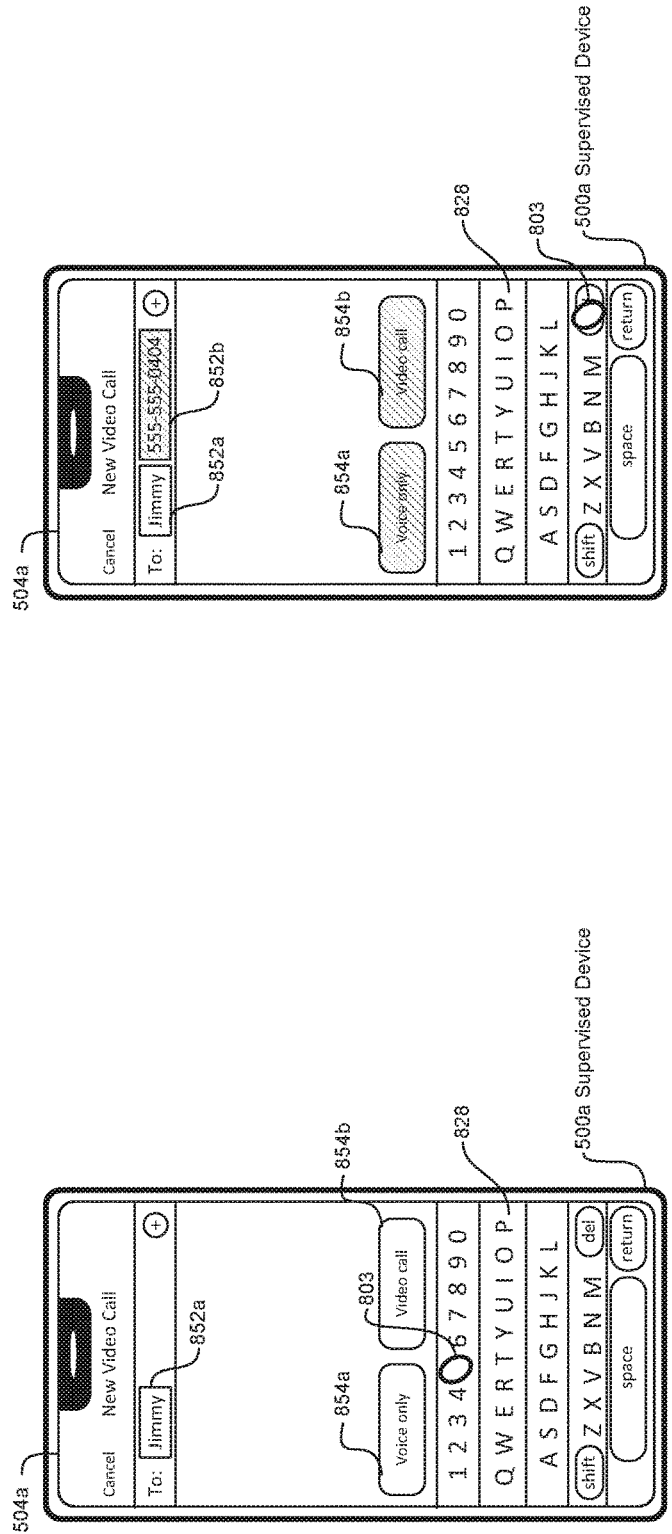

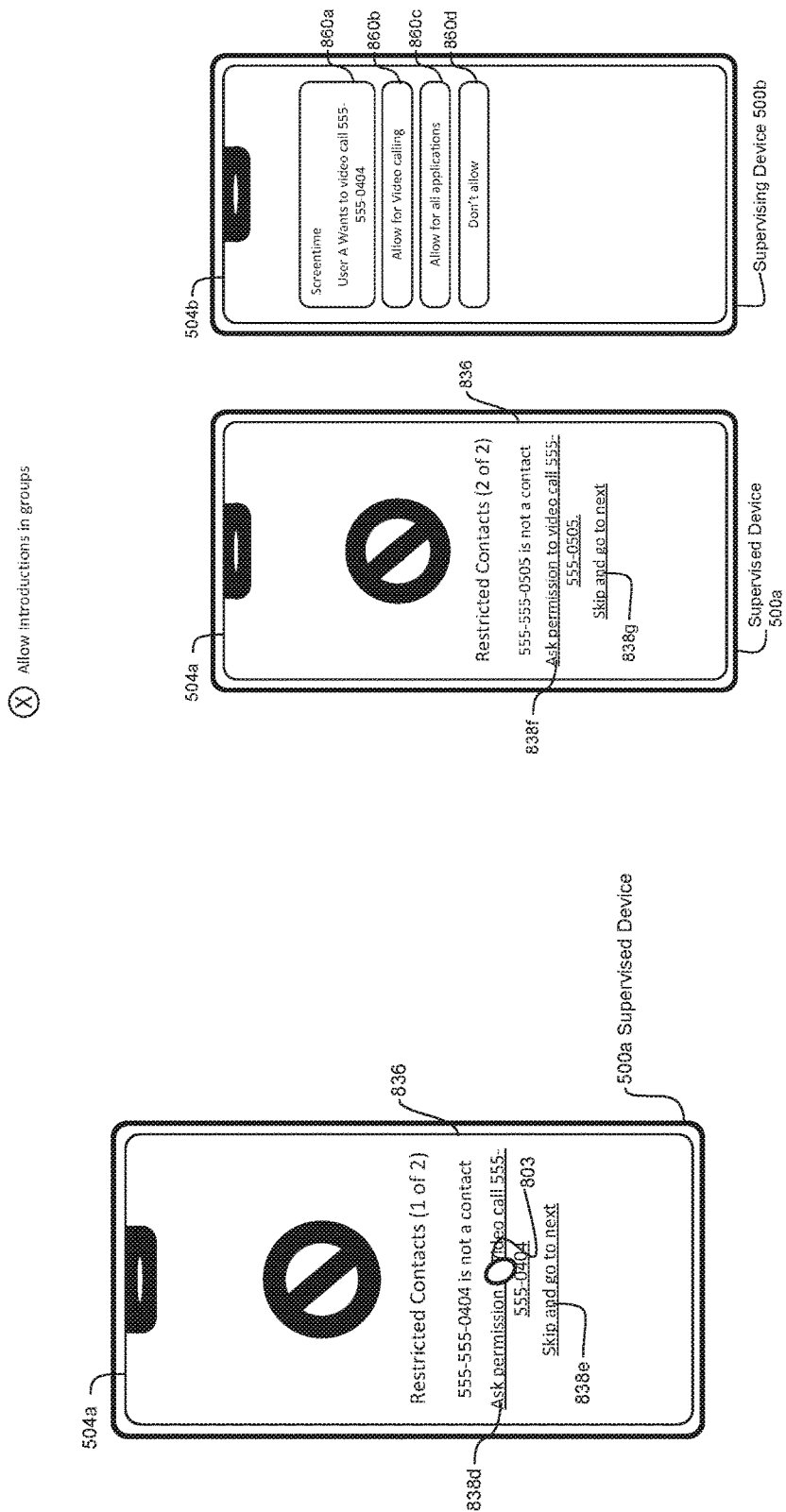

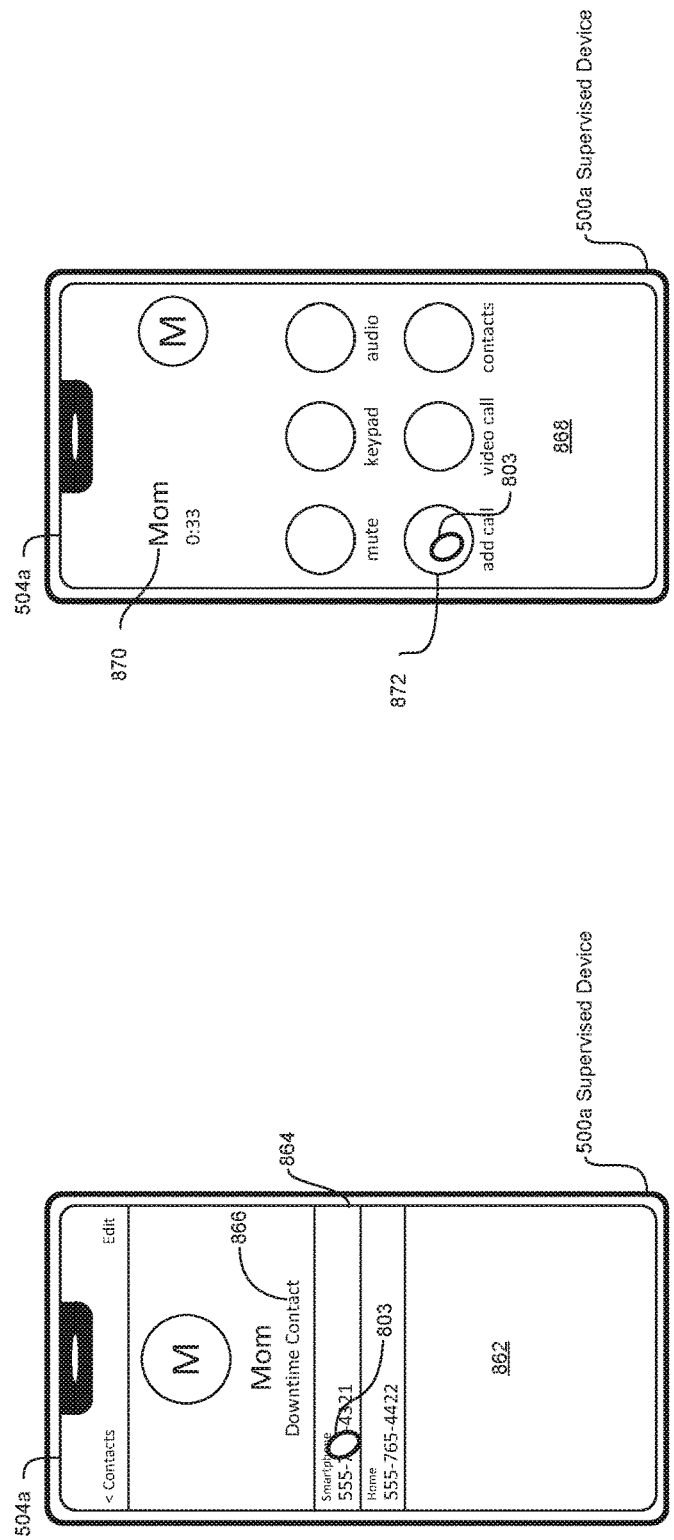

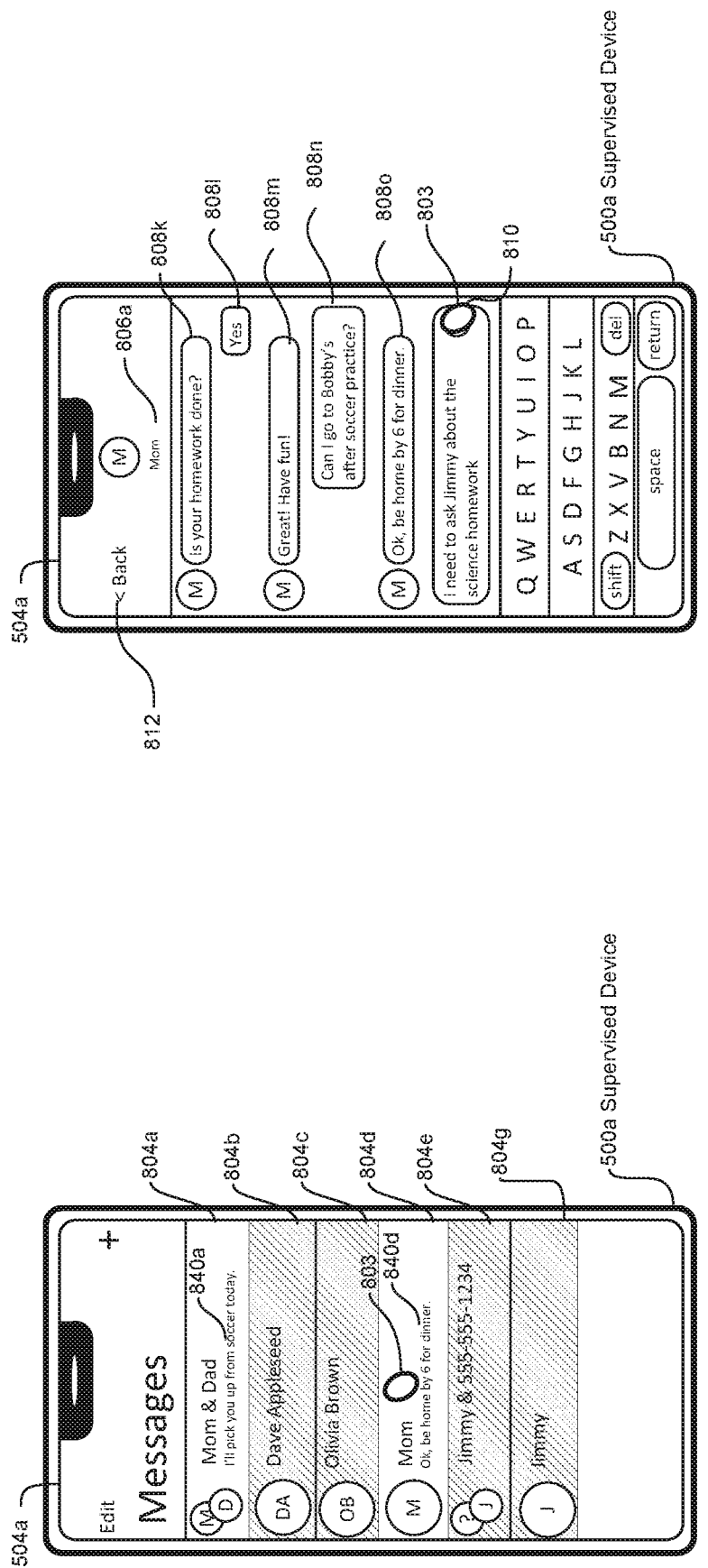

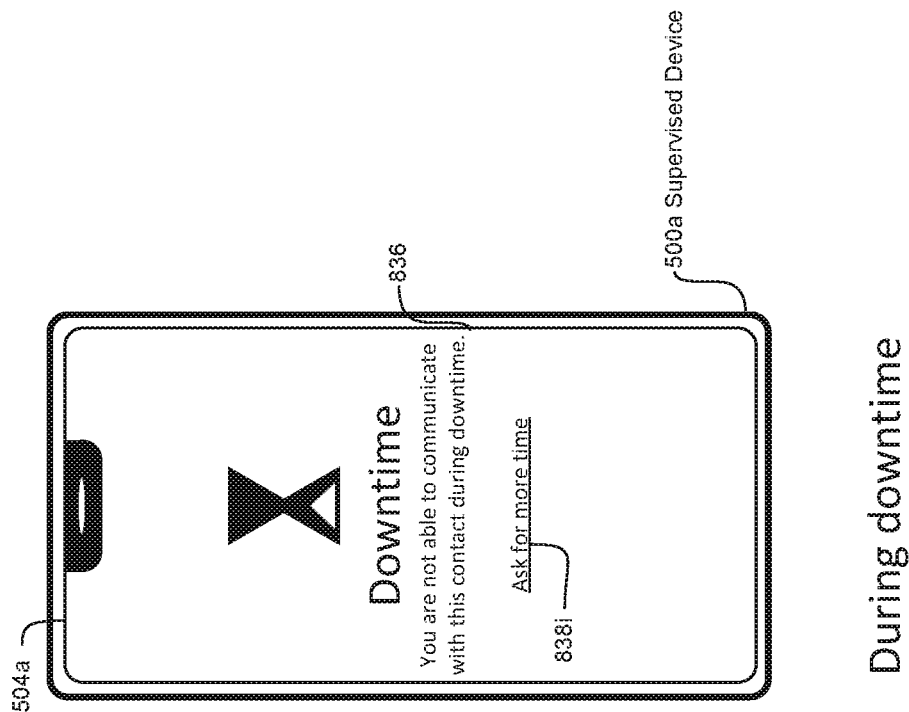

USER INTERFACES FOR MANAGING CONTACTS ON ANOTHER ELECTRONIC DEVICE

CROSS-REFERENCE TO RELATED APPLICATIONS

This application claims the benefit of U.S. Provisional Application No. 62/855,998, filed Jun. 1, 2019, the content of which is hereby incorporated by reference in its entirety for all purposes.

FIELD OF THE DISCLOSURE

This relates generally to electronic devices that enforce communication restrictions or configure communication restrictions of another electronic device.

BACKGROUND

User interaction with electronic devices has increased significantly in recent years. These devices can be devices such as computers, tablet computers, televisions, multimedia devices, mobile devices, and the like.

In some circumstances, users wish to configure communication restrictions on other electronic devices. Enhancing these interactions improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY

Some embodiments described in this disclosure are directed to one or more electronic devices that manage communication restrictions of other electronic devices. Some embodiments described in this disclosure are directed to one or more electronic devices that enforce communication restrictions.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
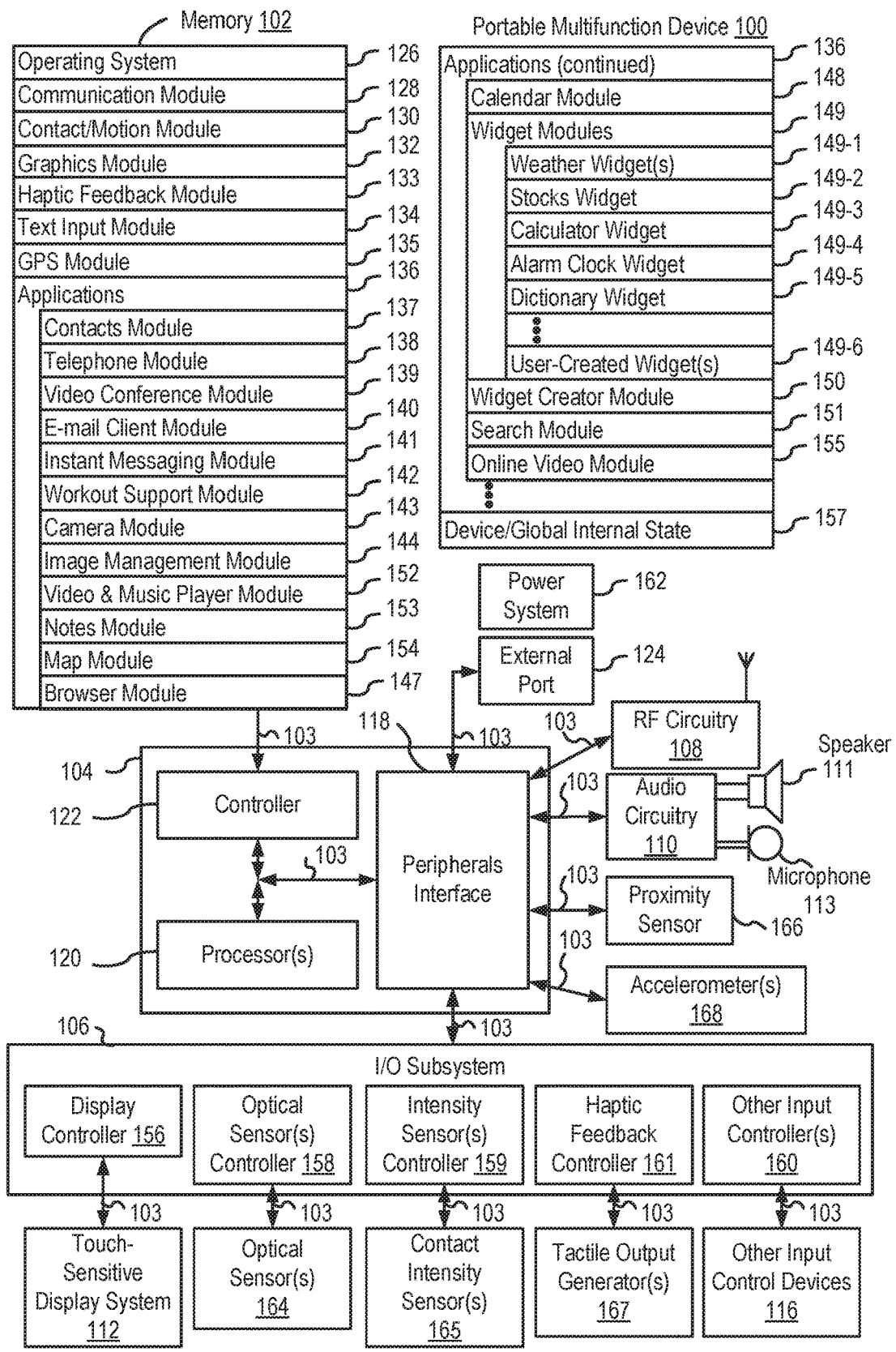
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that manage the contacts on other electronic devices. Such techniques can reduce the cognitive burden on a user who uses such devices and/or wishes to control their use of such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
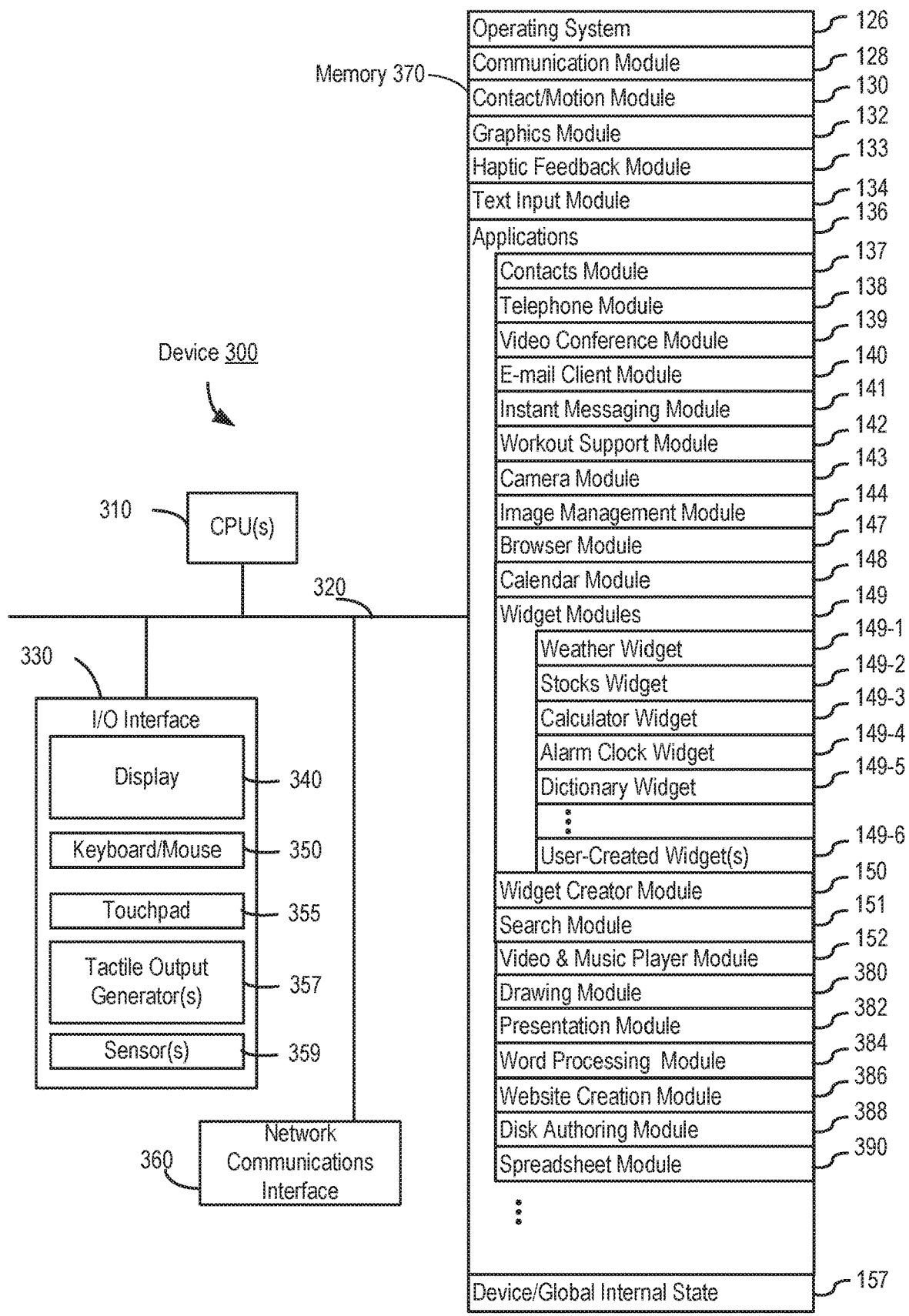
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
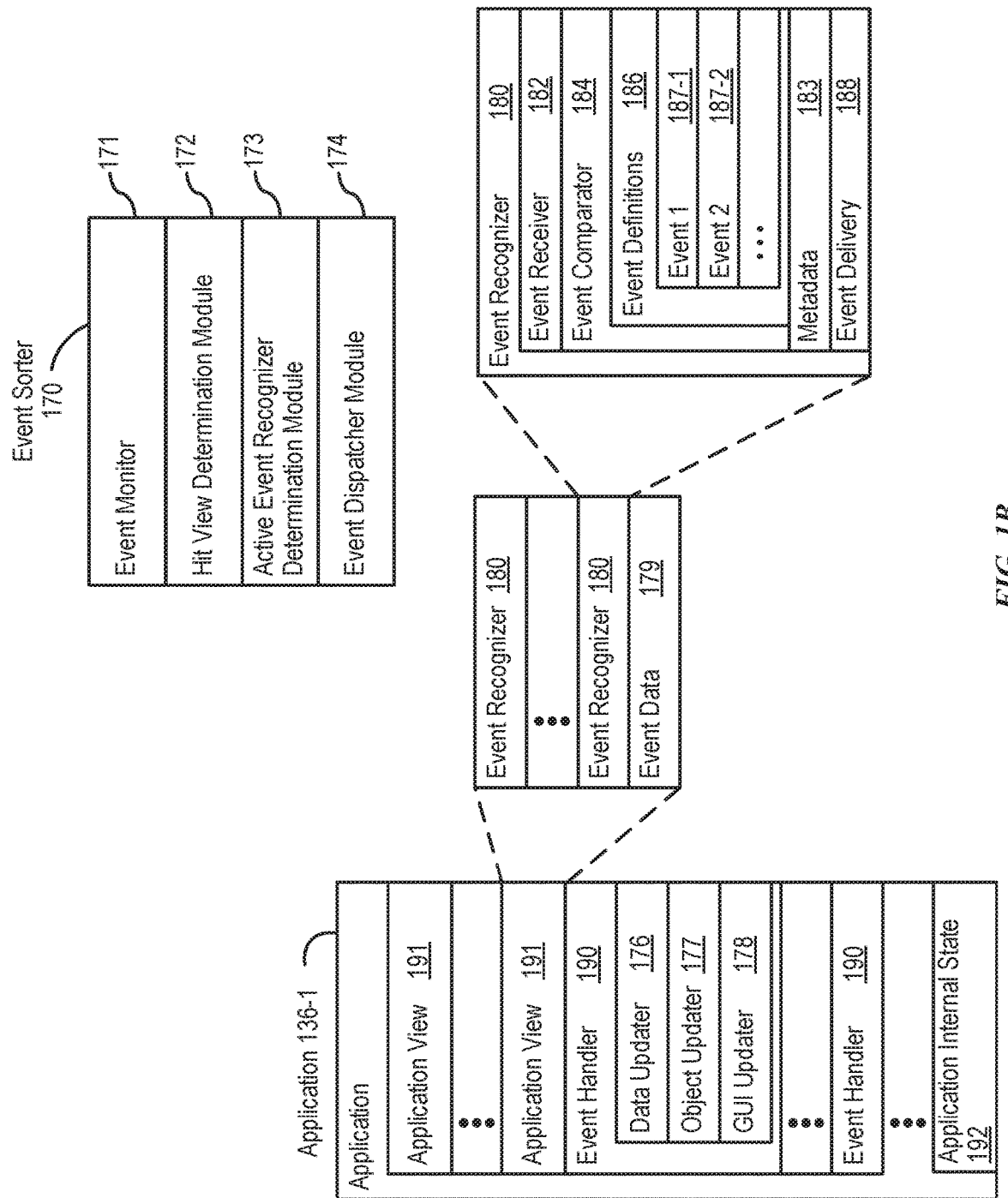
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
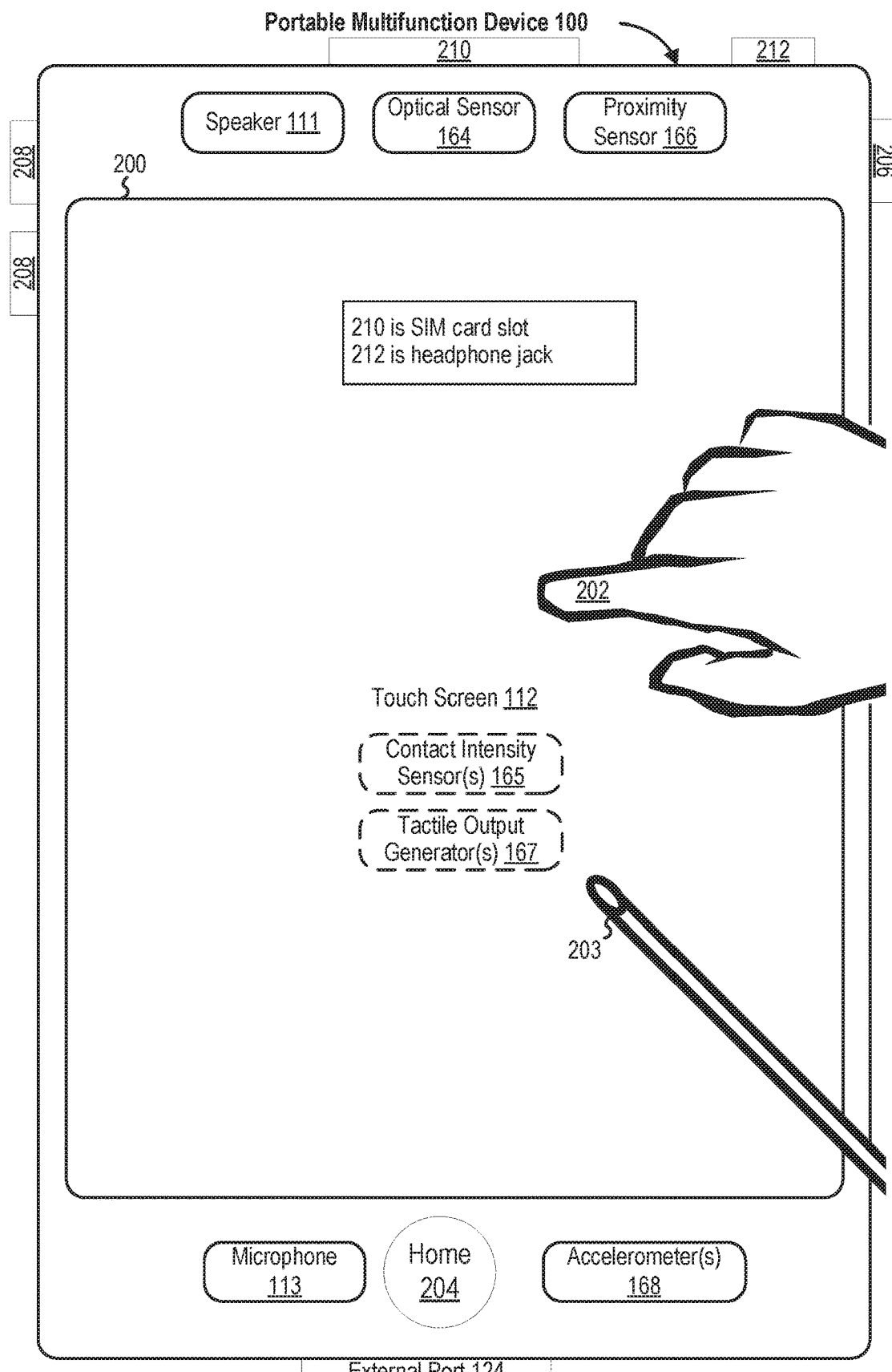
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
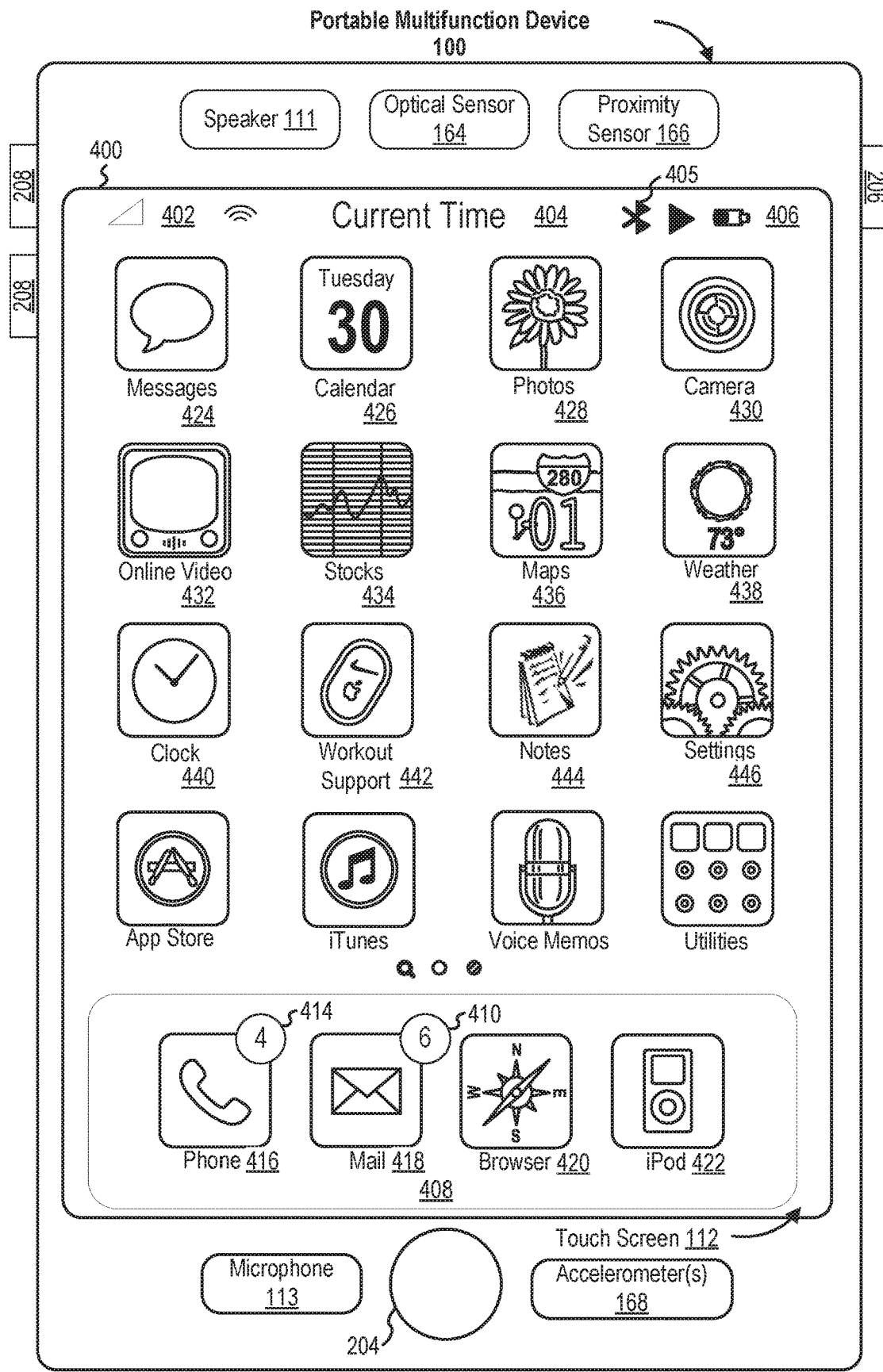
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and
Icon 422 for video and music player module 152, also referred to as iPod (trademark of Apple Inc.) module 152, labeled "iPod;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
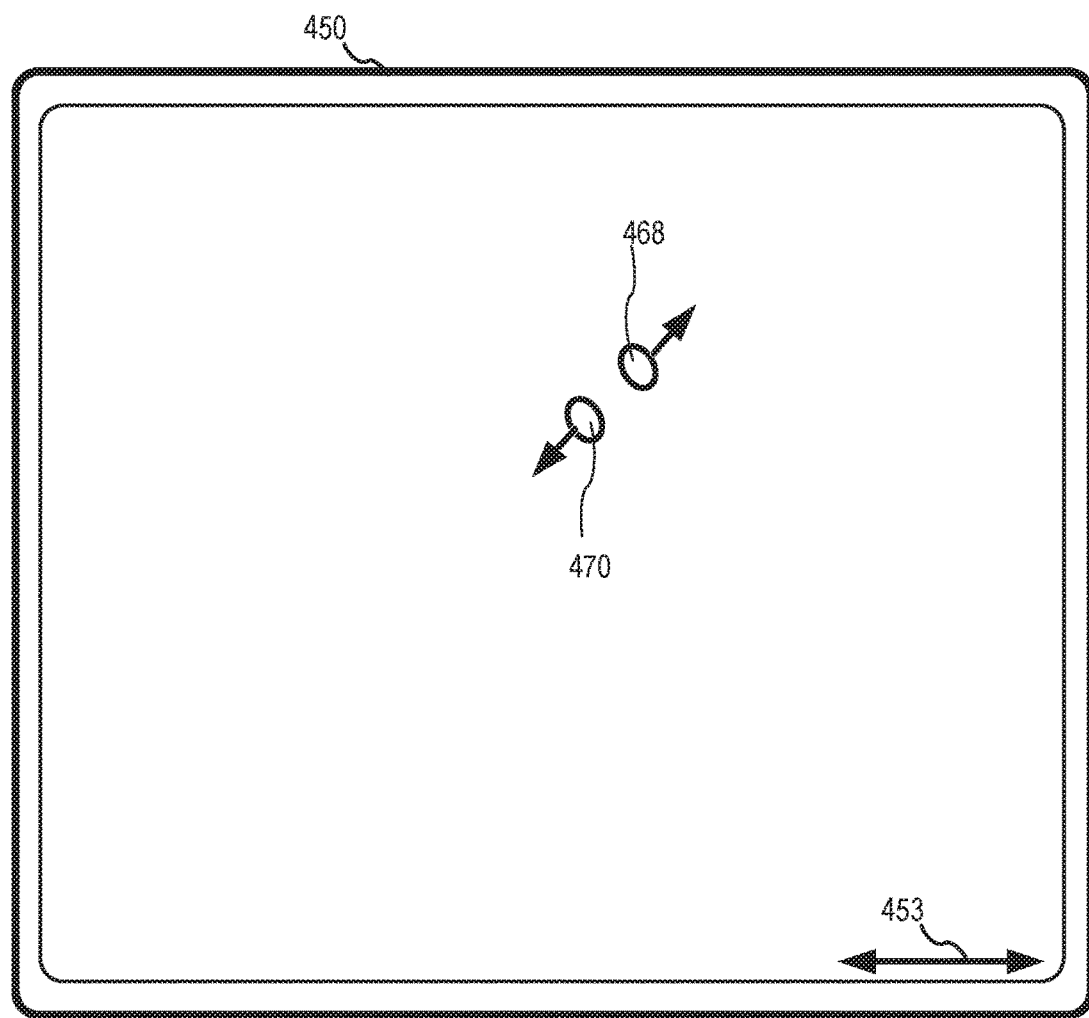
FIG. 4B illustrates an exemplary user interface for a multifunction device with a touch-sensitive surface that is separate from the display in accordance with some embodiments.
Figure 4B:
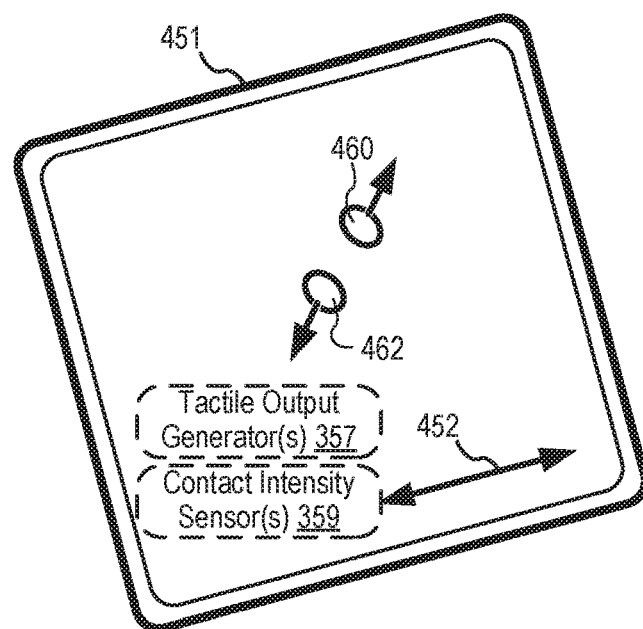

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
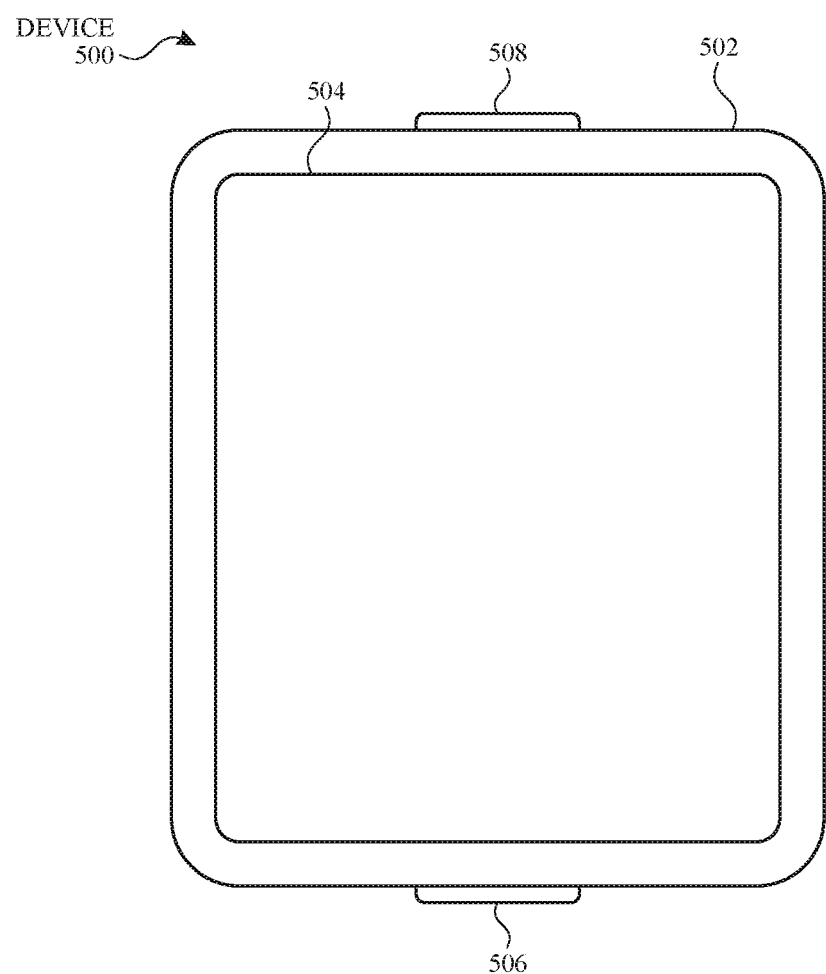
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
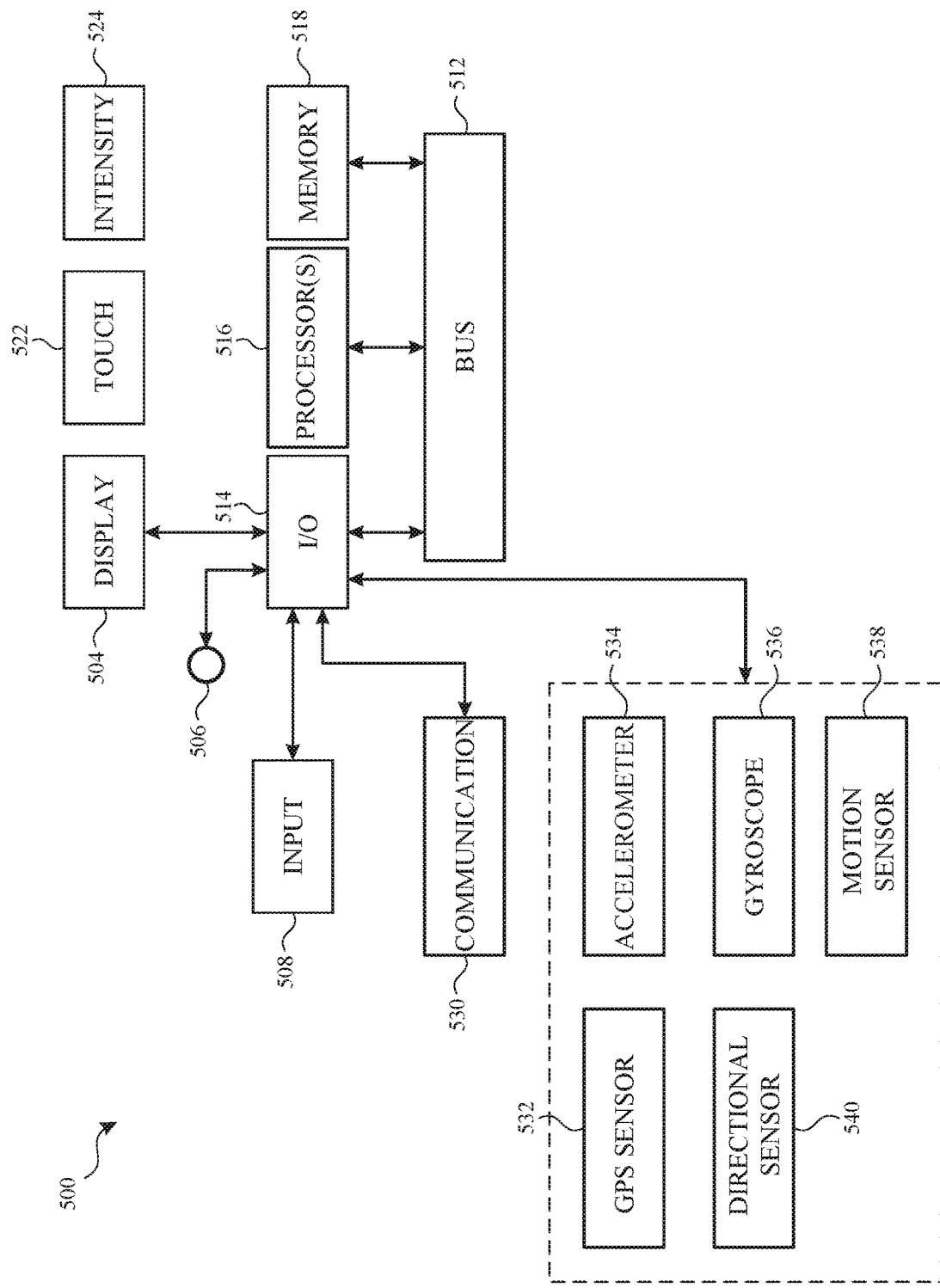
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 and 900 (FIGS. 7 and 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
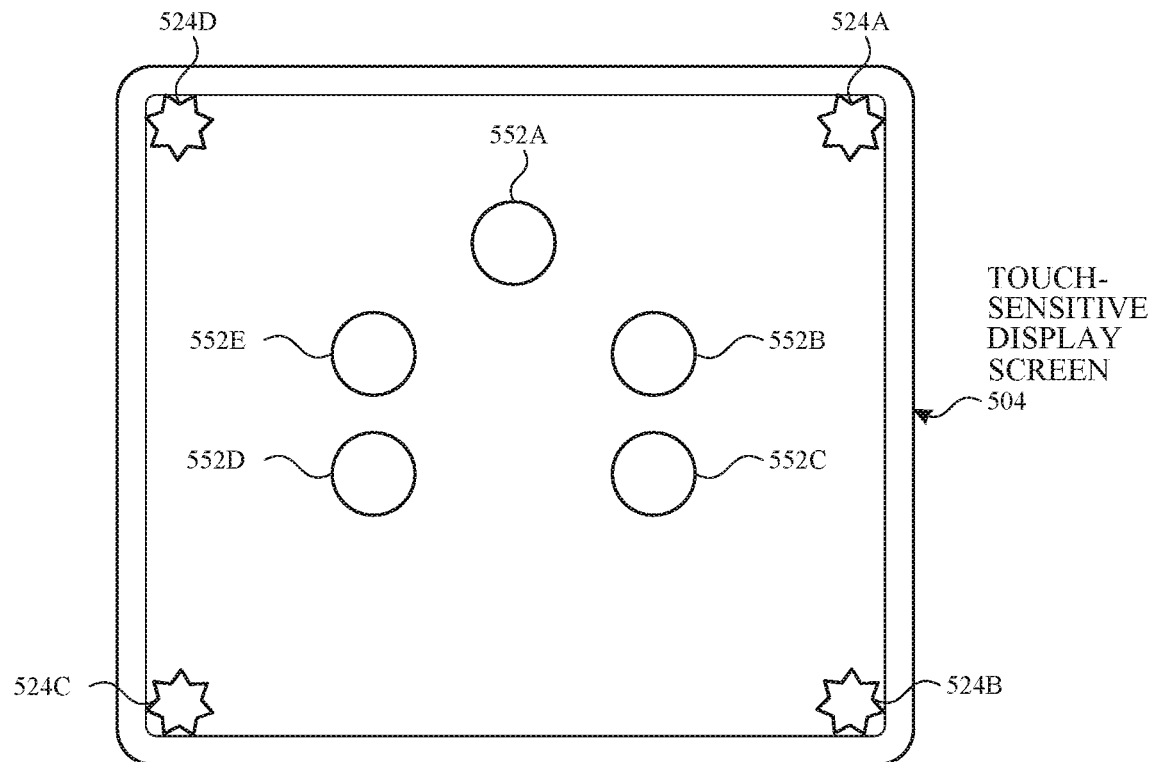
FIGS. 5C-5D illustrate exemplary components of a personal electronic device having a touch-sensitive display and intensity sensors in accordance with some embodiments.
Figure 5C:
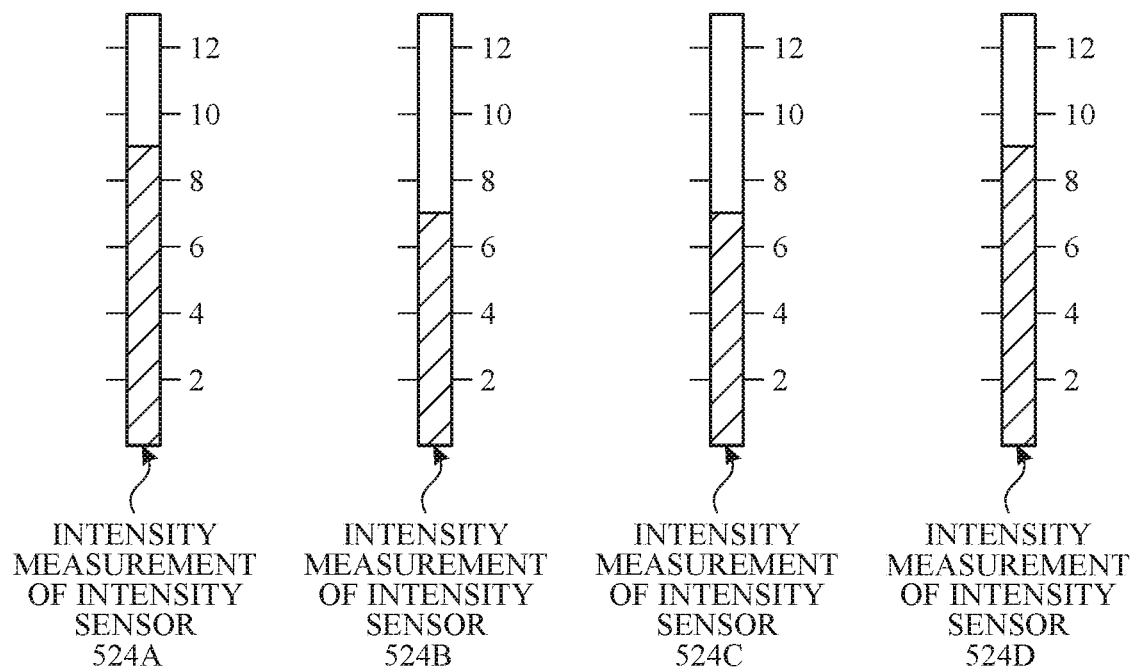
Figure 5D:
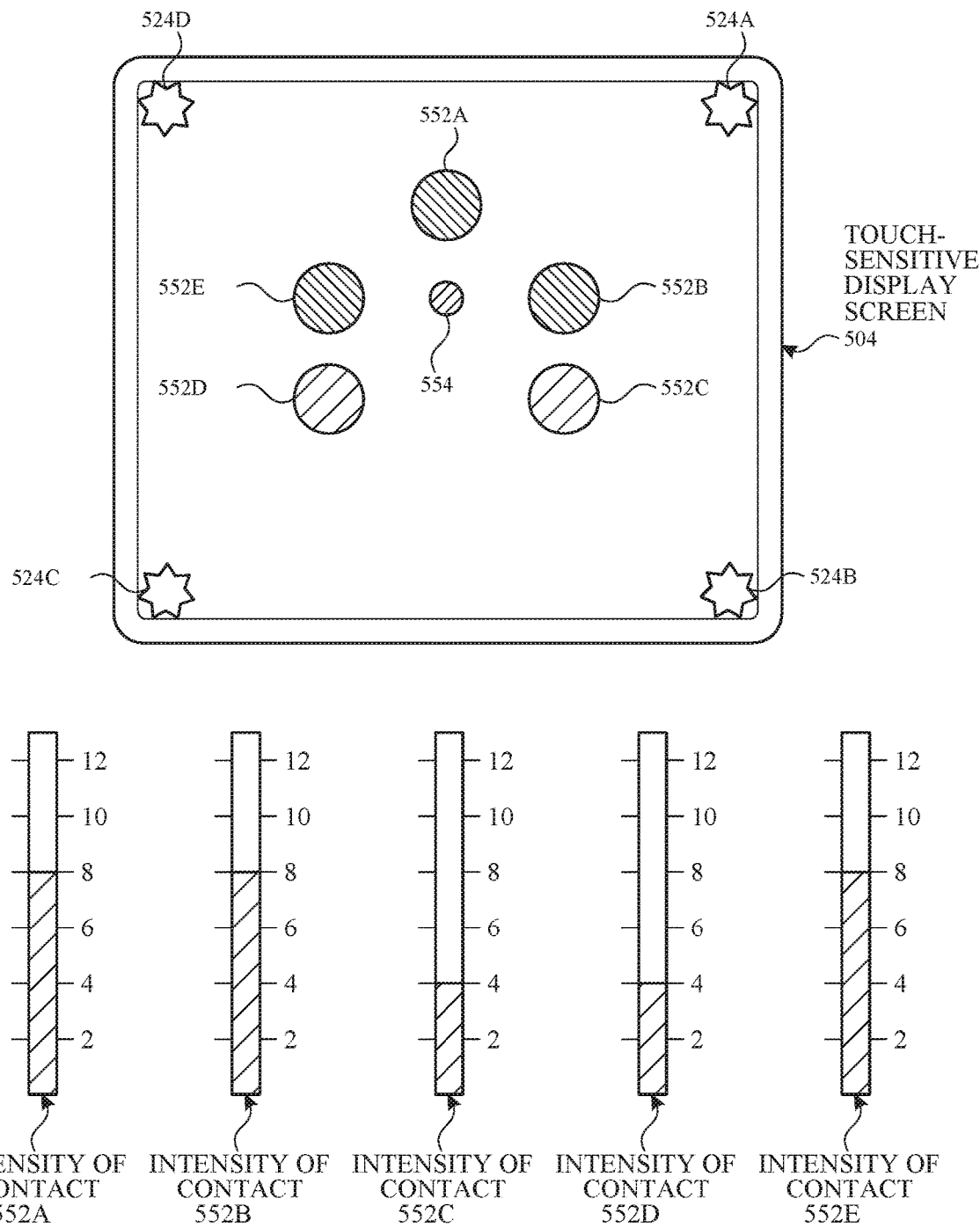

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
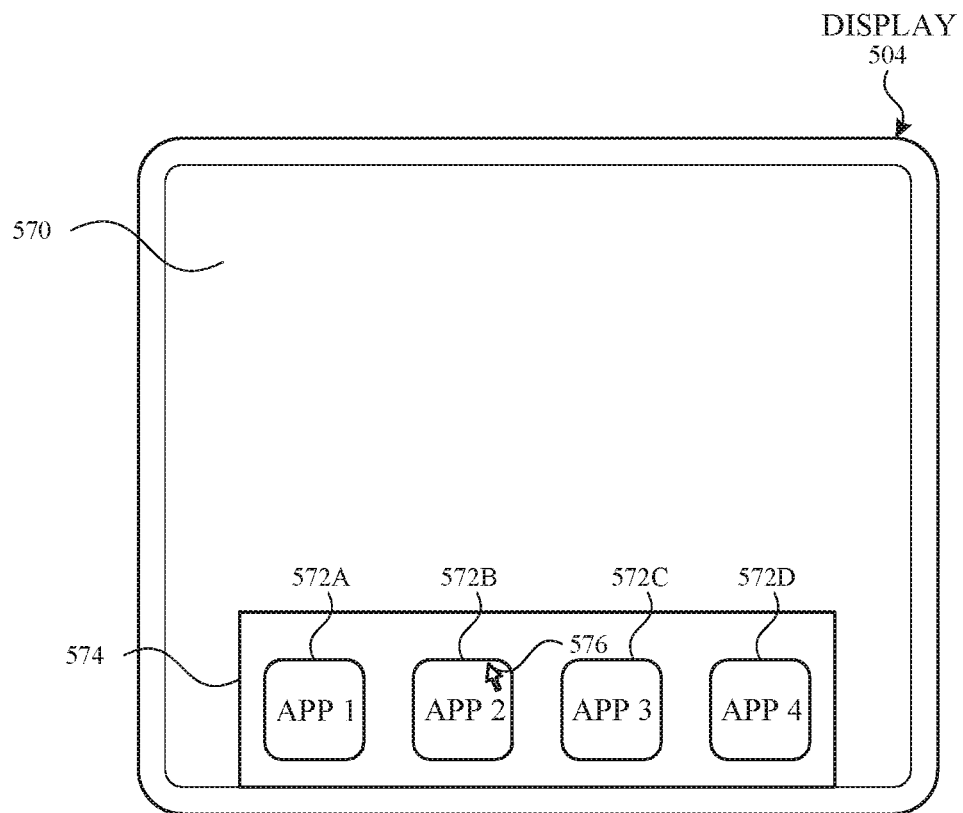
FIGS. 5E-5H illustrate exemplary components and user interfaces of a personal electronic device in accordance with some embodiments.
Figure 5E:
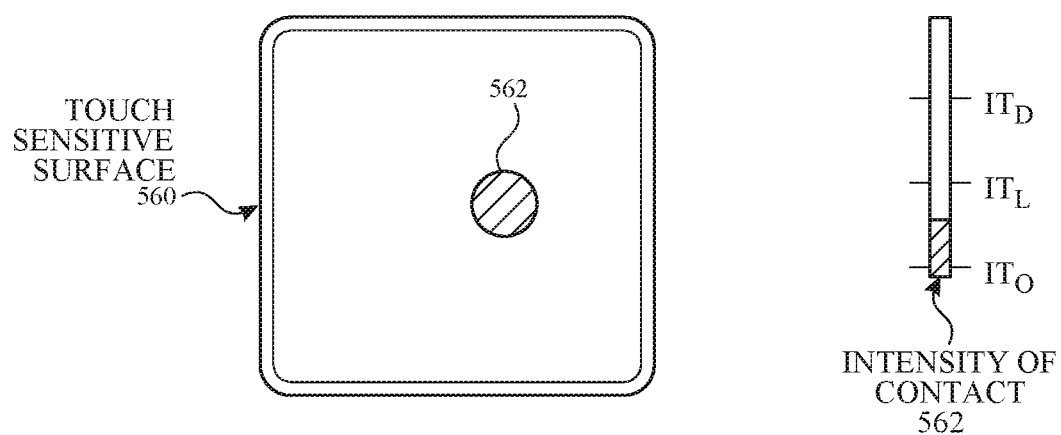
Figure 5F:
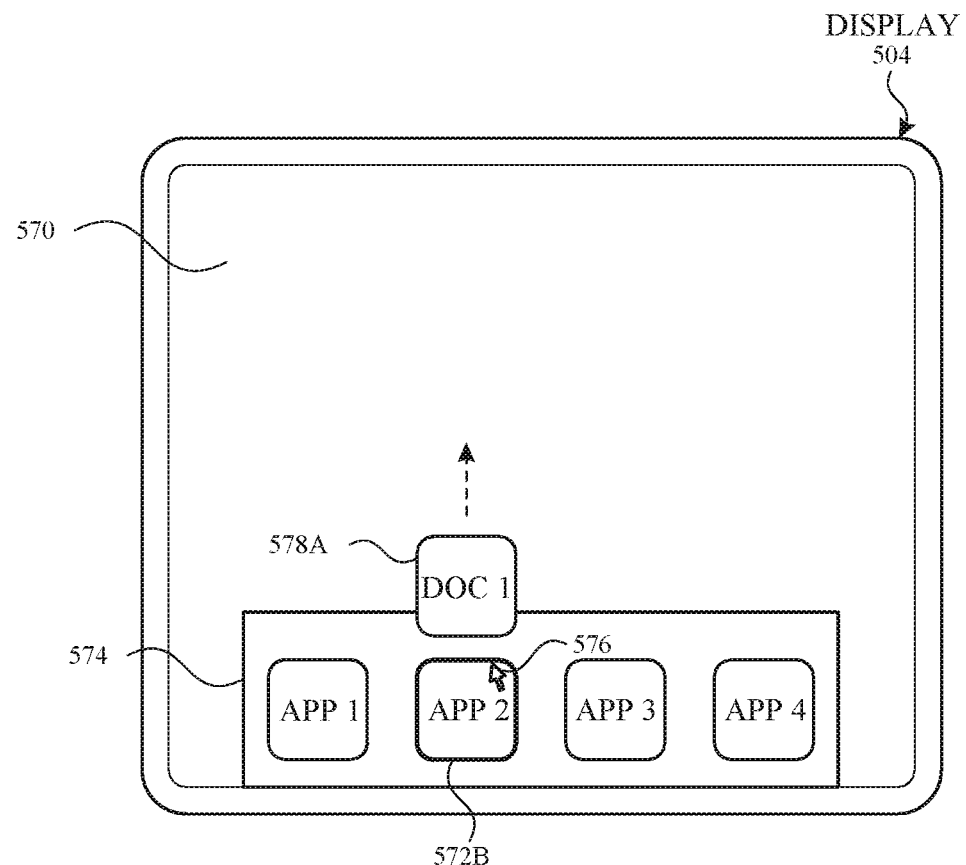
Figure 5F:
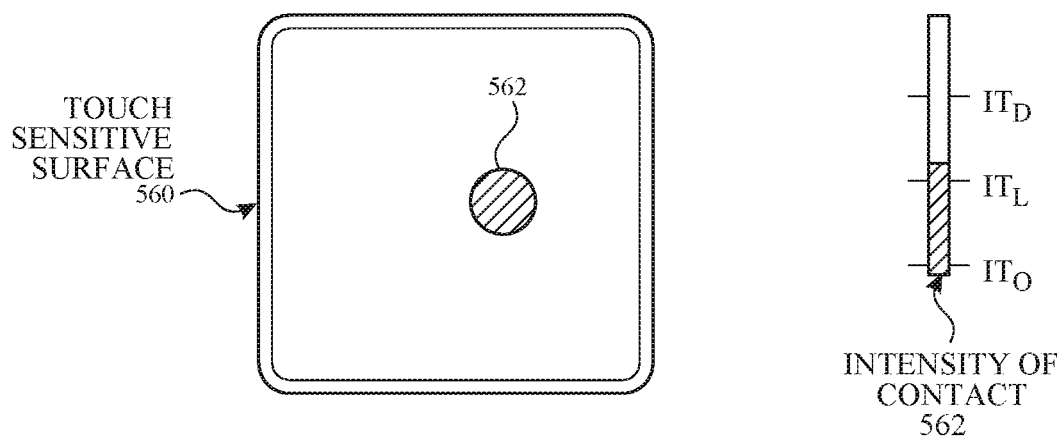
Figure 5G:
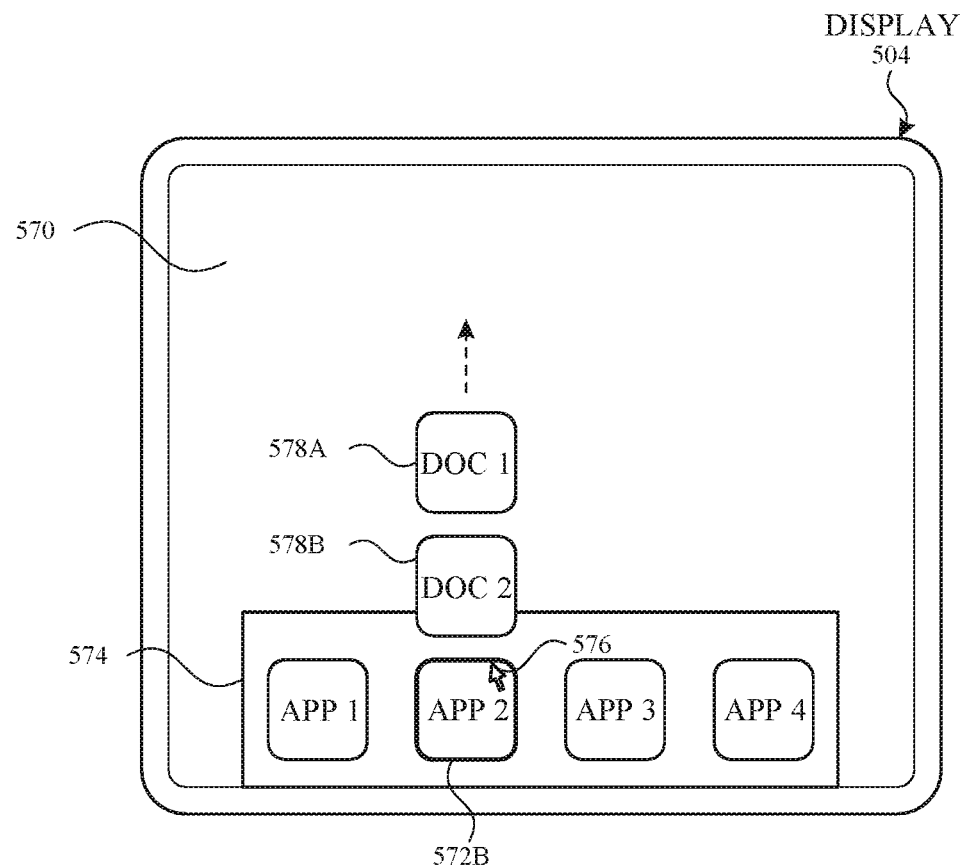
Figure 5G:
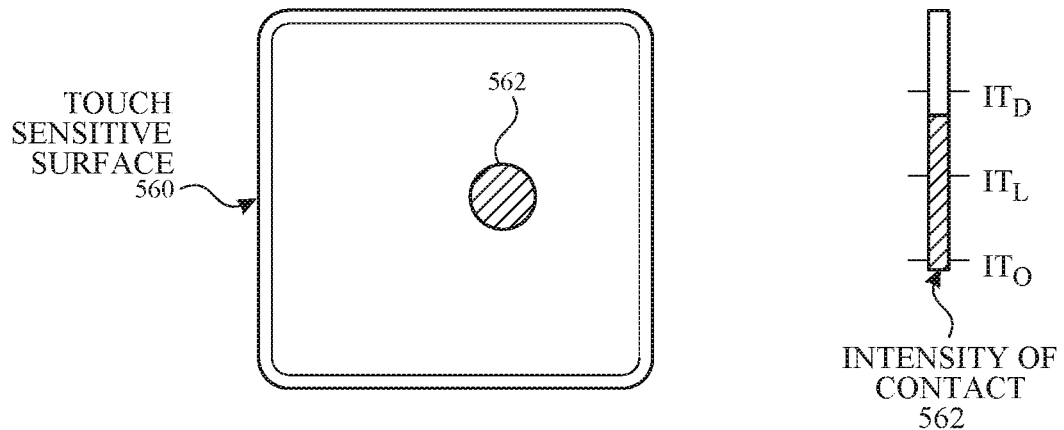
Figure 5H:
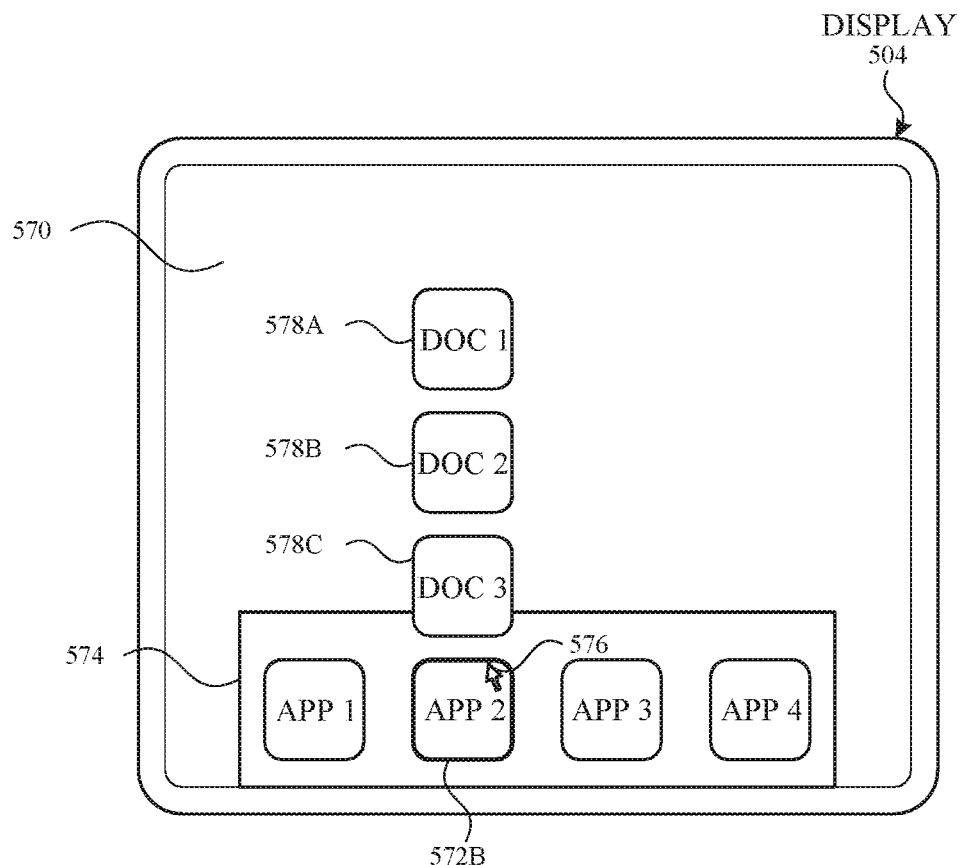
Figure 5H:
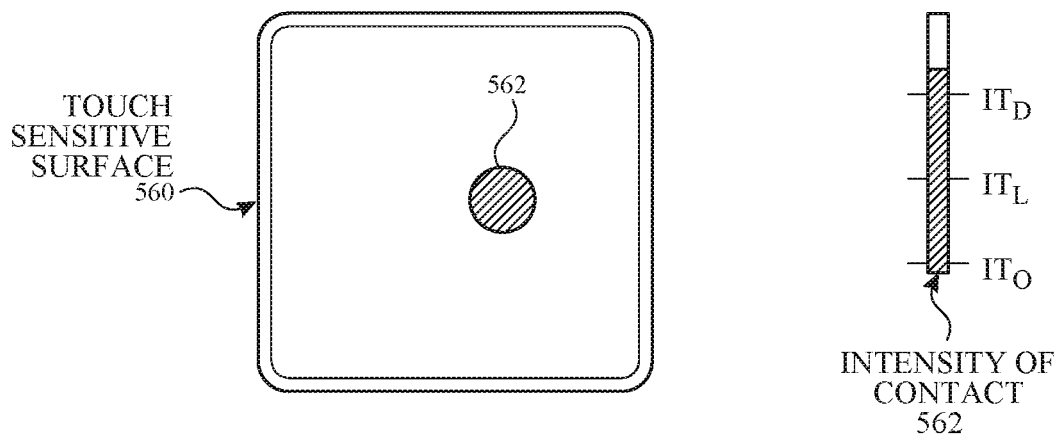

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

User Interfaces for Managing Communication Restrictions of Another Electronic Device Users interact with electronic devices in many different manners, including setting one or more communication restrictions to be enforced on another electronic device. The embodiments described below provide ways in which an electronic device sets and enforces one or more of these communication restrictions. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figures 6A, 6B:
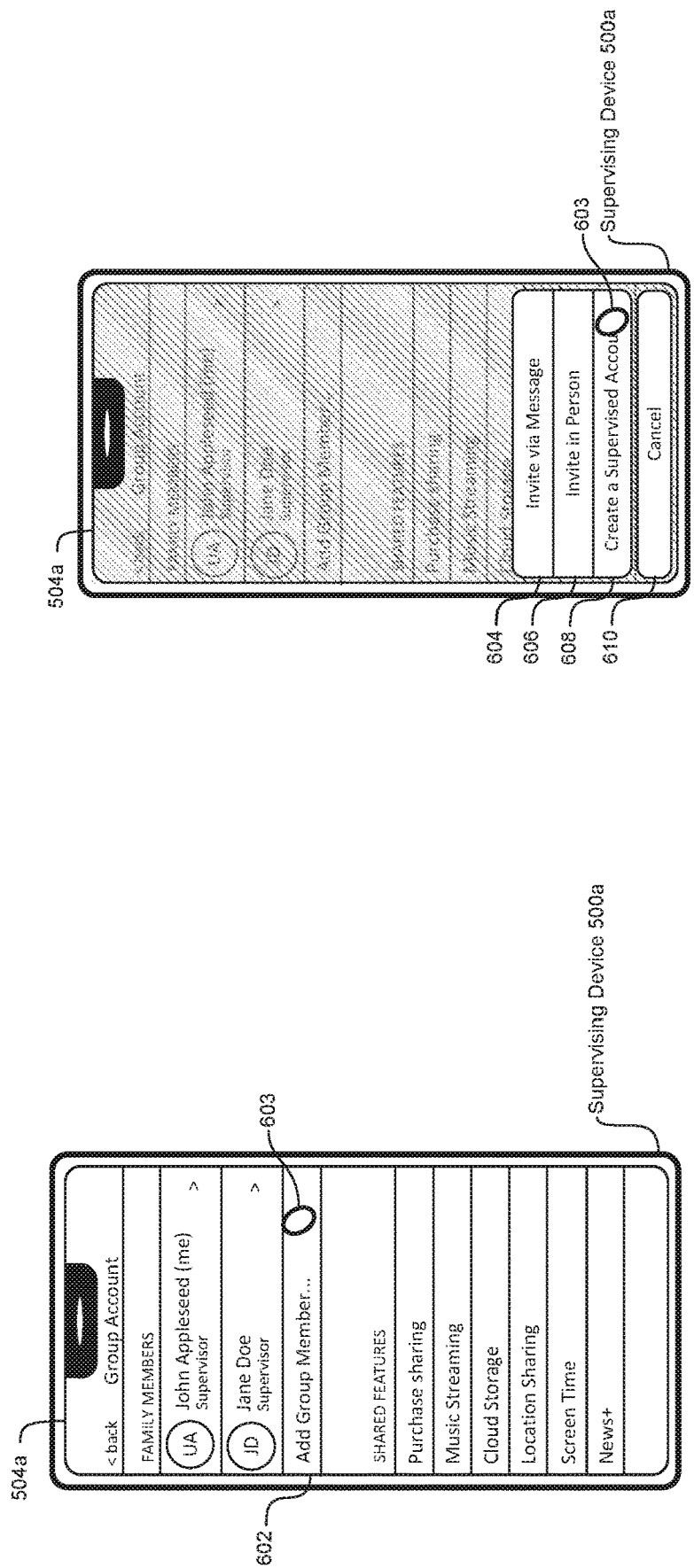
FIGS. 6A-6WW illustrate exemplary ways in which a supervising electronic device configures one or more communication restrictions that are enforced on a supervised electronic device in accordance with some embodiments of the disclosure.
Figure 6D:
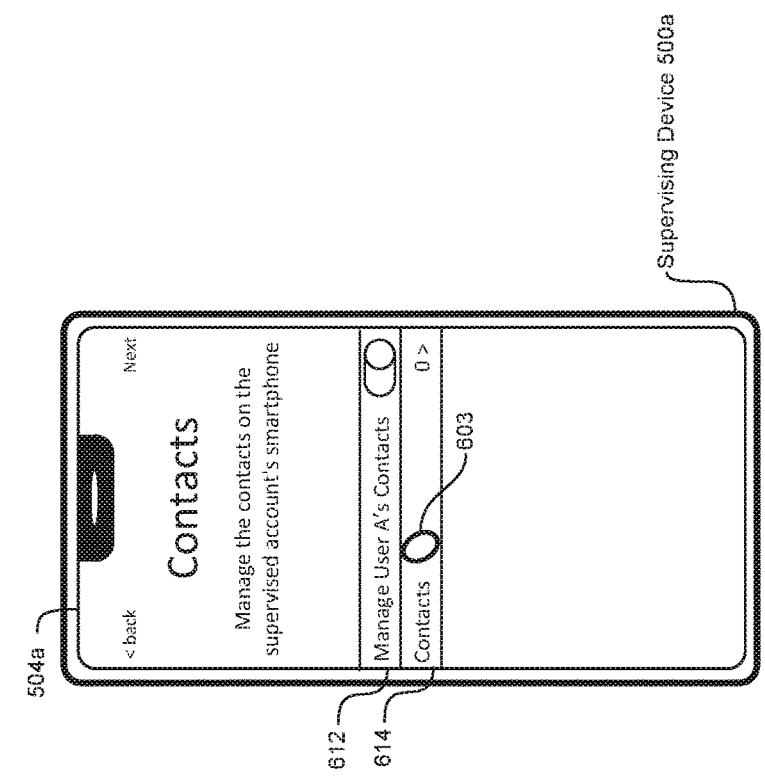
Figure 6C:
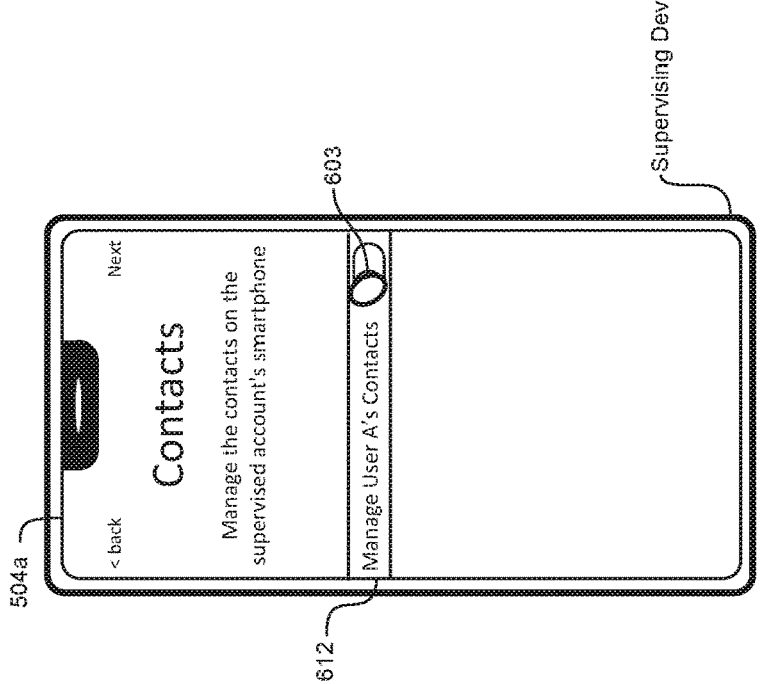
Figure 6F:
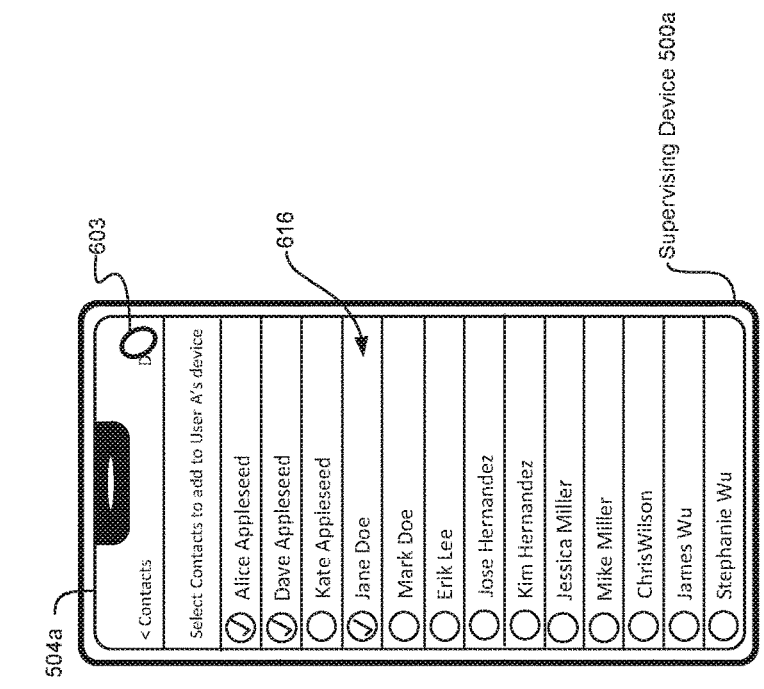
Figure 6E:
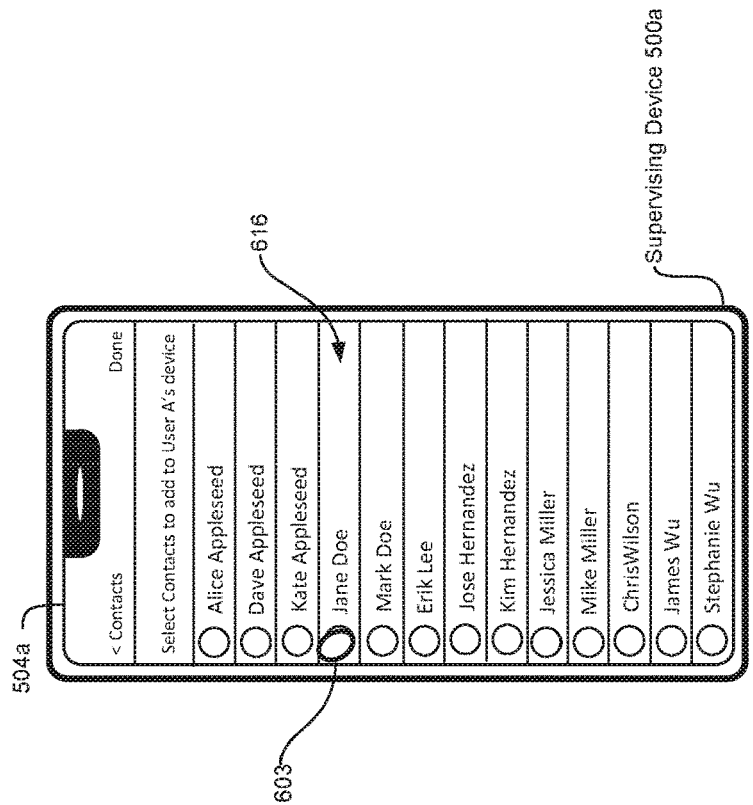
Figure 6T:
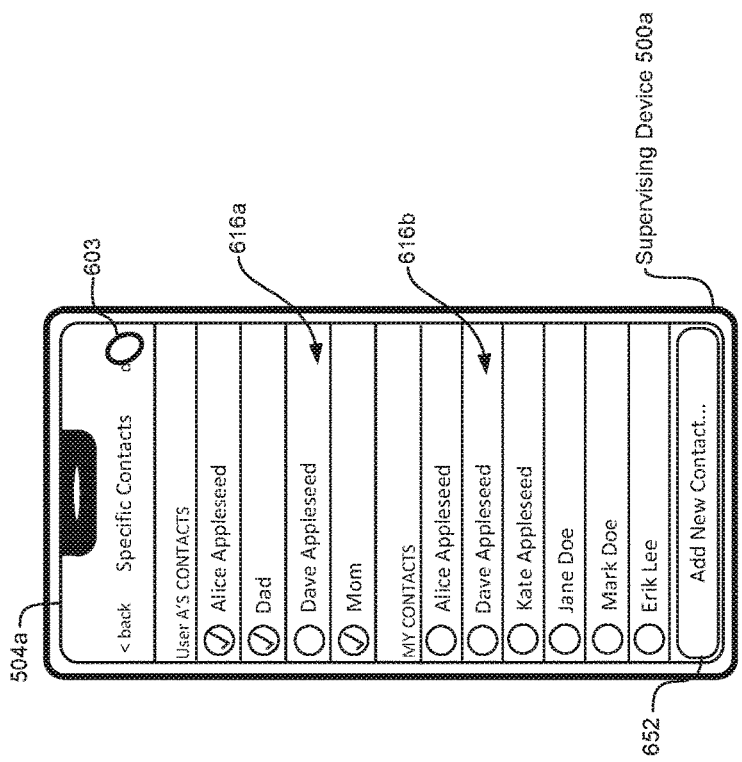
Figure 6S:
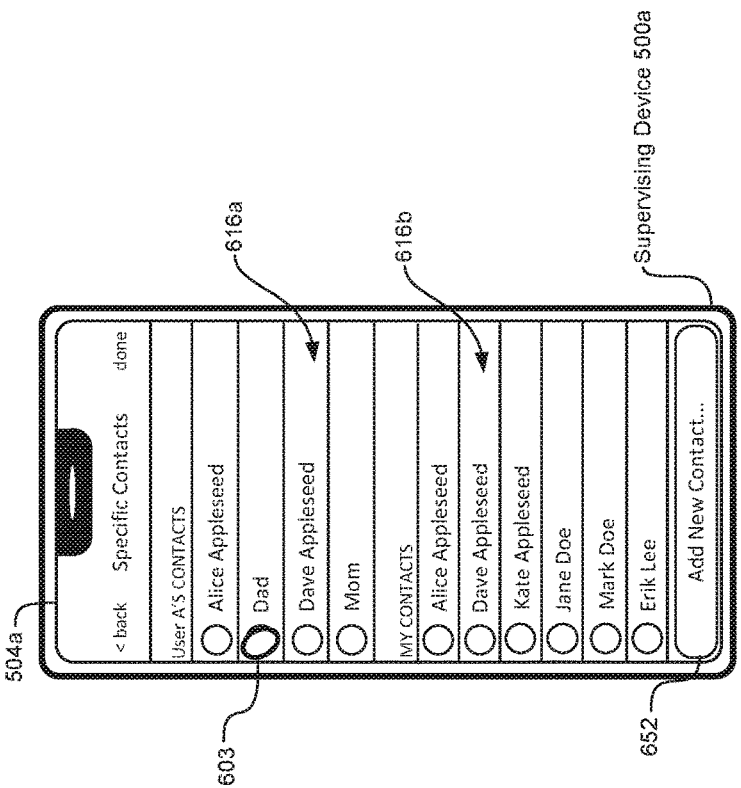
Figure 6B:
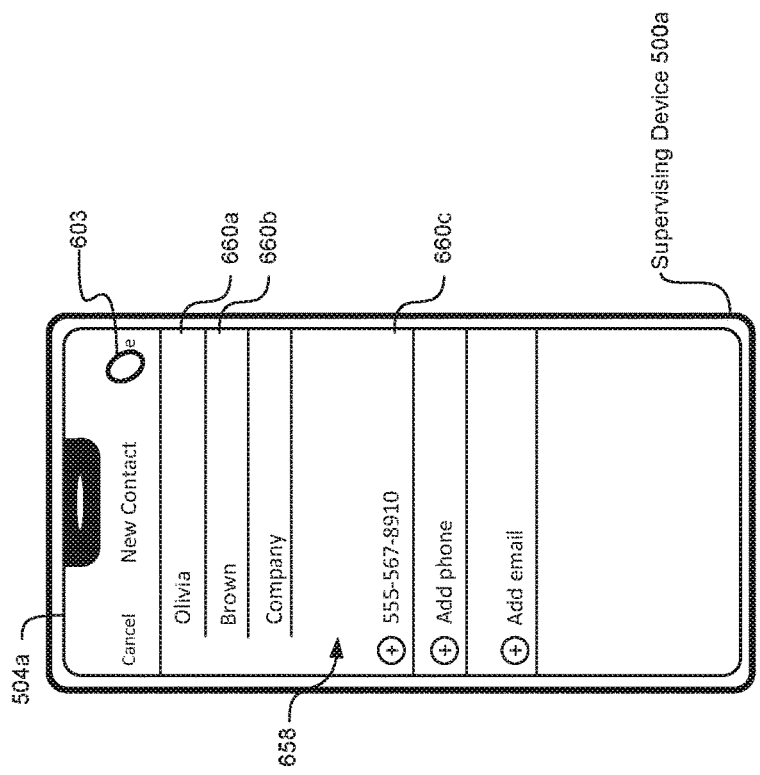
Figure 6A:
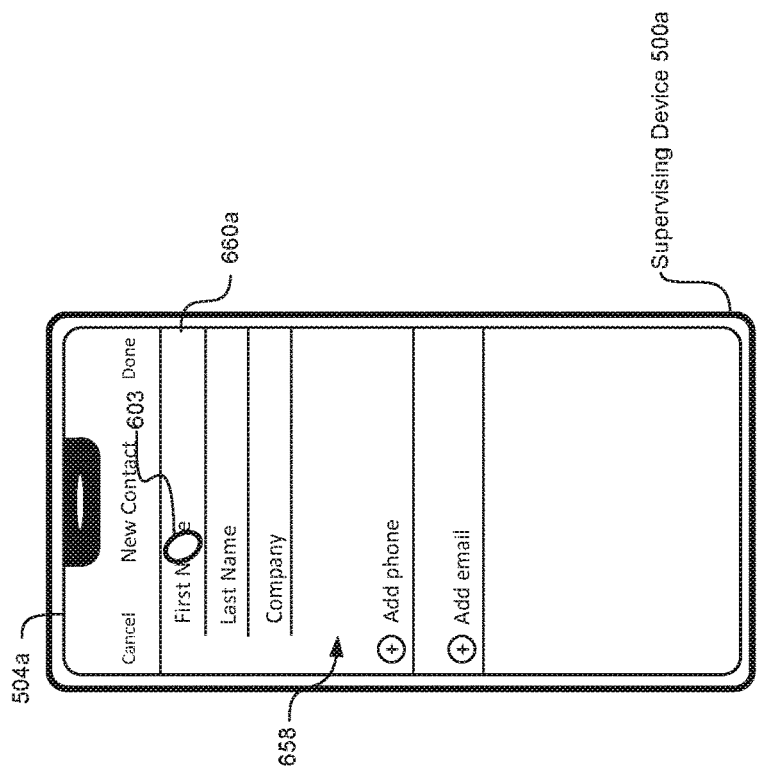
Figure 6H:
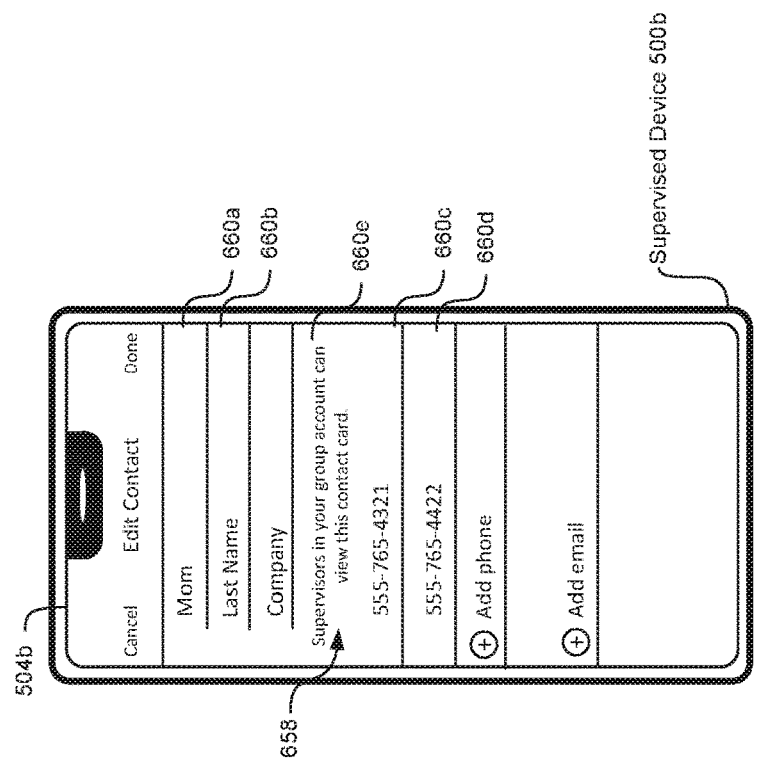
Figure 6G:
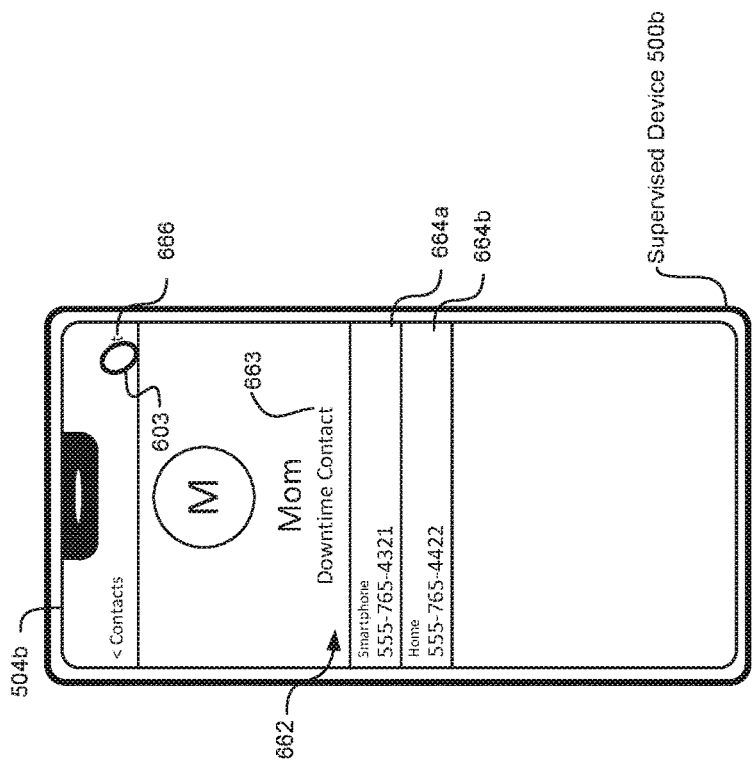
Figure 6J:
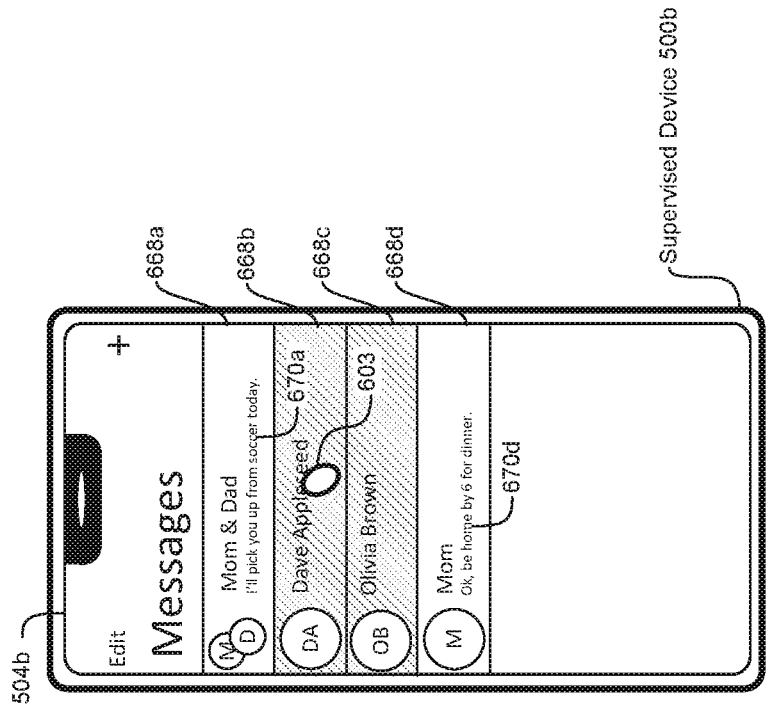
Figure 6I:
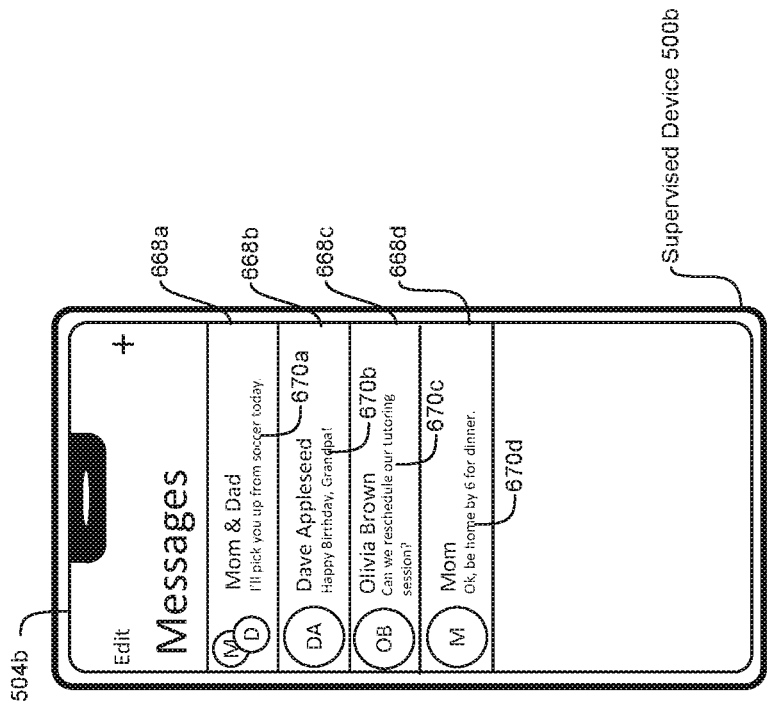
Figures 6K, 6L:
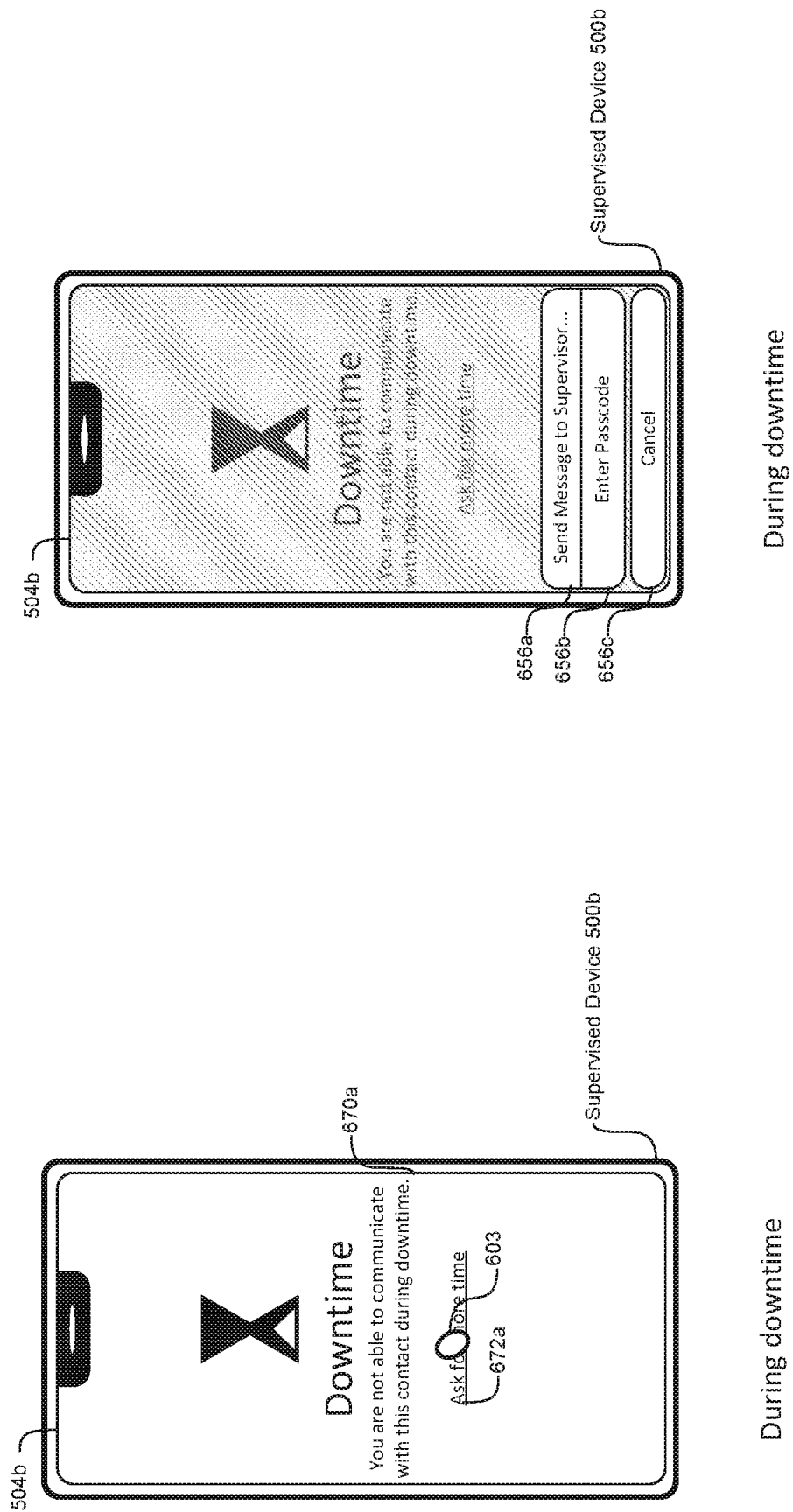
Figure 6N:
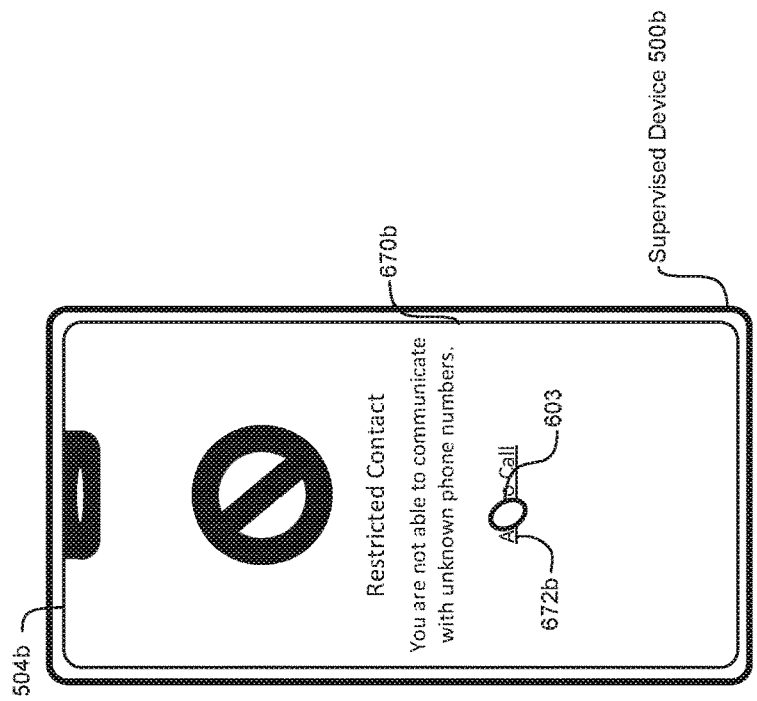
Figure 6M:
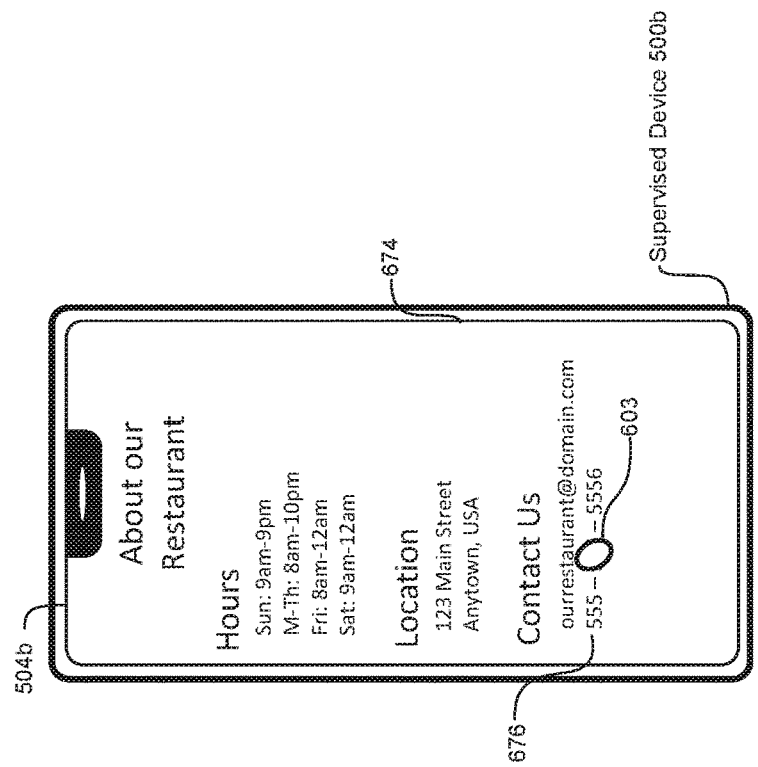
Figure 6R:
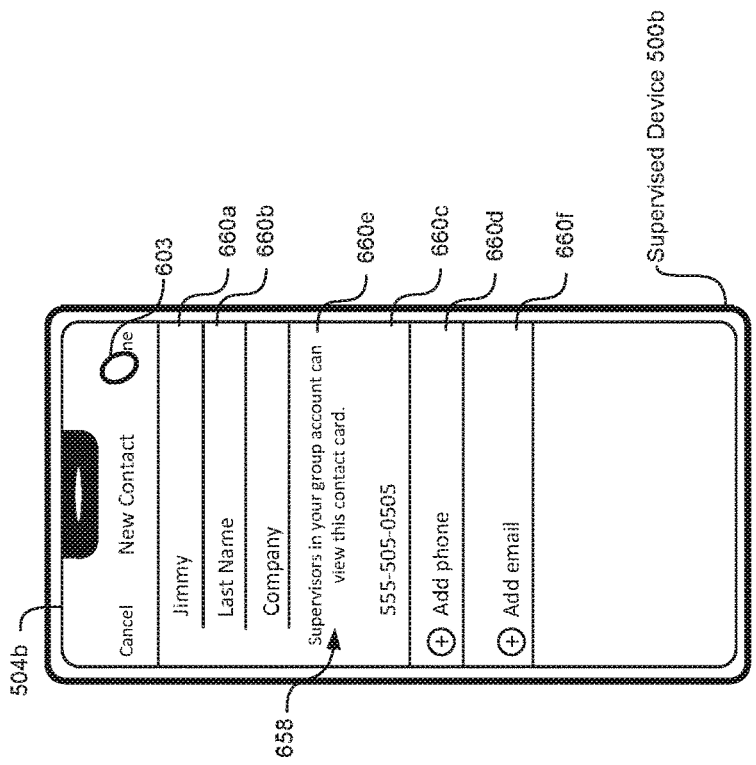
Figure 6Q:
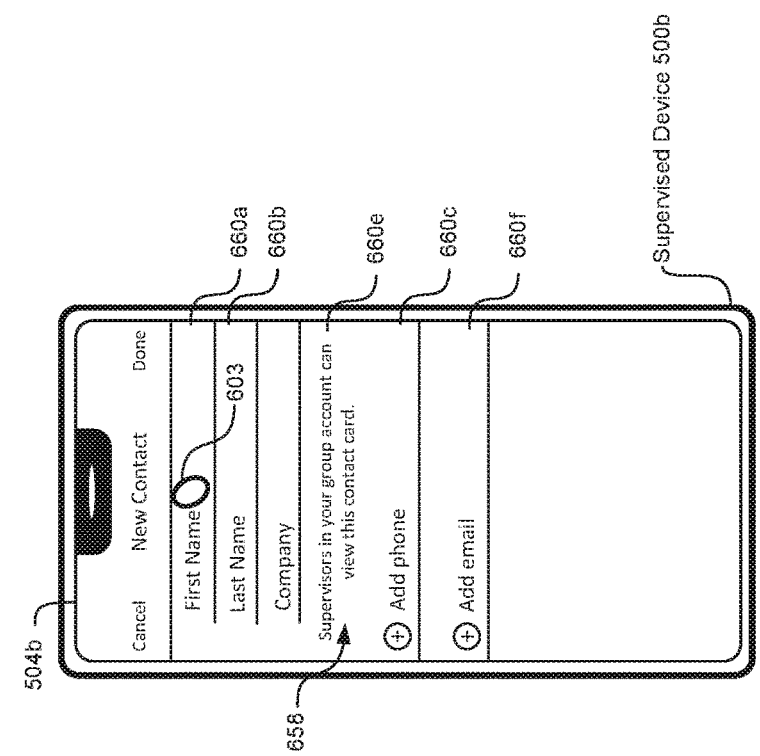
Figure 6W:
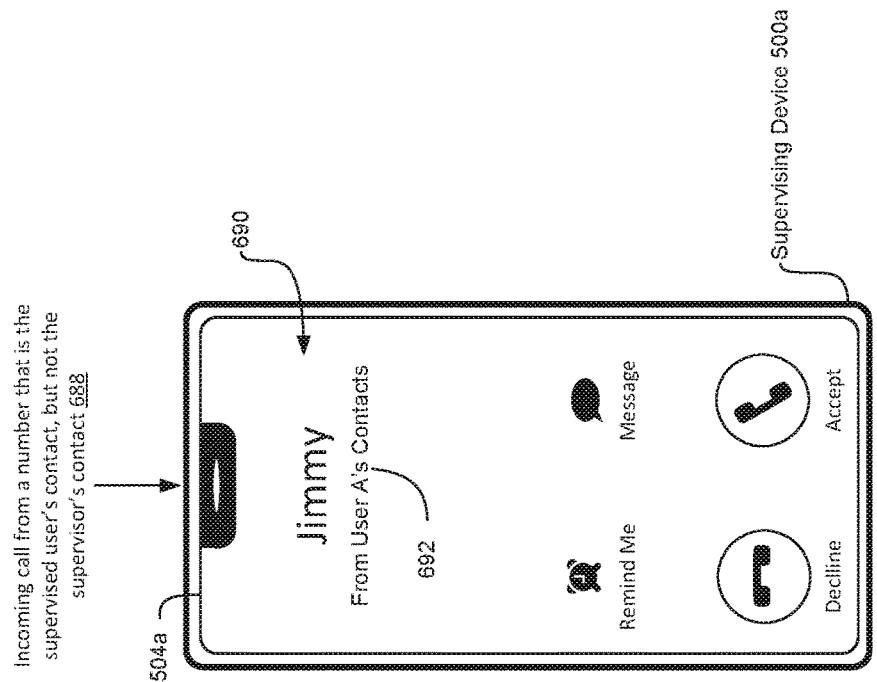
Figure 7A:
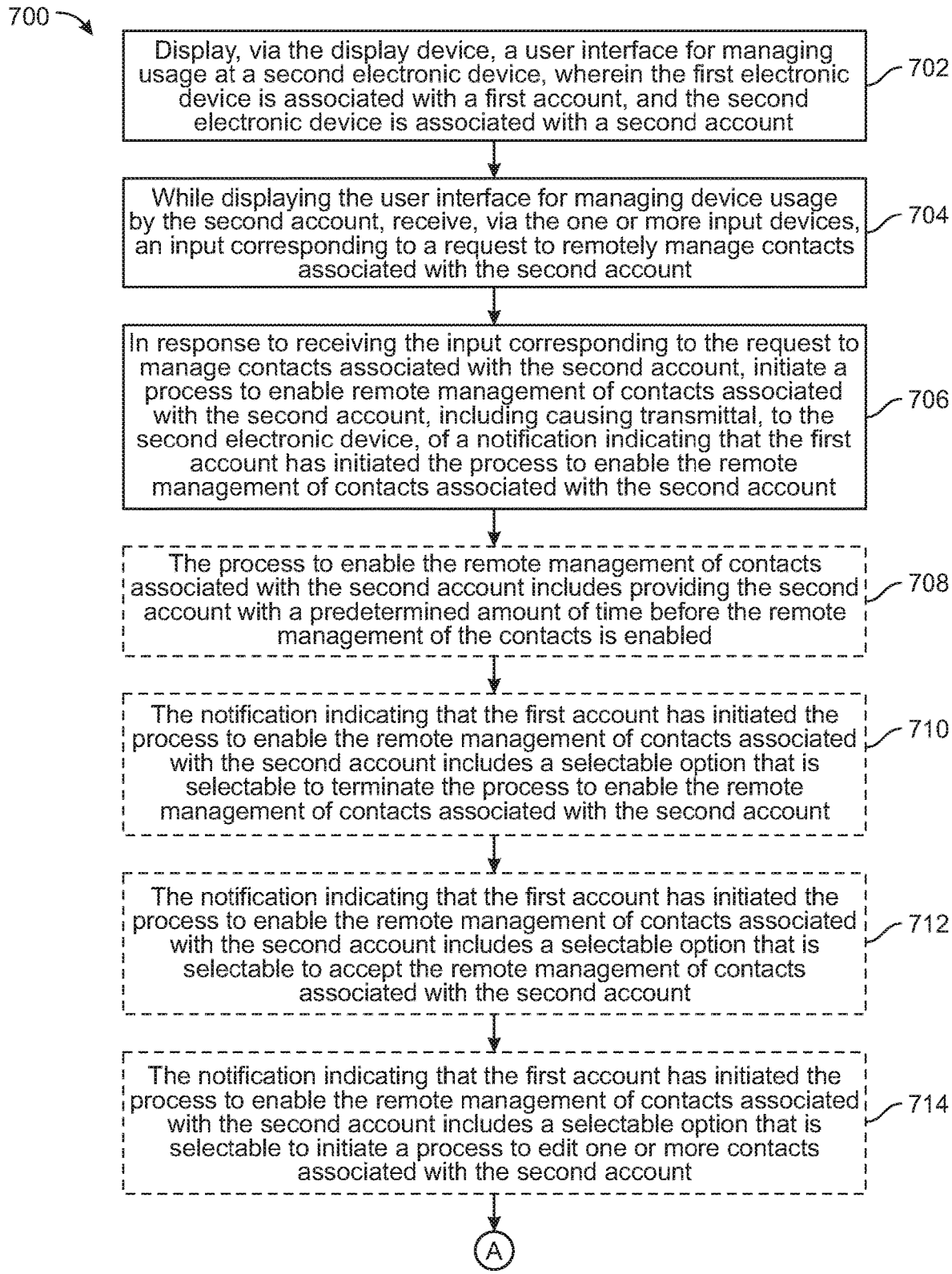
FIGS. 7A-7I are flow diagrams illustrating a method of configuring one or more communication restrictions that are enforced on a supervised electronic device in accordance with some embodiments of the disclosure.
Figure 7B:
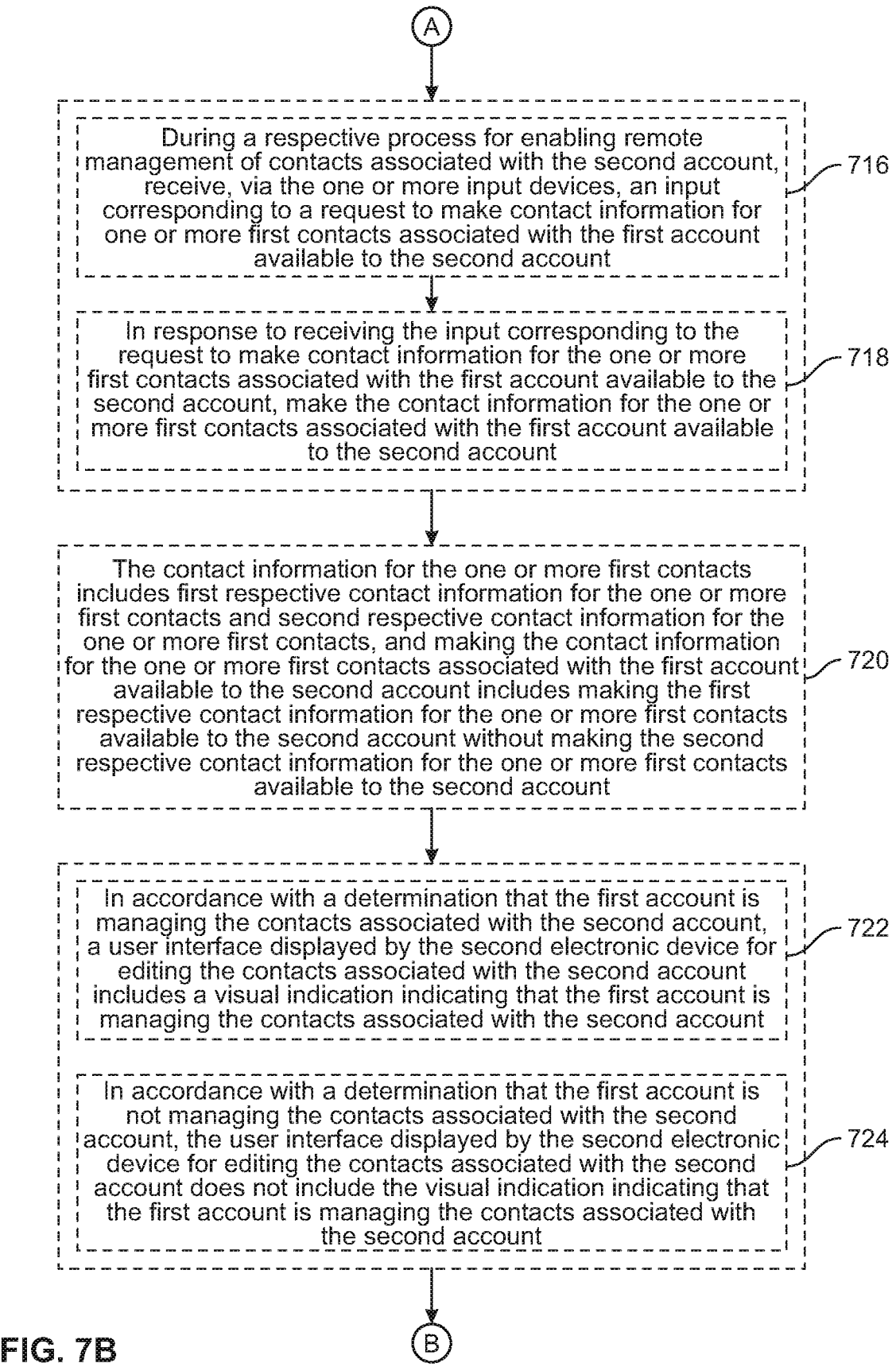
Figure 7C:
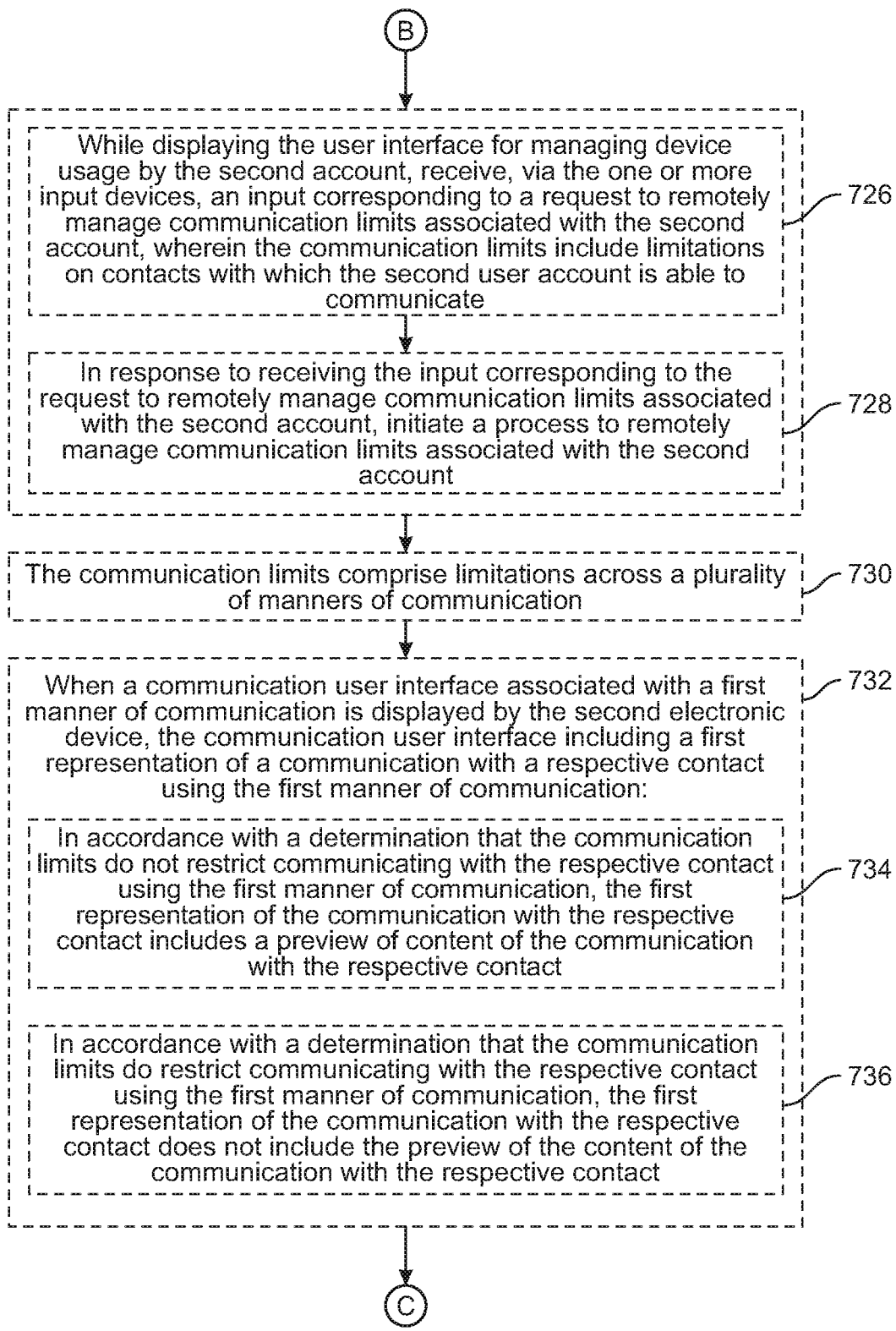
Figure 7D:
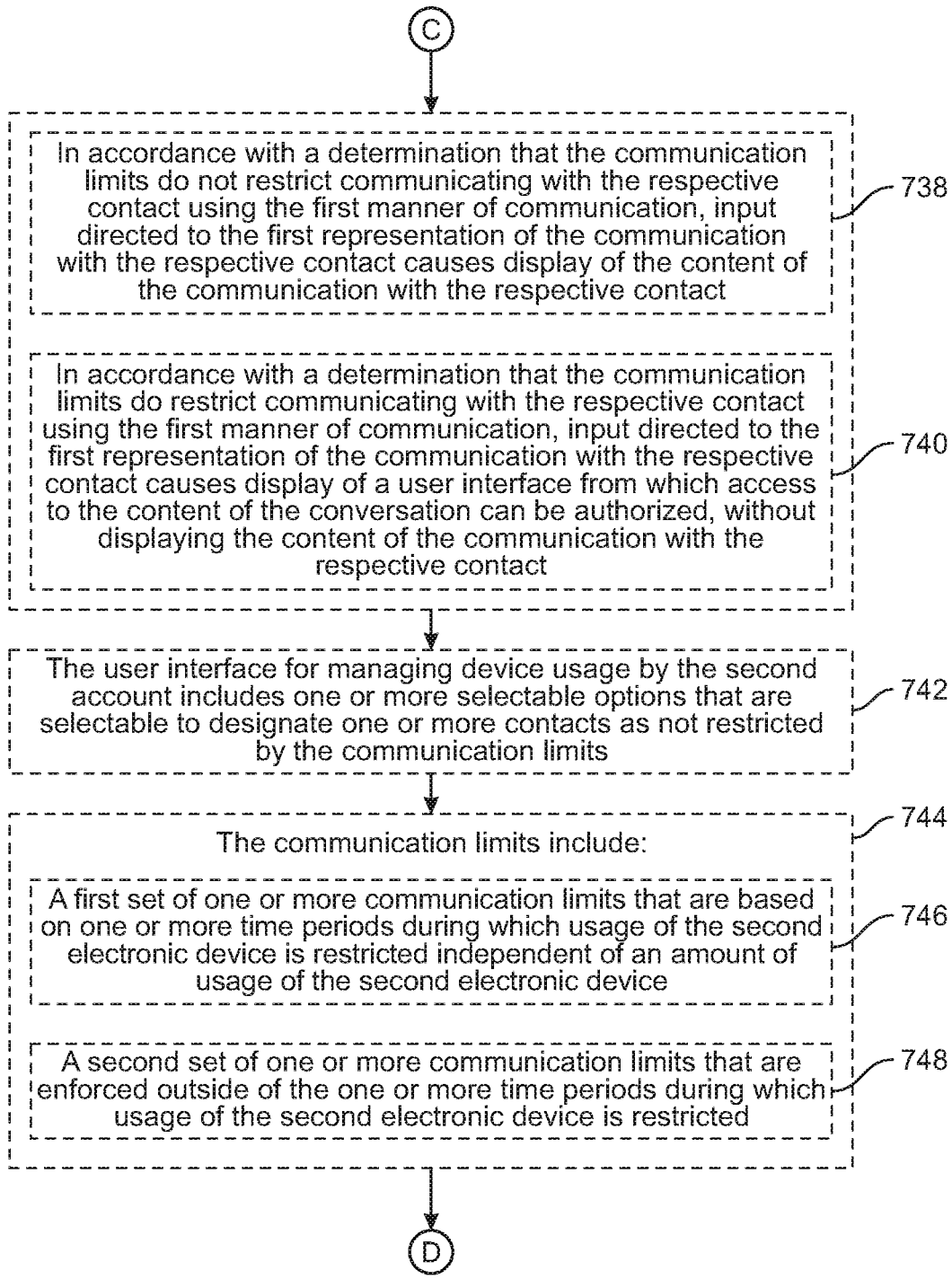
Figure 7E:
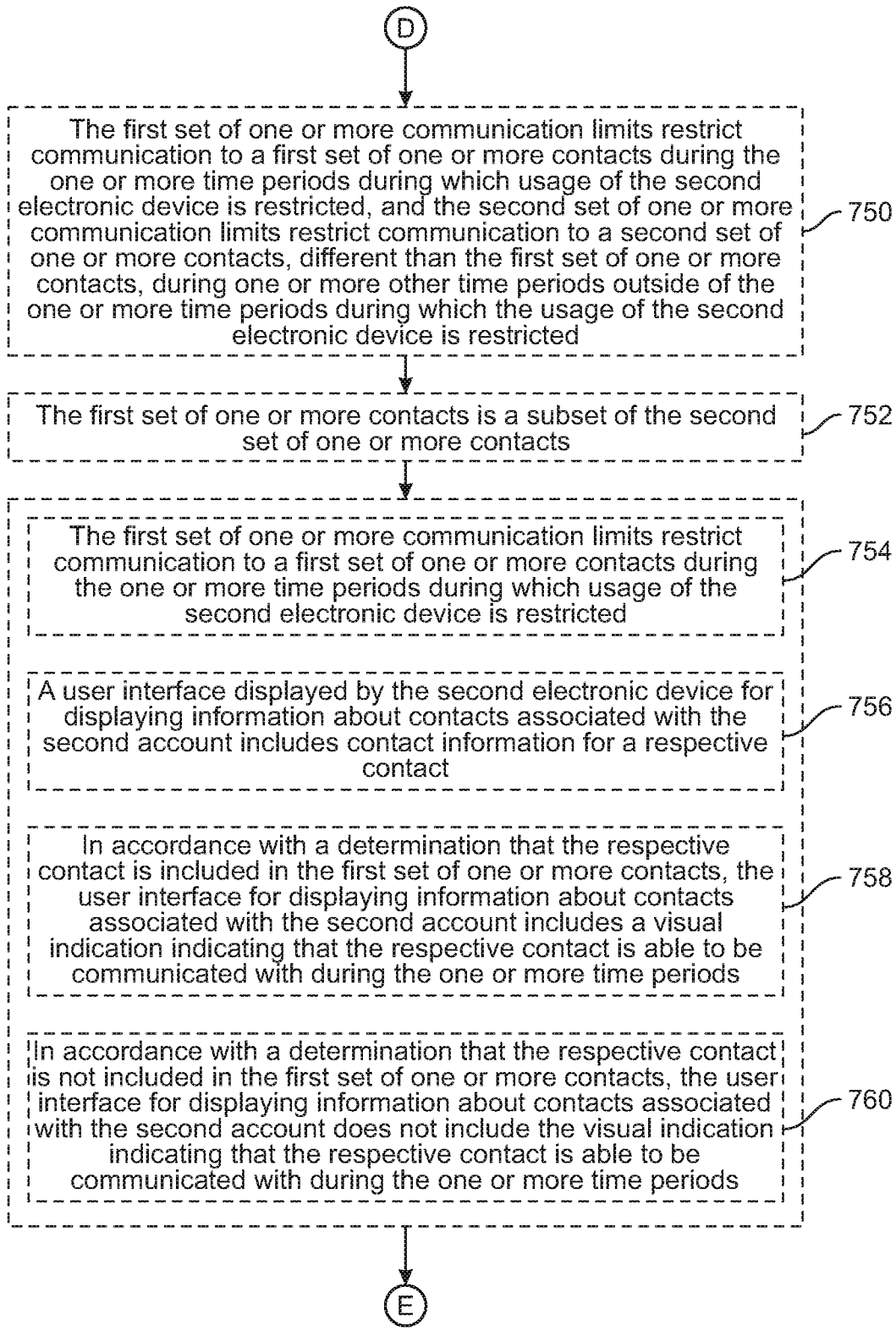
Figure 7F:
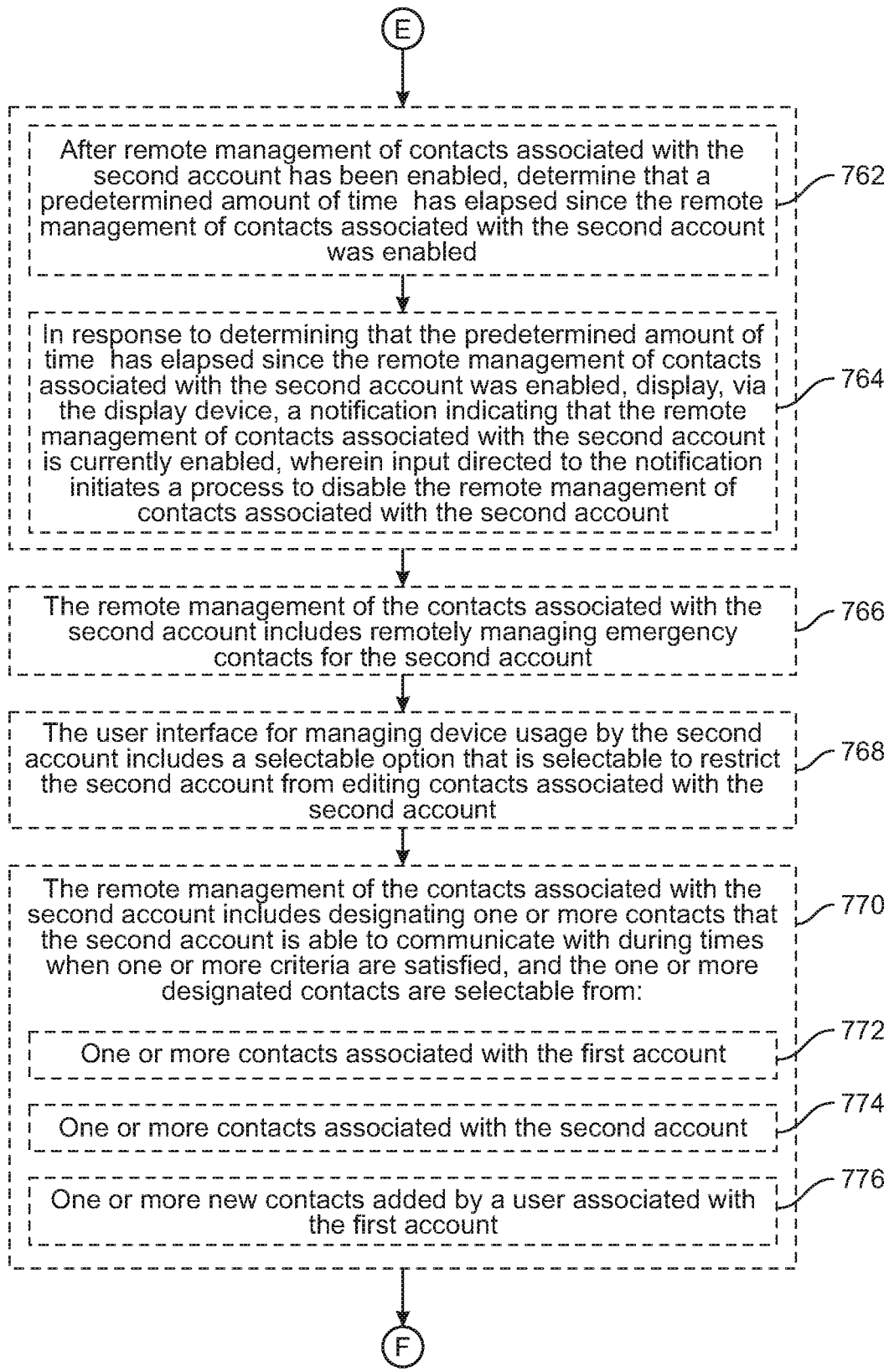
Figure 7G:
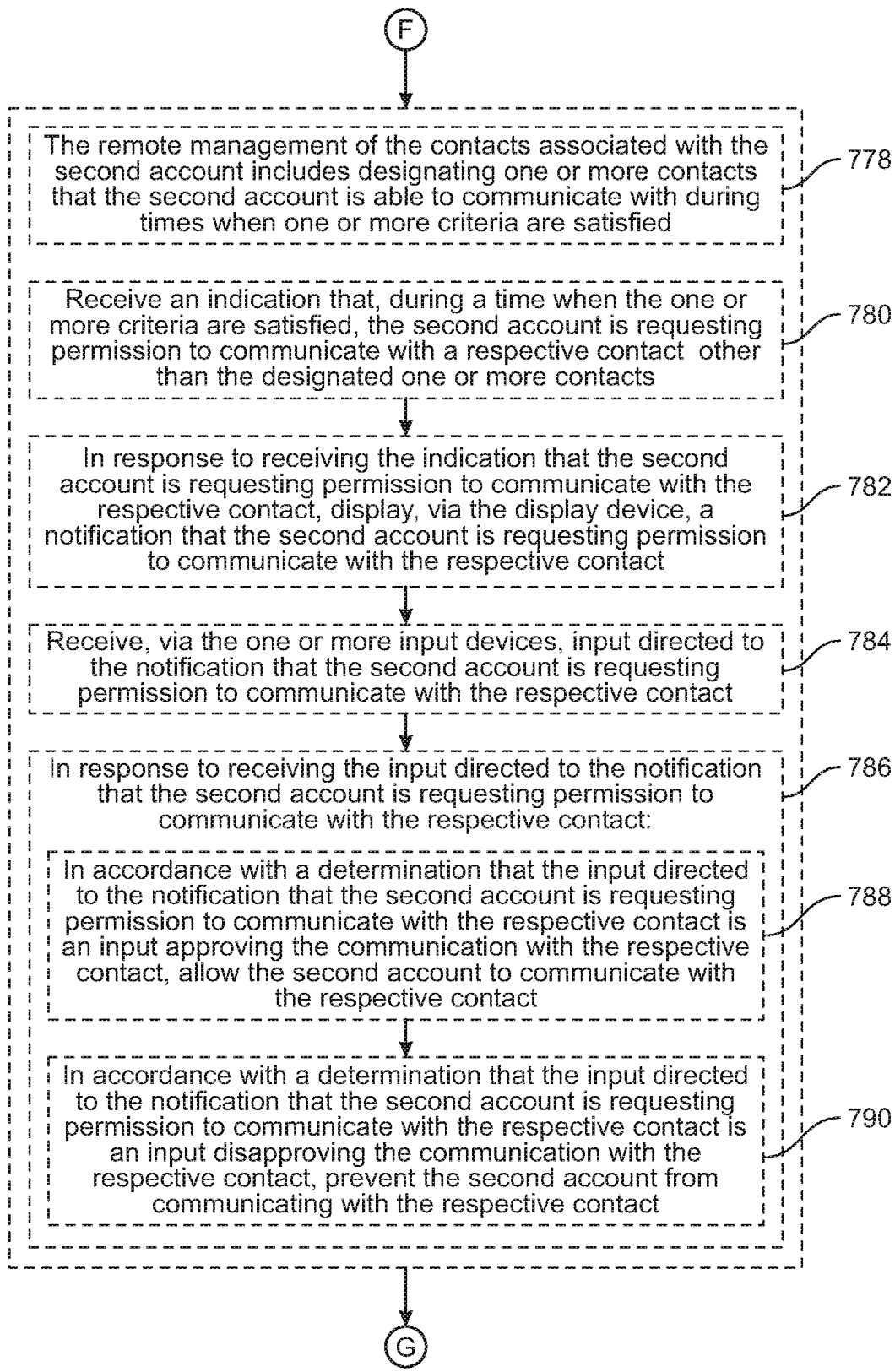
Figure 7H:
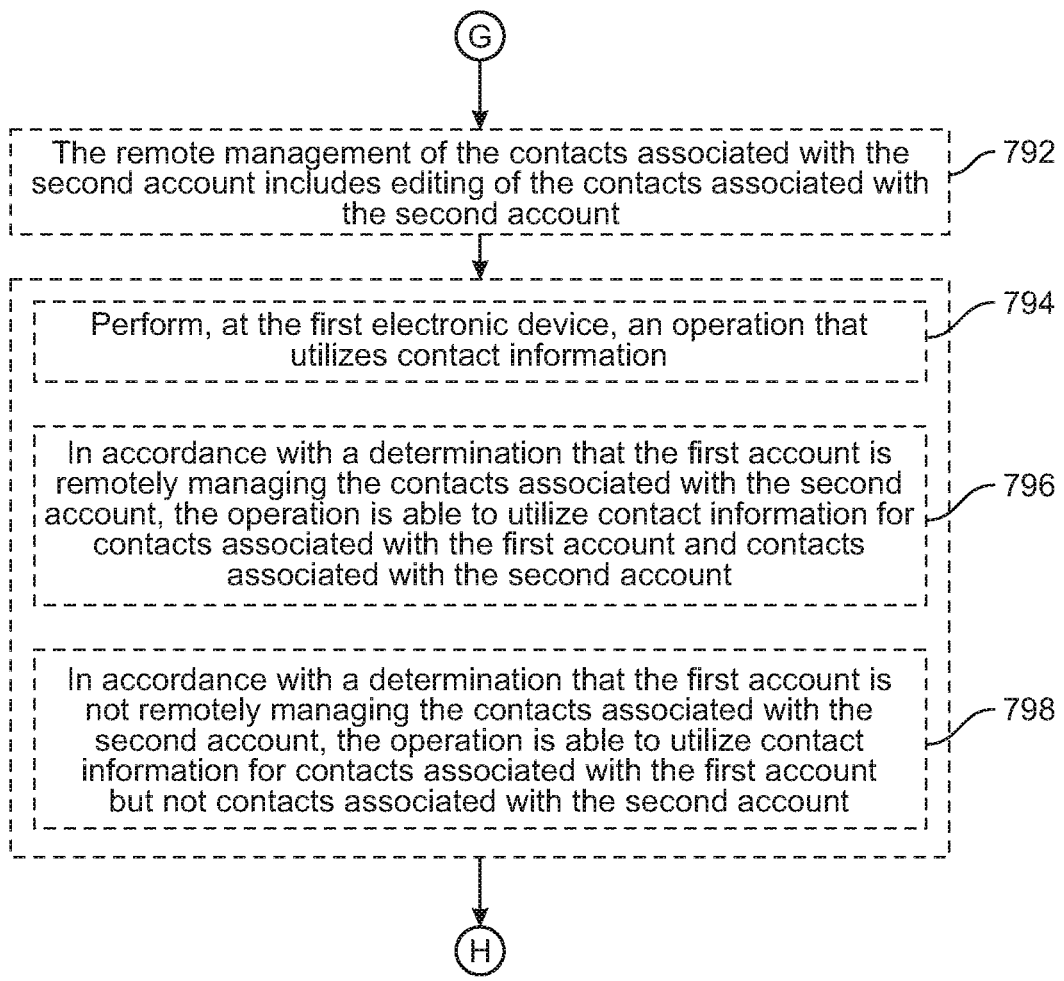
Figure 7I:
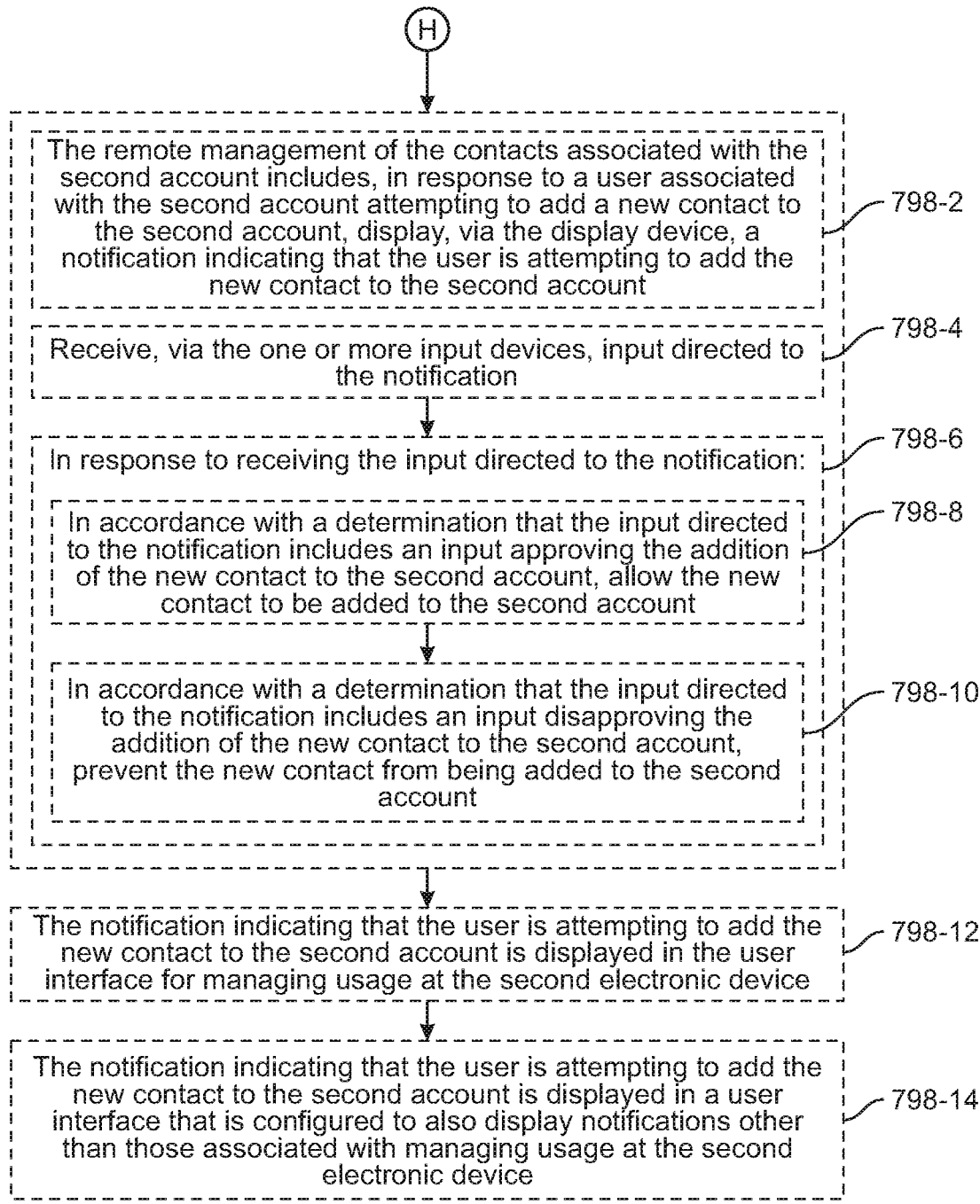

FIGS. 6A-6WW illustrate exemplary ways in which a supervising electronic device 500a configures one or more communication restrictions that are enforced on a supervised electronic device 500b in accordance with some embodiments of the disclosure. The embodiments in these figures are used to illustrate the processes described below, including the processes described with reference to FIGS. 7A-7I.

FIGS. 6A-6H illustrate ways in which a supervising electronic device 500a configures a supervised user account of a supervised electronic device 500b, including managing the contacts of the supervised user account.

FIG. 6A illustrates a group account user interface presented on the supervising electronic device 500a. The group user account includes a selectable option 602 that, when selected, causes the electronic device 500a to add a user account to the group user account.

In response to the user's selection in FIG. 6A, the supervising electronic device 500a presents the user interface illustrated in FIG. 6B. As shown in FIG. 6B, the supervising electronic device 500a presents an option 604 to add a new user account to the group by sending a message to another user account, an option 606 to add a new user account to the group in person, an option 608 to configure a new supervised user account, and an option 610 to cancel the process of adding a user account to the group of user accounts. The user selects (e.g., with contact 603) the option 608 to create a new supervised user account to add to the group of user accounts.

In response to the user's selection in FIG. 6B, the supervising electronic device 500a presents one or more user interfaces for configuring the new supervised user account, including the user interface illustrated in FIG. 6C. As shown in FIG. 6C, the supervising electronic device 500a presents an option 612 to configure the supervised user account to enable the user account of the supervising electronic device 500a (e.g., the supervising user account) to manage the contacts of the supervised user account. The user selects (e.g., with contact 603) the option 612 to manage the contacts of the supervised user account.

As shown in FIG. 6D, in response to the user's selection in FIG. 6C, the electronic device 500a presents an option 614 that, when selected, causes the electronic device 500a to present a user interface at which the user is able to add one or more contacts to the supervised user account.

In FIG. 6D, the user selects (e.g., with contact 603) the option 614 to add one or more contacts to the supervised user account. In response to the user's selection, the electronic device 500a presents a user interface that includes a plurality of representations 616 of the supervising user account's contacts that, when selected, add the respective selected contacts to a list of contacts to be added to the supervised user account. The user selects (e.g., with contact 603) one of the representations 616 (e.g., Jane Doe).

In response to the user's selection in FIG. 6E and the selection of a plurality of other contacts 616, the electronic device 500a presents a plurality of contacts 616 with a check mark indicating that the contacts will be made available to the supervised user account, as shown in FIG. 6F. The user selects (e.g., with contact 603) an option to confirm adding the contacts 616 to the supervised user account.

FIG. 6G illustrates presentation of a contacts user interface by the supervised electronic device 500b. The supervised user account that was configured in FIGS. 6A-6F is the user account of the supervised electronic device 500b. Thus, as shown in FIG. 6G, the contacts user interface includes representations 620 of the contacts added by the supervised electronic device 500a in FIGS. 6D-6F. The contacts user interface further includes a representation 618 of the supervised user account. The user selects (e.g., with contact 603) a representation 620 of one of the contacts (e.g., Dave Appleseed).

In response to the user's selection in FIG. 6G, the electronic device 500b presents a contact card user interface 626 including contact information of the contact, as shown in FIG. 6H. The contact card user interface 626 presented on the supervised electronic device 500b includes the contact information of the contact and an image 622b representing the contact that is generated by the electronic device 500b (e.g., the contact's initials). The contact card user interface 626 for the same contact that is displayed on the supervising electronic device 500a includes the contact information as well as a photo 622a associated with the contact and a note 624a associated with the contact. The photo 622a and note 624a are not presented on the supervised electronic device 500b because the supervising user account did not share the photo 622a and note 624a with the supervised user account when the supervising account added the plurality of contacts to the supervised user account, but optionally did share other information about the contact, such as the phone numbers and email address associated with the contact.

Thus, as shown in FIGS. 6A-6H, the supervising electronic device 500a is able to configure a supervised user account of a supervised electronic device 500b, including managing the contacts of the supervised user account.

FIGS. 6I-6L illustrate ways the supervising electronic device 500a initiates the management of contacts of a user account of a supervised electronic device 500b.

In FIG. 6I, the supervising electronic device 500a presents a restrictions user interface 628 that presents a number of options for setting and enforcing restrictions on the supervised user account and/or supervised electronic device 500b. The user interface 628 includes an option 630 to view and manage communication limits enforced on the user account of the supervised electronic device 500b. The user selects (e.g., with contact 603) the option 630 to view and edit the communication limits.

As shown in FIG. 6J, in response to the user's selection in FIG. 6I, the supervising electronic device 500a presents a user interface including a plurality of options 632a-b, 612, and 634 for managing one or more communication limitations of the user account of the supervised electronic device 500b. The user interface includes a selectable option 632a that, when selected, causes the electronic device 500a to present a user interface for setting one or more communication restrictions during screen time of the supervised electronic device 500b; a selectable option 632b that, when selected, causes the electronic device 500a to present a user interface for setting one or more communication restrictions during downtime of the supervised electronic device 500b; an option 612 to toggle the management of the contacts of the user account of the supervised electronic device 500b by the supervising user account; and an option 634 to view and edit the emergency contacts of the user account of the supervised electronic device 500b. The user selects (e.g., with contact 603) the option 612 to toggle the management of the contacts of the user account of the supervised electronic device 500b.

In response to the user's selection in FIG. 6J, if the age 642 of the user of the supervised electronic device 500b is less than a threshold age 644 (e.g., 13 years old), the supervised electronic device 500b presents the notification 640a and options 640b-c illustrated in FIG. 6K. The supervised device 500b presents the notification 640a informing the user that remote management of the contacts by the user account of the supervising electronic device 500a will begin in 24 hours. The notification 640a is presented with a selectable option 640b that, when selected, causes the electronic device 500b to dismiss the notification 640a and a selectable option 640c that, when selected, causes the electronic device 500b to present a contacts user interface (e.g., the contacts user interface illustrated in FIG. 6G) from which the user is able to view and edit the contacts before remote contact management begins. Until remote contact management of the contacts of the supervised user account begins, the supervising electronic device 500a presents an indication 636 indicating the amount of time before contact management will begin.

If the age 642 of the user of the supervised electronic device 500b is greater than the threshold age 644, in response to the user's selection in FIG. 6J, the supervised electronic device 500b presents the notification 640d illustrated in FIG. 6L. The supervised device 500b presents the notification 640b informing the user that remote management of the contacts by the user account of the supervising electronic device 500a will begin in 24 hours. The notification 640b is presented with a selectable option 640e that, when selected, causes the electronic device 500b to dismiss the notification 640a; a selectable option 640f that, when selected, causes the electronic device 500b to present a contacts user interface (e.g., the contacts user interface illustrated in FIG. 6G) from which the user is able to view and edit the contacts before remote contact management begins; and a selectable option 640g that, when selected, causes the electronic device 500b to prevent the supervising electronic device 500a from managing the contacts of the user account of the supervised electronic device 500b. Until remote contact management of the contacts of the user account of the supervised electronic device 500b begins, the supervising electronic device 500a presents an indication 636 indicating that the request to manage the contacts of the user account of the supervised electronic device 500b has been sent.

Therefore, as shown in FIGS. 6I-6L, the supervising electronic device 500a is able to initiate the management of contacts of a user account of a supervised electronic device 500b.

FIGS. 6M-6U illustrate ways the supervising electronic device 500a sets communication restrictions of the supervised electronic device 500b during screen time and downtime.

In some embodiments, the supervising electronic device 500a is able to set and enforce one or more usage limits of the user account of the supervised electronic device 500b and/or the supervised electronic device 500b itself. The usage limits optionally include time limits for the amount of time the supervised electronic device 500b (or a plurality of electronic devices associated with the user account of the supervised electronic device 500b) is able to interact with one or more applications, one or more categories of applications, or with all applications except one or more whitelisted applications. In some embodiments, the supervising electronic device 500a is also able to define a predetermined range of times (e.g., device downtime) during which additional restrictions, such as which applications are accessible, are enforced on the supervised electronic device 500b (or a plurality of electronic devices associated with the user account of the supervised electronic device 500b). For example, the supervising electronic device 500a restricts access to all applications except one or more whitelisted applications during device downtime and sets device downtime to occur from 9 pm to 6 am. Times outside of device downtime are optionally considered "screen time" during which one or more usage limits are enforced (e.g., the amount of time the user is able to use various applications or categories of applications), but additional downtime restrictions are not enforced. As will be described in more detail with reference to FIGS. 6M-6T, the supervising electronic device 500a is able to set different communication restrictions during screen time and downtime.

In FIG. 6M, the supervising electronic device 500a presents the communication management user interface described above with reference to FIG. 6J. The user selects (e.g., with contact 603) the option 632a to view and edit the communication limits of the user account of the supervised electronic device 500b during screen time.

As shown in FIG. 6N, in response to the user's selection in FIG. 6M, the electronic device 500a presents a plurality of options 646a-d for which contacts the user account of the supervised electronic device 500b is able to communicate with during screen time and an option 648 to toggle a setting for allowing the user account of the supervised electronic device 500b to communicate with unknown users in group communications that include one or more known users (e.g., "allow introductions in groups"). If the option 646a to allow the user to communicate with everyone is selected, the user account is able to communicate with any user regardless of whether or not that user is a contact of the user account of the supervised electronic device 500b during screen time. If the option 646b to allow the user to communicate with contacts is selected, the user account is able to communicate with user accounts that are known contacts of the user account associated with the supervised electronic device 500b but is not able to communicate with users that are not known contacts of the user account of the supervised electronic device 500b during screen time. If the option 646c to allow the user to communicate with specific contacts is selected, the user account is able to communicate with user accounts selected by the user account of the supervising electronic device 500a and not able to communicate with other users during screen time. If the option 646d to allow the user to communicate with group account members is selected, the user account is able to communicate with other users in the group user account to which the user account of the supervised electronic device 500b belongs and is unable to communicate with other users during screen time. The user selects (e.g., with contact 603) the option 646b to restrict communication during screen time to communication with contacts of the user account of the supervised electronic device 500b.

In response to the user's selection in FIG. 6N, the electronic device 500a updates the user interface to indicate selection of the option 646b to restrict communications of the user account of the supervised electronic device 500b to contacts of the user account of the supervised electronic device 500b, as shown in FIG. 6O. The user selects (e.g., with contact 603) an option to navigate backward in the user interface to the communication limits user interface illustrated in FIG. 6P.

As shown in FIG. 6P, after the user's selection in FIG. 6M, the screen time option 632a indicates the change in communication limits during screen time. The electronic device 500a also updates the communication limits during down time to be as restrictive as the communication limits during screen time, as indicated by the down time option 632b. Thus, in some embodiments, contact restrictions during downtime are at least as restrictive as contact restrictions during screen time. The user selects (e.g., with contact 603) the option 632b to view and edit the communication restrictions during down time.

FIG. 6Q illustrates the downtime communication limits user interface that is presented in response to the user's selection in FIG. 6P. The user interface includes a plurality of selectable options 646f-i that, when selected, cause the supervising electronic device 500a to change the communication restrictions enforced on the supervised electronic device 500b during down time. Because down time restrictions are more restrictive than screen time restrictions, the option 646e to allow communication with everyone, including contacts of the user account of the supervised electronic device 500b and unknown users, is greyed out and is not selectable. If the option 646f to allow the user to communicate with contacts is selected, the user account is able to communicate with user accounts that are known contacts of the user account associated with the supervised electronic device 500b but is not able to communicate with users that are not known contacts of the user account of the supervised electronic device 500b during down time. If the option 646g to allow the user to communicate with specific contacts is selected, the user account is able to communicate with user accounts selected by the user account of the supervising electronic device 500a and not able to communicate with other users during down time. If the option 646h to allow the user to communicate with group account members is selected, the user account is able to communicate with other users in the group user account to which the user account of the supervised electronic device 500b belongs and is unable to communicate with other users during down time. If the option 646i to allow the user to communicate with supervisors of the group account members is selected, the user account is able to communicate with supervisors of the group user account to which the user account of the supervised electronic device 500b belongs and is unable to communicate with other users during down time. In some embodiments, option 646e is not presented.

In FIG. 6Q, the user selects (e.g., with contact 603) the option 646g to specify one or more specific contacts with which the user account of the supervised electronic device 500b will be able to communicate during down time. As shown in FIG. 6R, in response to the user's selection in FIG. 6Q, the electronic device 500a presents an option 650 to add one or more contacts to the list of specific contacts with which the user account of the supervised electronic device 500b will be able to communicate during downtime (e.g., "downtime contacts"). The user selects (e.g., with contact 603) the option 650 to add one or more contacts to the list of downtime contacts.

As shown in FIG. 6S, in response to the user's selection in FIG. 6R, the supervising electronic device 500a presents a user interface from which the user is able to select one or more contacts to add to the list of downtime contacts. The user interface includes selectable representations 616a of contacts of the user account of the supervised electronic device 500b, selectable representations 616b of contacts of the user account of the supervising electronic device 500a, and a selectable option 652 that, when selected, causes the electronic device 500a to create a new contact of the user account of the supervised electronic device 500b and add that contact to the list of downtime contacts. The user selects (e.g., with contact 603) one of the representations 616a of a contact of the user account of the supervised electronic device 500b (e.g., Dad).

FIG. 6T illustrates the user interface after the user makes the selection illustrated in FIG. 6S and selects a plurality of additional contacts to add to the list of downtime contacts. The user selects (e.g., with contact 603) an option to finish adding contacts to the list of downtime contacts.

As shown in FIG. 6U, after the user makes the selections illustrated in FIGS. 6M-6T, the electronic device 500a indicates the restrictions in the restrictions user interface. The screen time option 632a indicates that the user account of the supervised electronic device 500b is able to communicate with contacts of the user account of the supervised electronic device 500b during screen time. The downtime option 632b indicates that the user account of the supervised electronic device 500b is able to communicate with the specific contacts "Alice, Dad, and Mom" during downtime.

Thus, as shown in FIGS. 6M-6U, the supervising electronic device 500a is able to set communication restrictions of the supervised electronic device 500b during screen time and downtime.

FIGS. 6U-6HH illustrate ways the supervising electronic device 500a adds and edits the contacts of the user account of the supervised electronic device 500b.

In FIG. 6U, the user selects (e.g., with contact 603) the option 614 to view and edit the contacts of the user account of the supervised electronic device 500b. In response to the user's selection in FIG. 6U, the electronic device 500a presents representations 620 of the contacts of the user account of the supervised electronic device 500b, as shown in FIG. 6V. The user interface also includes a selectable option 621 that, when selected, causes the electronic device 500a to present a user interface at which the user is able to add a new contact to the contacts of the user account of the supervised electronic device 500b.

In FIG. 6W, the user selects (e.g., with contact 603) the option 621 to add a new contact. In response to the user's selection in FIG. 6W, the electronic device 500a presents the options 654a-c illustrated in FIG. 6X. The options 654a-c include a selectable option 654a that, when selected, causes the electronic device 500a to display a user interface at which the user is able to select one or more contacts of the user account of the supervising electronic device 500a to be added to the contacts of the user account of the supervised electronic device 500b, an option 654b to create a new contact to be added to the contacts of the user account of the supervised electronic device 500b, and an option 654c to cancel.

In FIG. 6X, the user selects (e.g., with contact 603) the option 654a to add a contact of the user account of the supervising electronic device 500a to the contacts of the user account of the supervised electronic device 500b. As shown in FIG. 6Y, in response to the user's selection in FIG. 6X, the electronic device 500a presents a plurality of selectable representations 616 of contacts of the user account of the supervising electronic device 500a. The user is able to select one or more representations 616 to add the selected contacts to the contacts of the user account of the supervised electronic device 500a (e.g., in response to selecting "Done").

FIG. 6Z illustrates the user interface described above with reference to FIG. 6X. In FIG. 6Z, the user selects (e.g., with contact 603) the option 654b to create a new contact to be added to the contacts of the user account of the supervised electronic device 500b. As shown in FIG. 6AA, in response to the user's selection in FIG. 6Z, the electronic device 500a presents a new contact user interface 658 that includes a plurality of fields in which the user is able to enter information about the new contact, such as the field 660a in which the user is able to enter the first name of the contact. The user selects (e.g., with contact 603) the first name field 660a to enter the first name of the contact.

FIG. 6BB illustrates the new contact user interface 658 after the user enters the first name 660a, last name 660b, and phone number 660c of the contact. The user selects (e.g., with contact 603) an option to save the new contact (e.g., "Done").

As shown in FIG. 6CC, a representation 620 of the new contact ("Olivia Brown") is added to representations of the contacts of the user account of the supervised electronic device 500b in response to the selection in FIG. 6BB. In FIG. 6CC, the user selects (e.g., with contact 603) a representation 620 of another contact ("Mom").

In response to the user's selection in FIG. 6CC, the electronic device 500b presents a user interface 658 at which the user is able to edit the information associated with the contact, as shown in FIG. 6DD. The user interface 658 includes a first name field 660a, a last name field 660b, a first phone number field 660c, and a second phone number field 660d. The user selects (e.g., with contact 603) the second phone number field 660d to enter a second phone number associated with the contact.

As shown in FIG. 6EE, after entering the second phone number into the field 660d, the user selects an option to save the changes to the contact card (e.g., "Done"). In response to the user's selection, the supervising electronic device 500a transmits the updated contact card to the user account of the supervised electronic device 500b, enabling the supervised electronic device 500b to access the updated information.

FIG. 6FF illustrates the supervised electronic device 500b presenting a contacts user interface that includes representations 620 of the contacts of the user account of the supervised electronic device 500b. The representations 620 of the contacts include a representation of the contact that was added by the supervising electronic device 500a (e.g., "Olivia Brown"). The user selects (e.g., with contact 603) the representation 620 of the contact that was edited by the supervising electronic device 500a (e.g., "Mom").

In response to the user's selection in FIG. 6FF, the electronic device 500a presents a contact card user interface 662 of the selected contact, as shown in FIG. 6GG. The contact card user interface 662 includes indications 664a-b of the phone numbers of the contact, an indication 663 that the contact is a downtime contact (e.g., a contact with which the supervised user account is able to communicate during device downtime (and device screen time)), and an option 666 to edit the information associated with the contact. The user selects (e.g., with contact 603) the option 666 to edit the information associated with the contact.

As shown in FIG. 6HH, in response to the user's selection in FIG. 6GG, the electronic device 500b presents the contact editing user interface 658. The contact editing user interface includes the plurality of fields 660a-d for information associated with the contact and an indication 660e that the user account of the supervising electronic device 500a (and any other supervising user accounts in the group account to which the user account of the supervised electronic device 500b belongs) is able to view the contact card. The user is able to make changes to the information associated with the contact using user interface 658. Because the supervising user account is managing the contacts of the user account of the supervised electronic device 500b, the supervising user account is able to review and approve the edited contact card before the changes are saved.

Thus, as shown in FIGS. 6U-6HH, the supervising electronic device 500a is able to add and edit the contacts of the user account of the supervised electronic device 500b.

FIGS. 6II-6LL illustrate ways the supervised electronic device 500b enforces communication restrictions during device downtime.

FIG. 6II illustrates a messages user interface during screen time displayed by the supervised device 500b. The messages user interface includes representations 668a-d of a plurality of messaging conversations between the user account of the supervised electronic device 500b and other users. During screen time, the user account of the supervised electronic device 500b has access to all of the conversations, so each representation 668 includes a preview 670 of the last message sent to or from the user account of the supervised electronic device 500b. Each representation 668 is selectable to present the respective messaging conversation.

FIG. 6JJ illustrates the messages user interface during downtime (e.g., during a predefined range of hours during the day that have been defined as device down time, as previously described). The messages user interface includes representations 668a-d of the plurality of messaging conversations between the user account of the supervised electronic device 500b and other users. During downtime, the user account of the supervised electronic device only has access to conversations with downtime contacts, such as Mom and Dad. Therefore, the representation 668a of the conversation with Mom and Dad includes the preview 670a of the last message in the conversation and the representation 668*d* of the conversation with Mom includes the preview 670*d* of the last message in the conversation. The conversations with "Dave Appleseed" and "Olivia Brown" are not accessible to the supervised electronic device 500*b* because these contacts are not downtime contacts. Therefore, representations 668*b* and 668*c* do not include previews of the conversations with these contacts. Although FIG. 6JJ illustrates representations 668*b* and 668*c* with a greyed out appearance, in some embodiments, the representations 668*b* and 668*c* are not greyed out and simply do not include message previews.

As shown in FIG. 6JJ, the user selects (e.g., with contact 603) the representation 668*b* of a conversation with "Dave Appleseed," which is not one of the downtime contacts of the user account of the supervised electronic device 500*b*. As shown in FIG. 6KK, in response to the user's selection in FIG. 6JJ, the electronic device 500*b* presents a splash screen 670*a* instead of the messaging conversation represented by representation 668*b*. The splash screen 670*a* indicates that the supervised electronic device 500*b* will not display the messaging conversation because the contact is not a downtime contact. The splash screen 670*a* includes a selectable option 672*a* that, when selected, causes the electronic device 500*b* to present options for requesting more time to communicate with the contact from the user account of the supervising electronic device 500*a*.

FIG. 6LL illustrates the selectable options 656*a-c* that are presented in response to the user selection illustrated in FIG. 6KK. The electronic device 500*b* displays a selectable option 646*a* that, when selected, causes the electronic device 500*b* to send a message to the user account of the supervising electronic device 500*a* to request more time, a selectable option 656*b* to display a user interface at which a user is able to enter a passcode that is optionally unknown to the user of the supervised electronic device 500*b* to access the conversation (e.g., a passcode set by the supervising user account that provides access to the communication/usage restrictions set for the supervised user account—in some embodiments, this passcode is different than a password or passcode required to unlock or access the supervised user account/device 500*b*), and an option 646*c* to dismiss the options 656 without requesting more time. If the supervising user account approves more time to access the conversation, or if the required passcode is entered at device 500*b*, device 500*b* will optionally display the contents of the conversation.

Thus, as shown in FIGS. 6II-6LL, the supervised electronic device 500*b* is able to enforce communication restrictions during device downtime.

FIGS. 6MM-6OO illustrate ways the supervised electronic device 500*b* requests permission from the user account of the supervising electronic device 500*a* to call a number that is not the number of an approved contact of the user account of the supervised electronic device 500*b*.

FIG. 6MM illustrates a webpage 674 that includes a selectable option 676 to call a phone number. The phone number 676 is not associated with a contact of the user account of the supervised electronic device 500*b* and the user account of the supervised electronic device 500*b* is not able to contact phone numbers that are not associated with contacts of the user account of the supervised electronic device 500*b*. As shown in FIG. 6MM, the user selects (e.g., with contact 603) the option 676 to call the number.

As shown in FIG. 6NN, instead of calling the phone number, in response to the user's selection in FIG. 6MM, the electronic device 500*b* displays a splash screen 670*b* that indicates that the user account of the supervised electronic device 500*b* is not permitted to call the unknown number. The splash screen 670*b* includes a selectable option 672*b* to present options for requesting permission from the user account of the supervising electronic device 500*b* to call the unknown number. The user selects (e.g., with contact 603) the option 672*b* to display the options for requesting permission to make the phone call. In FIG. 600, in response to the user's selection in FIG. 6NN, the supervised electronic device 500*b* displays the selectable options 656 described above with reference to FIG. 6LL via which the supervised user is able to request permission to make the call or provide a passcode to make the call, as previously described.

Thus, as shown in FIGS. 6MM-6OO, the supervised electronic device 500*b* is able to request permission from the user account of the supervising electronic device 500*a* to call a number that is not the number of an approved contact of the user account of the supervised electronic device 500*b*.

FIGS. 6PP-6UU illustrate ways the supervised electronic device 500*b* requests permission from the user account of the supervising electronic device 500*a* to add a new contact.

FIG. 6PP illustrates the contacts user interface described above with reference to FIG. 6G. As shown in FIG. 6PP, the user selects (e.g., with contact 603) an option to add a new contact. In FIG. 6QQ, response to the user's selection in FIG. 6PP, the supervised electronic device 500*b* displays the new contact user interface described above with reference to FIGS. 6AA-6BB and 6FF. As shown in FIG. 6QQ, the user selects (e.g., with contact 603) the first name field 660*a* to enter the first name of the new contact. In FIG. 6RR, after entering information into the first name field 660*a*, and phone number field 660*c*, the user selects (e.g., with contact 603) an option to save the contact information.

In response to the user's selection in FIG. 6RR, the supervised electronic device 500*b* transmits an indication of the request to add the new contact to a user account of the supervising electronic device 500*a* without adding the new contact to the contacts of the user account of the supervised electronic device 500*b*. As shown in FIG. 6SS, in response to receiving the indication 680 of the new contact, the supervising electronic device 500*a* displays a notification 678*a* of the request to add the new contact and a plurality of selectable options 678*b-d*. The options include 678*b-d* a selectable option 678*b* that, when selected, causes the electronic device 500*a* to display the contact card of the new contact (e.g., so the user of the supervising electronic device 500*a* is able to decide whether or not to allow the new contact to be added); a selectable option 678*c* that, when selected, causes the electronic device 500*a* to transmit an indication of approval to add the new contact to the user account of the supervised electronic device 500*b*; and an option 678*d* that, when selected, causes the electronic device 500*a* not to approve the new contact. In response to detecting selection of option 678*d*, the supervising electronic device 500*a* either transmits an indication that the new contact is not allowed or merely forgoes transmitting an indication that the new contact is approved.

The electronic device 500*a* also displays a notification of the request of the user account of the supervised electronic device 500*b* to add the new contact in a restrictions management user interface. FIG. 6TT illustrates a restrictions management user interface 628 that includes one or more options for setting restrictions enforced on the supervising electronic device 500*a*. The user interface 628 includes an option 682 that, when selected, causes the electronic device 500*a* to present requests from the user account of the supervised electronic device 500*b*. As shown in FIG. 6TT, the user selects (e.g., with contact 603) the option 682 to view the requests.

As shown in FIG. 6UU, in response to the user's selection in FIG. 6TT, the supervising electronic device 500*a* displays an indication 684*a* of the request to add the new contact and a plurality of selectable options 684*b-d* that correspond to the selectable options 678*b-d* illustrated in FIG. 6SS and result in the above-described actions when selected.

Thus, as shown in FIGS. 6PP-6UU, the supervised electronic device 500*b* is able to request permission from the user account of the supervising electronic device 500*a* to add a new contact.

In some embodiments, the supervising electronic device 500*a* presents notifications at regular intervals to remind the user of the supervising electronic device 500*a* to review the restrictions enforced on the user account of the supervised electronic device 500*b*. In FIG. 6VV, the supervising electronic device 500*a* presents a notification 686*a* that it is the birthday of the user of the supervised electronic device 500*b* and an option 686*b* that, when selected, displays the user interface in FIG. 6J to view and edit the restrictions enforced on the user account of the supervised electronic device 500*b*. The supervising electronic device 500*a* also presents an option 686*c* that, when selected, causes the electronic device 500*a* to dismiss the notification 686*a* without viewing and managing the restrictions.

If the supervising electronic device 500*a* is managing the contacts of the user account of the supervised electronic device 500*b*, the supervising electronic device 500*a* has access to the contact information of the contacts of the user account of the supervised electronic device 500*b*, even for contacts that are not also contacts of the supervising electronic device 500*a*. As shown in FIG. 6WW, in response to receiving a phone call 688 from a contact of the supervised user account, the supervising electronic device 500*a* presents the name of the contact (e.g., "Jimmy") and an indication that the contact is a contact of the user account of the supervised electronic device 692 in an incoming phone call user interface 690, even though Jimmy is not a contact of the supervising user account.

FIGS. 7A-7I are flow diagrams illustrating a method 700 of configuring one or more communication restrictions that are enforced on a supervised electronic device in accordance with some embodiments of the disclosure. The method 700 is optionally performed at an electronic device such as device 100, device 300, device 500 as described above with reference to FIGS. 1A-1B, 2-3, 4A-4B and 5A-5H. Some operations in method 700 are, optionally combined and/or order of some operations is, optionally, changed.

In some embodiments, a first electronic device 500*a* in communication with a display device and one or more input devices (e.g., a mobile device (e.g., a tablet, a smartphone, a media player, or a wearable device) including a touch screen or a computer including one or more of a keyboard, mouse, trackpad, and display/touch screen) displays (702), via the display device, a user interface for managing usage at a second electronic device, wherein the first electronic device is associated with a first account (e.g., a parent account in a family of linked accounts, or more generally an organizer of a family of linked accounts), and the second electronic device is associated with a second account, such as in FIG. 6J (e.g., a child account in the family of linked accounts or some other managed account in a group of linked accounts). In some embodiments, the user interface includes one or more selectable options that, when selected, cause the first electronic device to transmit an indication of one or more settings or restrictions to be enforced on the second electronic device. The settings or restrictions optionally include usage limits on the amount of time the second electronic device is able to interact with one or more specified applications, times of day during which the second electronic device operates in a restricted mode, parental controls for applications and media, and the like. In some embodiments, the family account is an account that associates different users with each other in one family, and different users are provided different roles, such as parent and child roles. Parent roles optionally have the ability to control or restrict the device usage of child roles.

In some embodiments, such as in FIG. 6J while displaying the user interface for managing device usage by the second account, the electronic device 500*a* receives (704), via the one or more input devices, an input (e.g., selection of option 612 with contact 603) corresponding to a request to remotely manage contacts associated with the second account (e.g., the user interface includes a selectable option that, when selected, enables the first electronic device to manage one or more contacts stored on (or otherwise accessible on, such as from a cloud account) the second electronic device). Managing contacts stored on the second electronic device optionally includes adding or removing one or more contacts of the second electronic device from the first electronic device, enabling the second electronic device to communicate with one or more respective contacts during allowed screen time (e.g., a mode of operation in which one or more downtime restrictions are not enforced), enabling the second electronic device to communicate with one or more respective contacts during downtime (e.g., a mode of operation in which one or more downtime restrictions are enforced, such as prohibiting one or more restricted applications or functions), and requiring parental authentication on the second electronic device when adding contacts or contacting unknown users or unknown electronic devices.

In some embodiments, such as in FIG. 6K, in response to receiving the input corresponding to the request to manage contacts associated with the second account, the electronic device 500*a* initiates (706) a process to enable remote management of contacts associated with the second account, including causing transmittal, to the second electronic device 500*b*, of a notification 640*a* indicating that the first account has initiated the process to enable the remote management of contacts associated with the second account (e.g., the second electronic device presents an indication (e.g., text and/or an image) indicating that the first electronic device is able to manage contacts of the second electronic device). For example, the smartphone associated with a parent account detects selection of an option to manage the contacts on the smartphone associated with a child account that is in the same family as the parent account. In response to detecting selection of the option, the smartphone associated with the parent account optionally transmits an indication to the smartphone associated with the child account that the contacts of the child's smartphone will be remotely managed by the parent's smartphone. In some embodiments, in response to receiving the indication, the child's smartphone displays an indication that the parent's smartphone is able to manage the contacts of the child's smartphone. Once the parent's smartphone is able to manage the contacts of the child's smartphone, the parent's smartphone is optionally able to remotely add or remove one or more contacts from the child's smartphone and configure lists of contacts the child's smartphone is able to contact during downtime and during screen time. Once the parent's smartphone is able to manage the contacts of the child's smartphone, the child's smartphone optionally restricts communication with users according to one or more settings set by the parent's smartphone (e.g., blocking communication from unknown users or user accounts, blocking communication with certain contacts during device downtime, etc.) and optionally requires parental authentication (e.g., via a passcode, password, biometrics, or facial recognition at the child's smartphone or remotely via the parent's smartphone) before adding one or more contacts or contacting unknown users or user accounts at the child's smartphone.

The above-described manner of transmitting a notification to the second electronic device that indicates that the first electronic device has initiated the process to enable remote management of contacts at the second electronic device allows the second electronic device to indicate to the user that one or more functions may become unavailable when the first electronic device is managing the contacts at the second electronic device, which simplifies the interaction between the user and the second electronic device and enhances the operability of the second electronic device and makes the user-device interface more efficient (e.g., by informing the user that some functions will become unavailable so the user of the second electronic device so the user knows not to attempt to perform those functions), which additionally reduces power usage and improves battery life of the electronic device by enabling the user to use the electronic device more quickly and efficiency.

In some embodiments, such as in FIG. 6K the process to enable the remote management of contacts associated with the second account includes providing the second account with a predetermined amount of time (e.g., 12 hours, 24 hours, 48 hours, etc.) before the remote management of the contacts is enabled (708). In some embodiments, after the user of the first electronic device (e.g., parent, organizer, account manager) provides the input to manage the contacts of the second account (e.g., child account, managed account), contact management begins the predetermined amount of time after the input is received. The notification indicating that the user of the first electronic device has initiated the process to enable remote management of the second user's contacts optionally includes an indication of the amount of time before contact management will begin.

The above-described manner of providing the second account with a predetermined amount of time before remote management of the contacts is enabled allows the second electronic device to warn the second user before the first electronic device has access to the contacts of the second account, which simplifies the interaction between the user and the second electronic device and enhances the operability of the second electronic device and makes the user-device interface more efficient (e.g., by automatically notifying the second user instead of requiring the second user to enter one or more inputs to determine whether or not remote contact management will begin), which additionally reduces power usage and improves battery life of the electronic device by enabling the user to use the electronic device more quickly and efficiently.

In some embodiments, such as in FIG. 6L, the notification 640*d* indicating that the first account has initiated the process to enable the remote management of contacts associated with the second account includes a selectable option 640*g* that is selectable to terminate the process to enable the remote management of contacts associated with the second account (710). Optionally, the notification that the account organizer has initiated the process to manage the second user's contacts includes a selectable option with text such as "not now." In some embodiments, in accordance with a determination that the age of the second user (e.g., child) exceeds a predetermined age threshold (e.g., 13 years old), the indication includes the option to terminate the process to enable remote management of contacts and, in accordance with a determination that the age of the second user (e.g., child) is less than the predetermined age threshold, the indication does not include the option.

The above-described manner of presenting an option to terminate the process to enable remote management of the contacts of the second user account within the notification allows the second electronic device to reduce the number of inputs needed to terminate the remote contact management process, which simplifies the interaction between the user and the second electronic device and enhances the operability of the second electronic device and makes the user-device interface more efficient (e.g., by presenting the option while notifying the user that remote contact management has been initiated), which additionally reduces power usage and improves battery life of the electronic device by enabling the user to use the electronic device more quickly and efficiently.

In some embodiments, such as in FIG. 6L, the notification 640*d* indicating that the first account has initiated the process to enable the remote management of contacts associated with the second account includes a selectable option 640*e* that is selectable to accept the remote management of contacts associated with the second account (712). In some embodiments, remote contact management does not begin until the second electronic device (e.g., the child device, the managed electronic device) detects selection of the selectable option to accept remote management of the contacts.

The above-described manner of presenting an option to accept remote management of the contacts within the notification allows the second electronic device to reduce the number of inputs needed to accept management of the contacts, which simplifies the interaction between the user and the second electronic device and enhances the operability of the second electronic device and makes the user-device interface more efficient (e.g., by presenting the option while notifying the user that contact management has been initiated), which additionally reduces power usage and improves battery life of the electronic device by enabling the user to use the electronic device more quickly and efficiently.

In some embodiments, such as in FIG. 6L, the notification indicating that the first account has initiated the process to enable the remote management of contacts associated with the second account includes a selectable option 640*f* that is selectable to initiate a process to edit one or more contacts associated with the second account (714). In some embodiments, in response to detecting selection of the option that is selectable to initiate a process to edit one or more contacts associated with the second account, the second electronic device presents a user interface for viewing and editing the contacts associated with the second user account on the second electronic device. Optionally, contact management does not begin until one or more of the expiration of a predetermined amount of time (e.g., 12 hours, 24 hours, 48 hours) from the request at the first electronic device to remotely manage the contacts of the second user account and/or selection of a selectable option on the second electronic device that confirms the remote contact management. Thus, in some embodiments, the user of the second electronic device is able to edit the contacts associated with the second user account before the contacts of the second user account are visible to the user of the first electronic device at the first electronic device.

The above-described manner of presenting the option to edit one or more contacts within the notification allows the second electronic device to reduce the number of inputs required to navigate to the user interface for editing the one or more contacts before contact management begins which simplifies the interaction between the user and the second electronic device and enhances the operability of the second electronic device and makes the user-device interface more efficient (e.g., by providing the option to edit the contacts within the notification), which additionally reduces power usage and improves battery life of the electronic device by enabling the user to use the electronic device more quickly and efficiently.

In some embodiments, such as in FIG. 6D, during a respective process for enabling remote management of contacts associated with the second account (e.g., during a process performed at the first electronic device for configuring/creating the second user account, on the second electronic device, as part of the family account, where the first user account is a parent or organizer account associated with and at least partially in control of the second user account, which is a child or managed user account), the electronic device 500a receives (716), via the one or more input devices, an input (e.g., selection of option 614 with contact 603) corresponding to a request to make contact information for one or more first contacts associated with the first account available to the second account (e.g., adding one or more contacts associated with the first user account to a list of contacts associated with the second account). For example, while configuring a child device to be associated with a child account included in a family account, the parent of the child is able to save one or more of the parent's contacts as contacts associated with the child account, enabling the child to access those contacts on the child's device.

In some embodiments, such as in FIG. 6H, in response to receiving the input corresponding to the request to make contact information for the one or more first contacts associated with the first account available to the second account, the electronic device 500a makes (718) the contact information 626 for the one or more first contacts associated with the first account available to the second account. The second electronic device optionally presents the one or more first contacts in a contacts user interface of the second electronic device and optionally recognizes the user accounts associated with the one or more first contacts. For example, when one of the first contacts calls the second electronic device, the second electronic device indicates the name of the first contact that is calling the second electronic device.

The above-described manner of providing the second account with access to one or more contacts of the first account allows the second electronic device to access the contact information without requiring that the user enter the contact information manually, which simplifies the interaction between the user and the second electronic device and enhances the operability of the second electronic device and makes the user-device interface more efficient (e.g., by reducing the number of inputs needed to provide access to the contact information), which additionally reduces power usage and improves battery life of the electronic device by enabling the user to use the electronic device more quickly and efficiently.

In some embodiments, such as in FIG. 6H, the contact information 626 for the one or more first contacts includes first respective contact information 626 (e.g., the name of the contact, a physical address of the contact, and one or more user accounts for contacting the contact, such as phone numbers, e-mail addresses, and social media accounts) for the one or more first contacts and second respective contact information 622a and 624a (e.g., photos, nicknames, notes) for the one or more first contacts, and making the contact information for the one or more first contacts associated with the first account available to the second account includes making the first respective contact information 626 for the one or more first contacts available to the second account without making the second respective contact information 622a and 624a for the one or more first contacts available to the second account (720). Optionally, when the first user account shares the one or more first contacts with the second user account, the information includes the name(s) of the one or more first contacts and contact information (e.g., physical address, phone number, e-mail address, social media accounts) for the one or more first contact(s) but does not include other information, such as nicknames or notes associated with the first contacts or photos included in the contact cards of the one or more first contacts.

The above-described manner of forgoing sharing the second respective contact information when sharing the first respective contact information allows the first user account to transmit only the first information to the second account without deleting the second information or requesting that the second information not be shared, which simplifies the interaction between the user and the first electronic device and enhances the operability of the first electronic device and makes the user-device interface more efficient (e.g., by reducing the number of inputs needed to forgo sharing the second information when sharing the first information), which additionally reduces power usage and improves battery life of the electronic device by enabling the user to use the electronic device more quickly and efficiently.

In some embodiments, such as in FIG. 6HH, in accordance with a determination that the first account is managing the contacts associated with the second account, a user interface 658 displayed by the second electronic device 500b for editing the contacts associated with the second account includes a visual indication 660e indicating that the first account is managing the contacts associated with the second account (722) (e.g., the user interface for editing the contacts includes a message informing the second user that the first electronic device is able to view the contact card). For example, the user interface includes the message "the account organizer will be able to view changes to this contact card" or, when a parent or guardian is managing a child's electronic device "Parents/Guardians in your family will be able to view changes to this contact card."

In some embodiments, in accordance with a determination that the first account is not managing the contacts associated with the second account, the user interface displayed by the second electronic device for editing the contacts associated with the second account does not include the visual indication 660e, such as in FIG. 6HH, indicating that the first account is managing the contacts associated with the second account (724). Optionally, the first electronic device manages one or more other settings or permissions of the second electronic device or second account other than contacts. In some embodiments, if the first electronic device is not managing the contacts of the second electronic device or second account, the second electronic device presents the user interface without an indication that the first electronic device is able to view the contact card, because the first electronic device is not able to view the contact card.

The above-described manner of presenting the visual indication that the first account is managing the contacts of the second account allows the second electronic device to automatically inform the user of the contact management when the contact management user interface is displayed at the second electronic device, which simplifies the interaction between the user and the second electronic device and enhances the operability of the second electronic device and makes the user-device interface more efficient (e.g., by reducing the number of inputs needed to check whether the first account is managing the contacts of the second account), which additionally reduces power usage and improves battery life of the electronic device by enabling the user to use the electronic device more quickly and efficiently.

In some embodiments, such as in FIG. 6M, while displaying the user interface for managing device usage by the second account, the electronic device 500 receives (726), via the one or more input devices, an input (e.g., selection of option 632a with contact 603) corresponding to a request to remotely manage communication limits associated with the second account, wherein the communication limits include limitations on contacts with which the second user account is able to communicate (e.g., the first electronic device is able to select with which contacts the second user account is able to communicate). Optionally, the first user account is able to restrict communications on the second electronic device to contacts of the second user account, specific contacts of the second user account that the first user account is able to designate, or users within the user group that includes the first and second user accounts (e.g., a family account in which the first user account is a parent and the second user account is a child).

In some embodiments, such as in FIG. 6M, in response to receiving the input (e.g., selection of option 632a with contact 603) corresponding to the request to remotely manage communication limits associated with the second account, the electronic device 500 initiates (728) a process to remotely manage communication limits associated with the second account. In some embodiments, the second electronic device is only able to communicate with users that are allowed by the first user account. For example, if the first electronic device restricts communications on the second user account to contacts only, the second user account is able to communicate with users that are included in the contacts associated with the second user account, but is not able to communicate with users that are not included in the contacts associated with the second user account.

The above-described manner of remotely managing communication limits of the second electronic device allows the first electronic device to set the communication limits for the second electronic device, which reduces power usage and improves battery life of the second electronic device by reducing the number of inputs and functions performed locally on the second electronic device by accepting the inputs and performing the functions at the first electronic device instead.

In some embodiments, such as in FIG. 6M, the communication limits comprise limitations across a plurality of manners of communication (730). In some embodiments, the communication limits apply to voice calls, video calls, text messages, enhanced data-based messages, and walkie-talkie applications.

The above-described manner of enforcing the limits across the plurality of manners of communication allows the first electronic device to define one set of communication limits that applies to all of the manners of communication included in the plurality of manners of communication, which simplifies the interaction between the user and the first electronic device and enhances the operability of the first electronic device and makes the user-device interface more efficient (e.g., by enforcing the limits for all forms of communication instead of requiring the user of the first electronic device to enter communication limits for each communication manner separately), which additionally reduces power usage and improves battery life of the electronic device by enabling the user to use the electronic device more quickly and efficiently.

In some embodiments, such as in FIG. 6JJ, when a communication user interface associated with a first manner of communication is displayed by the second electronic device 500b, the communication user interface including a first representation 668a of a communication with a respective contact using the first manner of communication (732) (e.g., a messages user interface includes a first representation of a messaging conversation with a respective contact), in accordance with a determination that the communication limits do not restrict communicating with the respective contact using the first manner of communication, the first representation 668a of the communication with the respective contact includes a preview 670a of content of the communication with the respective contact (734) (e.g., the respective contact falls into the category of contacts with which communication is permitted). For example, if the first electronic device allows the second user account to communicate with contacts of the second user account and the respective contact is a contact of the second user account, the representation of the communication includes text of the most recent message to or from the second user account in the conversation with the respective contact.

In some embodiments, such as in FIG. 6JJ, when a communication user interface associated with a first manner of communication is displayed by the second electronic device 500b, the communication user interface including a first representation 668b of a communication with a respective contact using the first manner of communication (732) (e.g., a messages user interface includes a first representation of a messaging conversation with a respective contact), in accordance with a determination that the communication limits do restrict communicating with the respective contact using the first manner of communication, the first representation 668b of the communication with the respective contact does not include the preview of the content of the communication with the respective contact (736) (e.g., the respective contact is outside of the category of contacts with which communication is permitted). The first representation of the messaging conversation optionally includes an indication of the respective contact of the messaging conversation and a preview of the messaging conversation, such as some or all of the text of the last message sent to or from the second electronic device in the messaging conversation. In some embodiments, the messaging user interface includes a plurality of representations of messaging conversations with various contacts. Optionally, each representation of a respective messaging conversation is selectable to view the messaging conversation. For example, if the first electronic device allows the second user account to communicate with contacts of the second user account and the respective contact is not a contact of the second user account, the representation of the communication does not include text of the most recent message to or from the second user account in the conversation with the respective contact. As another example, the first electronic device allows the second user account to communicate with a subset of contacts during device downtime (e.g., a period of time during which additional restrictions on device usage, including communications, are enforced) and allows the second user account to communicate with all contacts associated with the second user account during screen time (e.g., during times that are not during downtime). In this example, the respective contact is included in the list of contacts associated with the second user account but is not included in the subset of contacts with which the second user account is permitted to communicate during downtime. Thus, for example, during downtime, the second user account does not present the preview of the conversation with the respective contact but during screen time, the second user account does present the preview of the conversation with the respective contact.

The above-described manner of presenting a communication preview for communications with allowed contacts and forgoing presenting the communication preview for communications with users with whom communication is restricted allows the second electronic device to indicate to the user that the second user account does not have access to the communication with the user with whom communication is restricted before the user requests to view the communication, which simplifies the interaction between the user and the second electronic device and enhances the operability of the second electronic device and makes the user-device interface more efficient (e.g., by reducing the number of inputs needed to determine whether or not the second electronic device is able to access the communication), which additionally reduces power usage and improves battery life of the electronic device by enabling the user to use the electronic device more quickly and efficiently.

In some embodiments, in accordance with a determination that the communication limits do not restrict communicating with the respective contact using the first manner of communication, input directed to the first representation 668a, such in FIG. 6JJ, of the communication with the respective contact causes display of the content of the communication with the respective contact (738). For example, in response to detecting selection of a representation of a messaging conversation with a contact with which communication is not restricted by the first electronic device, the second electronic device presents the messages in the conversation between the second user account and the respective contact.

In some embodiments, in accordance with a determination that the communication limits do restrict communicating with the respective contact using the first manner of communication, input directed to the first representation 668b of the communication with the respective contact, such as in FIG. 6JJ, causes display of a user interface 670a from which access to the content of the conversation can be authorized (e.g., by asking parent or organizer remotely or entering passcode locally), such as in FIG. 6KK, without displaying the content of the communication with the respective contact (740). In some embodiments, the user interface from which access to the content of the conversation can be authorized includes an indication that communication with the respective contact is restricted and a selectable option that, when selected, causes the second electronic device to initiate a process to request permission from the first user to communicate with the respective contact. For example, in response to selecting the selectable option, the second electronic device presents an option to transmit a request to the first electronic device to remotely authorize communication with the respective contact and an option to present a user interface from which a restrictions passcode can be entered. In some embodiments, the restrictions passcode is different from a passcode with which the second electronic device is unlocked, thus enabling the restrictions passcode to be known to the first user but not known to the second user. In some embodiments, the restrictions passcode is set by the first user account during the process for setting up remote management of contacts of the second user account.

The above-described manner of presenting the user interface from which access to the conversation can be authorized in response to a request to view a communication that is restricted allows the second electronic device to reduce the number of inputs needed to request access to the communication, which simplifies the interaction between the user and the second electronic device and enhances the operability of the second electronic device and makes the user-device interface more efficient (e.g., by presenting the option to request access to the conversation while informing the user that the second electronic device is unable to access the conversation), which additionally reduces power usage and improves battery life of the electronic device by enabling the user to use the electronic device more quickly and efficiently, such as by reducing the number of inputs entered by the user in an attempt to perform one or more blocked functions.

In some embodiments, such as in FIG. 6S, the user interface for managing device usage by the second account includes one or more selectable options 616a, 616b, and 652 that are selectable to designate one or more contacts as not restricted by the communication limits (742). In some embodiments, the user interface includes options to allow communications with all users (e.g., no restrictions on with which contacts the second user account is able to communicate), with contacts associated with the second user account, with specific contacts selected by the first electronic device, with members of the group of accounts to which the second user account belongs (e.g., family members in a family account in which the second user is a child), or with organizers of the group of accounts to which the second user account belongs (e.g., parents/guardians of a family account, organizers or managers of another account group). Optionally, the first electronic device is able to define different groups of one or more contacts with which the second user account is allowed to communicate during downtime (e.g., a period of time during which additional restrictions and/or limitations on usage of the second electronic device are enforced) and during screen time (e.g., a period of time during which the downtime restrictions are not enforced).

The above-described manner of including the one or more selectable options that designate one or more contacts as not restricted allows the first electronic device to automatically allow the second user account to communicate with the designated contacts, which simplifies the interaction between the user and the first electronic device and enhances the operability of the first electronic device and makes the user-device interface more efficient (e.g., by reducing the number of times the user of the first electronic device must enter an input to allow the second electronic device to communicate with the designated users), which additionally reduces power usage and improves battery life of the electronic device by enabling the user to use the electronic device more quickly and efficiently.

In some embodiments, such as in FIG. 6P, the communication limits include (744) a first set 632a of one or more communication limits that are based on one or more time periods during which usage of the second electronic device is restricted independent of an amount of usage of the second electronic device (746) (e.g., during periods of time during which additional restrictions on usage and communications at the second electronic device are enforced). In some embodiments, the first user account defines one or more periods of "downtime" during which the second electronic device is prevented from performing one or more operations, such as presenting one or more applications or communicating with one or more contacts. Optionally, the first electronic device is able to restrict the second electronic device from communicating with contacts not included in a specified group of contacts. In some embodiments, the first electronic device includes settings to allow the second user account to communicate with all users regardless of whether or not the users are contacts of the second account, contacts of the second account only, one or more contacts selected by the first user, members of a user account group to which the second account belongs (e.g., a family or other group account with multiple users), or organizers/managers of the group account only (e.g., parents of a family or managers/organizers of another type of group account) during downtime. For example, the first electronic device is able to set device downtime on the second electronic device to be a predetermined period of time, such as 9 pm to 6 am and to restrict communications at the second electronic device to communications with contacts of the second account during device downtime.

In some embodiments, such as in FIG. 6P, the communication limits include (744) a second set 632b of one or more communication limits that are enforced outside of the one or more time periods during which usage of the second electronic device is restricted (748). In some embodiments, the first electronic device is able to restrict with which contacts the second user account is able to communicate during periods of time outside of device downtime (e.g., during "screen time"). Optionally, the first electronic device includes settings to allow the second user account to communicate with all users regardless of whether or not the users are contacts of the second account, contacts of the second account only, one or more contacts selected by the first user, members of a user account group to which the second account belongs (e.g., a family or other group account with multiple users), or organizers/managers of the group account only (e.g., parents of a family or managers/organizers of another type of group account) during screen time. In some embodiments, the first electronic device is able to define one or more usage limits of the second electronic device that include limits on the amount of time the second electronic device is permitted to perform one or more respective functions. For example, the first electronic device is able to restrict the usage of a messaging application to a predetermined amount of time per day, such as 30 minutes per day. In some embodiments, if one or more usage limits of a communication application are reached on the second electronic device, the second electronic device is unable to communicate with any users using the restricted application, regardless of the communication limits set by the first electronic device. For example, the first electronic device allows the second electronic device to communicate with contacts associated with the second account during screen time and sets a usage limit for a video calling application for 30 minutes. In this example, once the second electronic device has used the video calling application for an amount of time that exceeds 30 minutes, the second electronic device is unable to contact anyone, including contacts associated with the second account, using the video calling application because the usage limit of the video calling application has been reached.

The above-described manner of including the first and second sets of communication limits allows the first electronic device to automatically enforce different restrictions depending on whether or not the second user account attempts to communicate with a contact during the one or more time periods during which usage is restricted, which simplifies the interaction between the user and the first electronic device and enhances the operability of the first electronic device and makes the user-device interface more efficient (e.g., by automatically applying the appropriate communication limits instead of requiring the first user to manually update the communication limits regularly), which additionally reduces power usage and improves battery life of the electronic device by enabling the user to use the electronic device more quickly and efficiently.

In some embodiments, such as in FIG. 6U, the first set 632a of one or more communication limits restrict communication to a first set of one or more contacts during the one or more time periods during which usage of the second electronic device is restricted, and the second set 632b of one or more communication limits restrict communication to a second set of one or more contacts, different than the first set of one or more contacts, during one or more other time periods outside of the one or more time periods during which the usage of the second electronic device is restricted (750). In some embodiments, the first electronic device is able to set different restrictions on which contacts the second user account is able to contact during device downtime and during screen time. For example, the first electronic device is able to select settings that allow the second user account to contact all users (e.g., regardless of whether or not the users are contacts of the second account) during screen time and to contact a subset of contacts of the second account selected by the first electronic device during downtime.

The above-described manner of providing different first and second sets of communication limits allows the first electronic device to automatically enforce different restrictions depending on whether or not the second user account attempts to communicate with a contact during the one or more time periods during which usage is restricted, which simplifies the interaction between the user and the first electronic device and enhances the operability of the first electronic device and makes the user-device interface more efficient (e.g., by automatically applying the appropriate communication limits instead of requiring the first user to manually update the communication limits regularly), which additionally reduces power usage and improves battery life of the electronic device by enabling the user to use the electronic device more quickly and efficiently.

In some embodiments, such as in FIG. 6U, the first set of one or more contacts is a subset of the second set of one or more contacts (752). Optionally, the communication limits on the second user account are more restrictive during device downtime than during screen time. For example, if the first electronic device restricts communications of the second user account during screen time to only contacts associated with the second account, the first electronic device has options to restrict communications on the second electronic device to contacts associated with the second account, one or more predetermined contacts selected by the first electronic device, contacts that are included in a group account including the second account, or organizers/managers of the group account including the second account, but does not have the ability to allow the second electronic device to contact all users including users that are not contacts of the second account during downtime because downtime communication restrictions are more restrictive than screen time communication restrictions.

The above-described manner of restricting the allowed contacts during device downtime allows the first electronic device to reduce user error of accidentally restricting fewer contacts during downtime, which simplifies the interaction between the user and the first electronic device and enhances the operability of the first electronic device and makes the user-device interface more efficient (e.g., by reducing the number of times the first user must revise the communication restrictions by reducing the chance for user error), which additionally reduces power usage and improves battery life of the electronic device by enabling the user to use the electronic device more quickly and efficiently.

In some embodiments, such as in FIG. 6U, the first set 632a of one or more communication limits restrict communication to a first set of one or more contacts during the one or more time periods during which usage of the second electronic device is restricted (754). Optionally, during the one or more time periods during which usage of the second electronic device is restricted (e.g., device downtime), the second user account is able to communicate with the first set of one or more contacts and not able to communicate with other contacts associated with the second account. In some embodiments, outside of downtime (e.g., during screen time), the second electronic device is permitted to communicate with one or more contacts in addition to the first set of one or more contacts.

In some embodiments, such as in FIG. 6GG, a user interface 662 (e.g., a contact card of a respective contact) displayed by the second electronic device 500b for displaying information about contacts associated with the second account includes contact information 664a and 664b for a respective contact (756) (e.g., the contact card includes the name of the contact and one or more items of contact information for the contact, such as phone number(s), email address(es), physical address(es), social media account(s), etc. at which the contact is contacted).

In some embodiments, such as in FIG. 6GG, in accordance with a determination that the respective contact is included in the first set of one or more contacts (e.g., the second electronic device is able to communicate with the respective contact during device downtime), the user interface 662 for displaying information about contacts associated with the second account includes a visual indication 663 indicating that the respective contact is able to be communicated with during the one or more time periods (758) (e.g., the contact card includes text or an image that indicates that the second electronic device is able to communicate with the respective contact during downtime. For example, the contact card includes the text "downtime contact").

In some embodiments, such as in FIG. 6H, in accordance with a determination that the respective contact is not included in the first set of one or more contacts, the user interface for displaying information 626 about contacts associated with the second account does not include the visual indication indicating that the respective contact is able to be communicated with during the one or more time periods (760). In some embodiments, if the respective contact is not a downtime contact, the contact card of the respective contact does not include the visual indication that the respective contact is a downtime contact because the respective contact is not a downtime contact.

The above-described manner of presenting the indication that the contact is included in the first set of one or more contacts allows the second electronic device to indicate to the user whether or not the second electronic device is able to communicate with a respective contact during downtime before the user requests to initiate the communication, which simplifies the interaction between the user and the second electronic device and enhances the operability of the second electronic device and makes the user-device interface more efficient (e.g., by reducing the number of inputs needed to determine whether or not the second electronic device is able to communicate with the respective contact), which additionally reduces power usage and improves battery life of the electronic device by enabling the user to use the electronic device more quickly and efficiently.

In some embodiments, such as in FIG. 6VV, after remote management of contacts associated with the second account has been enabled, the electronic device 500a determines (762) that a predetermined amount of time (e.g., one year, at the child's birthday, etc.) has elapsed since the remote management of contacts associated with the second account was enabled.

In some embodiments, such as in FIG. 6VV, in response to determining that the predetermined amount of time (e.g., one year, at the child's birthday, etc.) has elapsed since the remote management of contacts associated with the second account was enabled, the electronic device 500a displays (764), via the display device 504, a notification 686a indicating that the remote management of contacts associated with the second account is currently enabled, wherein input directed to the notification initiates a process to disable the remote management of contacts associated with the second account. In some embodiments, the first electronic device presents the notification with text that indicates the predetermined amount of time and a selectable option, that, when selected, causes the electronic device to present a restrictions user interface from which the first electronic device is able to add or remove one or more restrictions enforced on the second user account, including one or more communication restrictions.

The above-described manner of presenting the notification when the predetermined amount of time has elapsed since remote management of the contacts of the second account began allows the first electronic device to reduce the number of inputs needed to navigate to the user interface for managing the communication restrictions, which simplifies the interaction between the user and the first electronic device and enhances the operability of the first electronic device and makes the user-device interface more efficient (e.g., by more efficiently navigating to the user interface for editing the communication restrictions), which additionally reduces power usage and improves battery life of the electronic device by enabling the user to use the electronic device more quickly and efficiently.

In some embodiments, such as in FIG. 6U, the remote management of the contacts associated with the second account includes remotely managing emergency contacts 634 for the second account (766). In some embodiments, the second user account is able to contact the emergency contacts regardless of other restrictions enforced on the second electronic device (e.g., even though the device is in downtime mode, or even if the usage limit for a communication application for communicating with the emergency contacts has been reached). Optionally, the contact information of the emergency contacts, including one or more selectable options to communicate with each respective emergency contact, is accessible on the second electronic device even when access to the second electronic device is not authenticated (e.g., via passcode, password, biometrics, or an image of a user's face).

The above-described manner of remotely managing the emergency contacts of the second account allows the second electronic device to receive the emergency contacts from the first electronic device, which simplifies the interaction between the user and the second electronic device and enhances the operability of the second electronic device and makes the user-device interface more efficient (e.g., by reducing the number of operations performed at the second electronic device for managing the emergency contacts), which additionally reduces power usage and improves battery life of the electronic device by enabling the user to use the electronic device more quickly and efficiently.

In some embodiments, such as in FIG. 6U, the user interface for managing device usage by the second account includes a selectable option 638 that is selectable to restrict the second account from editing contacts associated with the second account (768). In some embodiments, if the second account is not allowed to edit contacts associated with the second account, the contacts associated with the second account are edited by the first electronic device or the first account.

The above-described manner of restricting the second account from editing the contacts allows the first electronic device to maintain control over the contacts of the second account, which simplifies the interaction between the user and the first electronic device and enhances the operability of the first electronic device and makes the user-device interface more efficient (e.g., by reducing the amount of time needed to review and revise contact revisions and additions made by the second electronic device), which additionally reduces power usage and improves battery life of the electronic device by enabling the user to use the electronic device more quickly and efficiently.

In some embodiments, such as in FIG. 6S, the remote management of the contacts associated with the second account includes designating one or more contacts 616 that the second account is able to communicate with during times when one or more criteria are satisfied (770) (e.g., and the second account is not able to communicate with other contacts during these times). In some embodiments, the one or more criteria are related to whether or not downtime restrictions are being enforced, including criteria that are satisfied during predetermined times of day and criteria that are satisfied when one or more usage limits (e.g., limitations on an amount of time of usage during a day) have been reached on the second electronic device. Optionally, the first electronic device is able to designate a first group of contacts with which the second electronic device is able to communicate during downtime and a second group of contacts with which the second electronic device is able to communicate during screen time (e.g., times outside of downtime).

In some embodiments, such as in FIG. 6S, the one or more designated contacts are selectable from one or more contacts 616a associated with the first account (772) (e.g., one or more contacts accessible to the first account and/or on the first electronic device that are not necessarily accessible to the second account and/or on the second electronic device). In some embodiments, the one or more contacts associated with the first account are visible in a contacts list on the first electronic device.

In some embodiments, such as in FIG. 6S, the one or more designated contacts are selectable from one or more contacts 616b associated with the second account (774) (e.g., one or more contacts accessible to the second account and/or on the second electronic device that are not necessarily accessible to the first account and/or on the first electronic device). In some embodiments, the one or more contacts associated with the second account are visible in a contacts list on the second electronic device, but not visible in a contacts list on the first electronic device. Optionally, the first electronic device is able to view the list of contacts associated with the second user account during remote management setup, such as in the restrictions user interface that includes one or more options for restricting with which contacts the second electronic device is able to communicate.

In some embodiments, such as in FIG. 6S, the one or more designated contacts are selectable from one or more new contacts 652 added by a user associated with the first account (776). In some embodiments, while designating one or more contacts that the second account is able to communicate with during times when one or more criteria are satisfied, the first electronic device is able to create a new contact that is not yet included in the contacts associated with the first account or contacts associated with the second account and enable the second account to communicate with the new contact.

The above-described manner of presenting options to allow the second electronic device to communicate with contacts of the first account, contacts of the second account, or new contacts allows the first electronic device to select existing contacts of the first or second accounts to allow the second electronic device to communicate with the selected existing contacts which simplifies the interaction between the user and the first electronic device and enhances the operability of the first electronic device and makes the user-device interface more efficient (e.g., by allowing the first user to select existing contacts instead of manually entering the contact information for each allowed contact), which additionally reduces power usage and improves battery life of the electronic device by enabling the user to use the electronic device more quickly and efficiently.

In some embodiments, such as in FIG. 6R, the remote management of the contacts associated with the second account includes designating one or more contacts 646g that the second account is able to communicate with during times when one or more criteria are satisfied (778) (e.g., and the second account is not able to communicate with other contacts during these times).

In some embodiments, the electronic device 500 receives (780) an indication that, during a time when the one or more criteria are satisfied, the second account is requesting permission to communicate with a respective contact (e.g., a contact not known to the first account and/or the second account, or a phone number not known to either the first account or the second account) other than the designated one or more contacts, such as in FIG. 6JJ (e.g., the second user account requests to communicate with a respective contact with which communication is restricted). Optionally, the indication that the second electronic device is requesting permission to communicate with the respective contact is transmitted to the first electronic device in response to the second electronic device detecting selection of an option to request permission from the first electronic device to communicate with the respective contact.

In some embodiments, in response to receiving the indication that the second account is requesting permission to communicate with the respective contact, the electronic device 500 receives (782), via the display device, a notification that the second account is requesting permission to communicate with the respective contact, such as in FIG. 6JJ (e.g., the first electronic device presents a notification indicating the contact with which the second electronic device is requesting to communicate). In some embodiments, the notification includes a selectable option that, when selected, causes the first electronic device to allow the second electronic device to communicate with the respective contact and a selectable option that, when selected, causes the first electronic device to not allow the second electronic device to communicate with the respective contact. Optionally, the indication that the second electronic device is requesting permission to communicate with the respective contact is transmitted to the first electronic device in response to the second electronic device detecting selection of an option to request permission from the first electronic device to communicate with the respective contact.

In some embodiments, the electronic device 500 receives (784), via the one or more input devices, input directed to the notification that the second account is requesting permission to communicate with the respective contact, such as in FIG. 6JJ (e.g., detecting selection of one of the selectable options included in the notification).

In some embodiments, in response to receiving the input directed to the notification that the second account is requesting permission to communicate with the respective contact (786), in accordance with a determination that the input directed to the notification that the second account is requesting permission to communicate with the respective contact is an input approving the communication with the respective contact, the electronic device 500 allows (788) the second account to communicate with the respective contact, such as in FIG. 6JJ (e.g., the first electronic device detects selection of the option to allow the second electronic device to communicate with the respective contact). In some embodiments, the second electronic device is permitted to communicate with the respective contact for a predetermined amount of time only (e.g., 15 minutes, 1 hour, during screen time only). In some embodiments, the second electronic device is permitted to communicate with the respective contact using a respective mode of communication (e.g., phone, messaging, video calling, walkie talkie application, etc.) only. In some embodiments, allowing the second account to communicate with the respective contact does not add the contact as a contact of the first user account and/or the second user account (and does not change the communication restrictions on the second user account). In some embodiments, allowing the second account to communicate with the respective contact does add the contact as a contact of the first user account and/or the second user account.

In some embodiments, in response to receiving the input directed to the notification that the second account is requesting permission to communicate with the respective contact (786), in accordance with a determination that the input directed to the notification that the second account is requesting permission to communicate with the respective contact is an input disapproving the communication with the respective contact, the electronic device 500 prevents (790) the second account from communicating with the respective contact, such as in FIG. 6KK (e.g., the first electronic device detects selection of the option to not allow the second electronic device to communicate with the respective contact).

The above-described manner of presenting the notification that the second electronic device wishes to communicate with a respective contact with an option to allow the communication to occur without updating the communication restrictions of the second user account allows the first electronic device to temporarily approve the communication, which simplifies the interaction between the user and the first electronic device and enhances the operability of the first electronic device and makes the user-device interface more efficient (e.g., by allowing the first user to allow the communication without entering inputs to update the communication restrictions to allow the communication and then restrict the contact after the communication is finished), which additionally reduces power usage and improves battery life of the electronic device by enabling the user to use the electronic device more quickly and efficiently.

In some embodiments, such as in FIG. 6DD, the remote management of the contacts associated with the second account includes editing of the contacts associated with the second account (792). In some embodiments, one or more contacts associated with the second account are not contacts associated with the first account.

The above-described manner of editing the contacts of the second account from the first electronic device allows the second electronic device to receive updated contact information from the first user, which simplifies the interaction between the user and the second electronic device and enhances the operability of the second electronic device and makes the user-device interface more efficient (e.g., by reducing the number of inputs and operations at the second electronic device needed to enable the second electronic device to access the updated information), which additionally reduces power usage and improves battery life of the electronic device by enabling the user to use the electronic device more quickly and efficiently.

In some embodiments, such as in FIG. 6WW, the first electronic device 500 performs (794), an operation that utilizes contact information (e.g., viewing contact cards and their details, receiving a communication (e.g., phone call, video call, text message, enhanced data-based message, etc.) from a phone number and associating the phone number with a contact card (e.g., name, physical address, email address, etc.)).

In some embodiments, such as in FIG. 6WW, in accordance with a determination that the first account is remotely managing the contacts associated with the second account, the operation is able to utilize contact information 692 for contacts associated with the first account and contacts associated with the second account (796) (e.g., the first electronic device associates the communication with the contact that sent the communication). For example, the first electronic device receives a phone call from a respective contact included in the contacts associated with the second account but not included in the contacts associated with the first account and, in response to receiving the phone call, the first electronic device presents an indication of the name of contact.

In some embodiments, in accordance with a determination that the first account is not remotely managing the contacts associated with the second account, the operation is able to utilize contact information for contacts associated with the first account but not contacts associated with the second account (798), such as forgoing displaying indication 692 illustrated in FIG. 6WW. For example, the first electronic device receives a phone call from a respective contact included in the contacts associated with the second account but not included in the contacts associated with the first account and, in response to receiving the phone call, the first electronic device does not present an indication of the name of the contact. In some embodiments, when the first electronic device does not have access to the contact information of the respective contact, such as when the respective contact is a contact of the second account but not the first account and the first electronic device does not manage the contacts of the second account, the first electronic device presents the phone number from which the phone call is received because the first electronic device does not have access to the contact information of the respective contact.

The above-described manner of utilizing contact information of contacts of the second user at the first electronic device allows the first electronic device to access the contact information without the first user manually adding the contact information to the contacts of the first user, which simplifies the interaction between the user and the first electronic device and enhances the operability of the first electronic device and makes the user-device interface more efficient (e.g., by reducing the number of inputs needed to utilize the contact information of the contacts of the second account), which additionally reduces power usage and improves battery life of the electronic device by enabling the user to use the electronic device more quickly and efficiently.

In some embodiments, such as in FIG. 6SS, the remote management of the contacts associated with the second account includes, in response to a user associated with the second account attempting to add a new contact to the second account, displaying, via the display device, a notification 678a indicating that the user is attempting to add the new contact to the second account (798-2) (e.g., the notification indicates the name of the contact the user is attempting to add to the second account). In some embodiments, if the first electronic device is not managing the contacts of the second account, the first electronic device does not present the notification in response to the user attempting to add the new contact to the second account. Optionally, if the first electronic device is not managing the contacts of the second account, the second user is able to add the new contact to the second user account without permission from the first electronic device/first user.

In some embodiments, the electronic device 500 receives (798-4), via the one or more input devices, input directed to the notification 678a, such as in FIG. 6SS (e.g., input selecting one of a plurality of selectable options included in the notification). In some embodiments, the notification includes an option to allow the second account to add the new contact, an option to prevent the second account from adding the new contact, and an option to view the contact card of the new contact before selection of one of the other options.

In some embodiments, in response to receiving the input directed to the notification (798-6), in accordance with a determination that the input directed to the notification includes an input approving the addition of the new contact to the second account, such as selection of option 678c illustrated in FIG. 6SS, the electronic device 500 allows (798-8) the new contact to be added to the second account. Optionally, in response to selection of the option to allow the second account to add the new contact, the first electronic device transmits an indication to the second electronic device that the new contact is allowed to be added. In response to detecting the indication that the new contact is allowed to be added, the second electronic device optionally saves the new contact to the second account. In some embodiments, the new contact is not saved until the new contact is approved by the first user (e.g., at the first electronic device). Optionally, if the first electronic device is not managing the contacts of the second account, the new contact is added in response to the request to add the new contact without permission of the first user.

In some embodiments, in response to receiving the input directed to the notification (798-6), in accordance with a determination that the input directed to the notification includes an input disapproving the addition of the new contact to the second account, such as selection of option 678d illustrated in FIG. 6SS, preventing the new contact from being added to the second account (798-10). Optionally, in response to selection of the option to prevent the second account to add the new contact, the first electronic device transmits an indication to the second electronic device that the new contact is not allowed to be added. In response to detecting the indication that the new contact is not allowed to be added, the second electronic device optionally forgoes saving the new contact to the second account.

The above-described manner of including options to view, approve, or disapprove a new contact in the notification that the second user account is attempting to add a new contact allows the first electronic device to reduce the number of inputs needed to review, approve, or disapprove of the new contact, which simplifies the interaction between the user and the first electronic device and enhances the operability of the first electronic device and makes the user-device interface more efficient (e.g., by allowing the first user to perform the review, approve, or disapprove functions without entering additional inputs), which additionally reduces power usage and improves battery life of the electronic device by enabling the user to use the electronic device more quickly and efficiently.

In some embodiments, such as in FIG. 6UU, the notification 684a indicating that the user is attempting to add the new contact to the second account is displayed in the user interface for managing usage at the second electronic device (798-12). In some embodiments, the user interface for managing usage at the second electronic device includes a region including one or more requests received from the second account. For example, a restrictions settings user interface includes a selectable option that, when selected, causes the first electronic device to present the one or more requests received from the second account, including the notification indicating that the user is attempting to add the new contact to the second account.

The above-described manner of presenting the notification in the user interface for managing usage at the second electronic device allows the first electronic device to enable the first user to view, approve, or disapprove of the contact at a time after the notification is received, which simplifies the interaction between the user and the second electronic device and enhances the operability of the second electronic device and makes the user-device interface more efficient (e.g., by allowing the first user to review the contact at a later time without the second user having to re-send the request), which additionally reduces power usage and improves battery life of the electronic device by enabling the user to use the electronic device more quickly and efficiently.

In some embodiments, such as in FIG. 6SS, the notification 678a indicating that the user is attempting to add the new contact to the second account is displayed in a user interface that is configured to also display notifications other than those associated with managing usage at the second electronic device (978-14). In some embodiments, the first electronic device presents the notification in a manner similar to the manners in which the first electronic device presents other notifications, such as notifications indicating incoming messages. Optionally, presenting the notification includes presenting a visual indication overlaid on another user interface presented by the first electronic device. In some embodiments, the first electronic device presents the notification in a notification user interface that includes a plurality of indications of other notifications (e.g., other types of notifications, such as incoming message notifications) that have been received at the first electronic device.

The above-described manner of presenting the notification in a notification user interface and/or in a manner that other types of notifications are presented allows the first electronic device to provide access to the notification at a time after the notification was first presented, which simplifies the interaction between the user and the second electronic device and enhances the operability of the second electronic device and makes the user-device interface more efficient (e.g., by allowing the first user to review the contact at a later time without the second user having to re-send the request), which additionally reduces power usage and improves battery life of the electronic device by enabling the user to use the electronic device more quickly and efficiently.

It should be understood that the particular order in which the operations in FIGS. 7A-7I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7I. For example, the ways of configuring communication restrictions of a supervised electronic device described above with reference to method 700 optionally have one or more of the characteristics of the ways of presenting user interfaces that enforce communication restrictions, etc., described herein with reference to other methods described herein (e.g., method 900). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7I are, optionally, implemented by components depicted in FIGS. 1A-1B. For example, displaying operations 702, 764, and 782 receiving operations 704, 716, and 726, and initiating operations 706 and 728, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Enforcing Communication Restrictions on a Supervised Electronic Device

Users interact with electronic devices in many different manners, including communicating with other users. In some embodiments, a supervised electronic device enforces one or more communication restrictions configured by a supervising electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
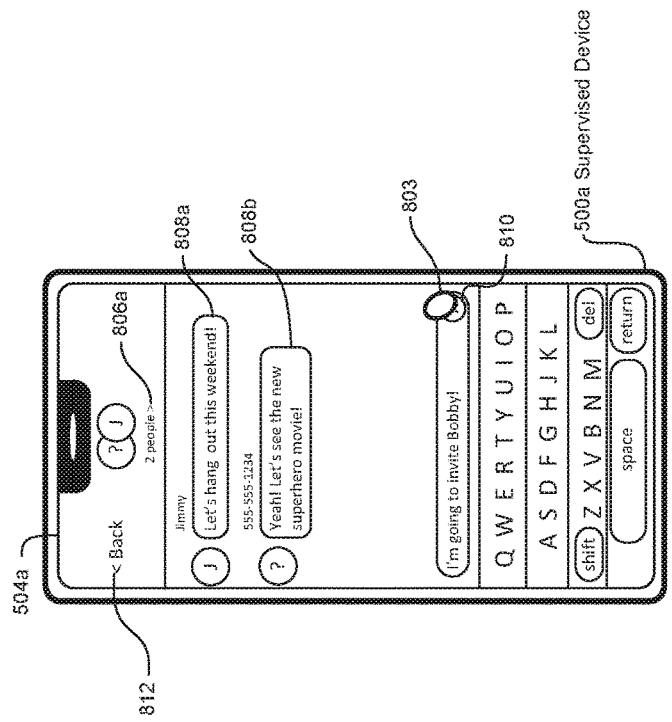
FIGS. 8A-8WW illustrate exemplary ways in which a supervised electronic device enforces one or more communication restrictions configured by a supervising electronic device and/or supervising user account in accordance with some embodiments of the disclosure.
Figure 8B:
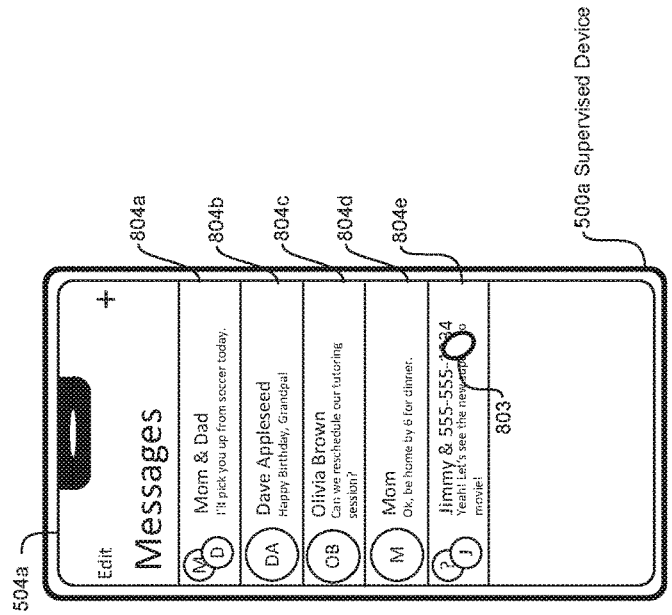
Figure 8D:
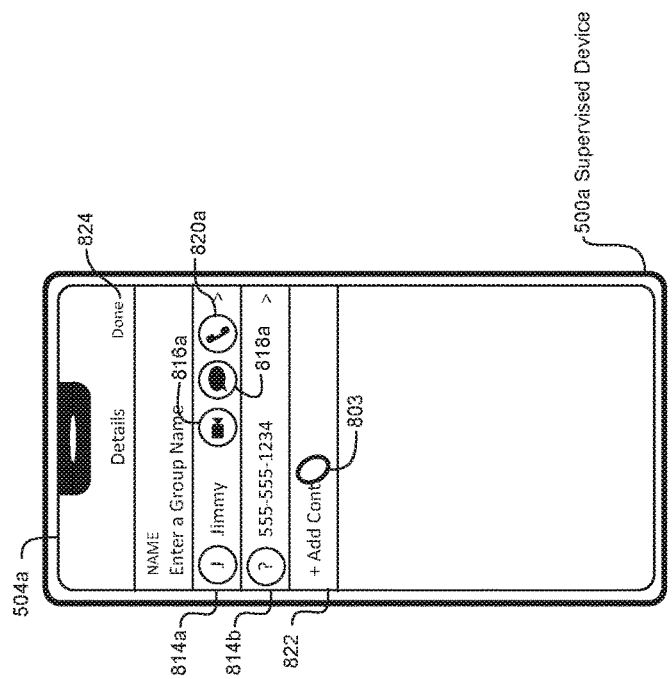
Figure 8C:
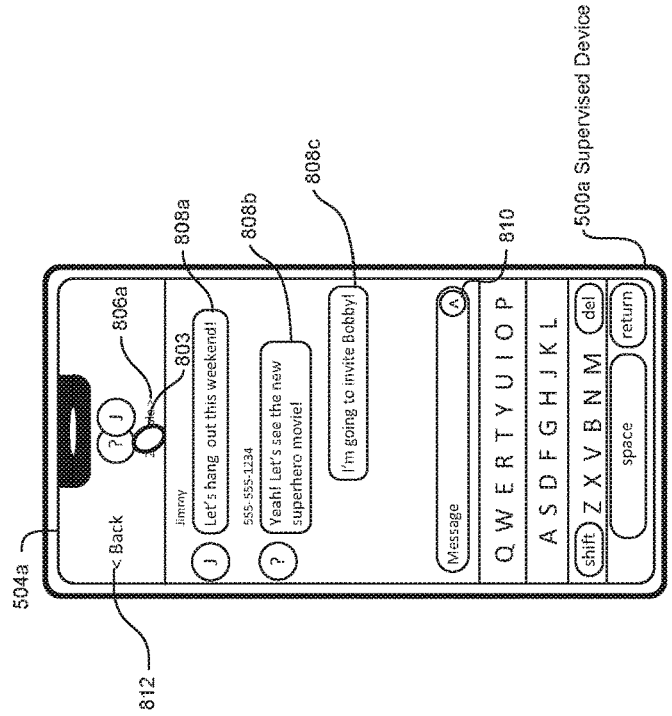
Figure 8H:
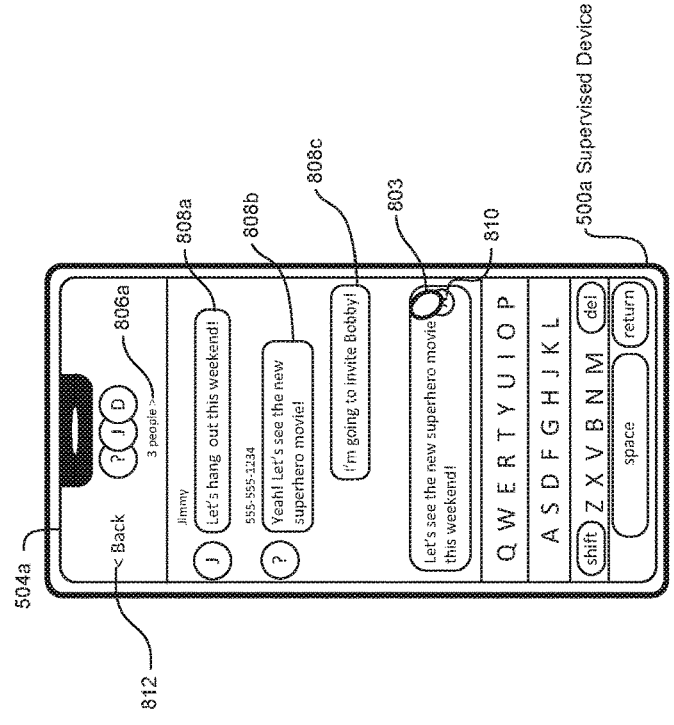
Figure 8G:
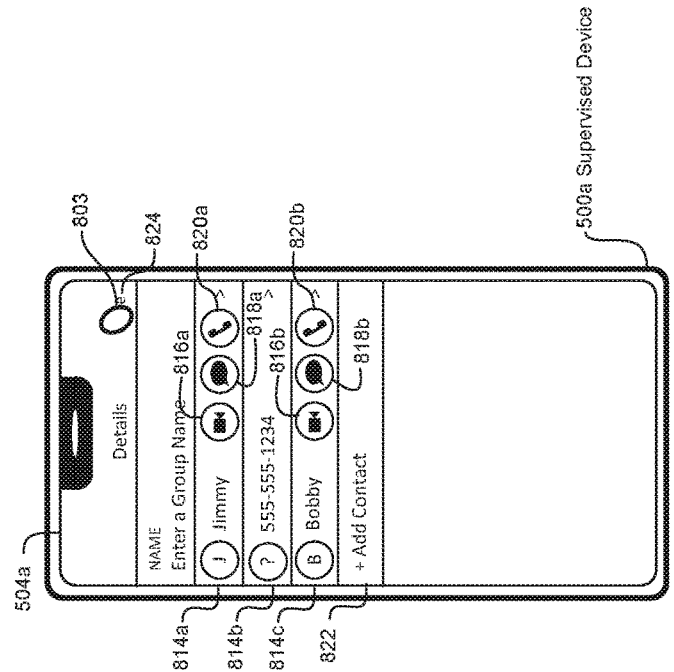
Figure 8L:
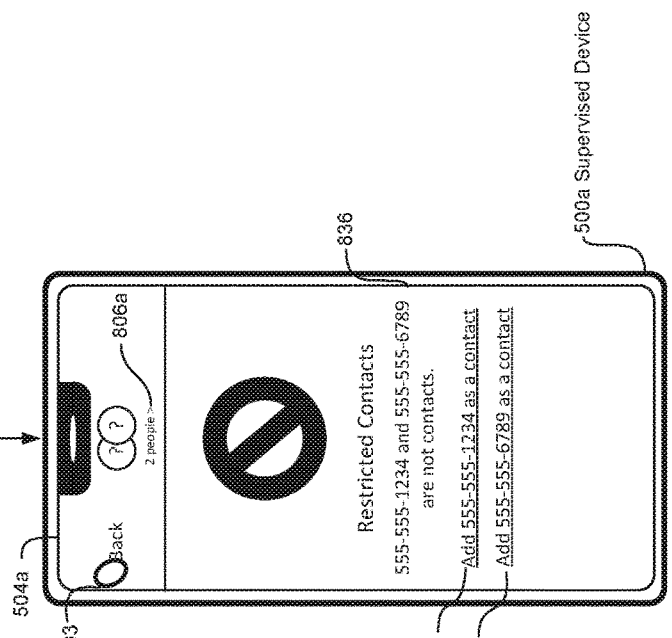
Figure 8K:
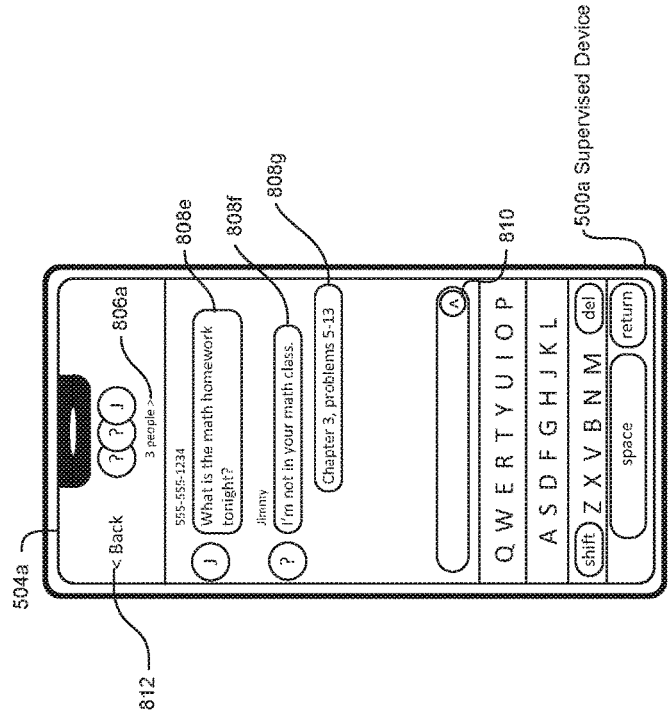
Figure 8N:
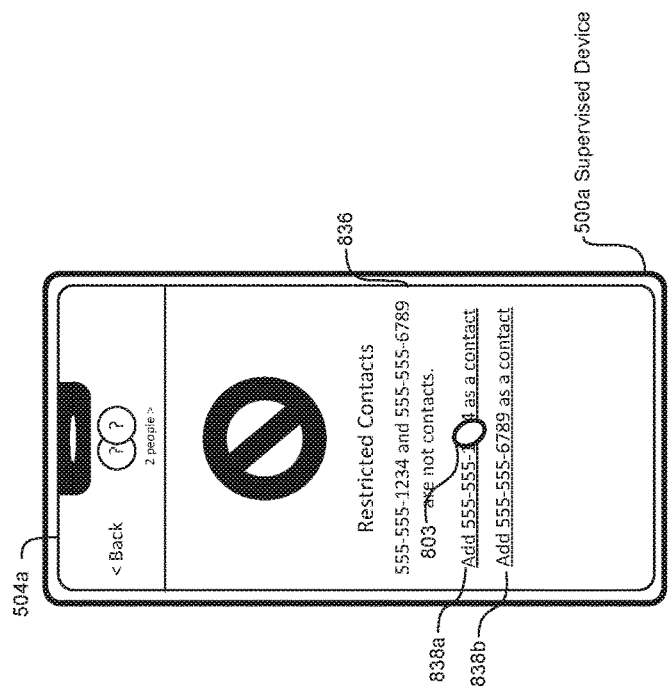
Figure 8M:
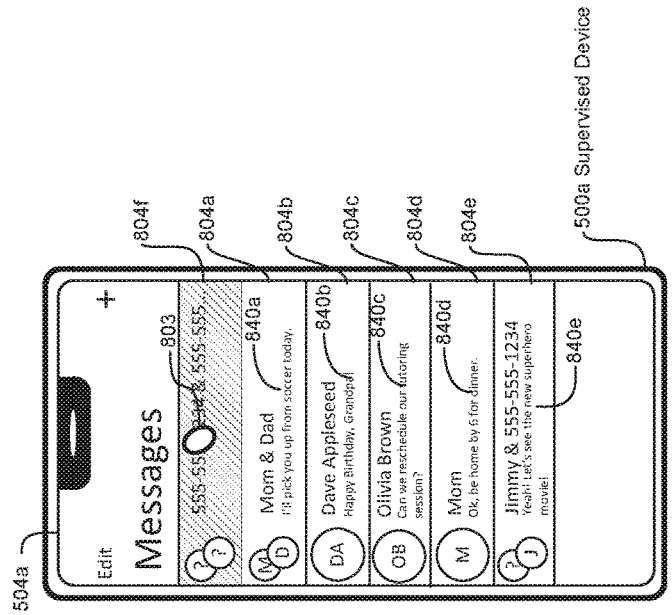
Figures 8W, 8X:
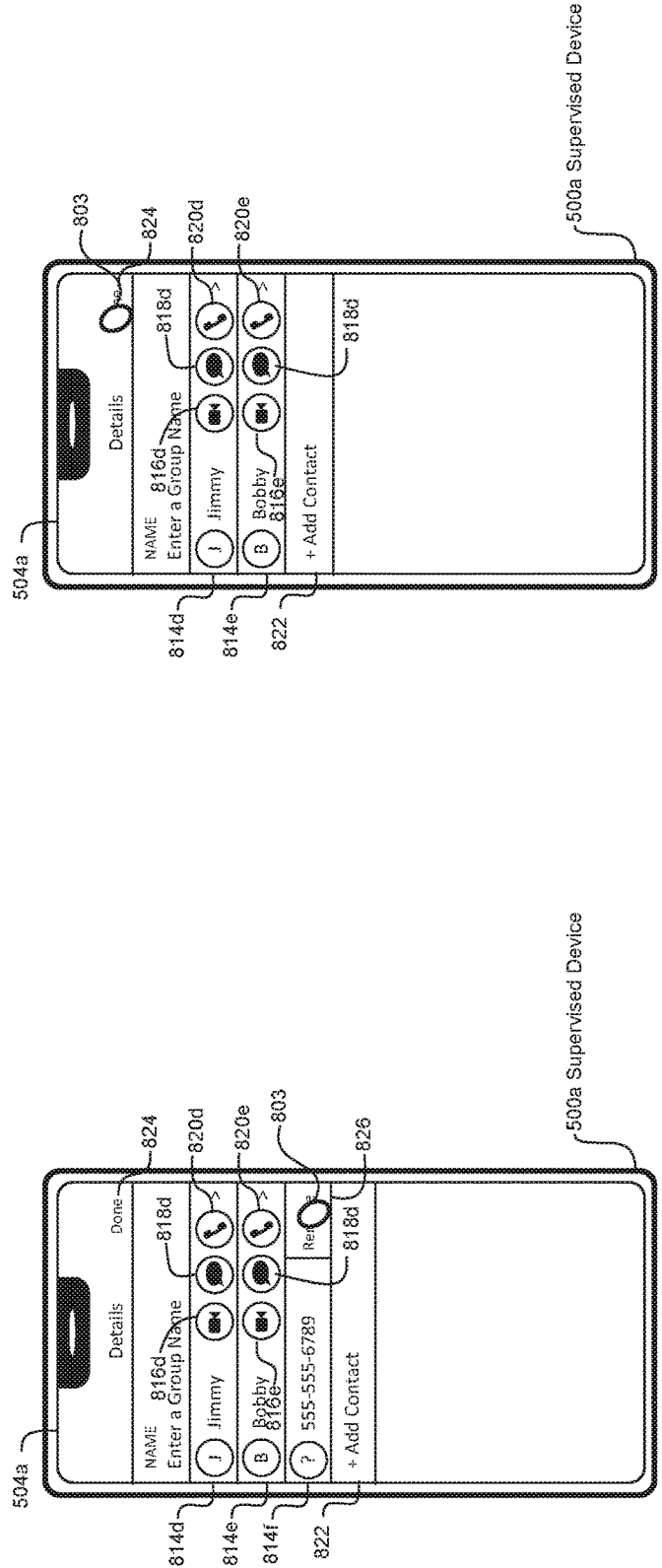
Figure 8D:
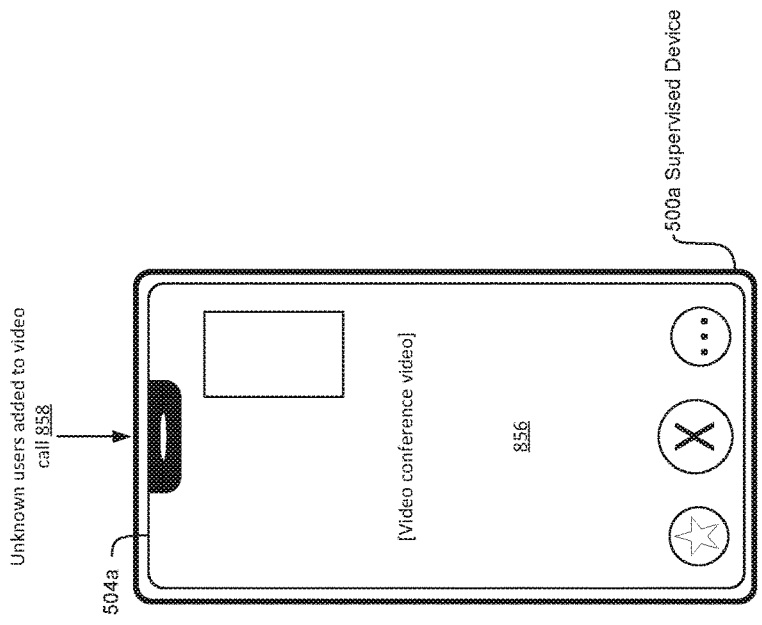
Figure 8C:
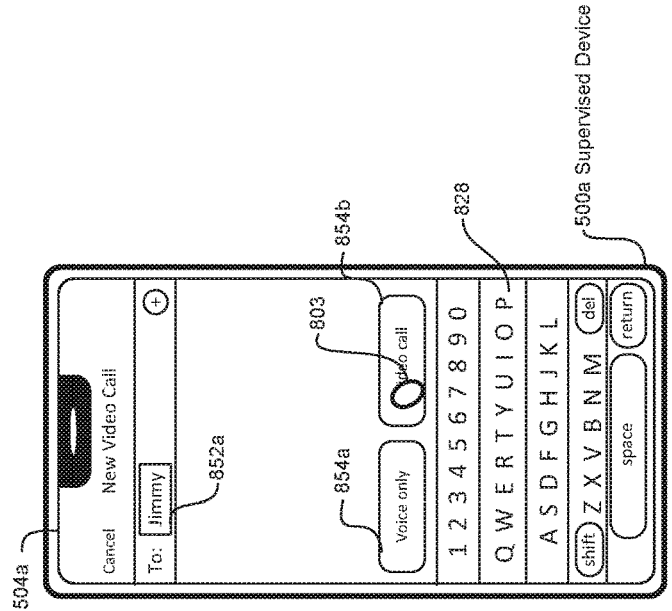

FIGS. 8A-8WW illustrate exemplary ways in which a supervised electronic device 500a enforces one or more communication restrictions configured by a supervising electronic device 500b and/or supervising user account in accordance with some embodiments of the disclosure. The embodiments in these figures are used to illustrate the processes described below, including the processes described with reference to FIGS. 9A-9L.

In the examples illustrated in FIGS. 8A-8WW, the user account of the supervised electronic device 500a is allowed to communicate with contacts of the user account of the supervised electronic device 500a and not allowed to communicate with users that are not contacts of the user account of the supervised electronic device during screen time. As will be described in more detail below, the supervising user is able to activate or deactivate the "allow introductions in groups" which, when enabled, allows the user account of the supervised electronic device 500a to participate in group communications (e.g., messaging conversations, phone calls, video conferences, etc.) that include an unknown user as long as at least one known contact is also included in the group. When "allow introductions in groups" is off, the user account of the supervised electronic device 500a is not allowed to participate in group communications that include an unknown user, even if the group also includes a known contact.

More generally, the "allow introductions in groups" setting enables the user account of the supervised electronic device 500a to participate in group communications that include users not included in the group of users with whom the user account of the supervised electronic device 500a is allowed to communicate as long as the group includes at least one user included in the group of users with which the user account of the supervised electronic device 500a is allowed to communicate. As another example, if the user account of the supervised electronic device 500a is allowed to communicate with specific contacts during screen time and not allowed to communicate with other users, including other contacts, during screen time, the "allow introductions in groups" setting enables the user of the supervised electronic device 500a to communicate with contacts not included in the specific contacts in groups that include at least one of the specific contacts.

FIGS. 8A-8I illustrate ways the supervised electronic device 500a participates in a group message that includes an unknown user and at least one known contact when the user account of the electronic device 500a is allowed to communicate with unknown users in groups that include at least one known contact. Supervision of contacts and/or communication of a supervised user account by a supervising user account was described with reference to FIGS. 6A-6WW and method 700, the details of which similarly apply here.

FIG. 8A illustrates a messages user interface that is displayed by the supervised electronic device 500a. The messages user interface includes representations 804a-e of a plurality of messaging conversations between the user account of the supervised electronic device 500a and other users. As shown in FIG. 8A, the user selects (e.g., with contact 803) the representation 804e of one of messaging conversations.

As shown in FIG. 8B, in response to the user's selection in FIG. 8A, the supervised electronic device 500a presents a messaging user interface that includes the messaging conversation represented by the representation 804e selected by the user. The messaging user interface includes a selectable option 806a that, when selected, causes the supervised electronic device 500a to present information about the participants in the messaging conversation, a plurality of messages 808a-b in the conversation, a selectable option 810 that, when selected, causes the electronic device 500a to send a message to the group, and a selectable option 812 that, when selected, causes the electronic device 500a to navigate back to the user interface illustrated in FIG. 8A.

The messaging conversation includes a contact (e.g., "Jimmy") of the user account of the supervised electronic device 500a and an unknown user (e.g., 555-555-1234). Even though the electronic device 500a is not able to communicate with unknown users outside of groups, the electronic device 500a is able to participate in the messaging conversation because it includes at least one contact of the user account of the supervised electronic device 500a and the setting "allow introductions in groups" is enabled on the supervised electronic device 500a.

As shown in FIG. 8B, the user selects (e.g., with contact 803) the option 810 to send a message to the group. As shown in FIG. 8C, in response to the user's selection, the message 808c is sent to the group. The user selects (e.g., with contact 803) the option 806a to view the information about the participants in the group message. In response to the user's selection, the electronic device 500a presents the message information user interface illustrated in FIG. 8D.

FIG. 8D illustrates the message information user interface. The message information user interface includes representations 814a and 814b of the participants in the conversation, an option 822 to add a contact to the group message, and an option 824 to exit the message information user interface. Representation 814a is a representation of a contact of the user account of the supervised electronic device 500a and includes the name of the contact and a plurality of options 816a-820a for initiating communication with the contact. Option 816a is selectable to initiate a video call with the contact. Option 818a is selectable to send a message to the contact. Option 820a is selectable to initiate a phone call with the contact. The representation 814b of the unknown user is does not include the options for communicating with the unknown user, because the unknown user is not a contact of the supervised user account.

Selecting the rightmost region of the respective representations 814a and 814b causes the electronic device to present contact information for the respective user. Detecting selection of the rightmost region of representation 814a causes the electronic device 500a to present the contact card of the respective contact. Detecting selection of the rightmost region of the representation 814b causes the electronic device to present a user interface including an option to initiate a process to add the unknown user as a contact of the user account of the supervised electronic device 500a.

As shown in FIG. 8D, the user selects (e.g., with contact 803) the option 822 to add a contact to the messaging conversation. In response to the user's selection, the electronic device 500a presents the user interface illustrated in FIG. 8E. As shown in FIG. 8E, the user interface includes a soft keyboard 828 at which the user is able to enter the name of a contact to add to the conversation and a selectable option 830 to confirm entry of the name of the contact. The user selects (e.g., with contact 803) a key of the soft keyboard 828 to enter the name of a contact.

As show in FIG. 8F, after the user enters the name 832 of the contact, the user selects (e.g., with contact 803) the option 830 to confirm entry of the name of the contact to add the contact to the group message.

In FIG. 8G, in response to the user's selection in FIG. 8F, the electronic device 500a displays the message information user interface. The message information user interface is the same as the user interface illustrated in FIG. 8D, except it has been updated to include a representation 814c of the contact the user added to the messaging conversation. The user selects (e.g., with contact 803) the option 824 to navigate back to the messaging conversation, as shown in FIG. 8H.

In FIG. 8H, the electronic device 500a displays the messaging conversation. The option 806a to view the information about the participants in the group conversation is updated to reflect the additional user added to the conversation. The user selects (e.g., with contact 803) the option 810 to send a message to the group, including the contact that the user added to group conversation.

Figure 8J:
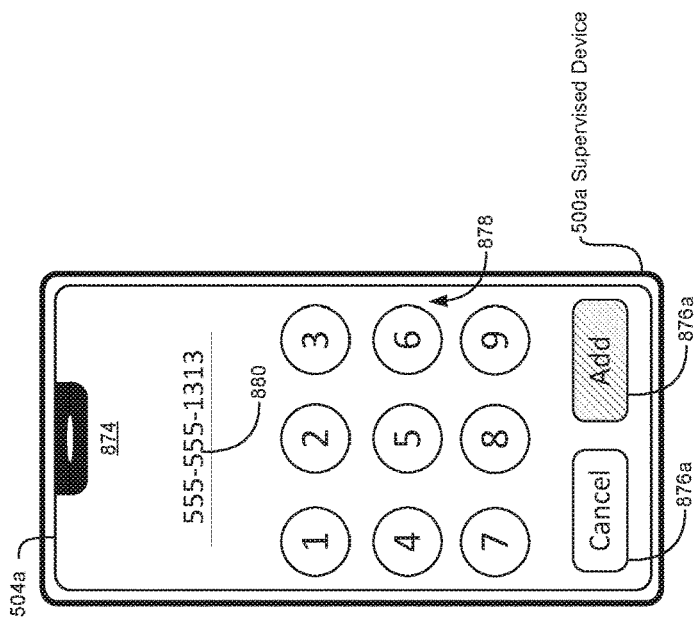
Figure 8I:
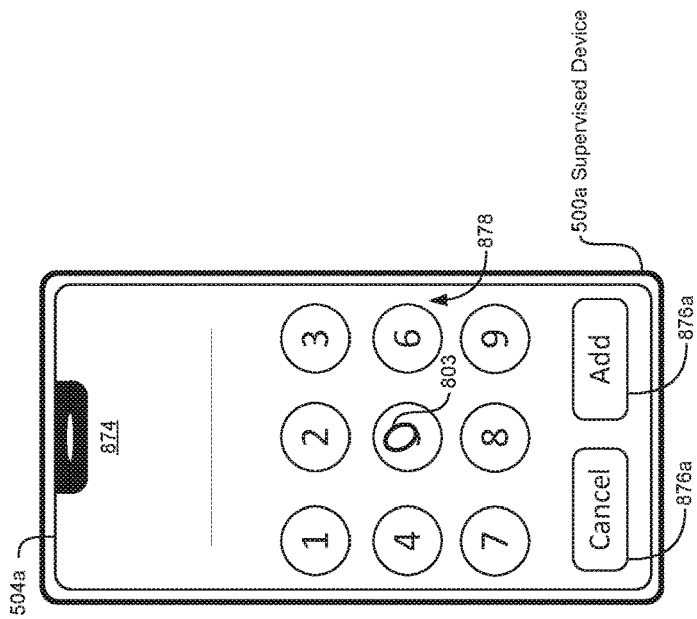
Figure 8L:
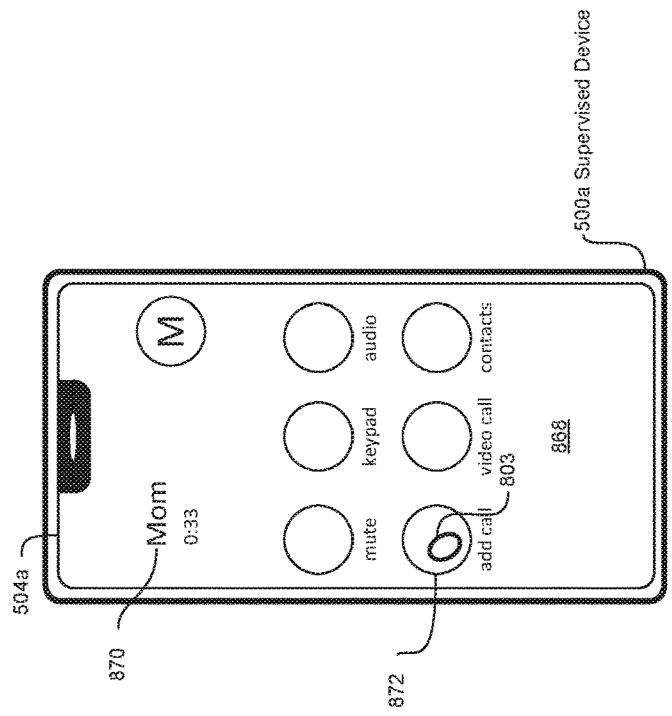
Figure 8K:
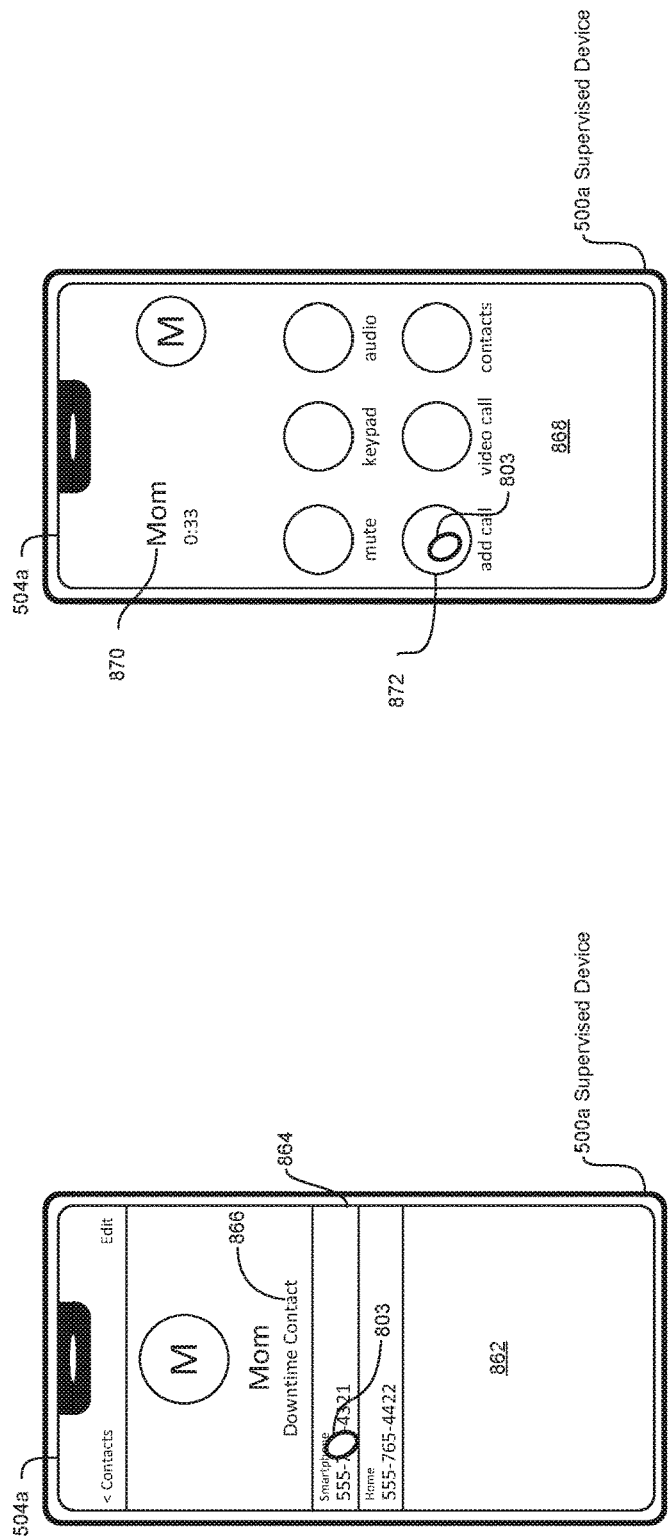
Figure 8N:
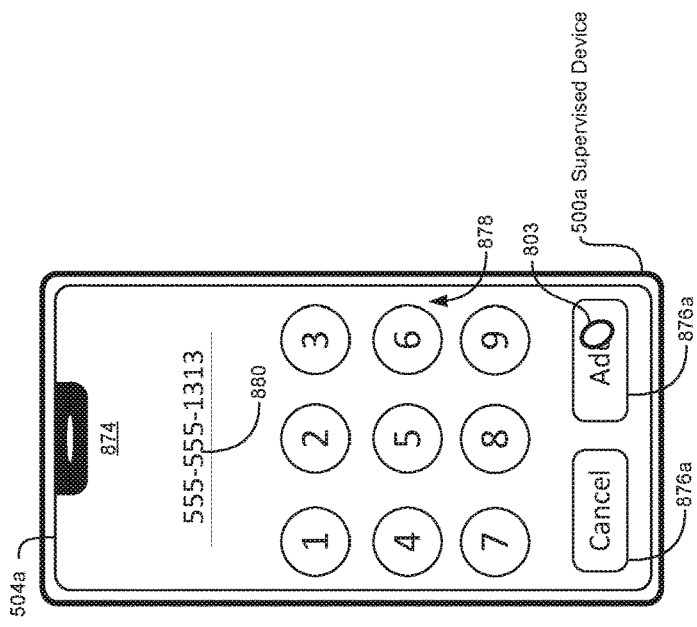
Figure 8M:
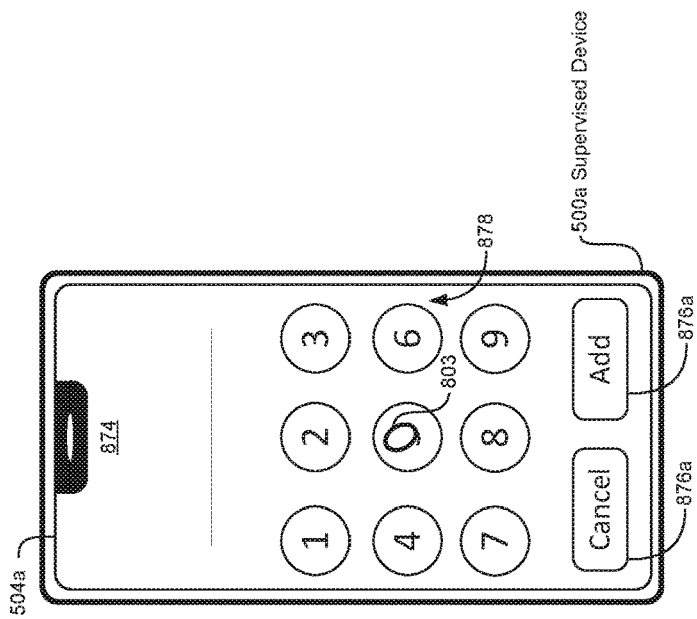

As shown in FIG. 8I, in response to the user's selection in FIG. 8H, the electronic device 500a sends the message 808d to the group. The user is still able to participate in the conversation after adding the contact to the group of messaging participants because the group includes at least one contact of the user account of the supervised electronic device. It should be understood that even if a different user were to add another participant to the group, as long as there is still at least one known contact in the group, the user is able to participate in the conversation.

Therefore, as shown in FIGS. 8A-8I, the supervised electronic device 500a is able to participate in a group message that includes an unknown user and at least one known contact when the user account of the electronic device 500a is allowed to communicate with unknown users in groups that include at least one known contact.

FIGS. 8J-8L illustrate ways the supervised electronic device 500a loses access to a group messaging conversation while the "allow introductions in groups" setting is enabled in response to detecting that the messaging participants change from including a known contact to not including any known contacts of the user account of the supervised electronic device 500a.

FIG. 8J illustrates a messaging user interface of a conversation that includes two unknown users and one contact of the user account of the supervised electronic device 500a. The user has entered a message into the user interface and selects the option 810 to send the message to the other participants in the conversation.

As shown in FIG. 8K, in response to the user's selection in FIG. 8J, the message is transmitted to the group. The user account of the supervised electronic device 500a is able to access the messaging conversation because at least one of the participants in the messaging conversation is a contact of the user account of the supervised electronic device 500a.

In FIG. 8L, the supervised electronic device 500a detects removal 834 of "Jimmy" from the conversation (e.g., by one of the other participants in the conversation). Because Jimmy was the only known contact in the group message, the removal of Jimmy causes the electronic device 500a to lose access to the messaging conversation. In response to losing access to the group messaging conversation, the electronic device 500a stops displaying the messages of the messaging conversation and instead displays a splash screen 836 indicating that the supervised electronic device 500*a* no longer has access to the conversation because there are no known contacts in the group conversation.

The splash screen user interface 836 includes selectable options 838*a* and 838*b* to add each of the unknown users as contacts of the user account of the supervised electronic device 500*a*. In response to detecting selection of option 838*a*, the supervised electronic device 500*a* initiates a process to request to add 555-555-1234 as a contact of the user account of the electronic device. In response to detecting selection of option 838*b*, the supervised electronic device 500*a* initiates a process to request to add 555-555-6789 as a contact of the user account of the electronic device, as will be described below with reference to FIGS. 8N-8Q.

Thus, as shown in FIGS. 8J-8L, the supervised electronic device 500*a* loses access to a group messaging conversation while the "allow introductions in groups" setting is enabled in response to detecting that the messaging participants change from including a known contact to not including any known contacts of the user account of the supervised electronic device 500*a*.

As shown in FIG. 8L, the user selects (e.g., with contact 803) an option to navigate back to a messaging user interface illustrated in FIG. 8M.

FIGS. 8M-8R illustrate ways the supervised electronic device 500*a* gains access to a conversation with unknown users in response to receiving authorization from the supervising electronic device 500*b* to add one of the unknown users as a contact of the user account of the supervised electronic device 500*a*.

FIG. 8M illustrates the messaging user interface displayed in response to the user's selection in FIG. 8L. The messaging user interface includes representations 804*a-f* of the messaging conversations in which the user account of the supervised electronic device 500*a* is participating. The representations 804*a-e* of the conversations to which the user account of the supervised electronic device 500*a* has access include a preview 840*a-e* of the last message sent to or from the user account of the supervised electronic device 500*a*. The representation 804*f* of the conversation to which the supervised electronic device 500*a* does not have access (as described above) does not include a preview of the last message sent in the conversation because the user account of the supervised electronic device 500*a* does not have access to the conversation. The user account of the supervised electronic device 500*a* does not have access to the conversation because the conversation does not include at least one known contact of the user account of the supervised electronic device.

As shown in FIG. 8M, the user selects (e.g., with contact 803) the representation 804*f* of the conversation to which the user account of the supervised electronic device 500*a* does not have access. In response to the user's selection, instead of displaying the messaging conversation, the supervised electronic device 500*a* presents the splash screen 836 indicating why the user does not have access to the conversation, as shown in FIG. 8N.

The user interface illustrated in FIG. 8N is the same as the user interface described above with reference to FIG. 8L. As shown in FIG. 8N, the user selects (e.g., with contact 803) the option 838*a* to initiate a process to request permission from the user account of the supervising electronic device 500*b* to add the number 555-555-1234 as a contact. In response to the user's selection, the supervised electronic device 500*a* presents a user interface at which the user is able to enter the information associated with the new contact, as shown in FIG. 8O.

Figure 8P:
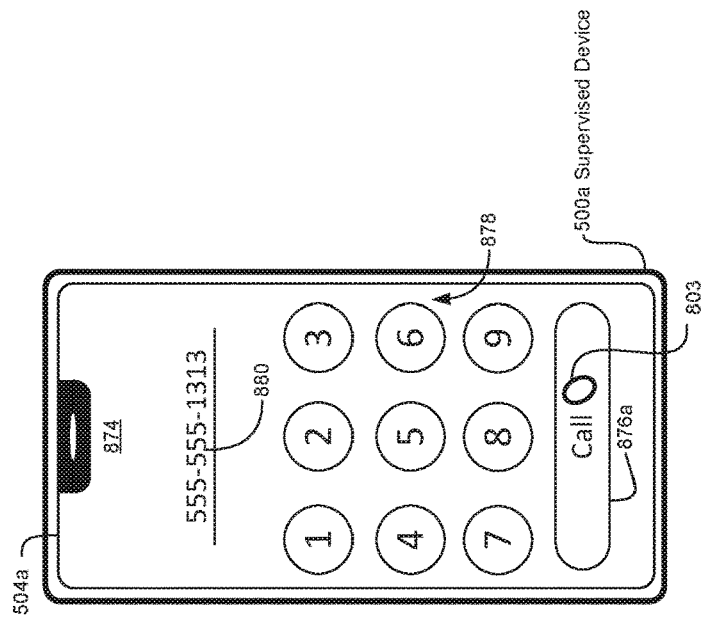
Figure 8O:
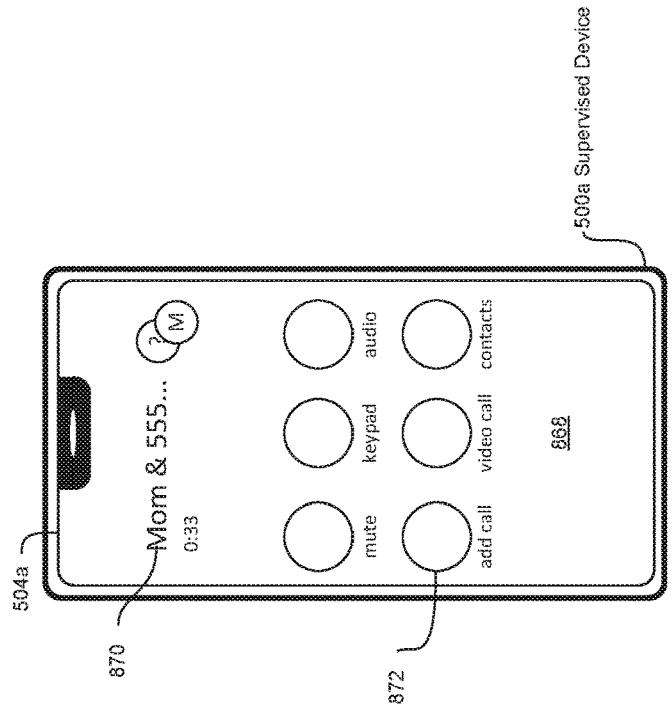

FIG. 8O illustrates the user interface at which the user is able to enter the contact information of the new contact. The user interface includes fields 842*a* and 842*b* in which to enter the contact's first and last name, respectively, and a field 842*c* that is pre-populated with the phone number selected by the user. The user interface also includes an indication 844 that the supervising user is able to view the contact card and an option 846 to save the contact information. As shown in FIG. 8O, the user selects the first name field 842*a* to enter the contact's first name.

As shown in FIG. 8P, after entering the first name of the contact into field 842*a*, the user selects (e.g., with contact 803) the option 846 to save the contact information. In response to the user's selection, the electronic device presents the notification 802*a* and options 802*b-c* illustrated in FIG. 8Q. In response to detecting selection of option 802*b*, the supervised electronic device 500*a* transmits a request to the user account of the supervising electronic device 500*b* for permission to add the contact. In response to detecting selection of the option 802*c*, the supervised electronic device 500*a* presents an authentication user interface where the supervising user is able to provide authentication (e.g., biometrics, facial recognition, a password or passcode that the supervised user does not know) to enable the supervised electronic 500*a* to add the contact.

Figures 8Q, 8R:
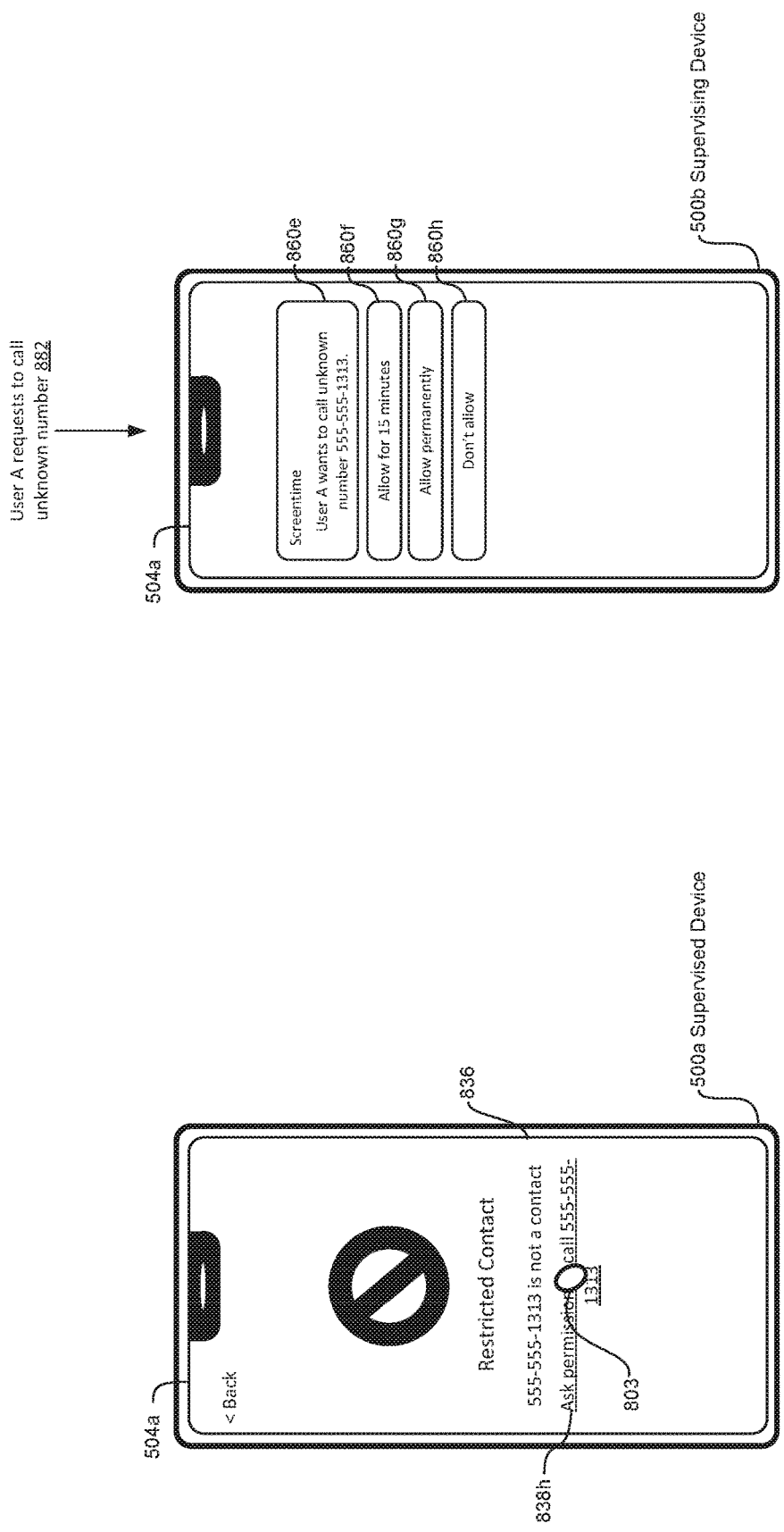

The supervised user is able to select either option 802*b* or 802*c* to request authorization to add the contact. As shown in FIG. 8R, in response to receiving the authorization 848 to add the contact (e.g., remote authorization from the supervising user account, or local authorization via a supervising user passcode), the supervised electronic device 500*a* presents the messaging conversation. The supervised electronic device 500*a* is able to access the messaging conversation because one of the participants has been added to the contacts of the user account of the supervised electronic device 500*a* (as a result of the supervising user account's authorization) and the user account of the supervised electronic device 500*a* is allowed to participate in messaging conversations that include at least one known contact of the user account of the supervised electronic device 500*a*.

Thus, as shown in FIGS. 8M-8R, the supervised electronic device 500*a* gains access to a conversation with unknown users in response to receiving authorization from the supervising electronic device 500*b* to add one of the unknown users as a contact of the user account of the supervised electronic device 500*a*.

FIGS. 8S-8Y illustrate ways the supervised electronic device 500*a* restricts access to a conversation that includes an unknown user and regains access to the conversation when the unknown user is removed if the electronic device 500*a* is not allowed to communicate with unknown numbers, even in groups that include one or more known contacts of the user account of the supervised electronic device 500*a*.

In FIG. 8S, the supervised electronic device 500*a* presents a messaging user interface that includes the content of a conversation with two known contacts of the user account of the supervised electronic device 500*a*. The supervised electronic device 500*a* is able to access the conversation because it does not include any unknown users. As shown in FIG. 8S, the user selects the option 810 to send a message to the group.

As shown in FIG. 8T, in response to the user's selection, the electronic device 500*a* sends the message 808*j* to the group. Also shown in 8T, after the user sends the message, the supervised electronic device 500a receives an indication 850 that an unknown user is added to the messaging conversation (e.g., by one of the other users).

In response to receiving the indication 850 illustrated in FIG. 8T, the supervised electronic device 500a loses access to the messaging conversation because the user account of the supervised electronic device 500a is not allowed to participate in group messages that include unknown users that are not contacts of the user account of the supervised electronic device.

Figure 8V:
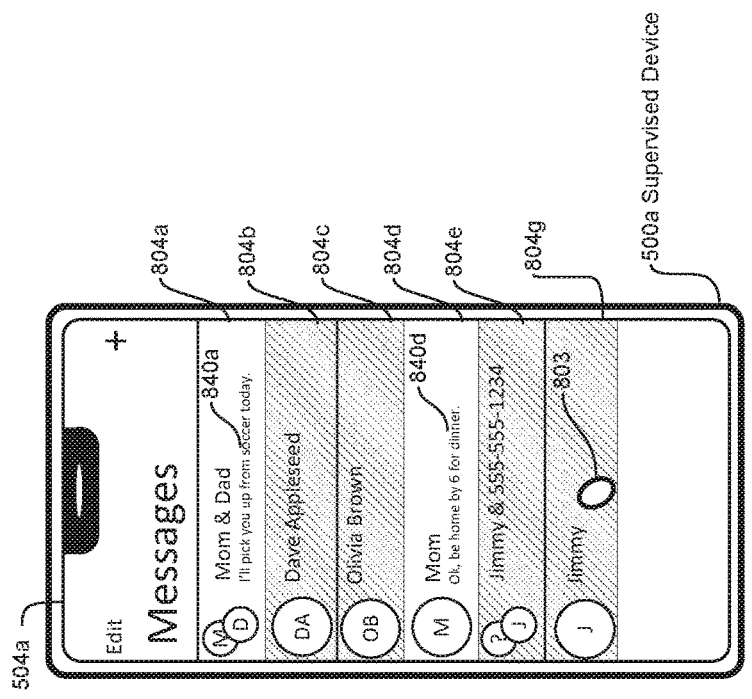
Figure 8U:
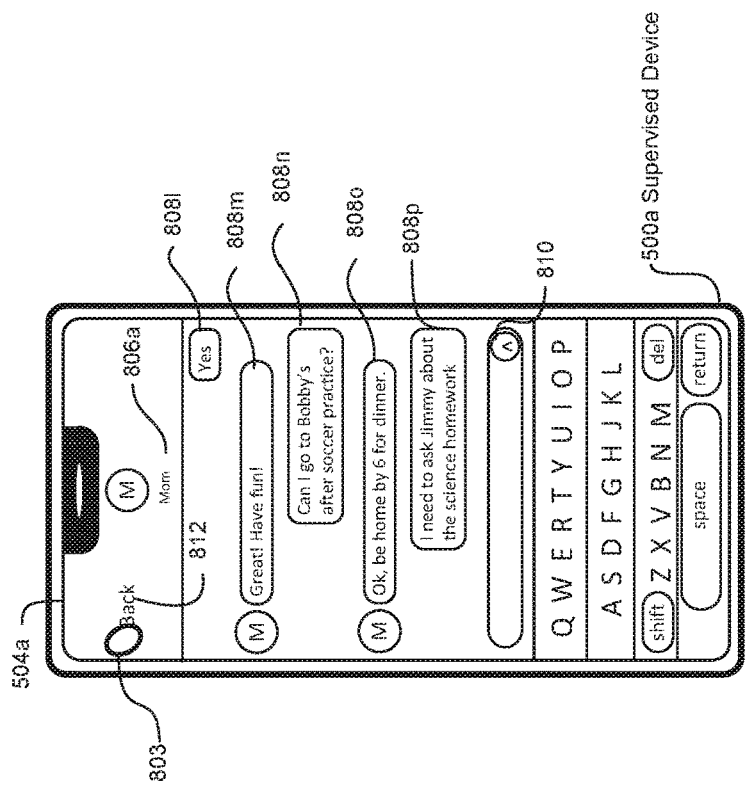
Figure 9A:
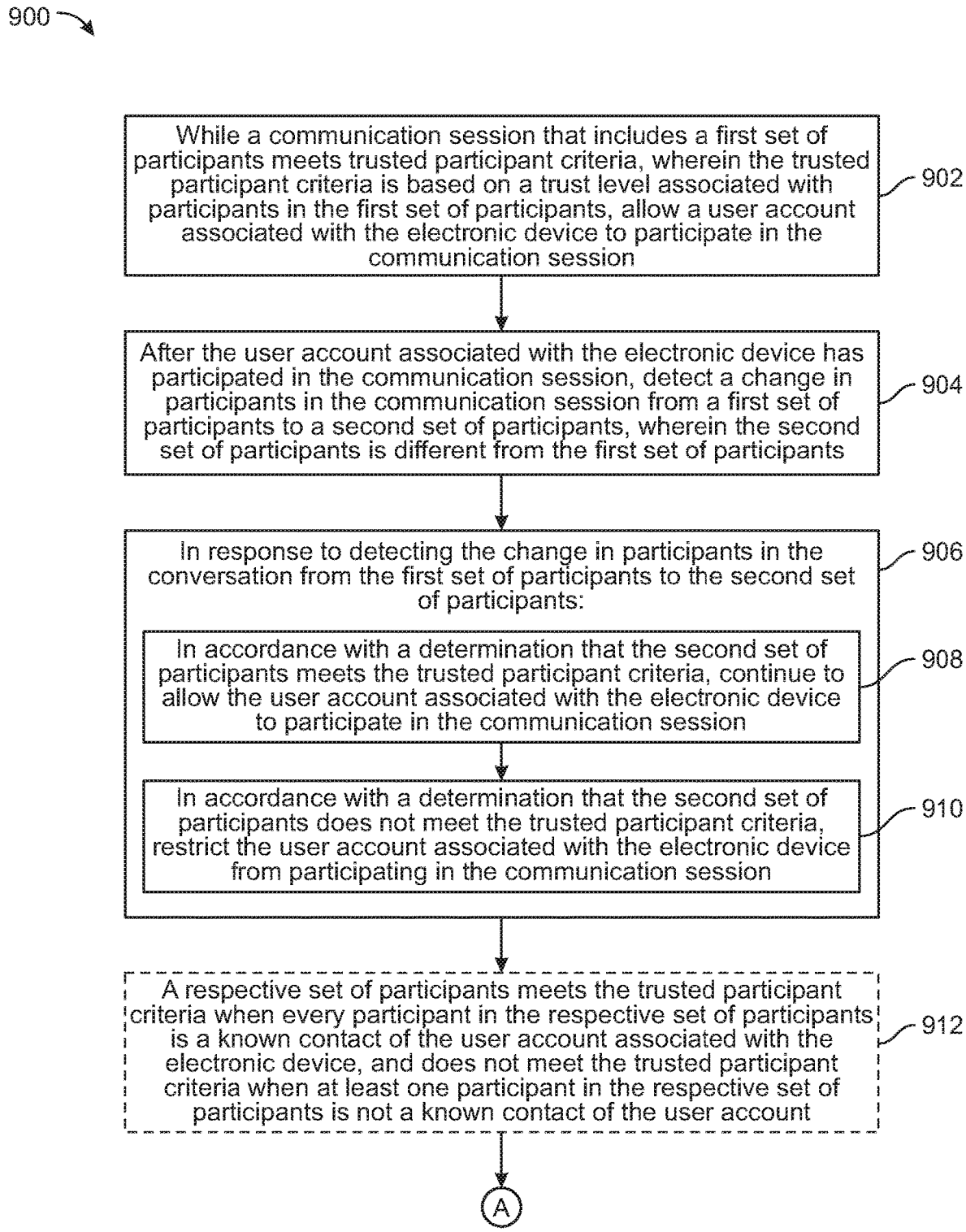
FIGS. 9A-9L are flow diagrams illustrating a method of enforcing one or more communication restrictions configured by a supervising electronic device and/or supervising user account in accordance with some embodiments of the disclosure.
Figure 9B:
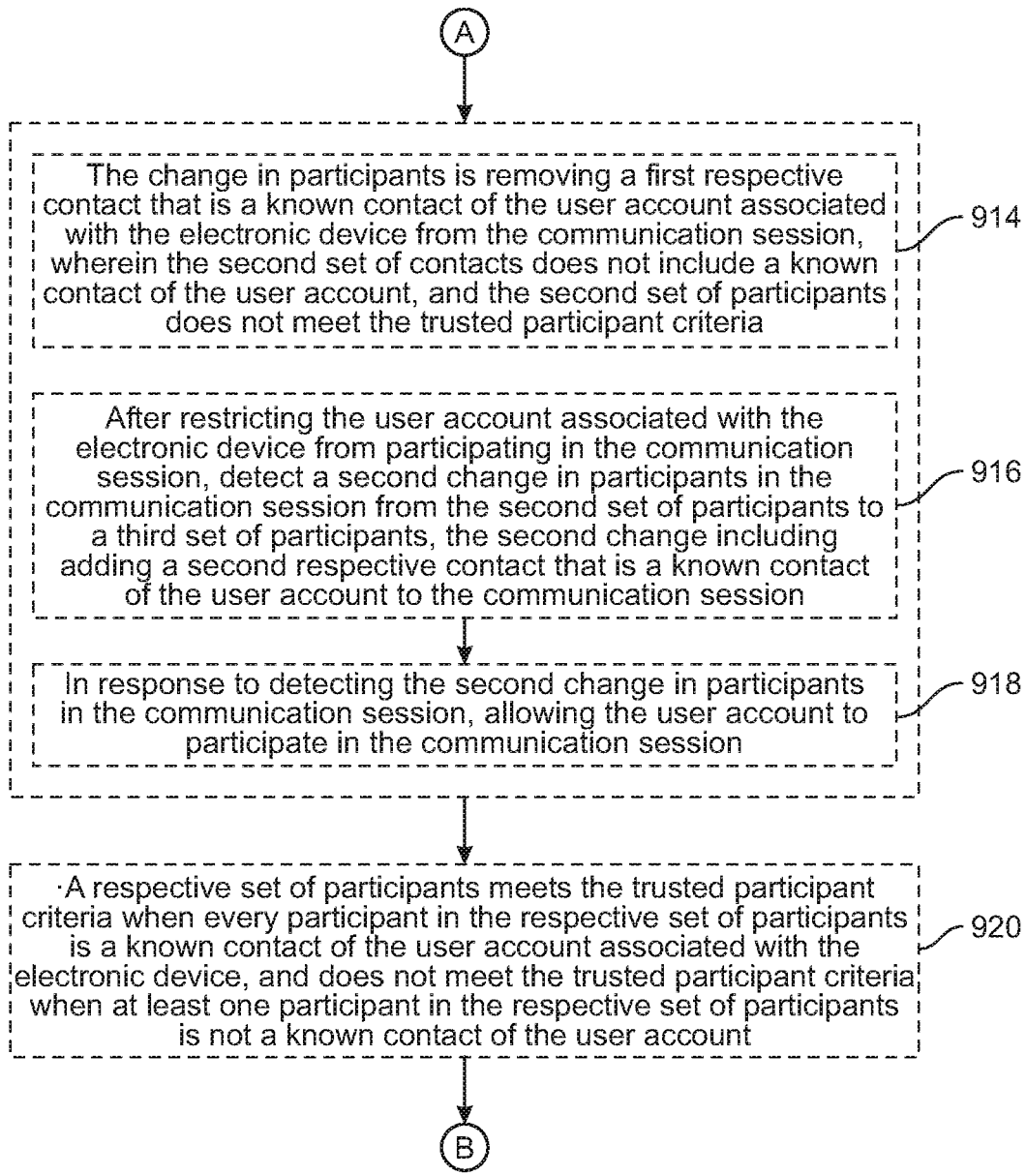
Figure 9C:
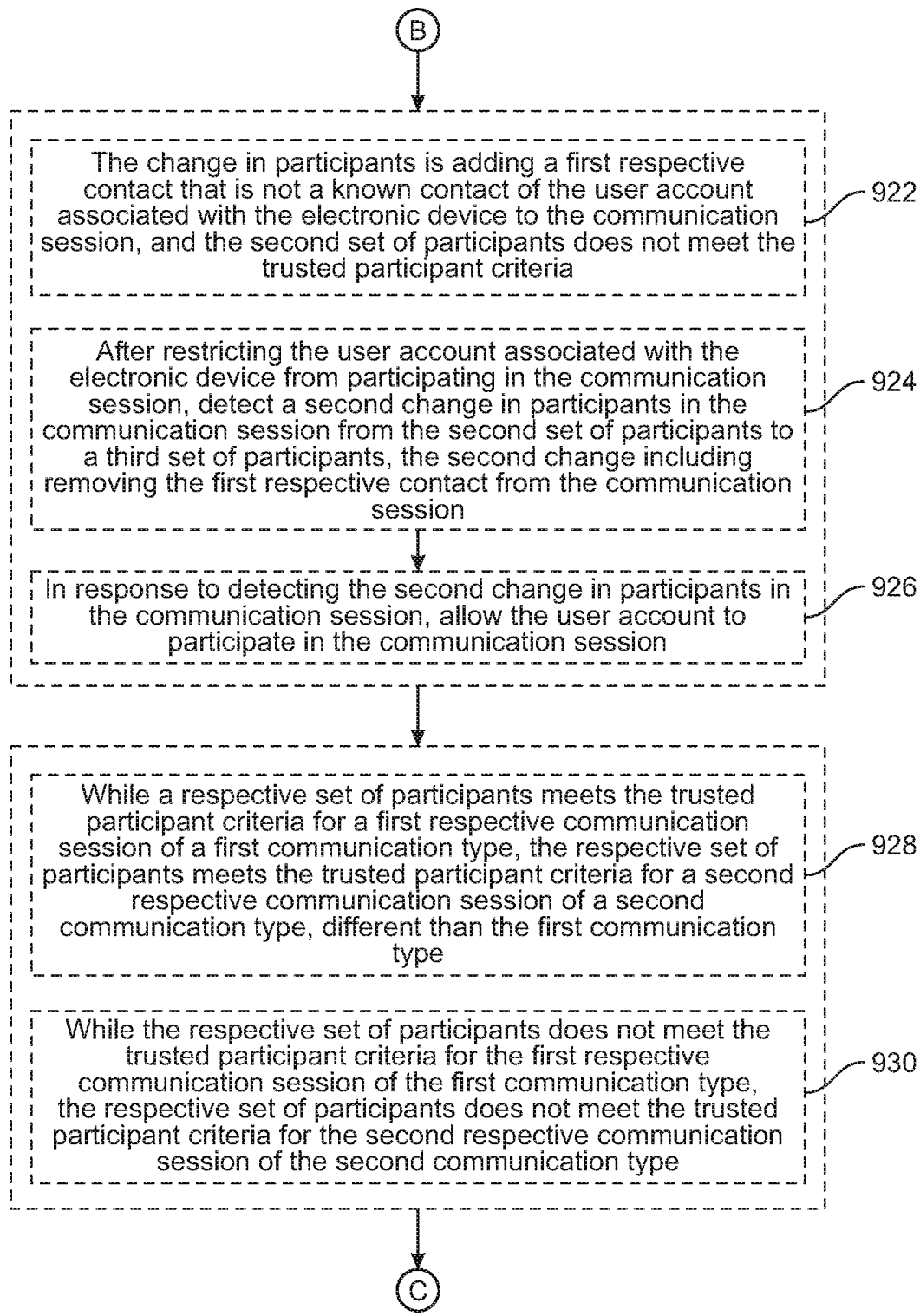
Figure 9D:
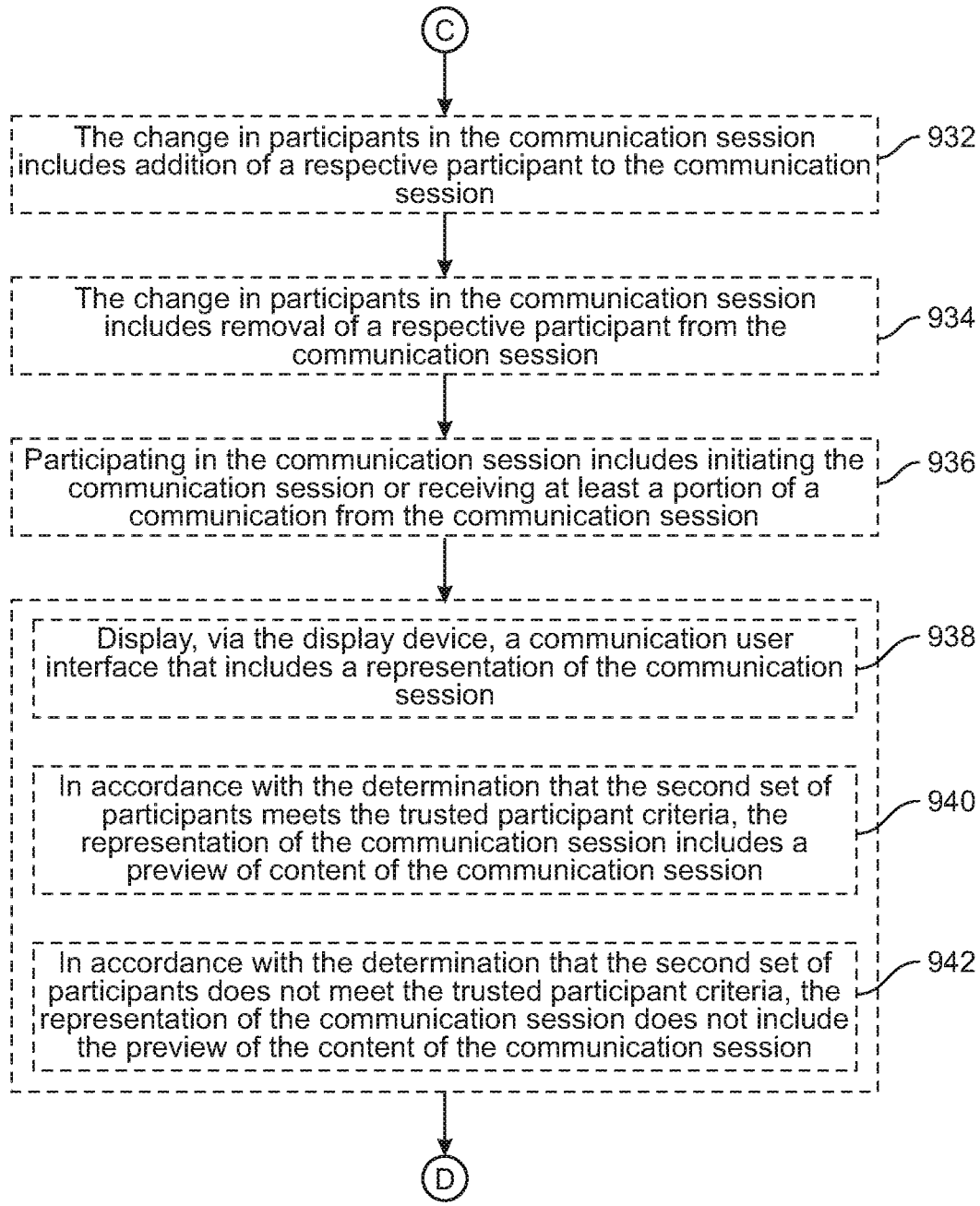
Figure 9E:
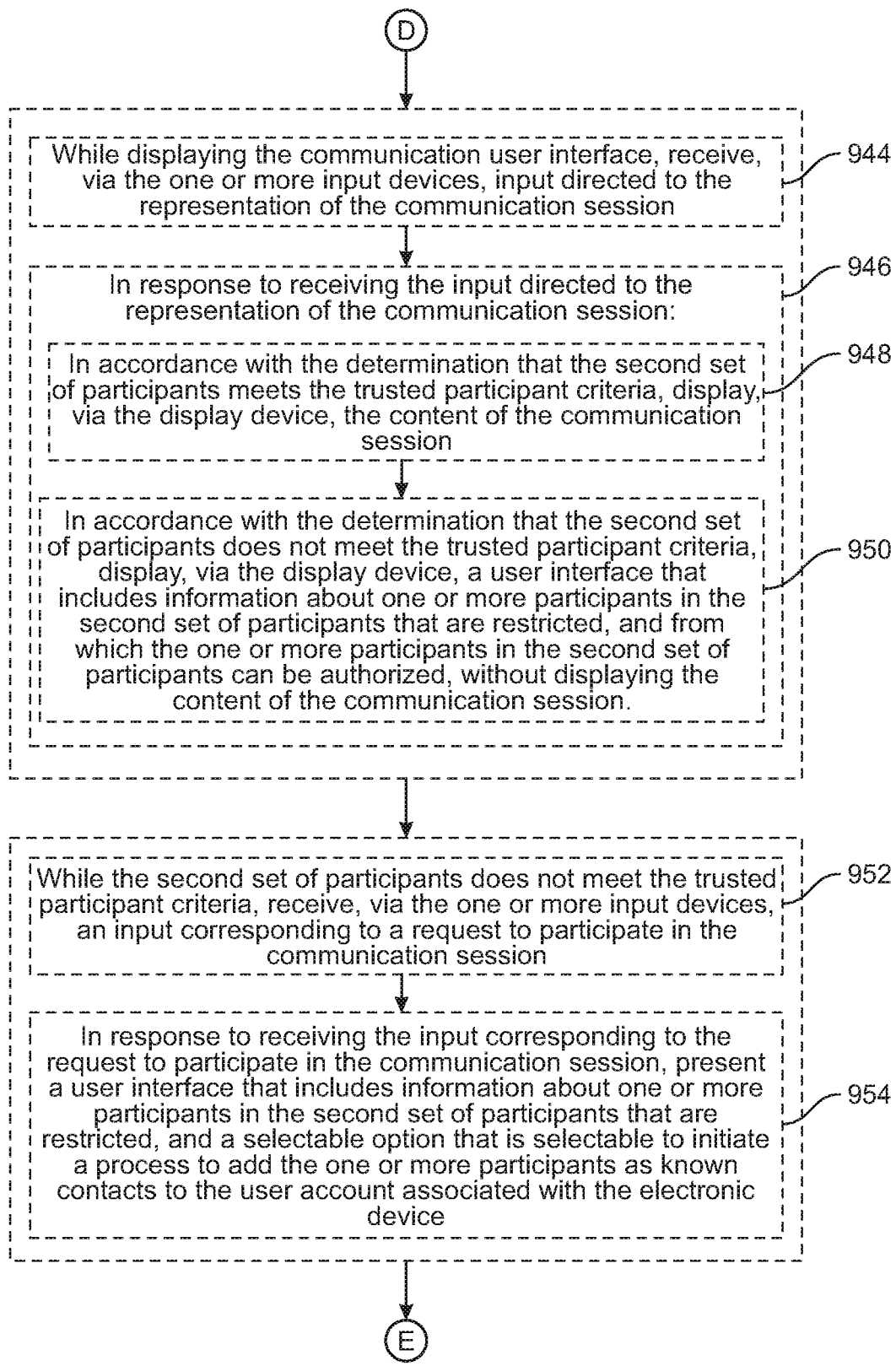
Figure 9F:
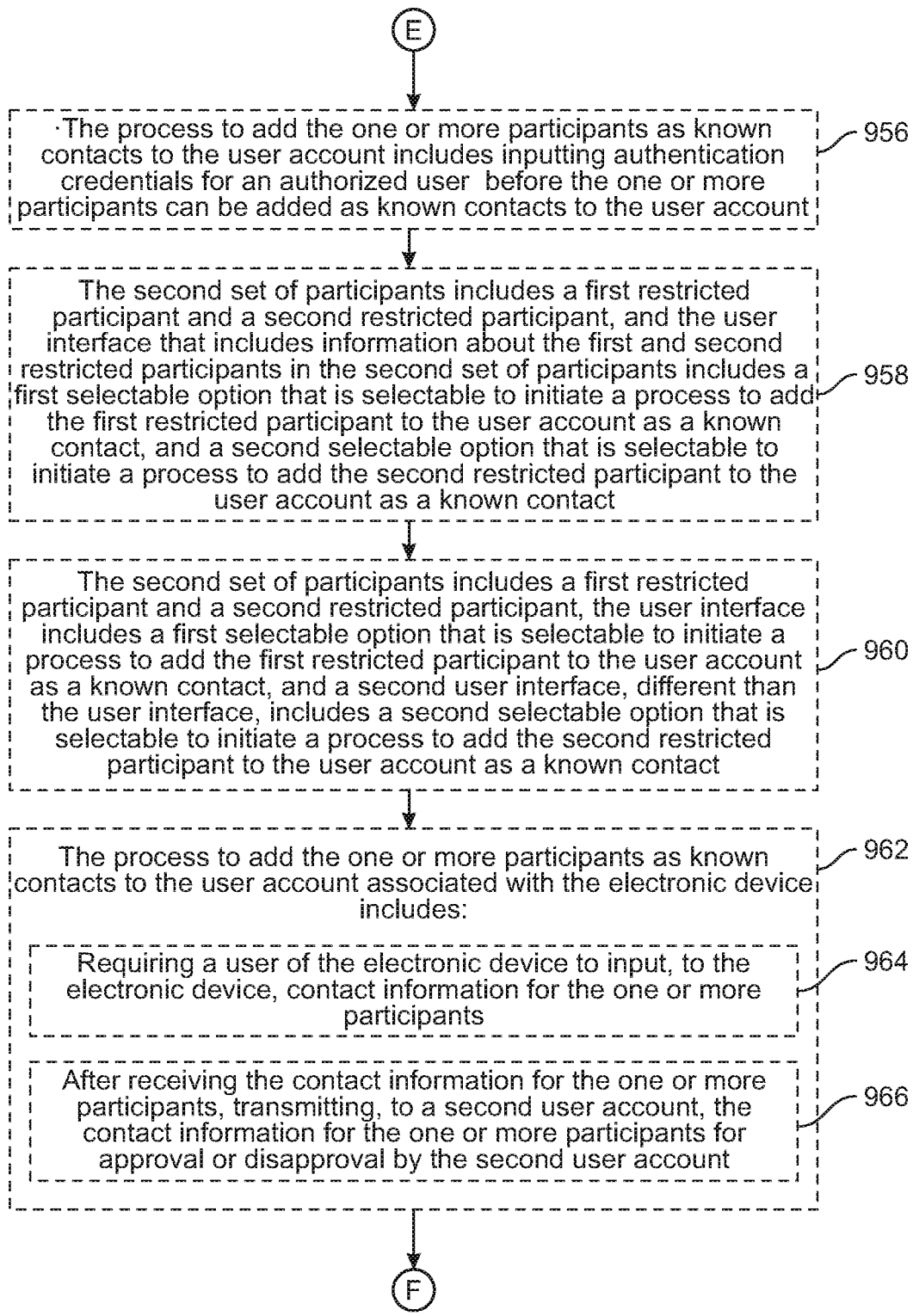
Figure 9G:
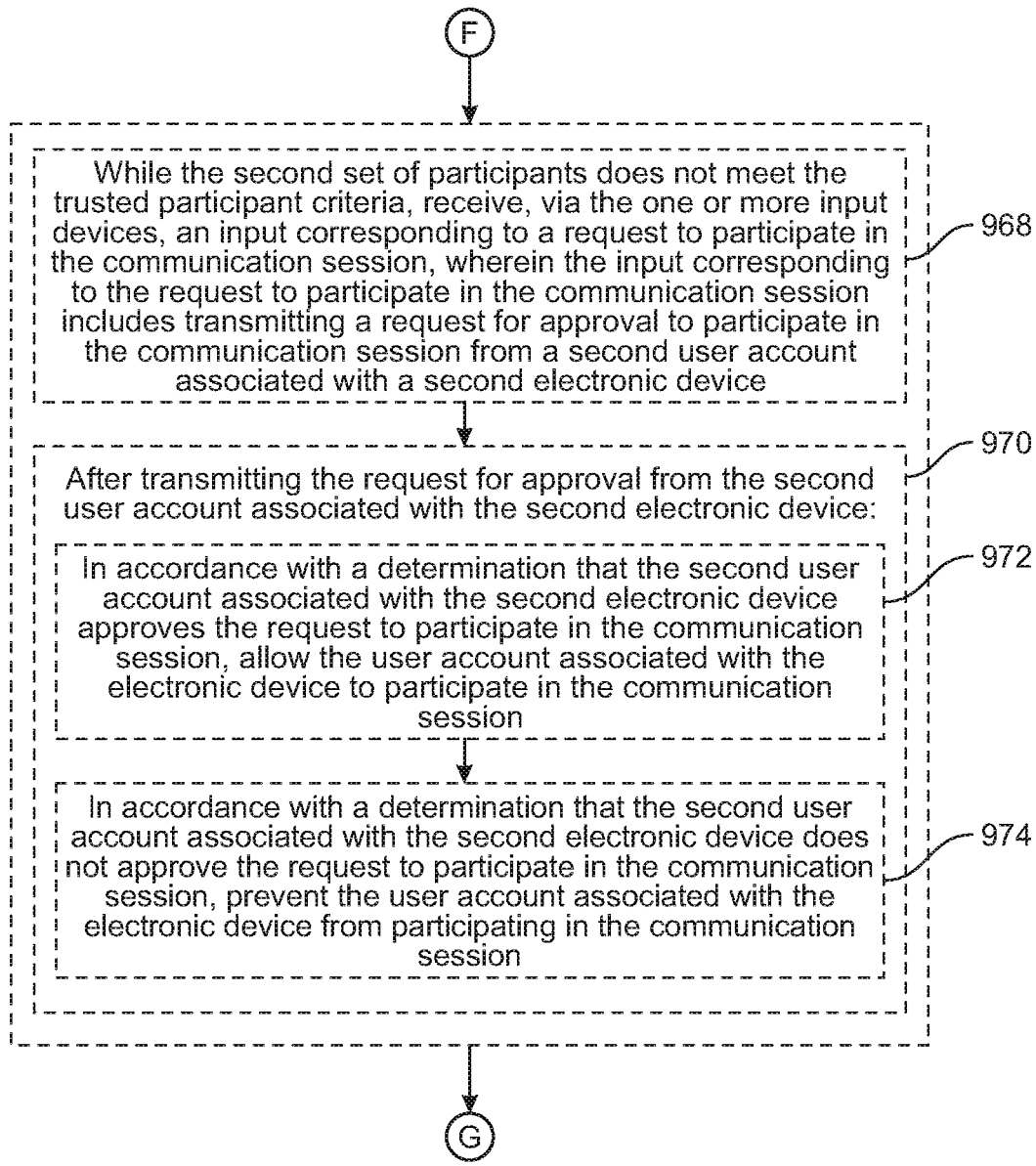
Figure 9H:
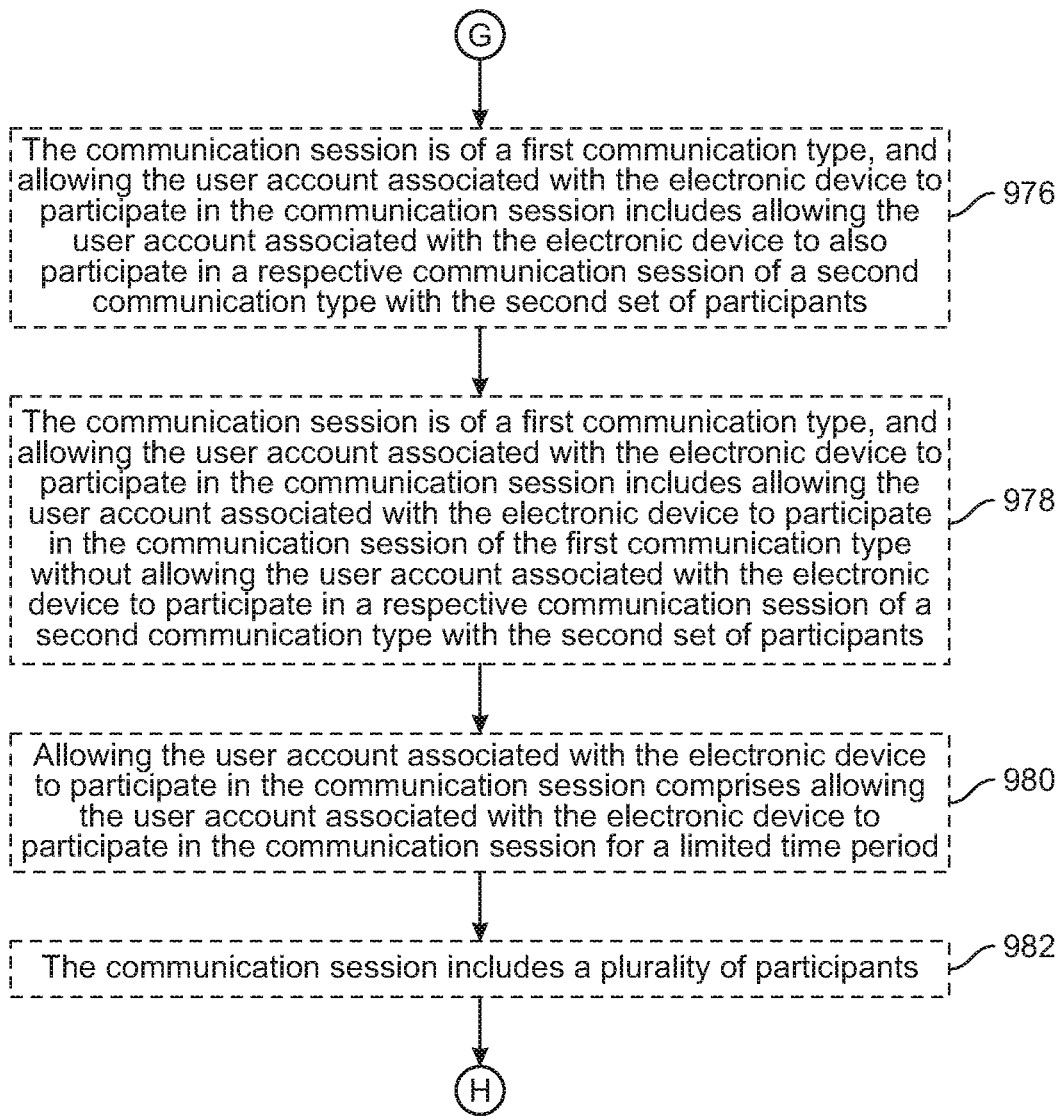
Figure 9I:
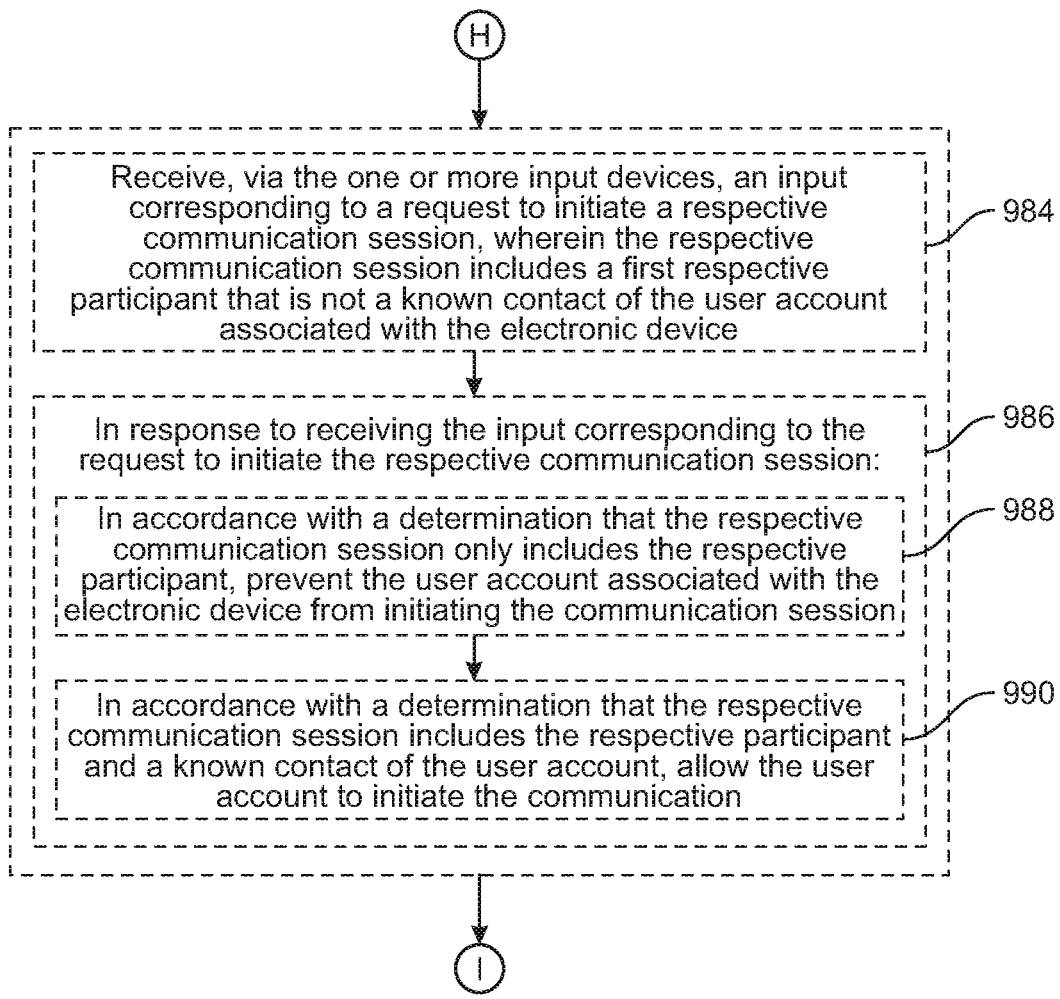
Figure 9J:
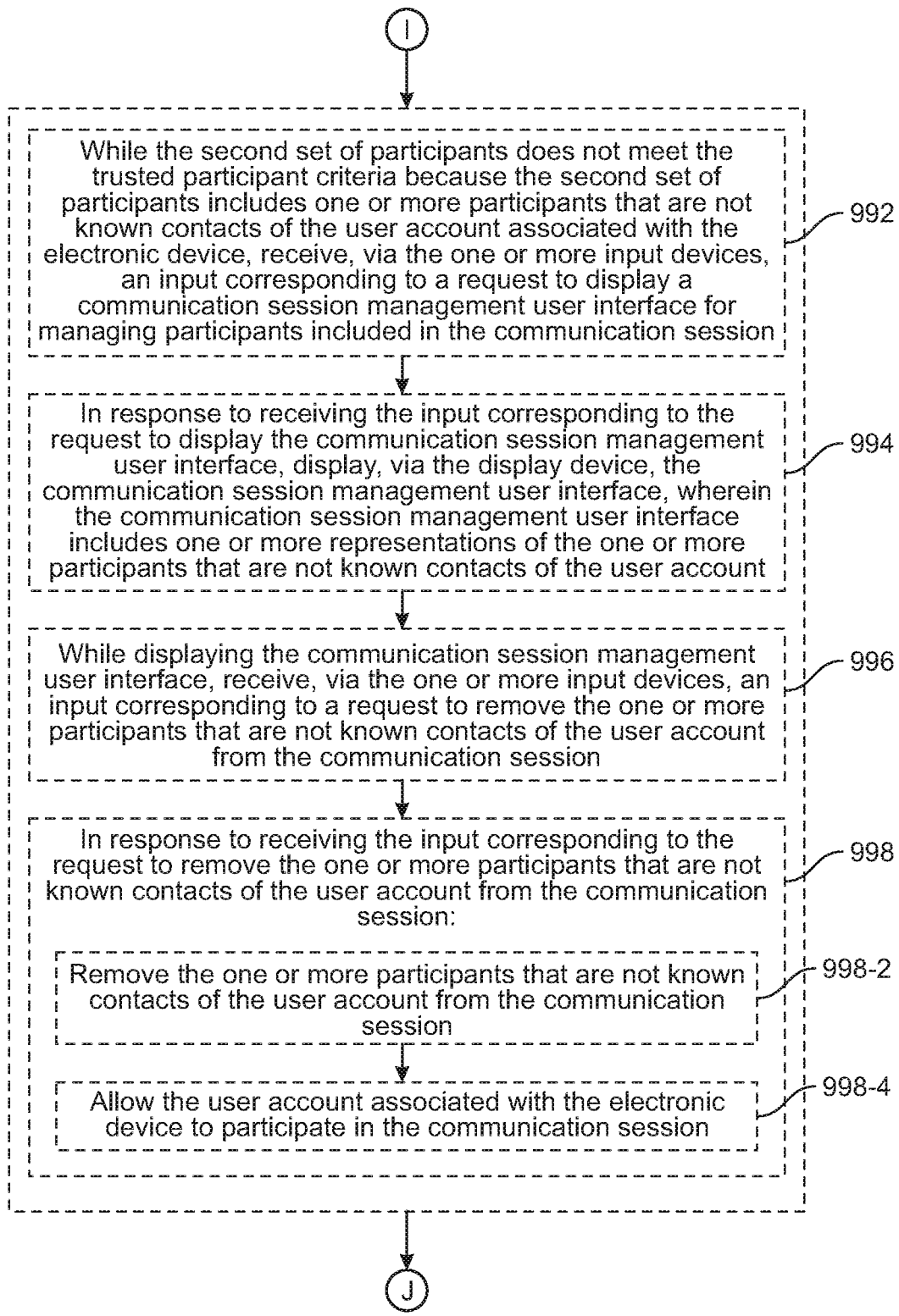
Figure 9K:
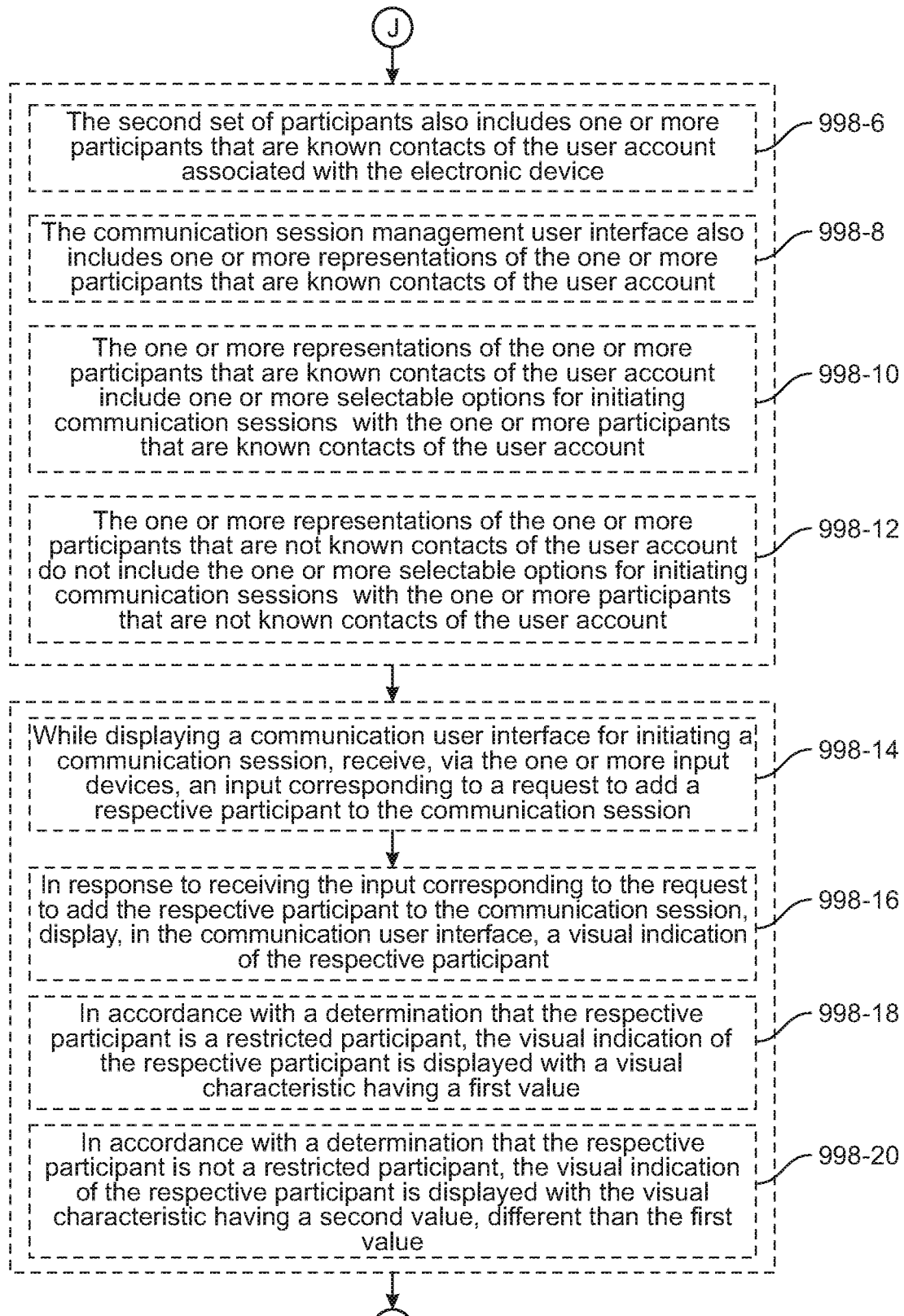
Figure 9L:
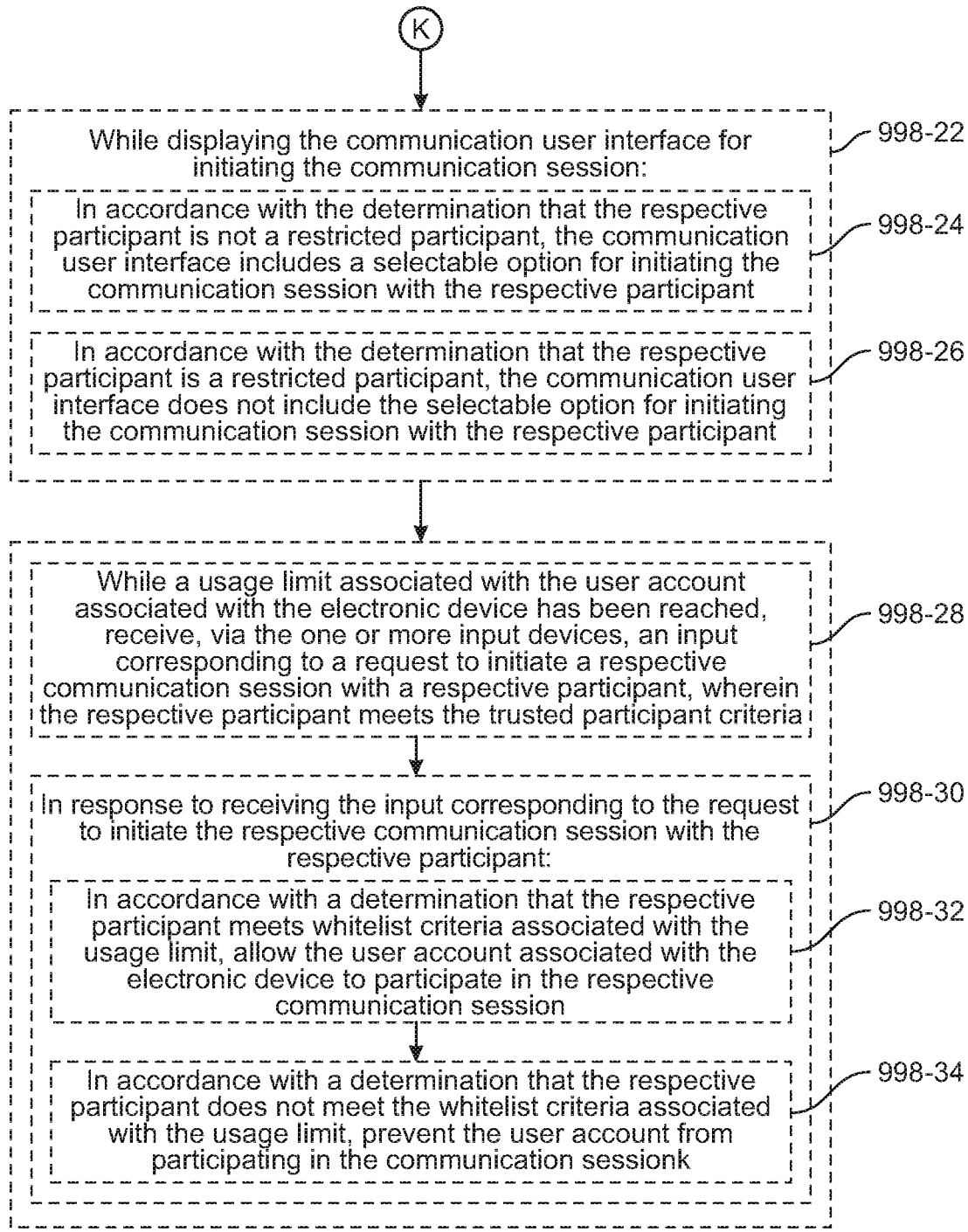

As shown in FIG. 8U, when the electronic device 500a loses access to the conversation, instead of presenting the content of the messaging conversation, such as in FIG. 8T, the electronic device 500a presents the splash screen 836 indicating that the supervised electronic device 500a is not allowed to access the conversation. The splash screen 836 includes a selectable option 838c that, when selected, causes the electronic device 500a to initiate a process to request permission from the supervising user account to allow the user account of the supervised electronic device 500a to add the unknown user as a contact in a manner similar to the manner described above with reference to FIGS. 8N-8Q. As shown in FIG. 8U, the user selects the selectable option 806a to view the messaging information user interface.

In response to the user's selection in FIG. 8U, the electronic device presents the messaging information user interface illustrated in FIG. 8V. The user interface includes representations 814d-f of the participants in the messaging conversation. As shown in FIG. 8V, the user swipes (e.g., with contact 803) over the representation 814f of the unknown user.

In response to the user input illustrated in FIG. 8V, the electronic device 500a presents an option 826 to remove the unknown user from the conversation, as shown in FIG. 8W. The user selects (e.g., with contact 803) the option 826 to remove the unknown user from the conversation.

As shown in FIG. 8X, in response to the user's selection in FIG. 8W, the electronic device 500a updates the messaging information user interface to no longer include the representation 814f of the unknown user. The user selects (e.g., with contact 803) the option 824 to dismiss the messaging information user interface and present the messaging conversation, as shown in FIG. 8Y.

FIG. 8Y illustrates the messaging conversation that is presented in response to the user's selection in FIG. 8X. Because the user removed the unknown contact from the conversation, the user account of the supervised electronic device is now able to view the conversation. Likewise, if any other user in the conversation had removed the unknown user from the conversation, the user account of the supervised electronic device 500a would gain access to the conversation.

Therefore, as shown in FIGS. 8S-8Y, the supervised electronic device 500a is able to restrict access to a conversation that includes an unknown user and able to regain access to the conversation when the unknown user is removed if the electronic device 500a is not allowed to communicate with unknown numbers, even in groups that include one or more known contacts of the user account of the supervised electronic device 500a. The user of the supervised electronic device 500a is also able to gain access to conversations by adding known contacts to conversations that only include unknown users if "allow introductions in groups" is on in a manner similar to the manner described above with reference to FIGS. 8S-8Y.

FIGS. 8Z-8CC illustrate ways in which the user account of the supervised electronic device 500a is able to initiate a video call with a known contact but is not able to initiate a video call with a group of users that includes an unknown user if "allow introductions in groups" is off.

FIG. 8Z illustrates a video call initiation user interface. The user interface includes a soft keyboard 828 at which the user is able to enter the name of one or more users with which to initiate a video call. The user selects (e.g., with contact 803) a key of the soft keyboard 828 to enter the name of a contact with which to initiate the video conference.

FIG. 8AA illustrates the video call initiation user interface after the user has entered the name of a contact 852a with which to initiate the video call. In response to the entry of the name of the contact, the electronic device 500a displays a selectable option 854a to initiate a voice call with the contact and a selectable option 854b to initiate a video call with the contact. The user selects (e.g., with contact 803) another key of the soft keyboard 828 to enter another user with which to initiate the call.

As shown in FIG. 8BB, in response to detecting entry of a phone number that is not a phone number of a known contact of the user account of the supervised electronic device 500a, the electronic device 500a deactivates the selectable options 854a-b because the electronic device 500a is not able to participate in calls that include unknown users. In some embodiments, selectable options 854a-b are alternatively not displayed in the user interface rather than being displayed but disabled. The user selects (e.g., with contact 803) a delete key of the soft keyboard 828 to delete the unknown number.

In FIG. 8CC, after the user deletes the unknown number, the supervised electronic device 500a presents the options 854a-b to call or video call the contact 852a. The supervised electronic device 500a is able to initiate the call because the other user participating in the call is a known contact of the user account of the supervised electronic device 500a.

Thus, as shown in FIGS. 8Z-8CC, the supervised electronic device 500a is able to initiate a video call with a known contact but not able to initiate a video call with a group of users that includes an unknown user if "allow introductions in groups" is off.

In FIG. 8CC, the user selects (e.g., with contact 803) the option 854b to initiate the video call with the contact 852a.

FIGS. 8DD-8FF illustrate ways the supervised electronic device 500a is unable to participate in a video call that includes unknown users when "allow introductions in groups" is off.

As shown in FIG. 8DD, in response to the user's selection in FIG. 8CC, the electronic device 500a initiates the video call and displays a video call user interface 856. The video call user interface includes options selectable to apply one or more video effects to the video (e.g., the option with the star), an option selectable to terminate the call (e.g., the option with the X), and an option selectable to view one or more additional options related to the video call (e.g., the option with " . . . "). While the user is participating in the video call, the electronic device 500a receives an indication 858 that unknown users have been added to the video call (e.g., by another user that is participating in the video call).

As shown in FIG. 8EE, in response to the indication 858 of the unknown users being added to the video call (e.g., by the other participant in the call), the supervised electronic device 500a is disconnected from the video call and displays a splash screen 836 indicating that the video call was disconnected because of the unknown users being added to the video call. The splash screen 836 includes an indication of one of the unknown users that was added to the video call, a selectable option 838d to initiate a process to request permission from the user account of a supervising electronic device 500b to video call one of the unknown numbers and a selectable option 838e to forgo requesting permission. The user selects (e.g., with contact 803) the option 838d to request permission to video call the unknown number.

As shown in FIG. 8FF, in response to the user's selection in FIG. 8EE, the supervised electronic device 500a presents a splash screen 836 including an indication of the next unknown user and the supervising electronic device 500b displays a notification 860a of the user's request. The splash screen 836 illustrated in FIG. 8FF is similar to the splash screen illustrated in FIG. 8EE, except it relates to a different unknown user that was added to the video call. In addition to displaying the notification 860a, the supervising electronic device 500b also displays a selectable option 860b to allow the user account of the supervised electronic device 500a to video call the user, a selectable option 860c to allow the user account of the supervised electronic device 500a to communicate with the user using any application (e.g., phone, messages, video, etc.), and an option 860d to forgo allowing the user account of the supervised electronic device 500a to communicate with the unknown user. If the supervising user selects the option 860b to allow the user account of the supervised electronic device 500a to participate in video calls with the user, the user account of the supervised electronic device 500a would be able to join a video call including the user but not able to communicate with the user by any other communication method (e.g., phone, messaging). If the supervising user selects the option 860c to allow the user account of the supervised electronic device 500a to communicate with the user with any communication method (e.g., video calling, phone, messaging), the user account of the supervised electronic device 500a would be able to communicate with the user with any communication method (e.g., video calling, phone, messaging). If the supervising user selects the option 860d to not allow the user account of the supervised electronic device 500a to communicate with the user, communication with the unknown user continues to be blocked.

Thus, as shown in FIGS. 8DD-8FF, the supervised electronic device 500a is unable to participate in a video call that includes unknown users when "allow introductions in groups" is off.

FIGS. 8GG-8JJ illustrate how the supervised electronic device 500a enforces a restriction against adding unknown users to conference calls when "allow introductions in groups" is off.

In FIG. 8GG, the supervised electronic device presents a contact card user interface 862 of a contact (e.g., "Mom"). The contact card user interface 862 includes an indication 866 that the user account of the supervised electronic device 500a is able to communicate with the contact during downtime and a selectable option 864 that, when selected, causes the electronic device 500a to initiate a phone call with the contact. The user selects (e.g., with contact 803) the option 864 to call the contact.

In FIG. 8HH, in response to the user's selection in FIG. 8GG, the supervised electronic device 500a initiates the phone call with the contact and displays a phone user interface 868. The phone use interface 868 includes an indication 870 of the other users on the phone call and an option 872 to add users to the phone call. As shown in FIG. 8HH, the user selects (e.g., with contact 803) the option 872 to add a user to the phone call.

In response to one or more inputs including the selection illustrated in FIG. 8HH, the supervised electronic device 500a displays a dialer user interface 874 at which the user is able to enter a phone number of the user to be added to the phone call, as shown in FIG. 8II. The dialer user interface 874 includes a soft keypad 878, an option 876a to add the phone number to the call, and an option 876b to cancel adding another user to the call. As shown in FIG. 8HH, the user selects (e.g., with contact 803) a key of the soft keypad 878 to enter the phone number of a user to add to the call.

After the user finishes entering the phone number, as shown in FIG. 8JJ, the electronic device 500a deactivates the option 876a to add the phone number to the call because the user account of the supervised electronic device 500a is not allowed to communicate with unknown users, even in groups that include known contacts of the user account of the supervised electronic device 500a. In some embodiments, the electronic device 500a ceases displaying the selectable option 876a to add the phone number to the call in response to detecting entry of a phone number that is not associated with a known contact of the user account of the supervised electronic device 500a.

Thus, as shown in FIGS. 8GG-8JJ, the supervised electronic device 500a is able to enforce a restriction against adding unknown users to conference calls when "allow introductions in groups" is off.

FIGS. 8KK-8OO illustrate ways in which the supervised electronic device 500a adds an unknown user to a conference call that includes a known contact of the user account of the supervised electronic device 500a when "allow introductions in groups" is on.

FIG. 8KK illustrates the contact card user interface 862 that was described above with reference to FIG. 8GG. The user selects (e.g., with contact 803) the option 864 to call the contact.

In response to the user's selection in FIG. 8KK, the supervised electronic device 500a presents the phone user interface 868 described above with reference to FIG. 8HH, as shown in FIG. 8LL. The user selects (e.g., with contact 803) the option 872 to add another user to the call.

In response to one or more inputs including the selection in FIG. 8LL, the electronic device 500a displays the dialer user interface 874 described above in FIG. 8II, as shown in FIG. 8MM. The user selects (e.g., with contact 803) one of the keys of soft keypad 878 to enter the phone number of the user to be added to the call.

In FIG. 8NN, after the user has entered the phone number 880 into the dialer user interface 874, the user selects (e.g., with contact 803) the option 876a to add the user to the phone call. In response to the user's selection in FIG. 8NN, the electronic device 500a adds the user to the phone call and presents the phone user interface 868 shown in FIG. 8OO. The phone user interface 868 includes an indication 870 of the contact and the unknown user participating in the phone call.

Because "allow introductions in groups" is on, the supervised electronic device 500a was able to add the unknown user to the call that also included the known contact. Thus, as shown in FIGS. 8KK-8OO, the supervised electronic device 500a is able to add an unknown user to a conference call that includes a known contact of the user account of the supervised electronic device 500a when "allow introductions in groups" is on.

FIGS. 8PP-8RR illustrate ways the supervised electronic device 500a enforces a restriction that prohibits the supervised electronic device 500a from communicating with unknown users outside of a group that includes a known contact when "allow introductions in groups" is on.

FIG. 8PP illustrates a dialer user interface 874 similar to the dialer user interface described above with reference to FIG. 8II. The user has entered a phone number 880 into the dialer user interface 874 (e.g., using soft keypad 878) and selects (e.g., with contact 803) the option 876a to call the user.

In response to the user's selection in FIG. 8QQ, instead of calling the user, the supervised electronic device 500a presents a splash screen 836 indicating that the user account of the supervised electronic device 500a is not able to make the call because the unknown number is not a contact of the user account of the supervised electronic device 500a. The splash screen 836 includes a selectable option 838h that, when selected, causes the electronic device 500a to request permission from a supervising user account to make the phone call. The user selects (e.g., with contact 803) the option 838h to request permission to make the phone call.

In response to one or more inputs including the selection illustrated in FIG. 8QQ, the supervised electronic device 500a transmits a request 882 to the user account of the supervising electronic device 500b for permission to make the phone call. As shown in FIG. 8RR, in response to receiving the request 882, the supervising electronic device 500b displays a notification 860e of the request and a plurality of selectable options 860f-h. In response to detecting selection of selectable option 860f, the supervising electronic device 500b transmits an authorization to the user account of the supervised electronic device 500a to call the unknown number for a predetermined amount of time (e.g., 15 minutes of authorization to call the unknown number). In response to receiving authorization to communicate with the unknown number for the predetermined amount of time, the supervised electronic device 500a is able to communicate with the unknown number, optionally without adding the unknown number as a contact, for the predetermined period of time and, after the predetermined period of time is over, is no longer allowed to communicate with the unknown number. In response to detecting selection of selectable option 860g, the supervising electronic device 500b transmits an authorization to the user account of the supervised electronic device 500a to call the unknown number permanently (e.g., a permanent authorization to call the unknown number). In response to receiving authorization to communicate with the unknown number, the supervised electronic device 500a is able to communicate with the unknown number any time after receiving the authorization, optionally without adding the unknown number as a contact. In response to detecting selection of selectable option 860h, the supervising electronic device 500b does not transmit an authorization to the user account of the supervised electronic device 500a to call the unknown number or transmits an indication that calling the unknown number is not allowed. If the supervised electronic device 500a does not receive authorization to call the unknown number, or if the supervised electronic device 500a receives an indication that communication with the unknown number is not allowed, the user account of the supervised electronic device 500a continues to be prevented from contacting the unknown number.

Thus, as shown in FIGS. 8PP-8RR, the supervised electronic device 500a is able to enforce a restriction that prohibits the supervised electronic device 500a from communicating with unknown users outside of a group that includes a known contact when "allow introductions in groups" is on.

FIGS. 8SS-8WW illustrate ways the supervised electronic device 500a enforces communication restrictions during downtime.

FIG. 8SS illustrates a messaging user interface during downtime of the supervised electronic device 500a. Downtime is a predetermined period of time during which additional restrictions, including communication restrictions, on the supervised electronic device 500a are enforced. Representations 804a and 804d of messaging conversations with one or more downtime contacts include previews 840a and 840d of the last message sent in the messaging conversation to or from the user account of the supervised electronic device 500a. Representations 804b, 804c, 804e, 804g of messaging conversations with one or more contacts that are not downtime contacts (e.g., that include at least one contact that is not a downtime contact) do not include previews of the conversations because the electronic device 500a does not have access to those conversations during device downtime. The user selects (e.g., with contact 803) a representation 804d of a conversation with a downtime contact.

In response to the user's selection in FIG. 8SS, the supervised electronic device 500a presents the messaging conversation with the contact illustrated in FIG. 8TT because the supervised electronic device 500a is able to access the messaging conversation with the downtime contact during downtime. The user enters a message and selects (e.g., with contact 803) the option 810 to send the message.

As shown in FIG. 8UU, in response to the user's selection in FIG. 8TT, the electronic device 500a transmits the message 808p to the downtime contact. The user selects (e.g., with contact 803) the option 812 to navigate backward to the messaging user interface illustrated in FIG. 8SS, as shown in FIG. 8VV. In FIG. 8VV, the user selects (e.g., with contact 803) the representation 804g of a conversation with a contact that is not a downtime contact of the user account of the supervised electronic device 500a.

As shown in FIG. 8WW, the supervised electronic device 500a presents a splash screen 836 in response to the user's selection in FIG. 8VV instead of presenting the content of the messaging conversation because the user account of the supervised electronic device 500a does not have access to the messaging conversation during downtime because the other participant in the messaging conversation is not a downtime contact. The splash screen 836 includes an option 838i that is selectable to request permission from the user account of the supervising electronic device 500b to communicate with the contact during downtime, in a manner similar to the manner described above with reference to FIGS. 8EE-8FF.

Thus, as shown in FIGS. 8SS-8WW, the supervised electronic device 500a is able to enforce communication restrictions during downtime.

FIGS. 9A-9L are flow diagrams illustrating a method of enforcing one or more communication restrictions configured by a supervising electronic device and/or supervising user account in accordance with some embodiments of the disclosure. The method 900 is optionally performed at an electronic device such as device 100, device 300, device 500 as described above with reference to FIGS. 1A-1B, 2-3, 4A-4B and 5A-5H. Some operations in method 900 are, optionally combined and/or order of some operations is, optionally, changed.

In some embodiments, such as in FIG. 8B, an electronic device 500a in communication with a display device and one or more input devices (e.g., a mobile device (e.g., a tablet, a smartphone, a media player, or a wearable device) including a touch screen or a computer including one or more of a keyboard, mouse, trackpad, and display/touch screen) allows (902) a user account associated with the electronic device to participate in the communication session while a communication session (e.g., a video chat, audio chat, text-based chat, or a combination) that includes a first set of participants 806a meets trusted participant criteria, wherein the trusted participant criteria is based on a trust level associated with participants in the first set of participants (e.g., one or more of the participants in the first set of participants are users with whom the electronic device is permitted to communicate). In some embodiments, the electronic device is allowed to communicate with a predetermined group of approved users and is not allowed to communicate with a predetermined group of restricted users, such as in method 700. Optionally, the electronic device is able to communicate with a group of users if all of the users in the group are approved users. In some embodiments, the electronic device is able to communicate with a group of users as long as at least one of the users in the group of users is an approved user.

In some embodiments, such as in FIG. 8G, after the user account associated with the electronic device has participated in the communication session, the electronic device 500 detects (904) a change in participants 814a, 814b, and 814c in the communication session from a first set of participants to a second set of participants, wherein the second set of participants is different from the first set of participants. In some embodiments, the first set of participants and the second set of participants both include the user account associated with the electronic device as an authorized participant. In some embodiments, the second user adds one or more users to the ongoing communication and/or removes one or more users from the ongoing communication. For example, after initiating transfer of a message or initiating a phone call, the electronic device detects an input to include an additional user in the messaging conversation or phone call. In some embodiments, a user associated with a different electronic device changes the users included in the communication. As another example, a user associated with another different electronic device changes the users included in the communication without removing the user of the electronic device.

In some embodiments, such as in FIG. 8I, in response to detecting the change in participants in the conversation from the first set of participants to the second set of participants (906), in accordance with a determination that the second set of participants meets the trusted participant criteria, the electronic device 500 continues (908) to allow the user account associated with the electronic device to participate in the communication session (e.g., the electronic device is permitted to contact all of the users included in the second set of users and/or is permitted to contact at least one of the users included in the second set of users). For example, if the electronic device initiates a phone call during downtime with one or more contacts with whom the electronic device is able to communicate during downtime and detects that another user with whom the electronic device is able to communicate during downtime has been added to the call, then the electronic device continues the phone call.

In some embodiments, such as in FIG. 8L, in response to detecting the change in participants in the conversation from the first set of participants to the second set of participants (906), in accordance with a determination that the second set of participants does not meet the trusted participant criteria, the electronic device 500 restricts (910) the user account associated with the electronic device from participating in the communication session (e.g., while the participants in the communication session do not meet the trusted participant criteria). In some embodiments, the second set of users includes a user with whom communication is restricted and/or the second set of users includes a user with whom communication is restricted without also including a user with whom communication is not restricted. In some embodiments, the electronic device is not able to communicate with users that are not saved as (or otherwise accessible as, such as via a cloud account) contacts on the electronic device. In some embodiments, the electronic device is not able to communicate with users during downtime (e.g., a period of time when one or more additional restrictions are enforced) unless those users are on a list of users with whom communication is permitted during downtime. For example, if the electronic device initiates a messaging conversation with one or more contacts of the electronic device and detects that a user that is not a contact of the electronic device has been added to the messaging conversation, the electronic device is no longer able to view the messages in the messaging conversation because the user that is not a contact has been added.

The above-described manner of allowing the electronic device to access the conversation when the second set of participants meet the trusted participant criteria, and block access to the conversation when this is not the case, allows the electronic device to control access to the conversation with the modified set of users based on usage controls in effect on the electronic device, which simplifies the interaction between the user and the second electronic device and enhances the operability of the electronic device and makes the user-device interface more efficient (e.g., by automatically applying usage controls to changing user participation in an ongoing communication), which additionally reduces power usage and improves battery life of the electronic device by enabling the user to use the electronic device more quickly and efficiently.

In some embodiments, such as in FIG. 8H, a respective set of participants meets the trusted participant criteria when at least one participant in the respective set of participants is a known contact of the user account associated with the electronic device, and does not meet the trusted participant criteria when every participant in the respective set of participants is not a known contact of the user account (912). In some embodiments, the user account of the electronic device is able to communicate with one or more permitted users and is not able to communicate with one or more restricted users, such as in method 700. Optionally, the user account of the electronic device is able to send and receive communications with a group that includes at least one permitted user. For example, the user account of the electronic device is permitted to communicate with one or more users that are contacts associated with a user account of the user of the electronic device and not permitted to communicate with users that are not contacts associated with the user account. As another example, the user account of the electronic device is permitted to communicate in a group that includes at least one user that is a contact associated with the user account, even if one or more other participants in the group are not contacts associated with the user account.

The above-described manner of allowing the electronic device to access the communication if one participant is a known contact allows the electronic device to access the communication without requesting access, which simplifies the interaction between the user and the electronic device and enhances the operability of the electronic device and makes the user-device interface more efficient (e.g., by reducing the number of inputs needed to access the conversation), which additionally reduces power usage and improves battery life of the electronic device by enabling the user to use the electronic device more quickly and efficiently.

In some embodiments, such as in FIG. 8L, the change 834 in participants is removing a first respective contact that is a known contact of the user account associated with the electronic device from the communication session, wherein the second set of contacts does not include a known contact of the user account, and the second set of participants does not meet the trusted participant criteria (914). Optionally, the electronic device is participating in a conversation that includes one contact with whom the user account of the electronic device is allowed to communicate and one or more other users with whom the user account of the electronic device is not allowed to communicate outside of a group conversation including an allowed contact. Optionally, in response to determining that the participants no longer include at least one allowed contact (e.g., the last known contact is removed from the group), the electronic device prevents the user from accessing the group communication.

In some embodiments, such as in FIG. 8R, after restricting the user account associated with the electronic device from participating in the communication session, the electronic device 500 detects (916) a second change 848 in participants in the communication session from the second set of participants to a third set of participants, the second change including adding a second respective contact that is a known contact of the user account to the communication session. Optionally, the electronic device is participating in and restricting access to a group communication with participants with whom the user account of the electronic device is not allowed to communicate outside of a group communication that includes at least one known contact. Optionally, the electronic device detects that a known contact is added to the group communication, either by the user account of the electronic device or by another user in the group.

In some embodiments, such as in FIG. 8R, in response to detecting the second change in participants in the communication session, allowing the user account to participate in the communication session (918). In some embodiments, if the user account of the electronic device is allowed to communicate with unknown contacts within groups that include at least one known contact, in response to detecting that the participants in a group changes from only unknown contacts to including at least one known contact, the electronic device allows the user to access the communication. For example, the electronic device is participating in a messaging conversation that includes a known contact and two unknown contacts. In the example, the known contact is removed from the conversation, which causes the user account of the electronic device to lose access to the messaging conversation. For example, in response to determining that a known contact (the same or a different known contact as before) is added to the conversation with the two unknown contacts, the user account of the electronic device is able to access the conversation again. In some embodiments, the electronic device receives one or more inputs for modifying the conversation participants. Optionally, one or more other conversation participants modify the conversation participants.

The above-described manner of updating the electronic device's access to the communication when the participants in the communication change allows the electronic device to automatically regain access to the communication when a known contact is added to the participants, which simplifies the interaction between the user and the electronic device and enhances the operability of the electronic device and makes the user-device interface more efficient (e.g., by reducing the number of inputs needed to access the communication once the known contact is added to the communication), which additionally reduces power usage and improves battery life of the electronic device by enabling the user to use the electronic device more quickly and efficiently.

In some embodiments, such as in FIG. 8S, a respective set of participants meets the trusted participant criteria when every participant in the respective set of participants is a known contact of the user account associated with the electronic device 500a, and does not meet the trusted participant criteria when at least one participant in the respective set of participants is not a known contact of the user account, such as in FIG. 8U (920). In some embodiments, the user account of the electronic device is permitted to communicate with one or more allowed contacts and is not allowed to communicate with one or more users with whom communication is restricted as described above with reference to method 700. For example, the user account of the electronic device is able to communicate with one or more specific contacts designated by another electronic device (e.g., a managing user account, a parent in the same family as a child device) and not able to communicate with any other users. Optionally, the user account of the electronic device is permitted to communicate with groups that only include participants that are allowed or known contacts and is not permitted to communicate with groups that include one or more restricted or unknown contacts.

The above-described manner of automatically updating the electronic device's access to the communication allows the electronic device to continue to enforce the communication restrictions without additional input from the user, which simplifies the interaction between the user and the electronic device and enhances the operability of the electronic device and makes the user-device interface more efficient (e.g., by reducing the number of inputs needed to operate the electronic device when restrictions are enforced), which additionally reduces power usage and improves battery life of the electronic device by enabling the user to use the electronic device more quickly and efficiently.

In some embodiments, such as in FIG. 8T, the change 850 in participants is adding a first respective contact that is not a known contact of the user account associated with the electronic device 500a to the communication session, and the second set of participants does not meet the trusted participant criteria (922). Optionally, the user account of the electronic device is included in a group communication with two allowed contacts and is able to participate in the communication. In some embodiments, in response to detecting that a user with whom communication is restricted is added to the group, the electronic device no longer allows access to the communication. For example, one of the other participants adds the user with whom communication is restricted to the group communication.

In some embodiments, such as in FIG. 8W, after restricting the user account associated with the electronic device from participating in the communication session, the electronic device 500 detects (924) a second change in participants in the communication session from the second set of participants to a third set of participants, the second change including removing the first respective contact 814f from the communication session (e.g., the user account of the electronic device is included in a group communication that includes a user with whom communication is restricted and does not allow the user to access the communication). Optionally, the electronic device receives an input to remove the user with whom communication is restricted or another participant in the group removes the user with whom communication is restricted.

In some embodiments, such as in FIG. 8Y, in response to detecting the second change in participants in the communication session, the electronic device 500 allows (926) the user account to participate in the communication session. In some embodiments, in response to detecting removal of the unknown contact from the group, the electronic device allows the user to access the conversation. For example, the electronic device participates in a messaging conversation with two known contacts. As an example, an unknown contact is added to the conversation and, in response, the electronic device prevents the user of the electronic device from accessing the messaging conversation. In this example, in response to detecting that the unknown contact is added to the conversation, the electronic device prevents the user from accessing the conversation. As another example, in response to detecting removal of the unknown contact from the conversation and in response to detecting that there are no unknown contacts participating in the conversation, the electronic device allows the user to access the conversation.

The above-described manner of updating the electronic device's ability to access the communication when the unknown user is removed from the communication allows the electronic device to access the communication without requesting access once the unknown user is removed, which simplifies the interaction between the user and the electronic device and enhances the operability of the electronic device and makes the user-device interface more efficient (e.g., by reducing the number of inputs needed to access the conversation when the updated participants meet the trusted participant criteria), which additionally reduces power usage and improves battery life of the electronic device by enabling the user to use the electronic device more quickly and efficiently.

In some embodiments, while a respective set of participants meets the trusted participant criteria for a first respective communication session of a first communication type, such as in FIG. 8Y, the respective set of participants meets the trusted participant criteria for a second respective communication session of a second communication type, different than the first communication type, such as in FIG. 8OO (928). Optionally, if the user account of the electronic device is allowed to communicate with a respective set of participants using a first communication type, it is also allowed to communicate with the respective set of participants using a second communication type. Optionally, if the user account of the electronic device is allowed to communicate with a respective set of participants, the user account of the electronic device is able to communicate with the respective set of participants using phone, video calling, text messaging, enhanced data-based messaging, and a walkie-talkie application.

In some embodiments, while the respective set of participants does not meet the trusted participant criteria for the first respective communication session of the first communication type, such as in FIG. 8EE, the respective set of participants does not meet the trusted participant criteria for the second respective communication session of the second communication type, such as in FIG. 8U (930). In some embodiments, if the user account of the electronic device is not allowed to communicate with a respective set of participants using a first communication type, it is also not allowed to communicate with the respective set of participants using a second communication type. Optionally, if the user account of the electronic device is not allowed to communicate with a respective set of participants, the user account of the electronic device is not able to communicate with the respective set of participants using phone, video calling, text messaging, enhanced data-based messaging, or a walkie-talkie application.

The above-described manner of applying the trusted participant criteria to multiple communication types allows the electronic device to allow and deny access to communications in a manner that is consistent across communication types, which simplifies the interaction between the user and the electronic device and enhances the operability of the electronic device and makes the user-device interface more efficient (e.g., by reducing the number of inputs the user will need to enter to determine whether or not the second electronic device will be able to access a respective communication), which additionally reduces power usage and improves battery life of the electronic device by enabling the user to use the electronic device more quickly and efficiently.

In some embodiments, such as in FIG. 8T, the change in participants in the communication session includes addition 850 of a respective participant to the communication session (932). In some embodiments, the electronic device adds the respective participant to the communication session. In some embodiments, another participant in the communication session adds the respective participant to the communication session. Optionally, if the trusted participant criteria are met after the addition of the respective participant, the user account of the electronic device is able to access the communication session. For example, the respective participant is a contact associated with a user account of the electronic device with whom the electronic device is allowed to communicate. In some embodiments, if the trusted participant criteria are not met after the addition of the respective participant, the user account of the electronic device is not able to access the communication. For example, if the user account of the electronic device is not able to communicate in groups that include a participant that is not a contact with whom the user account of the electronic device is allowed to communicate, and the respective user is a contact with whom the user account of the electronic device is not allowed to communicate, in response to the respective participant being added to the communication, the user account of the electronic device is not allowed to access the communication.

The above-described manner of updating the ability for the electronic device to access a communication when a participant is added to a communication allows the electronic device to automatically update whether or not the electronic device is able to access the communication without a user input for updating whether or not the electronic device is able to access the conversation, which simplifies the interaction between the user and the electronic device and enhances the operability of the electronic device and makes the user-device interface more efficient (e.g., by reducing the number of inputs needed by the user to operate the electronic device while restrictions are enforced), which additionally reduces power usage and improves battery life of the electronic device by enabling the user to use the electronic device more quickly and efficiently.

In some embodiments, such as in FIG. 8L, the change in participants in the communication session includes removal of a respective participant from the communication session (934). In some embodiments, the electronic device removes the respective participant from the communication session. In some embodiments, another participant in the communication session removes the respective participant from the communication session. Optionally, if the trusted participant criteria are met after the removal of the respective participant, the user account of the electronic device is able to access the communication session. For example, after removal of the respective participant, all of the remaining participants are contacts of the user account of the electronic device with whom the user account of the electronic device is allowed to communicate. In some embodiments, if the trusted participant criteria are not met after the removal of the respective participant, the user account of the electronic device is not able to access the communication. For example, if the user account of the electronic device is not able to communicate in groups that do not include a participant that is a contact with whom the user account of the electronic device is allowed to communicate and none of the remaining participants are contacts with whom the user account of the electronic device is allowed to communicate, the user account of the electronic device is not allowed to access the communication.

The above-described manner of updating the ability for the electronic device to access a communication when a participant is removed from a communication allows the electronic device to automatically update whether or not the electronic device is able to access the communication without a user input for updating whether or not the electronic device is able to access the conversation, which simplifies the interaction between the user and the electronic device and enhances the operability of the electronic device and makes the user-device interface more efficient (e.g., by reducing the number of inputs needed by the user to operate the electronic device while restrictions are enforced), which additionally reduces power usage and improves battery life of the electronic device by enabling the user to use the electronic device more quickly and efficiently.

In some embodiments, such as in FIG. 8KK participating in the communication session includes initiating the communication session (e.g., selection of option 864 illustrated in FIG. 8KK) or receiving at least a portion of a communication from the communication session (936). In some embodiments, the electronic device initiates the communication session with the respective set of participants. In some embodiments, another participant initiates the communication session with the electronic device and the other participants in the communication session. Optionally, the respective set of participants includes at least one user that is a known contact with whom the user account of the electronic device is allowed to communicate and at least one user that is a contact that the user account of the electronic device is not allowed to communicate with outside of groups that include at least one known contact.

The above-described manner of automatically applying the appropriate restrictions regardless of whether the electronic device initiates or receives the communication allows the electronic device to operate with the restrictions without a user input for requesting access the conversation if access is allowed, which simplifies the interaction between the user and the electronic device and enhances the operability of the electronic device and makes the user-device interface more efficient (e.g., by reducing the number of inputs needed by the user to operate the electronic device while restrictions are enforced), which additionally reduces power usage and improves battery life of the electronic device by enabling the user to use the electronic device more quickly and efficiently.

In some embodiments, such as in FIG. 8M the electronic device 500 displays (938), via the display device, a communication user interface that includes a representation 804 of the communication session (e.g., a messages user interface that includes a representation of a messaging conversation). The messaging conversation optionally includes an indication of the participants in the conversation. The messages user interface optionally also includes representations of other communications with other users in which the user of the electronic device is participating.

In some embodiments, such as in FIG. 8M, in accordance with the determination that the second set of participants meets the trusted participant criteria, the representation 804a of the communication session includes a preview 840a of content of the communication session (940) (e.g., an indication of a messaging conversation includes text of the last message in the conversation that was sent by the user account of the electronic device or another participant in the conversation).

In some embodiments, such as in FIG. 8M, in accordance with the determination that the second set of participants does not meet the trusted participant criteria, the representation 804f of the communication session does not include the preview of the content of the communication session (942) (e.g., an indication of a messaging conversation does not include the text of the last message in the conversation because the user account of the electronic device does not have access to the conversation).

The above-described manner of presenting a preview of allowed communications and forgoing presenting a preview of a blocked communication allows the electronic device to indicate to the user whether or not the electronic device is able to access the communication before the user enters an input to access the communication, which simplifies the interaction between the user and the electronic device and enhances the operability of the electronic device and makes the user-device interface more efficient (e.g., by reducing the number of inputs needed to determine whether or not the electronic device is able to access the communication), which additionally reduces power usage and improves battery life of the electronic device by enabling the user to use the electronic device more quickly and efficiently.

In some embodiments, such as in FIG. 8M, while displaying the communication user interface, the electronic device 500 receives (944), via the one or more input devices, input directed to the representation 804f of the communication session (e.g., the user selects the representation of the communication session).

In some embodiments, in response to receiving the input directed to the representation 804e of the communication session (946), such as in FIG. 8A, in accordance with the determination that the second set of participants meets the trusted participant criteria, the electronic device 500 displays (948), via the display device, the content of the communication session, such as in FIG. 8B, (e.g., the user account of the electronic device has access to the communication session). In some embodiments, in response to detecting selection of a representation of a messaging conversation to which the electronic device has access, the electronic device presents the messages in the messaging conversation.

In some embodiments, in response to receiving the input directed to the representation 804f of the communication session (946), such as in FIG. 8M, in accordance with the determination that the second set of participants does not meet the trusted participant criteria, the electronic device 500 displays (950) displaying, via the display device, a user interface 836 that includes information about one or more participants in the second set of participants that are restricted, and from which the one or more participants in the second set of participants can be authorized (e.g., by asking a supervisor (e.g., parent/guardian, organizer) remotely or entering passcode locally), without displaying the content of the communication session, such as in FIG. 8N (e.g., the user account of the electronic device does not have access to the messaging conversation). In some embodiments, the user interface includes an indication of the reason why the user account of the electronic device is not able to access the communication. In some embodiments, the user interface indicates one or more participants of the communication that cause the set of participants not to meet the trusted participant criteria. For example, if the user account of the electronic device is not permitted to communicate with users that are not contacts of the electronic device, the user interface indicates which participants are not contacts of the user account of the electronic device. In some embodiments, the user interface includes a selectable option that, when selected, causes the electronic device to initiate a process to request access to the communication, such as by adding the one or more unknown participants as contacts of the user account of the electronic device. Optionally, the electronic device transmits a request to a supervising electronic device that is able to set and manage restrictions of the user account of the electronic device, such as the parent of a child or an organizer of another group of user accounts. In some embodiments, the electronic device displays a user interface from which the electronic device is able to detect local authorization (e.g., a password, passcode, biometric, or image of a face) allowing the user account of the electronic device to view the communication.

The above-described manner of presenting the user interface from which the second set of participants can be authorized in response to an input requesting access to the communication allows the electronic device to present the user with an option to request access to the communication while informing the user that access is not permitted, which simplifies the interaction between the user and the electronic device and enhances the operability of the electronic device and makes the user-device interface more efficient (e.g., by reducing the number of inputs needed to request access to the communication), which additionally reduces power usage and improves battery life of the electronic device by enabling the user to use the electronic device more quickly and efficiently.

In some embodiments, such as in FIG. 8N, while the second set of participants does not meet the trusted participant criteria (e.g., the electronic device does not have access to the communication session), the electronic device 500 receives (952), via the one or more input devices, an input corresponding to a request to participate in the communication session, such as selection of option 838a (e.g., an input selecting a representation of the communication session). In some embodiments, the electronic device detects selection of a representation of a messaging conversation to which the user account of the electronic device does not have access. Optionally, in response to detecting selection of a representation of a messaging conversation to which the user account of the electronic device does have access, the electronic device presents a user interface that includes the messages in the conversation and one or more user interface elements (e.g., a text entry field, an option to send a voice message, an option to send an image, etc.) for sending a message in the conversation.

In some embodiments, such as in FIG. 8N, in response to receiving the input corresponding to the request to participate in the communication session, the electronic device 500 presents (954) a user interface 836 that includes information about one or more participants in the second set of participants that are restricted, and a selectable option 838a and 838b that is selectable to initiate a process to add the one or more participants as known contacts to the user account associated with the electronic device. In some embodiments, the user interface includes one or more selectable options associated with a respective participant that is selectable to initiate a process to request to add the respective participant as a known contact to the user account associated with the electronic device. For example, the electronic device presents a splash screen indicating one or more user accounts (e.g., phone numbers, e-mail addresses) of participants that are not known contacts to the user account with one or more selectable options to add the participants as contacts of the user account (such as by entering a passcode locally, or requesting remote approval from an organizer account).

The above-described manner of presenting a selectable option to add one or more participants as contacts of the user account of the electronic device in the user interface to request access to the communication allows the electronic device to reduce the number of inputs needed to add the contacts, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, such as in FIG. 8Q, the process to add the one or more participants as known contacts to the user account includes inputting authentication credentials 802c for an authorized user (e.g., a user account of a parent or other individual in a supervisory role with respect to the user account) before the one or more participants can be added as known contacts to the user account (956). In some embodiments, the electronic device presents a user interface at which a user is able to enter credentials (e.g., password, passcode, biometrics, an image of a face) that enable the user account of the electronic device to add one or more participants as contacts of the user account. For example, a parent/guardian is able to enter a passcode unknown to a child to whom the electronic device belongs to enable the child to add one or more contacts to the child's user account.

The above-described manner of adding the contacts in response to receiving the authentication credentials allows the electronic device to communicate with the contacts in the future without requiring authorization for each communication, which simplifies the interaction between the user and the electronic device and enhances the operability of the electronic device and makes the user-device interface more efficient (e.g., by reducing the number of inputs needed to communicate with the contacts), which additionally reduces power usage and improves battery life of the electronic device by enabling the user to use the electronic device more quickly and efficiently.

In some embodiments, such as in FIG. 8N, the second set of participants includes a first restricted participant and a second restricted participant, and the user interface that includes information about the first and second restricted participants in the second set of participants includes a first selectable option 838a that is selectable to initiate a process to add the first restricted participant to the user account as a known contact, and a second selectable option 838b that is selectable to initiate a process to add the second restricted participant to the user account as a known contact (958). In some embodiments, in response to detecting selection of the first selectable option, the electronic device initiates a process to add the first restricted participant as a contact of the user account, including requesting permission from an organizer (e.g., parent/guardian, administrator, manager, etc. of a group account to which the electronic device belongs) remotely or locally to add the first participant as a contact. In some embodiments, in response to detecting selection of the second selectable option, the electronic device initiates a process to add the second restricted participant as a contact of the user account, including requesting permission from an organizer (e.g., parent/guardian, administrator, manager, etc. of a group account to which the electronic device belongs) remotely or locally to add the second participant as a contact.

The above-described manner of concurrently displaying the first and second selectable options allows the electronic device to enable the user to add the contacts in an order of the user's choosing while having access to both the first and second options, which simplifies the interaction between the user and the electronic device and enhances the operability of the electronic device and makes the user-device interface more efficient (e.g., by reducing the number of inputs needed to add the contacts in the user's chosen order), which additionally reduces power usage and improves battery life of the electronic device by enabling the user to use the electronic device more quickly and efficiently.

In some embodiments, such as in FIG. 8EE, the second set of participants includes a first restricted participant and a second restricted participant, the user interface includes a first selectable option 838d that is selectable to initiate a process to add the first restricted participant to the user account as a known contact, and a second user interface, different than the user interface, such as in FIG. 8FF, includes a second selectable option 838f that is selectable to initiate a process to add the second restricted participant to the user account as a known contact (960). In some embodiments, the electronic device first presents a user interface associated with the first restricted participant from which the electronic device is able to request to add the first restricted participant as a contact. The user is optionally able to request to add the contact or to skip to the next user interface. In some embodiments, after ceasing to display the user interface associated with the first restricted participant, the electronic device presents a user interface associated with the second restricted participant from which the electronic device is able to request to add the second restricted participant as a contact.

The above-described manner of presenting separate user interfaces for the first and second options allows the electronic device to present the indications of the restricted participants in user interfaces that are less cluttered and easier to read, which simplifies the interaction between the user and the electronic device and enhances the operability of the electronic device and makes the user-device interface more efficient (e.g., by reducing the amount of time it takes the user to determine how to add each contact), which additionally reduces power usage and improves battery life of the electronic device by enabling the user to use the electronic device more quickly and efficiently.

In some embodiments, such as in FIG. 8O, the process to add the one or more participants as known contacts to the user account associated with the electronic device includes (962) requiring a user of the electronic device to input, to the electronic device, contact information 842c for the one or more participants (964) (e.g., a name of the participant which is to be associated with contact information (e.g., phone number, email address, etc.) of the participant). In some embodiments, the contact information includes a user account from which the electronic device received a communication. Optionally, the user is able to add additional contact information to the contact other than the user account from which the electronic device received a communication.

In some embodiments, the process to add the one or more participants as known contacts to the user account associated with the electronic device includes (962) after receiving the contact information for the one or more participants, transmitting, to a second user account, the contact information for the one or more participants for approval or disapproval by the second user account (966), such as by detecting selection of option 802b in FIG. 8Q. In some embodiments, the second user account (e.g., the organizer account) is able to review the contact information before approving or declining to approve the addition of the participant as a contact of the user account of the electronic device.

The above-described manner of entering the contact information before transmitting the request for approval of the contact information allows the electronic device to transmit as much information as would be needed by the organizer account to be able to approve/disapprove of the addition, which simplifies the interaction between the user and the electronic device and enhances the operability of the electronic device and makes the user-device interface more efficient (e.g., by reducing the number of back and forth communications between the user account and the organizer account in getting approval), which additionally reduces power usage and improves battery life of the electronic device by enabling the user to use the electronic device more quickly and efficiently.

In some embodiments, such as in FIG. 8FF, while the second set of participants does not meet the trusted participant criteria, the electronic device 500 receives (968), via the one or more input devices, an input corresponding to a request to participate in the communication session, such as selection of option 838f, wherein the input corresponding to the request to participate in the communication session includes transmitting a request 860a for approval to participate in the communication session from a second user account associated with a second electronic device 500b. In some embodiments, the electronic device detects selection of an option to access the communication session and, in response to the request, presents a user interface indicating that access to the communication session is restricted. Optionally, the electronic device detects selection of an option requesting access to the conversation. In some embodiments, the second electronic device receives the request and in response, presents an option to approve access to the communication and an option to deny access to the conversation. Optionally, in response to detecting selection of the option to allow the user of the electronic device to access the conversation, the second electronic device transmits the authorization to the electronic device. In some embodiments, in response to receiving the authorization, the electronic device presents the communication. Optionally, in response to detecting selection of the option to deny access to the conversation, the second electronic device transmits a signal to the electronic device denying access to the conversation or merely forgoes transmitting the approval to access the conversation. In some embodiments, in response to receiving the denial of access or while the approval of access is not received, the electronic device continues to restrict access to the communication. For example, the user account of the electronic device is not allowed to access the communication because one of the participants is not a contact of the user account of the electronic device and the electronic device presents a user interface including an option to request permission to add the participant as a contact. In this example, the electronic device detects selection of the option to request permission to add the participant as a contact. Optionally, when permission to add the participant as a contact is granted, the user account of the electronic device is allowed to access the conversation. For example, the second electronic device presents an option to allow the user account of the electronic device to add the participant as a contact and an option to prohibit the user account of the electronic device from adding the participant as a contact.

In some embodiments, such as in FIG. 8R, after transmitting the request for approval from the second user account associated with the second electronic device (970), in accordance with a determination that the second user account associated with the second electronic device approves 848 the request to participate in the communication session, the electronic device 500 allows (972) the user account associated with the electronic device to participate in the communication session (e.g., the electronic device presents the communication in response to a request to access the communication). For example, the second electronic device detects selection of an option that allows the user account of the electronic device to add the participant as a contact and transmits an indication of the approval to the electronic device. In this example, in response to the indication of the approval, the electronic device adds the participant as a contact and enables access to the communication. As another example, the second electronic device detects selection of an option that allows the user account of the electronic device to access the communication without adding one or more participants as contacts of the user account of the electronic device.

In some embodiments, after transmitting the request for approval from the second user account associated with the second electronic device (970), in accordance with a determination that the second user account associated with the second electronic device does not approve (e.g., disapproves or declines) the request to participate in the communication session, the electronic device 500 prevents (974) the user account associated with the electronic device from participating in the communication session, such as by presenting user interface 836 illustrated in FIG. 8U. For example, the second electronic device detects selection of an option that does not allow the user account of the electronic device to add the participant as a contact and transmits an indication of the disapproval to the electronic device or merely forgoes transmitting an indication of approval. In this example, in response to the indication of the disapproval or in the absence of an indication of approval, the user account of the electronic device is prevented from adding the participant as a contact and is still unable to access to the communication. As another example, the second electronic device detects selection of an option to deny the user account of the electronic device access to the conversation and transmits an indication of the disapproval to the electronic device or merely forgoes transmitting an indication of the approval. In this example, in response to the indication of the disapproval or in the absence of an indication of approval, the user account of the electronic device is prevented from accessing the communication.

The above-described manner of remotely receiving approval to participate in the communication session allows the electronic device to gain access to the communication session without having to enter authentication at the electronic device, which simplifies the interaction between the user and the electronic device and enhances the operability of the electronic device and makes the user-device interface more efficient (e.g., by reducing the number of inputs and operations performed at the electronic device), which additionally reduces power usage and improves battery life of the electronic device by enabling the user to use the electronic device more quickly and efficiently.

In some embodiments, such as in FIG. 8FF, the communication session is of a first communication type, and allowing the user account associated with the electronic device to participate in the communication session includes allowing the user account associated with the electronic device to also participate in a respective communication session of a second communication type with the second set of participants (976), such as by detecting selection of option 860c in FIG. 8FF. In some embodiments, the second electronic device presents a first option to allow the user account of the electronic device to communicate with the participants only using the same type of communication as the communication session and a second option to allow the user account of the electronic device to communicate with the participants using all forms of communication available on the electronic device. For example, if the communication session is a messaging conversation, the second electronic device presents an option to allow the user account of the electronic device to participate in messaging conversations with the participants of the messaging conversation only, and an option to allow the user account of the electronic device to communicate with the participants of the messaging conversation using any form of communication available to the electronic device. In response to detecting selection of the option to allow the user account of the electronic device to communicate with the participants using any of the communication methods available to the electronic device, the second electronic device enables the electronic device to communicate with the participants in any communication method that is available to the electronic device.

The above-described manner of allowing the electronic device to communicate with the second set of participants using both the first and second communication types allows the electronic device to communicate with the participants using either communication type in response to one authorization process, which simplifies the interaction between the user and the electronic device and enhances the operability of the electronic device and makes the user-device interface more efficient (e.g., by reducing the number of inputs needed to access two different communication types), which additionally reduces power usage and improves battery life of the electronic device by enabling the user to use the electronic device more quickly and efficiently.

In some embodiments, such as in FIG. 8FF, the communication session is of a first communication type, and allowing the user account associated with the electronic device to participate in the communication session includes allowing the user account associated with the electronic device to participate in the communication session of the first communication type without allowing the user account associated with the electronic device to participate in a respective communication session of a second communication type with the second set of participants (978), such as by detecting selection of option 860b illustrated in FIG. 8FF. In some embodiments, the second electronic device presents a first option to allow the user account of the electronic device to communicate with the participants only using the same type of communication as the communication session and a second option to allow the user account of the electronic device to communicate with the participants using all forms of communication available on the electronic device. For example, if the communication session is a messaging conversation, the second electronic device presents an option to allow the user account of the electronic device to participate in messaging conversations with the participants of the messaging conversation only and an option to allow the user account of the electronic device to communicate with the participants of the messaging conversation using any form of communication available to the electronic device. In response to detecting selection of the option to allow the user account of the electronic device to communicate with the participants using the first communication type only, the second electronic device enables the user account of the electronic device to communicate with the participants using the first communication type only.

The above-described manner of allowing access to the first communication type but not the second communication type allows the electronic device to continue to restrict access to the second communication type without entering an additional input to restrict the second communication type, which simplifies the interaction between the user and the second electronic device and enhances the operability of the second electronic device and makes the user-device interface more efficient (e.g., by reducing the number of inputs needed to allow the first communication type, but not the second communication type), which additionally reduces power usage and improves battery life of the electronic device by enabling the user to use the electronic device more quickly and efficiently.

In some embodiments, such as in FIG. 8RR, allowing the user account associated with the electronic device to participate in the communication session comprises allowing the user account associated with the electronic device to participate in the communication session for a limited time period (980), such as by detecting selection of option 860f illustrated in FIG. 8RR (e.g., 15 minutes, 30 minutes, rest of day, etc.). In some embodiments, the second electronic device presents a selectable option that, when selected, enables the user account of the electronic device to participate in the communication session for the limited time period. Optionally, after the limited time period is over, the user account of the electronic device is restricted from participating in the communication session.

The above-described manner of allowing the electronic device to access the communication for a limited time period allows the electronic device to automatically enforce the restrictions after the limited time period expires, which simplifies the interaction between the user and the electronic device and enhances the operability of the electronic device and makes the user-device interface more efficient (e.g., by reducing the number of inputs needed to enforce the restrictions after the limited time period expires), which additionally reduces power usage and improves battery life of the electronic device by enabling the user to use the electronic device more quickly and efficiently.

In some embodiments, such as in FIG. 8OO the communication session includes a plurality of participants (982). In some embodiments, the trusted participant criteria apply to a group communication, but not to a one-on-one communication. For example, the user account of the electronic device is permitted to participate in group communications with unknown users as long as at least one member of the group is a contact associated with the user account of the electronic device, but is not allowed to communicate with unknown users one-on-one or in a group that includes unknown users without including at least one contact of the user account of the electronic device.

The above-described manner of applying the trusted participant criteria to communication sessions with a plurality of participants allows the electronic device to communicate in groups of participants in accordance with the communication limits set for the user account, which simplifies the interaction between the user and the electronic device and enhances the operability of the electronic device and makes the user-device interface more efficient (e.g., by reducing the number of inputs needed to send a duplicate communication to multiple known contacts), which additionally reduces power usage and improves battery life of the electronic device by enabling the user to use the electronic device more quickly and efficiently.

In some embodiments, such as in FIG. 8NN, the electronic device 500 receives (984), via the one or more input devices, an input corresponding to a request to initiate a respective communication session (e.g., a messaging conversation, a phone call, a video call, etc.), such as by detecting selection of option 876a, wherein the respective communication session includes a first respective participant that is not a known contact of the user account associated with the electronic device.

In some embodiments, such as in FIG. 8PP, in response to receiving the input corresponding to the request to initiate the respective communication session (986), such as selection of option 876a, in accordance with a determination that the respective communication session only includes the respective participant, the electronic device 500 prevents (988) the user account associated with the electronic device from initiating the communication session, such as in FIG. 8QQ (e.g., the user account of the electronic device is not permitted to communicate with unknown users outside of a group communication that includes a known contact).

In some embodiments, such as in FIG. 8NN, in response to receiving the input corresponding to the request to initiate the respective communication session, such as detecting selection of option 876a (986), in accordance with a determination that the respective communication session includes the respective participant and a known contact of the user account, allowing the user account to initiate the communication, such as in FIG. 8OO (990). In some embodiments, the user account of the electronic device is permitted to communicate with unknown users in group communications that include at least one known contact.

The above-described manner of allowing the electronic device to communicate with an unknown user in a group without allowing the electronic device to communicate with the unknown user alone allows the electronic device to access a group conversation including the unknown user even if the electronic device is not able to communicate with the unknown user alone without requesting access, which simplifies the interaction between the user and the electronic device and enhances the operability of the electronic device and makes the user-device interface more efficient (e.g., by reducing the number of inputs needed to access the group communication), which additionally reduces power usage and improves battery life of the electronic device by enabling the user to use the electronic device more quickly and efficiently.

In some embodiments, such as in FIG. 8U, while the second set of participants does not meet the trusted participant criteria because the second set of participating includes one or more participants that are not known contacts of the user account associated with the electronic device (e.g., the user account of the electronic device is not permitted to contact users that are not contacts), the electronic device 500 receives (992), via the one or more input devices, an input corresponding to a request to display a communication session management user interface for managing participants included in the communication session, such as selection of option 806*a* (e.g., a user interface that includes indications of the participants in the communication session, including options to add and remove participants).

In some embodiments, such as in FIG. 8V, in response to receiving the input corresponding to the request to display the communication session management user interface, the electronic device 500 displays (994), via the display device, the communication session management user interface, wherein the communication session management user interface includes one or more representations 814*d-f* of the one or more participants that are not known contacts of the user account (e.g., the user interface includes a representation of each participant in the communication). In some embodiments, known contacts are indicated by a name associated with the contact and indications of known contacts include one or more options for initiating a communication with the known contact (e.g., via phone, message, video conference). Optionally, unknown users are indicated by identifying information associated with the user account of the unknown user (e.g., phone number, e-mail address).

In some embodiments, such as in FIG. 8W, while displaying the communication session management user interface, the electronic device 500 receives (996), via the one or more input devices, an input corresponding to a request to remove the one or more participants that are not known contacts of the user account from the communication session, such as selection of option 826 (e.g., the electronic device detects selection of a selectable option that, when selected, removes the respective user from the communication. In some embodiments, the electronic device displays the selectable option to remove the participant in response to detecting a swipe input over the representation of the respective participant).

In some embodiments, such as in FIG. 8X, in response to receiving the input corresponding to the request to remove the one or more participants that are not known contacts of the user account from the communication session (998), the electronic device 500 removes (998-2) the one or more participants that are not known contacts of the user account from the communication session (e.g., changing the participants to a subset of the participants of the communication).

In some embodiments, such as in FIG. 8Y, in response to receiving the input corresponding to the request to remove the one or more participants that are not known contacts of the user account from the communication session (998), the electronic device 500 allows (998-4) the user account associated with the electronic device to participate in the communication session. In some embodiments, further communications in the communication session are not transmitted to the one or more participants that are not known contacts of the user account after those participants are removed. Optionally, the user account of the electronic device is able to access the communication session to communicate with the remaining participants.

The above-described manner of allowing the electronic device to access a communication session after removing the unknown user from the group of participants allows the electronic device to communicate with the participants that are approved without requesting permission, which simplifies the interaction between the user and the electronic device and enhances the operability of the electronic device and makes the user-device interface more efficient (e.g., by reducing the amount of time it takes to gain access to a communication with known contacts), which additionally reduces power usage and improves battery life of the electronic device by enabling the user to use the electronic device more quickly and efficiently.

In some embodiments, such as in FIG. 8W, the second set of participants also includes one or more participants 814*d* and 814*e* that are known contacts of the user account associated with the electronic device (998-6) (e.g., the one or more participants are stored as contacts associated with the user account).

In some embodiments, such as in FIG. 8W, the communication session management user interface also includes one or more representations 814*d* and 814*e* of the one or more participants that are known contacts of the user account (998-8) (e.g., the representations of the one or more known contacts include an image included in a contact card of the respective contact and the name of the contact).

In some embodiments, such as in FIG. 8W, the one or more representations 814*d* of the one or more participants that are known contacts of the user account include one or more selectable options 816*d*, 818*d*, 820*d* for initiating communication sessions (e.g., separate or direct communication sessions between the contact and the user) with the one or more participants that are known contacts of the user account (998-10) (e.g., options to initiate a phone call, message, or video call with the respective participant).

In some embodiments, such as in FIG. 8W, the one or more representations 814*f* of the one or more participants that are not known contacts of the user account do not include the one or more selectable options for initiating communication sessions (e.g., separate or direct communication sessions between the contact and the user) with the one or more participants that are not known contacts of the user account (998-12). Optionally, instead of including a name and image of the participants, the representation includes an indication of the user account of the participants (e.g., phone number, e-mail address) without including selectable options for initiating communication sessions with those participants.

The above-described manner of presenting options to contact the known contacts, but not the unknown contacts, within the communication session management user interface allows the electronic device to accept an input for communicating with a known contact, but not an unknown contact, while displaying the communication session management user interface, which simplifies the interaction between the user and the electronic device and enhances the operability of the electronic device and makes the user-device interface more efficient (e.g., by reducing the number of erroneous inputs provided to the device for attempting to communicate with unknown contacts), which additionally reduces power usage and improves battery life of the electronic device by enabling the user to use the electronic device more quickly and efficiently.

In some embodiments, such as in FIG. 8Z, while displaying a communication user interface for initiating a communication session, the electronic device 500 receives (998-14), via the one or more input devices, an input corresponding to a request to add a respective participant to the communication session, such as entry of the contact's name using soft keyboard 828 (e.g., the electronic device detects entry of a name of a contact or a user account (e.g., phone number, email address) of another user into a field in a communication user interface into which recipients of the communication are entered).

In some embodiments, such as in FIG. 8AA, such in response to receiving the input corresponding to the request to add the respective participant to the communication session, the electronic device 500 displays (998-16), in the communication user interface, a visual indication 852a of the respective participant (e.g., the name of the contact or the user account of the user).

In some embodiments, such as in FIG. 8BB, in accordance with a determination that the respective participant is a restricted participant, the visual indication 852b of the respective participant is displayed with a visual characteristic having a first value (998-18) (e.g., a first color, size, font, etc.).

In some embodiments, such as in FIG. 8BB, in accordance with a determination that the respective participant is not a restricted participant, the visual indication 852a of the respective participant is displayed with the visual characteristic having a second value, different than the first value (998-20) (e.g., a second color, size, font, etc.). For example, the user enters the name of a contact and a phone number of an unknown user into a user interface for initiating a video call. In some embodiments, the name of the contact is displayed in a first color (e.g., blue) and the phone number of the unknown user is displayed in a second color (e.g., red) to indicate to the user that the user account of the electronic device is unable to communicate with the unknown user.

The above-described manner of presenting the visual indication of the respective participant with a visual indication that indicates whether or not the participant is restricted allows the electronic device to indicate to the user which participants must be removed in order to send the communication, which simplifies the interaction between the user and the electronic device and enhances the operability of the electronic device and makes the user-device interface more efficient (e.g., by reducing the time and inputs needed to determine how to initiate the communication), which additionally reduces power usage and improves battery life of the electronic device by enabling the user to use the electronic device more quickly and efficiently.

In some embodiments, such as in FIG. 8AA, while displaying the communication user interface for initiating the communication session (998-22), in accordance with the determination that the respective participant is not a restricted participant, the communication user interface includes a selectable option 854b for initiating the communication session with the respective participant (998-24). Optionally, while the one or more participants designated to receive a communication are each known contacts of the user account associated with the electronic device, the electronic device presents a selectable option that, when selected, initiates the communication because the electronic device is permitted to communicate with the known contacts.

In some embodiments, such as in FIG. 8BB, while displaying the communication user interface for initiating the communication session (998-22), in accordance with the determination that the respective participant is a restricted participant, the communication user interface does not include the selectable option 854b for initiating the communication session with the respective participant (998-26). In some embodiments, the electronic device does not display the selectable option to initiate the communication session because the user account of the electronic device is not permitted to communicate with the unknown users. Optionally, if the user account of the electronic device is permitted to communicate with unknown users in group communications that include at least one known contact, the electronic device displays the selectable option for initiating the communication session if there is a known contact designated to receive the communication in addition to the unknown user.

The above-described manner of forgoing presenting an option for initiating communication when communication cannot be initiated allows the electronic device to indicate to the user that the communication will not be sent before receiving an input to send the communication, which simplifies the interaction between the user and the electronic device and enhances the operability of the electronic device and makes the user-device interface more efficient (e.g., by reducing the time and inputs needed to figure out whether or not the communication is permitted), which additionally reduces power usage and improves battery life of the electronic device by enabling the user to use the electronic device more quickly and efficiently.

In some embodiments, such as in FIG. 8VV, while a usage limit associated with the user account associated with the electronic device has been reached, the electronic device 500 receives (998-28), via the one or more input devices, an input corresponding to a request to initiate a respective communication session with a respective participant, such as selection of option 804g, wherein the respective participant meets the trusted participant criteria. Optionally, the usage limit is a maximum amount of time the electronic device is able to perform an operation, such as operating one or more applications or a predetermined period of time during which usage of the electronic device to perform one or more predetermined operations (e.g., operating one or more applications) is not permitted. In some embodiments, while the usage limit has been reached, the electronic device detects an input corresponding to a request to communicate with the respective participant.

In some embodiments, such as in FIG. 8TT, in response to receiving the input corresponding to the request to initiate the respective communication session with the respective participant (998-30), in accordance with a determination that the respective participant meets whitelist criteria associated with the usage limit, the electronic device 500 allows (998-32) the user account associated with the electronic device to participate in the respective communication session (e.g., the user account of the electronic device is permitted to communicate with one or more users included in a whitelist even when the usage limit has been reached).

In some embodiments, such as in FIG. 8WW, in response to receiving the input corresponding to the request to initiate the respective communication session with the respective participant (998-30), in accordance with a determination that the respective participant does not meet the whitelist criteria associated with the usage limit, preventing the user account from participating in the communication session (998-34). In some embodiments, the user account of the electronic device is permitted to communicate with the respective participant when the usage limit has not been reached. Optionally, once the usage limit has been reached, the user account of the electronic device is no longer able to communicate with the respective user until the usage limit is reset, even though the respective participant meets the trusted participant criteria. In some embodiments, a usage limit that is a predetermined amount of time that the electronic device is able to perform an operation is reset periodically (e.g., every day, every week, etc.). Optionally, if a usage limit is a predetermined period of time (e.g., a predetermined time of day) during which device usage is restricted, the usage limit is reset at the end of the predetermined period of time.

The above-described manner of allowing communication with whitelisted contacts when the usage limit is reached—but not allowing such communication with non-whitelisted contacts—allows the electronic device to communicate with the whitelisted contacts when the usage limit is reached without requesting permission, which simplifies the interaction between the user and the electronic device and enhances the operability of the electronic device and makes the user-device interface more efficient (e.g., by reducing the number of inputs needed to communicate with the whitelisted contacts when the usage limit is reached), which additionally reduces power usage and improves battery life of the electronic device by enabling the user to use the electronic device more quickly and efficiently.

It should be understood that the particular order in which the operations in FIGS. 9A-9L have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9L. For example, the ways the electronic device enforces communication restrictions as described above with reference to method 900 optionally have one or more of the characteristics of ways of managing communication subscriptions, etc., described herein with reference to other methods described herein (e.g., method 700). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 9A-9L are, optionally, implemented by components depicted in FIGS. 1A-1B. For example, displaying operations 938, 948, and 950 and receiving operations 944, 952, and 968 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to present content of relevance to the user. The present disclosure contemplates that in some instances, this gathered data may include personal information data that uniquely identifies or can be used to identify a specific person. Such personal information data can include demographic data, location-based data, online identifiers, telephone numbers, e-mail addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, accessing contacts data of a supervised user account from a supervising user account enables the supervising user to configure communication restrictions enforced on the supervised user account. Accordingly, use of such personal information data enables supervising users to supervise the contacts with which supervised users are able to communicate. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. For example, with the permission of a supervising user, supervised users can select not to share contact information with other user accounts.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, communication restrictions can be managed on the electronic device of the user account for which the communication restrictions are enforced (e.g., via a passcode known by a supervising person (e.g., parent/guardian) and unknown to a supervised person (e.g., child)).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
   at an electronic device in communication with a display device and one or more input devices:
      while a communication session that includes a first set of participants meets trusted participant criteria, wherein the trusted participant criteria is based on a trust level associated with participants in the first set of participants, allowing a user account associated with the electronic device to participate in the communication session;
      after the user account associated with the electronic device has participated in the communication session, detecting a change in participants in the communication session from a first set of participants to a second set of participants, wherein the second set of participants is different from the first set of participants; and
      after detecting the change in participants in the communication session from the first set of participants to the second set of participants, receiving a request to access the communication session; and
      in response to the request to access the communication session:
         in accordance with a determination that the second set of participants meets the trusted participant criteria, allowing the user account associated with the electronic device to participate in the communication session including providing access to content of the communication session; and
         in accordance with a determination that the second set of participants does not meet the trusted participant criteria, displaying a user interface that includes an indication that participation in the communication session is restricted and an indication of a reason that participation in the communication session is restricted while restricting the user account associated with the electronic device from participating in the communication session.

2. The method of claim 1, wherein a respective set of participants meets the trusted participant criteria when at least one participant in the respective set of participants is a known contact of the user account associated with the electronic device, and does not meet the trusted participant criteria when every participant in the respective set of participants is not a known contact of the user account.

3. The method of claim 2, wherein the change in participants is removing a first respective contact that is a known contact of the user account associated with the electronic device from the communication session, wherein the second set of contacts does not include a known contact of the user account, and the second set of participants does not meet the trusted participant criteria, the method further comprising:
   after restricting the user account associated with the electronic device from participating in the communication session, detecting a second change in participants in the communication session from the second set of participants to a third set of participants, the second change including adding a second respective contact that is a known contact of the user account to the communication session; and
   in response to detecting the second change in participants in the communication session, allowing the user account to participate in the communication session.

4. The method of claim 1, wherein a respective set of participants meets the trusted participant criteria when every participant in the respective set of participants is a known contact of the user account associated with the electronic device, and does not meet the trusted participant criteria when at least one participant in the respective set of participants is not a known contact of the user account.

5. The method of claim 4, wherein the change in participants is adding a first respective contact that is not a known contact of the user account associated with the electronic device to the communication session, and the second set of participants does not meet the trusted participant criteria, the method further comprising:
   after restricting the user account associated with the electronic device from participating in the communication session, detecting a second change in participants in the communication session from the second set of participants to a third set of participants, the second change including removing the first respective contact from the communication session; and
   in response to detecting the second change in participants in the communication session, allowing the user account to participate in the communication session.

6. The method of claim 1, wherein:
   while a respective set of participants meets the trusted participant criteria for a first respective communication session of a first communication type, the respective set of participants meets the trusted participant criteria for a second respective communication session of a second communication type, different than the first communication type; and while the respective set of participants does not meet the trusted participant criteria for the first respective communication session of the first communication type, the respective set of participants does not meet the trusted participant criteria for the second respective communication session of the second communication type.

7. The method of claim 1, wherein the change in participants in the communication session includes addition of a respective participant to the communication session.

8. The method of claim 1, wherein the change in participants in the communication session includes removal of a respective participant from the communication session.

9. The method of claim 1, wherein participating in the communication session includes initiating the communication session or receiving at least a portion of a communication from the communication session.

10. The method of claim 1, further comprising:
displaying, via the display device, a communication user interface that includes a representation of the communication session, wherein:
in accordance with the determination that the second set of participants meets the trusted participant criteria, the representation of the communication session includes a preview of content of the communication session, and
in accordance with the determination that the second set of participants does not meet the trusted participant criteria, the representation of the communication session does not include the preview of the content of the communication session.

11. The method of claim 10, further comprising:
while displaying the communication user interface, receiving, via the one or more input devices, input directed to the representation of the communication session; and
in response to receiving the input directed to the representation of the communication session:
in accordance with the determination that the second set of participants meets the trusted participant criteria, displaying, via the display device, the content of the communication session; and
in accordance with the determination that the second set of participants does not meet the trusted participant criteria, displaying, via the display device, a user interface that includes information about one or more participants in the second set of participants that are restricted, and from which the one or more participants in the second set of participants can be authorized, without displaying the content of the communication session.

12. The method of claim 1, further comprising:
while the second set of participants does not meet the trusted participant criteria, receiving, via the one or more input devices, an input corresponding to a request to participate in the communication session; and
in response to receiving the input corresponding to the request to participate in the communication session, presenting a user interface that includes information about one or more participants in the second set of participants that are restricted, and a selectable option that is selectable to initiate a process to add the one or more participants as known contacts to the user account associated with the electronic device.

13. The method of claim 12, wherein the process to add the one or more participants as known contacts to the user account includes inputting authentication credentials for an authorized user before the one or more participants can be added as known contacts to the user account.

14. The method of claim 13, wherein the second set of participants includes a first restricted participant and a second restricted participant, and the user interface that includes information about the first and second restricted participants in the second set of participants includes a first selectable option that is selectable to initiate a process to add the first restricted participant to the user account as a known contact, and a second selectable option that is selectable to initiate a process to add the second restricted participant to the user account as a known contact.

15. The method of claim 13, wherein the second set of participants includes a first restricted participant and a second restricted participant, the user interface includes a first selectable option that is selectable to initiate a process to add the first restricted participant to the user account as a known contact, and a second user interface, different than the user interface, includes a second selectable option that is selectable to initiate a process to add the second restricted participant to the user account as a known contact.

16. The method of claim 13, wherein the process to add the one or more participants as known contacts to the user account associated with the electronic device includes:
requiring a user of the electronic device to input, to the electronic device, contact information for the one or more participants; and
after receiving the contact information for the one or more participants, transmitting, to a second user account, the contact information for the one or more participants for approval or disapproval by the second user account.

17. The method of claim 1, further comprising:
while the second set of participants does not meet the trusted participant criteria, receiving, via the one or more input devices, an input corresponding to a request to participate in the communication session, wherein the input corresponding to the request to participate in the communication session includes transmitting a request for approval to participate in the communication session from a second user account associated with a second electronic device; and
after transmitting the request for approval from the second user account associated with the second electronic device:
in accordance with a determination that the second user account associated with the second electronic device approves the request to participate in the communication session, allowing the user account associated with the electronic device to participate in the communication session; and
in accordance with a determination that the second user account associated with the second electronic device does not approve the request to participate in the communication session, preventing the user account associated with the electronic device from participating in the communication session.

18. The method of claim 17, wherein the communication session is of a first communication type, and allowing the user account associated with the electronic device to participate in the communication session includes allowing the user account associated with the electronic device to also participate in a respective communication session of a second communication type with the second set of participants.

19. The method of claim 17, wherein the communication session is of a first communication type, and allowing the user account associated with the electronic device to participate in the communication session includes allowing the user account associated with the electronic device to participate in the communication session of the first communication type without allowing the user account associated with the electronic device to participate in a respective communication session of a second communication type with the second set of participants.

20. The method of claim 17, wherein allowing the user account associated with the electronic device to participate in the communication session comprises allowing the user account associated with the electronic device to participate in the communication session for a limited time period.

21. The method of claim 1, wherein the communication session includes a plurality of participants.

22. The method of claim 1, further comprising:
receiving, via the one or more input devices, an input corresponding to a request to initiate a respective communication session, wherein the respective communication session includes a respective participant that is not a known contact of the user account associated with the electronic device; and
in response to receiving the input corresponding to the request to initiate the respective communication session:
in accordance with a determination that the respective communication session only includes the respective participant, preventing the user account associated with the electronic device from initiating the communication session; and
in accordance with a determination that the respective communication session includes the respective participant and a known contact of the user account, allowing the user account to initiate the communication.

23. The method of claim 1, further comprising:
while the second set of participants does not meet the trusted participant criteria because the second set of participants includes one or more participants that are not known contacts of the user account associated with the electronic device, receiving, via the one or more input devices, an input corresponding to a request to display a communication session management user interface for managing participants included in the communication session;
in response to receiving the input corresponding to the request to display the communication session management user interface, displaying, via the display device, the communication session management user interface, wherein the communication session management user interface includes one or more representations of the one or more participants that are not known contacts of the user account;
while displaying the communication session management user interface, receiving, via the one or more input devices, an input corresponding to a request to remove the one or more participants that are not known contacts of the user account from the communication session; and
in response to receiving the input corresponding to the request to remove the one or more participants that are not known contacts of the user account from the communication session:
removing the one or more participants that are not known contacts of the user account from the communication session; and
allowing the user account associated with the electronic device to participate in the communication session.

24. The method of claim 23, wherein:
the second set of participants also includes one or more participants that are known contacts of the user account associated with the electronic device,
the communication session management user interface also includes one or more representations of the one or more participants that are known contacts of the user account,
the one or more representations of the one or more participants that are known contacts of the user account include one or more selectable options for initiating communication sessions with the one or more participants that are known contacts of the user account, and
the one or more representations of the one or more participants that are not known contacts of the user account do not include the one or more selectable options for initiating communication sessions with the one or more participants that are not known contacts of the user account.

25. The method of claim 1, further comprising:
while displaying a communication user interface for initiating a communication session, receiving, via the one or more input devices, an input corresponding to a request to add a respective participant to the communication session; and
in response to receiving the input corresponding to the request to add the respective participant to the communication session, displaying, in the communication user interface, a visual indication of the respective participant, wherein:
in accordance with a determination that the respective participant is a restricted participant, the visual indication of the respective participant is displayed with a visual characteristic having a first value; and
in accordance with a determination that the respective participant is not a restricted participant, the visual indication of the respective participant is displayed with the visual characteristic having a second value, different than the first value.

26. The method of claim 25, wherein, while displaying the communication user interface for initiating the communication session:
in accordance with the determination that the respective participant is not a restricted participant, the communication user interface includes a selectable option for initiating the communication session with the respective participant, and
in accordance with the determination that the respective participant is a restricted participant, the communication user interface does not include the selectable option for initiating the communication session with the respective participant.

27. The method of claim 1, further comprising:
while a usage limit associated with the user account associated with the electronic device has been reached, receiving, via the one or more input devices, an input corresponding to a request to initiate a respective communication session with a respective participant, wherein the respective participant meets the trusted participant criteria; and in response to receiving the input corresponding to the request to initiate the respective communication session with the respective participant:
in accordance with a determination that the respective participant meets whitelist criteria associated with the usage limit, allowing the user account associated with the electronic device to participate in the respective communication session; and
in accordance with a determination that the respective participant does not meet the whitelist criteria associated with the usage limit, preventing the user account from participating in the communication session.

28. An electronic device, comprising:
one or more processors;
memory; and
one or more programs, wherein the one or more programs are stored in the memory and configured to be executed by the one or more processors, the one or more programs including instructions for:
while a communication session that includes a first set of participants meets trusted participant criteria, wherein the trusted participant criteria is based on a trust level associated with participants in the first set of participants, allowing a user account associated with the electronic device to participate in the communication session;
after the user account associated with the electronic device has participated in the communication session, detecting a change in participants in the communication session from a first set of participants to a second set of participants, wherein the second set of participants is different from the first set of participants; and
after detecting the change in participants in the communication session from the first set of participants to the second set of participants, receiving a request to access the communication session; and
in response to the request to access the communication session:
in accordance with a determination that the second set of participants meets the trusted participant criteria, allowing the user account associated with the electronic device to participate in the communication session including providing access to content of the communication session; and
in accordance with a determination that the second set of participants does not meet the trusted participant criteria, displaying a user interface that includes an indication that participation in the communication session is restricted and an indication of a reason that participation in the communication session is restricted while restricting the user account associated with the electronic device from participating in the communication session.

29. A non-transitory computer readable storage medium storing one or more programs, the one or more programs comprising instructions, which when executed by one or more processors of an electronic device, cause the electronic device to:
while a communication session that includes a first set of participants meets trusted participant criteria, wherein the trusted participant criteria is based on a trust level associated with participants in the first set of participants, allow a user account associated with the electronic device to participate in the communication session;
after the user account associated with the electronic device has participated in the communication session, detect a change in participants in the communication session from a first set of participants to a second set of participants, wherein the second set of participants is different from the first set of participants; and
after detecting the change in participants in the communication session from the first set of participants to the second set of participants, receive a request to access the communication session; and
in response to the request to access the communication session:
in accordance with a determination that the second set of participants meets the trusted participant criteria, allow the user account associated with the electronic device to participate in the communication session including providing access to content of the communication session; and
in accordance with a determination that the second set of participants does not meet the trusted participant criteria, display a user interface that includes an indication that participation in the communication session is restricted and an indication of a reason that participation in the communication session is restricted while restricting the user account associated with the electronic device from participating in the communication session.

30. The electronic device of claim 28, wherein a respective set of participants meets the trusted participant criteria when at least one participant in the respective set of participants is a known contact of the user account associated with the electronic device, and does not meet the trusted participant criteria when every participant in the respective set of participants is not a known contact of the user account.

31. The electronic device of claim 30, wherein the change in participants is removing a first respective contact that is a known contact of the user account associated with the electronic device from the communication session, wherein the second set of contacts does not include a known contact of the user account, and the second set of participants does not meet the trusted participant criteria, the one or more programs further including instructions for:
after restricting the user account associated with the electronic device from participating in the communication session, detecting a second change in participants in the communication session from the second set of participants to a third set of participants, the second change including adding a second respective contact that is a known contact of the user account to the communication session; and
in response to detecting the second change in participants in the communication session, allowing the user account to participate in the communication session.

32. The electronic device of claim 28, wherein a respective set of participants meets the trusted participant criteria when every participant in the respective set of participants is a known contact of the user account associated with the electronic device, and does not meet the trusted participant criteria when at least one participant in the respective set of participants is not a known contact of the user account.

33. The electronic device of claim 32, wherein the change in participants is adding a first respective contact that is not a known contact of the user account associated with the electronic device to the communication session, and the second set of participants does not meet the trusted participant criteria, the one or more programs further including instructions for:

after restricting the user account associated with the electronic device from participating in the communication session, detecting a second change in participants in the communication session from the second set of participants to a third set of participants, the second change including removing the first respective contact from the communication session; and in response to detecting the second change in participants in the communication session, allowing the user account to participate in the communication session.

34. The electronic device of claim 28, wherein:
while a respective set of participants meets the trusted participant criteria for a first respective communication session of a first communication type, the respective set of participants meets the trusted participant criteria for a second respective communication session of a second communication type, different than the first communication type; and
while the respective set of participants does not meet the trusted participant criteria for the first respective communication session of the first communication type, the respective set of participants does not meet the trusted participant criteria for the second respective communication session of the second communication type.

35. The electronic device of claim 28, wherein the change in participants in the communication session includes addition of a respective participant to the communication session.

36. The electronic device of claim 28, wherein the change in participants in the communication session includes removal of a respective participant from the communication session.

37. The electronic device of claim 28, wherein participating in the communication session includes initiating the communication session or receiving at least a portion of a communication from the communication session.

38. The electronic device of claim 28, wherein the one or more programs further include instructions for:
displaying, via the display device, a communication user interface that includes a representation of the communication session, wherein:
in accordance with the determination that the second set of participants meets the trusted participant criteria, the representation of the communication session includes a preview of content of the communication session, and
in accordance with the determination that the second set of participants does not meet the trusted participant criteria, the representation of the communication session does not include the preview of the content of the communication session.

39. The electronic device of claim 38, wherein the one or more programs further include instructions for:
while displaying the communication user interface, receiving, via the one or more input devices, input directed to the representation of the communication session; and
in response to receiving the input directed to the representation of the communication session:
in accordance with the determination that the second set of participants meets the trusted participant criteria, displaying, via the display device, the content of the communication session; and
in accordance with the determination that the second set of participants does not meet the trusted participant criteria, displaying, via the display device, a user interface that includes information about one or more participants in the second set of participants that are restricted, and from which the one or more participants in the second set of participants can be authorized, without displaying the content of the communication session.

40. The electronic device of claim 28, wherein the one or more programs further include instructions for:
while the second set of participants does not meet the trusted participant criteria, receiving, via the one or more input devices, an input corresponding to a request to participate in the communication session; and
in response to receiving the input corresponding to the request to participate in the communication session, presenting a user interface that includes information about one or more participants in the second set of participants that are restricted, and a selectable option that is selectable to initiate a process to add the one or more participants as known contacts to the user account associated with the electronic device.

41. The electronic device of claim 40, wherein the process to add the one or more participants as known contacts to the user account includes inputting authentication credentials for an authorized user before the one or more participants can be added as known contacts to the user account.

42. The electronic device of claim 41, wherein the second set of participants includes a first restricted participant and a second restricted participant, and the user interface that includes information about the first and second restricted participants in the second set of participants includes a first selectable option that is selectable to initiate a process to add the first restricted participant to the user account as a known contact, and a second selectable option that is selectable to initiate a process to add the second restricted participant to the user account as a known contact.

43. The electronic device of claim 41, wherein the second set of participants includes a first restricted participant and a second restricted participant, the user interface includes a first selectable option that is selectable to initiate a process to add the first restricted participant to the user account as a known contact, and a second user interface, different than the user interface, includes a second selectable option that is selectable to initiate a process to add the second restricted participant to the user account as a known contact.

44. The electronic device of claim 41, wherein the process to add the one or more participants as known contacts to the user account associated with the electronic device includes:
requiring a user of the electronic device to input, to the electronic device, contact information for the one or more participants; and
after receiving the contact information for the one or more participants, transmitting, to a second user account, the contact information for the one or more participants for approval or disapproval by the second user account.

45. The electronic device of claim 28, wherein the one or more programs further include instructions for:
while the second set of participants does not meet the trusted participant criteria, receiving, via the one or more input devices, an input corresponding to a request to participate in the communication session, wherein the input corresponding to the request to participate in the communication session includes transmitting a request for approval to participate in the communication session from a second user account associated with a second electronic device; and
after transmitting the request for approval from the second user account associated with the second electronic device:

in accordance with a determination that the second user account associated with the second electronic device approves the request to participate in the communication session, allowing the user account associated with the electronic device to participate in the communication session; and in accordance with a determination that the second user account associated with the second electronic device does not approve the request to participate in the communication session, preventing the user account associated with the electronic device from participating in the communication session.

46. The electronic device of claim 45, wherein the communication session is of a first communication type, and allowing the user account associated with the electronic device to participate in the communication session includes allowing the user account associated with the electronic device to also participate in a respective communication session of a second communication type with the second set of participants.

47. The electronic device of claim 45, wherein the communication session is of a first communication type, and allowing the user account associated with the electronic device to participate in the communication session includes allowing the user account associated with the electronic device to participate in the communication session of the first communication type without allowing the user account associated with the electronic device to participate in a respective communication session of a second communication type with the second set of participants.

48. The electronic device of claim 45, wherein allowing the user account associated with the electronic device to participate in the communication session comprises allowing the user account associated with the electronic device to participate in the communication session for a limited time period.

49. The electronic device of claim 28, wherein the communication session includes a plurality of participants.

50. The electronic device of claim 28, wherein the one or more programs further include instructions for:
receiving, via the one or more input devices, an input corresponding to a request to initiate a respective communication session, wherein the respective communication session includes a respective participant that is not a known contact of the user account associated with the electronic device; and
in response to receiving the input corresponding to the request to initiate the respective communication session:
in accordance with a determination that the respective communication session only includes the respective participant, preventing the user account associated with the electronic device from initiating the communication session; and
in accordance with a determination that the respective communication session includes the respective participant and a known contact of the user account, allowing the user account to initiate the communication.

51. The electronic device of claim 28, wherein the one or more programs further include instructions for:
while the second set of participants does not meet the trusted participant criteria because the second set of participants includes one or more participants that are not known contacts of the user account associated with the electronic device, receiving, via the one or more input devices, an input corresponding to a request to display a communication session management user interface for managing participants included in the communication session;
in response to receiving the input corresponding to the request to display the communication session management user interface, displaying, via the display device, the communication session management user interface, wherein the communication session management user interface includes one or more representations of the one or more participants that are not known contacts of the user account;
while displaying the communication session management user interface, receiving, via the one or more input devices, an input corresponding to a request to remove the one or more participants that are not known contacts of the user account from the communication session; and
in response to receiving the input corresponding to the request to remove the one or more participants that are not known contacts of the user account from the communication session:
removing the one or more participants that are not known contacts of the user account from the communication session; and
allowing the user account associated with the electronic device to participate in the communication session.

52. The electronic device of claim 51, wherein:
the second set of participants also includes one or more participants that are known contacts of the user account associated with the electronic device,
the communication session management user interface also includes one or more representations of the one or more participants that are known contacts of the user account,
the one or more representations of the one or more participants that are known contacts of the user account include one or more selectable options for initiating communication sessions with the one or more participants that are known contacts of the user account, and
the one or more representations of the one or more participants that are not known contacts of the user account do not include the one or more selectable options for initiating communication sessions with the one or more participants that are not known contacts of the user account.

53. The electronic device of claim 28, wherein the one or more programs further include instructions for:
while displaying a communication user interface for initiating a communication session, receiving, via the one or more input devices, an input corresponding to a request to add a respective participant to the communication session; and
in response to receiving the input corresponding to the request to add the respective participant to the communication session, displaying, in the communication user interface, a visual indication of the respective participant, wherein:
in accordance with a determination that the respective participant is a restricted participant, the visual indication of the respective participant is displayed with a visual characteristic having a first value; and
in accordance with a determination that the respective participant is not a restricted participant, the visual indication of the respective participant is displayed with the visual characteristic having a second value, different than the first value.

54. The electronic device of claim 53, wherein, while displaying the communication user interface for initiating the communication session:
  in accordance with the determination that the respective participant is not a restricted participant, the communication user interface includes a selectable option for initiating the communication session with the respective participant, and
  in accordance with the determination that the respective participant is a restricted participant, the communication user interface does not include the selectable option for initiating the communication session with the respective participant.

55. The electronic device of claim 28, wherein the one or more programs further include instructions for:
  while a usage limit associated with the user account associated with the electronic device has been reached, receiving, via the one or more input devices, an input corresponding to a request to initiate a respective communication session with a respective participant, wherein the respective participant meets the trusted participant criteria; and
  in response to receiving the input corresponding to the request to initiate the respective communication session with the respective participant:
    in accordance with a determination that the respective participant meets whitelist criteria associated with the usage limit, allowing the user account associated with the electronic device to participate in the respective communication session; and
    in accordance with a determination that the respective participant does not meet the whitelist criteria associated with the usage limit, preventing the user account from participating in the communication session.

56. The non-transitory computer readable storage medium of claim 29, wherein a respective set of participants meets the trusted participant criteria when at least one participant in the respective set of participants is a known contact of the user account associated with the electronic device, and does not meet the trusted participant criteria when every participant in the respective set of participants is not a known contact of the user account.

57. The non-transitory computer readable storage medium of claim 56, wherein the change in participants is removing a first respective contact that is a known contact of the user account associated with the electronic device from the communication session, wherein the second set of contacts does not include a known contact of the user account, and the second set of participants does not meet the trusted participant criteria, wherein the one or more programs further cause the electronic device to:
  after restricting the user account associated with the electronic device from participating in the communication session, detect a second change in participants in the communication session from the second set of participants to a third set of participants, the second change including adding a second respective contact that is a known contact of the user account to the communication session; and
  in response to detecting the second change in participants in the communication session, allow the user account to participate in the communication session.

58. The non-transitory computer readable storage medium of claim 29, wherein a respective set of participants meets the trusted participant criteria when every participant in the respective set of participants is a known contact of the user account associated with the electronic device, and does not meet the trusted participant criteria when at least one participant in the respective set of participants is not a known contact of the user account.

59. The non-transitory computer readable storage medium of claim 58, wherein the change in participants is adding a first respective contact that is not a known contact of the user account associated with the electronic device to the communication session, and the second set of participants does not meet the trusted participant criteria, wherein the one or more programs further cause the electronic device to:
  after restricting the user account associated with the electronic device from participating in the communication session, detect a second change in participants in the communication session from the second set of participants to a third set of participants, the second change including removing the first respective contact from the communication session; and
  in response to detecting the second change in participants in the communication session, allow the user account to participate in the communication session.

60. The non-transitory computer readable storage medium of claim 29, wherein:
  while a respective set of participants meets the trusted participant criteria for a first respective communication session of a first communication type, the respective set of participants meets the trusted participant criteria for a second respective communication session of a second communication type, different than the first communication type; and
  while the respective set of participants does not meet the trusted participant criteria for the first respective communication session of the first communication type, the respective set of participants does not meet the trusted participant criteria for the second respective communication session of the second communication type.

61. The non-transitory computer readable storage medium of claim 29, wherein the change in participants in the communication session includes addition of a respective participant to the communication session.

62. The non-transitory computer readable storage medium of claim 29, wherein the change in participants in the communication session includes removal of a respective participant from the communication session.

63. The non-transitory computer readable storage medium of claim 29, wherein participating in the communication session includes initiating the communication session or receiving at least a portion of a communication from the communication session.

64. The non-transitory computer readable storage medium of claim 29, wherein the one or more programs further cause the electronic device to:
  display, via the display device, a communication user interface that includes a representation of the communication session, wherein:
    in accordance with the determination that the second set of participants meets the trusted participant criteria, the representation of the communication session includes a preview of content of the communication session, and
    in accordance with the determination that the second set of participants does not meet the trusted participant criteria, the representation of the communication session does not include the preview of the content of the communication session.

65. The non-transitory computer readable storage medium of claim 64, wherein the one or more programs further cause the electronic device to:
while displaying the communication user interface, receive, via the one or more input devices, input directed to the representation of the communication session; and
in response to receiving the input directed to the representation of the communication session:
in accordance with the determination that the second set of participants meets the trusted participant criteria, display, via the display device, the content of the communication session; and
in accordance with the determination that the second set of participants does not meet the trusted participant criteria, displaying, via the display device, a user interface that includes information about one or more participants in the second set of participants that are restricted, and from which the one or more participants in the second set of participants can be authorized, without displaying the content of the communication session.

66. The non-transitory computer readable storage medium of claim 29, wherein the one or more programs further cause the electronic device to:
while the second set of participants does not meet the trusted participant criteria, receive, via the one or more input devices, an input corresponding to a request to participate in the communication session; and
in response to receiving the input corresponding to the request to participate in the communication session, present a user interface that includes information about one or more participants in the second set of participants that are restricted, and a selectable option that is selectable to initiate a process to add the one or more participants as known contacts to the user account associated with the electronic device.

67. The non-transitory computer readable storage medium of claim 66, wherein the process to add the one or more participants as known contacts to the user account includes inputting authentication credentials for an authorized user before the one or more participants can be added as known contacts to the user account.

68. The non-transitory computer readable storage medium of claim 67, wherein the second set of participants includes a first restricted participant and a second restricted participant, and the user interface that includes information about the first and second restricted participants in the second set of participants includes a first selectable option that is selectable to initiate a process to add the first restricted participant to the user account as a known contact, and a second selectable option that is selectable to initiate a process to add the second restricted participant to the user account as a known contact.

69. The non-transitory computer readable storage medium of claim 67, wherein the second set of participants includes a first restricted participant and a second restricted participant, the user interface includes a first selectable option that is selectable to initiate a process to add the first restricted participant to the user account as a known contact, and a second user interface, different than the user interface, includes a second selectable option that is selectable to initiate a process to add the second restricted participant to the user account as a known contact.

70. The non-transitory computer readable storage medium of claim 67, wherein the process to add the one or more participants as known contacts to the user account associated with the electronic device includes:
requiring a user of the electronic device to input, to the electronic device, contact information for the one or more participants; and
after receiving the contact information for the one or more participants, transmitting, to a second user account, the contact information for the one or more participants for approval or disapproval by the second user account.

71. The non-transitory computer readable storage medium of claim 29, wherein the one or more programs further cause the electronic device to:
while the second set of participants does not meet the trusted participant criteria, receive, via the one or more input devices, an input corresponding to a request to participate in the communication session, wherein the input corresponding to the request to participate in the communication session includes transmitting a request for approval to participate in the communication session from a second user account associated with a second electronic device; and
after transmitting the request for approval from the second user account associated with the second electronic device:
in accordance with a determination that the second user account associated with the second electronic device approves the request to participate in the communication session, allow the user account associated with the electronic device to participate in the communication session; and
in accordance with a determination that the second user account associated with the prevent electronic device does not approve the request to participate in the communication session, preventing the user account associated with the electronic device from participating in the communication session.

72. The non-transitory computer readable storage medium of claim 71, wherein the communication session is of a first communication type, and allowing the user account associated with the electronic device to participate in the communication session includes allowing the user account associated with the electronic device to also participate in a respective communication session of a second communication type with the second set of participants.

73. The non-transitory computer readable storage medium of claim 71, wherein the communication session is of a first communication type, and allowing the user account associated with the electronic device to participate in the communication session includes allowing the user account associated with the electronic device to participate in the communication session of the first communication type without allowing the user account associated with the electronic device to participate in a respective communication session of a second communication type with the second set of participants.

74. The non-transitory computer readable storage medium of claim 71, wherein allowing the user account associated with the electronic device to participate in the communication session comprises allowing the user account associated with the electronic device to participate in the communication session for a limited time period.

75. The non-transitory computer readable storage medium of claim 29, wherein the communication session includes a plurality of participants.

76. The non-transitory computer readable storage medium of claim 29, wherein the one or more programs further cause the electronic device to:

receive, via the one or more input devices, an input corresponding to a request to initiate a respective communication session, wherein the respective communication session includes a respective participant that is not a known contact of the user account associated with the electronic device; and in response to receiving the input corresponding to the request to initiate the respective communication session:
  in accordance with a determination that the respective communication session only includes the respective participant, prevent the user account associated with the electronic device from initiating the communication session; and
  in accordance with a determination that the respective communication session includes the respective participant and a known contact of the user account, allow the user account to initiate the communication.

77. The non-transitory computer readable storage medium of claim 29, wherein the one or more programs further cause the electronic device to:
  while the second set of participants does not meet the trusted participant criteria because the second set of participants includes one or more participants that are not known contacts of the user account associated with the electronic device, receive, via the one or more input devices, an input corresponding to a request to display a communication session management user interface for managing participants included in the communication session;
  in response to receiving the input corresponding to the request to display the communication session management user interface, display, via the display device, the communication session management user interface, wherein the communication session management user interface includes one or more representations of the one or more participants that are not known contacts of the user account;
  while displaying the communication session management user interface, receive, via the one or more input devices, an input corresponding to a request to remove the one or more participants that are not known contacts of the user account from the communication session; and
  in response to receiving the input corresponding to the request to remove the one or more participants that are not known contacts of the user account from the communication session:
    remove the one or more participants that are not known contacts of the user account from the communication session; and
    allow the user account associated with the electronic device to participate in the communication session.

78. The non-transitory computer readable storage medium of claim 77, wherein:
  the second set of participants also includes one or more participants that are known contacts of the user account associated with the electronic device,
  the communication session management user interface also includes one or more representations of the one or more participants that are known contacts of the user account,
  the one or more representations of the one or more participants that are known contacts of the user account include one or more selectable options for initiating communication sessions with the one or more participants that are known contacts of the user account, and
  the one or more representations of the one or more participants that are not known contacts of the user account do not include the one or more selectable options for initiating communication sessions with the one or more participants that are not known contacts of the user account.

79. The non-transitory computer readable storage medium of claim 29, wherein the one or more programs further cause the electronic device to:
  while displaying a communication user interface for initiating a communication session, receive, via the one or more input devices, an input corresponding to a request to add a respective participant to the communication session; and
  in response to receiving the input corresponding to the request to add the respective participant to the communication session, display, in the communication user interface, a visual indication of the respective participant, wherein:
    in accordance with a determination that the respective participant is a restricted participant, the visual indication of the respective participant is displayed with a visual characteristic having a first value; and
    in accordance with a determination that the respective participant is not a restricted participant, the visual indication of the respective participant is displayed with the visual characteristic having a second value, different than the first value.

80. The non-transitory computer readable storage medium of claim 79, wherein, while displaying the communication user interface for initiating the communication session:
  in accordance with the determination that the respective participant is not a restricted participant, the communication user interface includes a selectable option for initiating the communication session with the respective participant, and
  in accordance with the determination that the respective participant is a restricted participant, the communication user interface does not include the selectable option for initiating the communication session with the respective participant.

81. The non-transitory computer readable storage medium of claim 29, wherein the one or more programs further cause the electronic device to:
  while a usage limit associated with the user account associated with the electronic device has been reached, receive, via the one or more input devices, an input corresponding to a request to initiate a respective communication session with a respective participant, wherein the respective participant meets the trusted participant criteria; and
  in response to receiving the input corresponding to the request to initiate the respective communication session with the respective participant:
    in accordance with a determination that the respective participant meets whitelist criteria associated with the usage limit, allow the user account associated with the electronic device to participate in the respective communication session; and
    in accordance with a determination that the respective participant does not meet the whitelist criteria associated with the usage limit, prevent the user account from participating in the communication session.

* * * * *